United States Patent
Yasui

(10) Patent No.: US 6,925,372 B2
(45) Date of Patent: Aug. 2, 2005

(54) CONTROL APPARATUS, CONTROL METHOD, AND ENGINE CONTROL UNIT

(75) Inventor: Yuji Yasui, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 230 days.

(21) Appl. No.: 10/201,988

(22) Filed: Jul. 25, 2002

(65) Prior Publication Data

US 2003/0023328 A1 Jan. 30, 2003

(30) Foreign Application Priority Data

Jul. 25, 2001 (JP) .......................................... 2001-225041
Jul. 12, 2002 (JP) .......................................... 2002-204891

(51) Int. Cl.⁷ ................................................. B60T 7/12
(52) U.S. Cl. ..................... 701/109; 701/103; 701/115; 123/692; 123/697; 60/276; 60/277; 341/143
(58) Field of Search .................... 341/143; 123/679, 123/672; 60/276, 277, 285; 700/28, 29, 40, 44; 701/103, 109, 115

(56) References Cited

U.S. PATENT DOCUMENTS

| | | | |
|---|---|---|---|
| 5,266,907 A | 11/1993 | Dacus | 331/11 |
| 5,467,185 A | 11/1995 | Engeler et al. | 356/44 |
| 5,623,432 A | 4/1997 | Degrauwe | 364/707 |
| 5,857,443 A * | 1/1999 | Kono et al. | 123/339.2 |
| 5,992,383 A * | 11/1999 | Scholten et al. | 123/399 |
| 6,188,953 B1 * | 2/2001 | Yasui et al. | 701/109 |
| 6,535,153 B1 * | 3/2003 | Zierhofer | 341/143 |

FOREIGN PATENT DOCUMENTS

| | | |
|---|---|---|
| EP | 0 908 801 A2 | 4/1999 |
| EP | 1 106 800 A1 | 6/2001 |

* cited by examiner

Primary Examiner—Tony M. Argenbright
Assistant Examiner—Johnny H. Hoang
(74) Attorney, Agent, or Firm—Squire, Sanders & Dempsey L.L.P.

(57) ABSTRACT

A control apparatus, a control method, and an engine control unit are provided for controlling an output of a controlled object which has a relatively large response delay and/or dead time to rapidly and accurately converge to a target value. When the output of the controlled object is chosen to be that of an air/fuel ratio sensor in an internal combustion engine, the output of the air/fuel ratio sensor can be controlled to rapidly and accurately converge to a target value even in an extremely light load operation mode.

159 Claims, 55 Drawing Sheets

F I G. 7
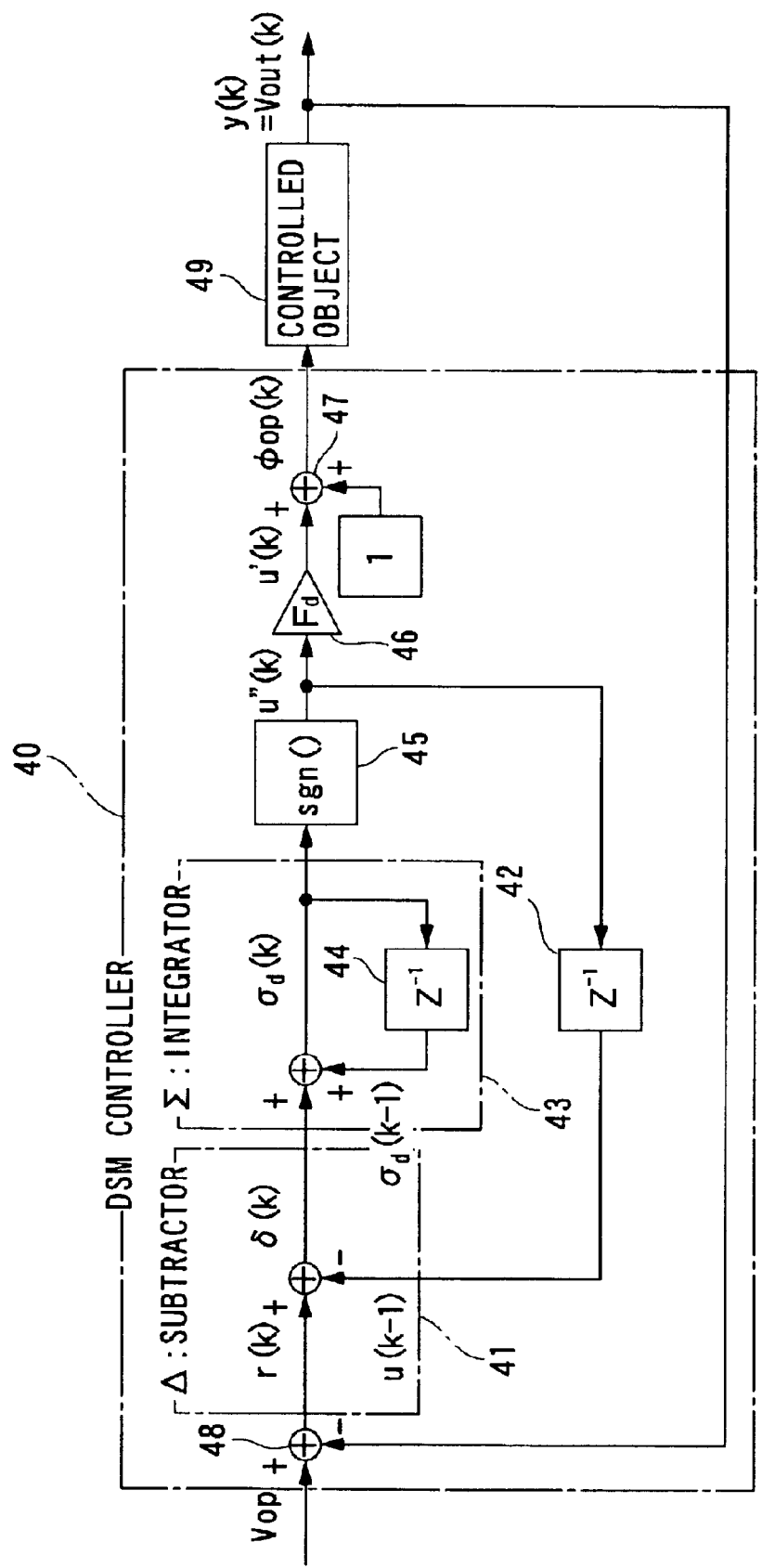

F I G. 1 4
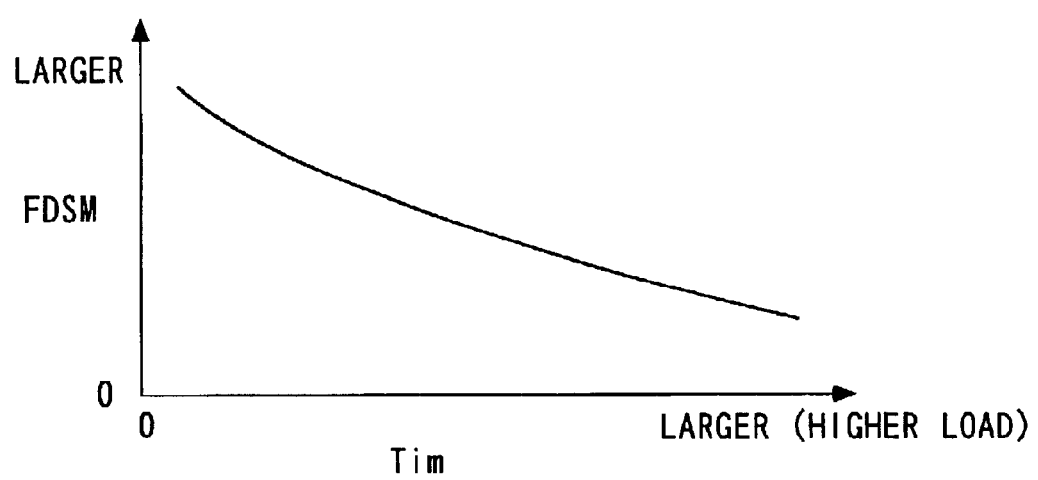

FIG. 18

$$A = \begin{bmatrix} a1 & a2 \\ 1 & 0 \end{bmatrix} \quad \cdots (21)$$

$$B = \begin{bmatrix} b1 \\ 0 \end{bmatrix} \quad \cdots (22)$$

$$PREVO2(k) = \alpha1 \cdot VO2(k) + \alpha2 \cdot VO2(k-1) + \sum_{i=1}^{dt} \beta i \cdot DKCMD(k-i)$$
$$\cdots (23)$$

WHERE $\alpha 1$ : ONE-ROW, ONE-COLUMN ELEMENT OF $A^{dt}$
$\alpha 2$ : ONE-ROW, TWO-COLUMN ELEMENT OF $A^{dt}$
$\beta i$ : ONE-ROW, ELEMENT OF $A^{i-1}B$ $$PREVO2(k) = \alpha1 \cdot VO2(k) + \alpha2 \cdot VO2(k-1)$$
$$+ \sum_{i=1}^{d'-1} \beta i \cdot DKCMD(k-i) + \sum_{j=d'}^{dt} \beta j \cdot DKACT(k-j)$$
$$\cdots (24)$$

WHERE $\beta j$ : ONE-ROW ELEMENT OF $A^{j-1}B$

F I G. 1 9

$$\theta(k) = \theta(k-1) + KP(k) \cdot ide\_f(k) \quad \cdots\cdots (25)$$

$$\theta(k)^T = [a1'(k), a2'(k), b1'(k)] \quad \cdots\cdots (26)$$

$$ide\_f(k) = \frac{1}{n}\sum_{i=1}^{n} ide(i) \quad \cdots\cdots (27)$$

$$ide(k) = VO2(k) - VO2HAT(k) \quad \cdots\cdots (28)$$

$$VO2HAT(k) = \theta(k-1)^T \zeta(k) \quad \cdots\cdots (29)$$

$$\zeta(k)^T = [VO2(k-1), VO2(k-2), DKCMD(k-dt)] \quad \cdots\cdots (30)$$

$$KP(k) = \frac{P(k)\zeta(k)}{1 + \zeta(k)^T P(k)\zeta(k)} \quad \cdots\cdots (31)$$

$$P(k+1) = \frac{1}{\lambda_1}\left(I - \frac{\lambda_2 P(k)\zeta(k)\zeta(k)^T}{\lambda_1 + \lambda_2 \zeta(k)^T P(k)\zeta(k)}\right)P(k) \quad \cdots\cdots (32)$$

WHERE I IS UNIT MATRIX

F I G. 2 0

$$\theta(k) = \theta(k-1) + KP(k) \cdot ide\_f(k) \quad \cdots\cdots (33)$$

$$\theta(k)^T = [a1'(k), a2'(k), b1'(k)] \quad \cdots\cdots (34)$$

$$ide\_f(k) = \frac{1}{n}\sum_{i=1}^{n} ide(i) \quad \cdots\cdots (35)$$

$$ide(k) = VO2(k) - VO2HAT(k) \quad \cdots\cdots (36)$$

$$VO2HAT(k) = \theta(k-1)^T \zeta(k) \quad \cdots\cdots (37)$$

$$\zeta(k)^T = [VO2(k-1), VO2(k-2), DKACT(k-d-dd)] \quad \cdots\cdots (38)$$

$$KP(k) = \frac{P(k)\zeta(k)}{1+\zeta(k)^T P(k)\zeta(k)} \quad \cdots\cdots (39)$$

$$P(k+1) = \frac{1}{\lambda_1}\left(I - \frac{\lambda_2 P(k)\zeta(k)\zeta(k)^T}{\lambda_1 + \lambda_2 \zeta(k)^T P(k)\zeta(k)}\right)P(k) \quad \cdots\cdots (40)$$

WHERE I IS UNIT MATRIX

F I G. 2 3

$$Usl(k) = Ueq(k) + Urch(k) + Uadp(k) \quad \cdots \cdot (48)$$

$$Ueq(k) = \frac{-1}{S1 \cdot b1}\{[S1 \cdot (a1-1) + S2] \cdot VO2(k+dt)$$
$$+ (S1 \cdot a2 - S2) \cdot VO2(k+dt-1)\} \quad \cdots \cdot (49)$$

$$Urch(k) = \frac{-F}{S1 \cdot b1} \cdot \sigma(k+dt) \quad \cdots \cdot (50)$$

$$Uadp(k) = \frac{-G}{S1 \cdot b1} \sum_{i=0}^{k+dt} \Delta T \cdot \sigma(i) \quad \cdots \cdot (51)$$

FIG. 24

$$\sigma PRE(k) = S1 \cdot PREVO2(k) + S2 \cdot PREVO2(k-1) \quad \cdots \cdot (52)$$

$$Usl(k) = Ueq(k) + Urch(k) + Uadp(k) \quad \cdots \cdot (53)$$

$$Ueq(k) = \frac{-1}{S1 \cdot b1}\{[S1 \cdot (a1-1) + S2] \cdot PREVO2(k) \\ + (S1 \cdot a2 - S2) \cdot PREVO2(k-1)\} \quad \cdots \cdot (54)$$

$$Urch(k) = \frac{-F}{S1 \cdot b1} \cdot \sigma PRE(k) \quad \cdots \cdot (55)$$

$$Uadp(k) = \frac{-G}{S1 \cdot b1} \sum_{i=0}^{k} \Delta T \cdot \sigma PRE(i) \quad \cdots \cdot (56)$$

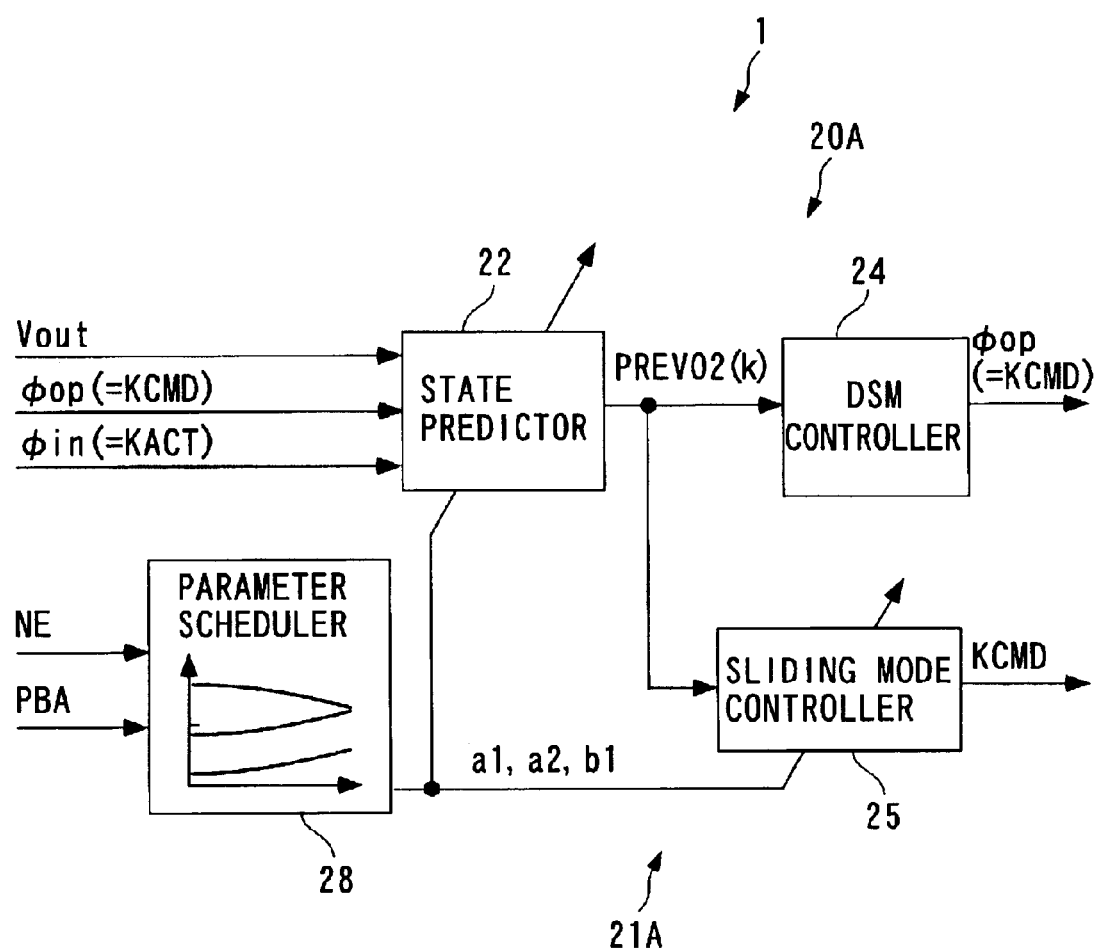
F I G. 5 2

CONTROL APPARATUS, CONTROL METHOD, AND ENGINE CONTROL UNIT

BACKGROUND OF THE INVENTION

1. Field of the Invention

The present invention relates to a control apparatus, a control method, and an engine control unit which control an output of a controlled object to converge to a target value in accordance with a deviation of the output from the target value.

2. Description of the Prior Art

Conventionally, a control apparatus of the type mentioned above is known, for example, from Laid-open Japanese Patent Application No. 2000-179385. Specifically, Laid-open Japanese Patent Application No. 2000-179385 describes an air/fuel ratio control apparatus for an internal combustion engine for controlling an air/fuel ratio of exhaust gases in an exhaust pipe of the internal combustion engine. An LAF sensor and an O2 sensor are provided respectively at a location upstream and at a location downstream of a catalyzer arranged in an exhaust passage of the internal combustion engine. The LAF sensor linearly detects an oxygen concentration in exhaust gases in a wide range of air/fuel ratio from a rich region to a lean region to output a detection signal KACT which is proportional to the detected oxygen concentration. The O2 sensor in turn generates a detection output VO2OUT at high level (for example, 0.8 volts) when an air/fuel mixture is richer than the stoichiometric air/fuel ratio; at low level (for example, 0.2 volts) when the air/fuel mixture is lean; and at a predetermined target value VO2TARGET (for example, 0.6 volts) between the high level and low level when the air/fuel mixture is near the stoichiometric air/fuel ratio.

The foregoing air/fuel ratio control apparatus relies on the following air/fuel ratio control to converge the air/fuel ratio of exhaust gases emitted from the internal combustion engine to a target value. First, the control apparatus calculates a basic fuel injection amount Tim and a correction coefficient KTOTAL therefor based on an operating condition of the internal combustion engine. Next, the control apparatus determines whether or not the internal combustion engine is in a predetermined operation mode in which the control apparatus should employ a target air/fuel ratio KCMD which is calculated by an adaptive sliding mode control different from this air/fuel ratio control. In this event, the control apparatus determines that the internal combustion engine is in the predetermined operation mode when the O2 sensor and LAF sensor are activated, and when an engine rotational speed NE and absolute intake pipe inner pressure PBA are within respective predetermined ranges. When the internal combustion engine is in the predetermined operation mode, as determined, the control apparatus reads the target air/fuel ratio KCMD calculated by the adaptive sliding mode control.

On the other hand, when the internal combustion engine is not in the predetermined operation mode, the control apparatus searches a map based on the engine rotational speed NE and absolute intake pipe inner pressure PBA to calculate the target air/fuel ratio KCMD. Next, the control apparatus calculates a variety of feedback coefficients #nKLAF, KFB. Then, the control apparatus corrects the target air/fuel ratio KCMD thus calculated in accordance with an air density to calculate a corrected target air/fuel ratio KCMDM. The control apparatus multiplies the basic fuel injection amount Tim by the total correction coefficient KTOTAL, corrected target air/fuel ratio KCMDM, and feedback coefficients #nKLAF, KFB to calculate a fuel injection amount #nTOUT for each cylinder and correct the resulting fuel injection amount #nTOUT for sticking. Subsequently, the control apparatus outputs a driving signal based on the fuel injection amount #nTOUT corrected for sticking to an fuel injector.

In the foregoing manner, the air/fuel ratio control apparatus controls the output KACT of the LAF sensor to converge to the target air/fuel ratio KCMD, and accordingly controls the output VO2OUT of the O2 sensor to converge to the target value VO2TARGET. Particularly, when the internal combustion engine is in the predetermined operation mode, the control apparatus employs the adaptive sliding mode control to calculate the target air/fuel ratio KCMD, so that the output VO2OUT of the O2 sensor can be more rapidly converged to the target value VO2TARGET than when the internal combustion engine is not in the predetermined operation mode. In other words, the control apparatus accurately controls the air/fuel ratio of an air/fuel mixture for the internal combustion engine to come closer to the stoichiometric air/fuel ratio with a high responsibility. Generally, a catalyzer most effectively purifies HC, CO, and NOx when the air/fuel ratio of the air/fuel mixture lies near the stoichiometric air/fuel ratio, so that the air/fuel ratio control apparatus can provide a satisfactory exhaust gas characteristic.

The conventional air/fuel ratio control apparatus described above can advantageously control the air/fuel ratio with a high responsibility when the internal combustion engine is in the predetermined operation mode by employing the adaptive sliding mode control to calculate the target air/fuel ratio KCMD. However, when the control apparatus conducts the foregoing adaptive sliding mode control when the internal combustion engine is in an extremely low load operation mode such as an idle operation mode, a reduced exhaust gas volume, longer response delay and dead time of the O2 sensor in providing the output VO2OUT, and a reduced range of the air/fuel ratio in which a stable combustion state can be ensured for the internal combustion engine will cause a degradation in controllability of the output VO2OUT of the O2 sensor with respect to the target value VO2TARGET. As a result, the air/fuel ratio of the air/fuel mixture fluctuates about the stoichiometric air/fuel ratio to reduce the purification percentage of exhaust gases by the catalyzer, possibly resulting in exacerbated characteristic of exhaust gases purified by the catalyzer (hereinafter called the "post-catalyst exhaust gas characteristic").

OBJECT AND SUMMARY OF THE INVENTION

The present invention has been made to solve the foregoing problem, and it is an object of the invention to provide a control apparatus, a control method, and an engine control unit which are capable of controlling an output of a controlled object which is limited in an available range for a control input, a controlled object which has a relatively large response delay and/or dead time, and the like to rapidly and accurately converge to a target value. Particularly, when the output of the controlled object is chosen to be that of an air/fuel ratio sensor in an internal combustion engine, the control apparatus, control method, and engine control unit can control the output of the air/fuel ratio sensor to rapidly and accurately converge to a target value even when the internal combustion engine is in an extremely low load operation mode, thereby providing a satisfactory post-catalyst exhaust gas characteristic.

To achieve the above object, according to a first aspect of the present invention, there is provided a control apparatus characterized by comprising deviation calculating means for calculating a deviation of an output of a controlled object from a predetermined target value; and control input calculating means for calculating a control input to the controlled object based on one modulation algorithm selected from a $\Delta$ modulation algorithm, a $\Delta\Sigma$ modulation algorithm, and a $\Sigma\Delta$ modulation algorithm for converging the output of the controlled object to the target value in accordance with the calculated deviation.

According to this control apparatus, the control input to the controlled object is calculated based on one modulation algorithm selected from a $\Delta$ modulation algorithm, a $\Delta\Sigma$ modulation algorithm, and a $\Sigma\Delta$ modulation algorithm (hereinafter called the "one modulation algorithm") in accordance with the deviation of the output of the controlled object from the predetermined target value, and the output of the controlled object is controlled to converge to the target value by the calculated control input. Since the control input is thus calculated in accordance with the deviation of the output of the controlled object from the target value based on the one modulation algorithm, the control input can be calculated to derive the output of the controlled object for generating the deviation having the opposite phase waveform to the deviation of the output of the controlled object from the target value so as to cancel the same. It is therefore possible to accurately and rapidly converge the output of a controlled object applied with a control input changing in a narrow range, a controlled object with a low response accuracy of an actual input to a control input, a controlled object having a dead time and a response delay, a controlled object with a large response delay, and the like to a target value without variations (it should be noted that in this specification, "calculation" in "calculation of a deviation," "calculation of a control input" and the like is not limited to a program-based operation but includes hardware-based generation of electric signals indicative of such values).

To achieve the above object, according to a second aspect of the invention, there is provided a control method comprising the steps of calculating a deviation of an output of a controlled object from a predetermined target value; and calculating a control input to the controlled object based on one modulation algorithm selected from a $\Delta$ modulation algorithm, a $\Delta\Sigma$ modulation algorithm, and a $\Sigma\Delta$ modulation algorithm for converging the output of the controlled object to the target value in accordance with the calculated deviation.

This control method provides the same advantageous effects as described above concerning the control apparatus according to the first aspect of the invention.

To achieve the above object, according to a third aspect of the invention, there is provided an engine control unit including a control program for causing a computer to calculate a deviation of an output of a controlled object from a predetermined target value; and calculate a control input to the controlled object based on one modulation algorithm selected from a $\Delta$ modulation algorithm, a $\Delta\Sigma$ modulation algorithm, and a $\Sigma\Delta$ modulation algorithm for converging the output of the controlled object to the target value in accordance with the calculated deviation.

This engine control unit provides the same advantageous effects as described above concerning the control apparatus according to the first aspect of the invention.

Preferably, in the control apparatus described above, the control input calculating means calculates a first intermediate value in accordance with the deviation based on the one modulation algorithm, and calculates the control input based on a product of the calculated first intermediate value and a predetermined gain.

Generally, each of the $\Delta\Sigma$ modulation algorithm, $\Sigma\Delta$ modulation algorithm, and $\Delta$ modulation algorithm determines a control input on the assumption that a controlled object has a unity gain, so that if the controlled object has an actual gain different from a unity value, the controllability may be degraded due to a failure in calculating an appropriate control input. For example, when the controlled object has an actual gain larger than one, the control input is calculated as a value larger than necessity, resulting in an over-gain condition. On the other hand, according to this preferred embodiment of the control apparatus, the control input is calculated based on the first intermediate value, which is calculated based on the one modulation algorithm, multiplied by a predetermined gain, so that a satisfactory controllability can be ensured by setting the predetermined gain to an appropriate value.

Preferably, in the control method described above, the step of calculating a control input includes calculating a first intermediate value in accordance with the deviation based on the one modulation algorithm, and calculating the control input based on a product of the calculated first intermediate value and a predetermined gain.

This preferred embodiment of the control method provides the same advantageous effects provided by the corresponding preferred embodiment of the control apparatus.

Preferably, in the engine control unit described above, the control program further causes the computer to calculate a first intermediate value in accordance with the deviation based on the one modulation algorithm, and calculate the control input based on a product of the calculated first intermediate value and a predetermined gain.

This preferred embodiment of the engine control unit provides the same advantageous effects provided by the corresponding preferred embodiment of the control apparatus.

Preferably, the control apparatus described above further comprises gain parameter detecting means for detecting a gain parameter indicative of a gain characteristic of the controlled object; and gain setting means for setting the gain in accordance with the detected gain parameter.

According to this preferred embodiment of the control apparatus, since the gain for use in the calculation of the control input is set in accordance with the gain characteristic of the controlled object, the control input can be calculated as a value which has appropriate energy in accordance with the gain characteristic of the controlled object, thereby making it possible to avoid an over-gain condition and the like to ensure a satisfactory controllability.

Preferably, the control method described above further comprises the step of detecting a gain parameter indicative of a gain characteristic of the controlled object; and setting the gain in accordance with the detected gain parameter.

This preferred embodiment of the control method provides the same advantageous effects provided by the corresponding preferred embodiment of the control apparatus.

Preferably, in the engine control unit described above, the control program further causes the computer to detect a gain parameter indicative of a gain characteristic of the controlled object; and set the gain in accordance with the detected gain parameter.

This preferred embodiment of the engine control unit provides the same advantageous effects provided by the corresponding preferred embodiment of the control apparatus.

Preferably, in the control apparatus described above, the control input calculating means calculates a second intermediate value in accordance with the deviation based on the one modulation algorithm, and calculates the control input by adding a predetermined value to the calculated second intermediate value.

Generally, any of the $\Delta$ modulation algorithm, $\Delta\Sigma$ modulation algorithm, and $\Sigma\Delta$ modulation algorithm can only calculate a positive-negative inversion type control input centered at zero. On the contrary, according to this preferred embodiment of the control apparatus, the control input calculating means calculates the control input by adding the predetermined value to the second intermediate value calculated based on the one modulation algorithm, so that the control input calculating means can calculate the control input not only as a value which positively and negatively inverts about zero, but also as a value which repeats predetermined increase and decrease about a predetermined value, thereby making it possible to improve the degree of freedom in control.

Preferably, in the control method described above, the step of calculating a control input includes calculating a second intermediate value in accordance with the deviation based on the one modulation algorithm, and calculating the control input by adding a predetermined value to the calculated second intermediate value.

This preferred embodiment of the control method provides the same advantageous effects provided by the corresponding preferred embodiment of the control apparatus.

Preferably, in the engine control unit described above, the control program causes the computer to calculate a second intermediate value in accordance with the deviation based on the one modulation algorithm, and calculating the control input by adding a predetermined value to the calculated second intermediate value.

This preferred embodiment of the engine control unit provides the same advantageous effects provided by the corresponding preferred embodiment of the control apparatus.

Preferably, in the control apparatus described above, the deviation calculating means includes predicted value calculating means for calculating a predicted value of the deviation in accordance with the deviation based on a prediction algorithm, wherein the control input calculating means calculates the control input in accordance with the calculated predicted value of the deviation based on the one modulation algorithm.

According to this preferred embodiment of the control apparatus, since the predicted value of the deviation is calculated in accordance with the deviation based on the prediction algorithm, and the control input is calculated in accordance with this predicted value, it is possible to eliminate a slippage in control timing between the input and output of the controlled object by calculating such a predicted value as a value which reflects a dynamic characteristic, for example, a phase delay, a dead time, and the like of the controlled object. As a result, the control apparatus of the invention can ensure the stability of the control and an improvement of the controllability.

Preferably, in the control method described above, the step of calculating a deviation includes calculating a predicted value of the deviation in accordance with the deviation based on a prediction algorithm, and the step of calculating a control input includes calculating the control input in accordance with the calculated predicted value of the deviation based on the one modulation algorithm.

This preferred embodiment of the control method provides the same advantageous effects provided by the corresponding preferred embodiment of the control apparatus.

Preferably, in the engine control unit described above, the control program causes the computer to calculate a predicted value of the deviation in accordance with the deviation based on a prediction algorithm; and calculate the control input in accordance with the calculated predicted value of the deviation based on the one modulation algorithm.

This preferred embodiment of the engine control unit provides the same advantageous effects provided by the corresponding preferred embodiment of the control apparatus.

Preferably, in the control apparatus described above, the control input calculating means calculates the control input in accordance with the deviation based further on a controlled object model which models the controlled object.

According to this preferred embodiment of the control apparatus, since the control input is calculated based on any of the $\Delta$ modulation algorithm, $\Delta\Sigma$ modulation algorithm, and $\Sigma\Delta$ modulation algorithm, and the controlled object model which models the controlled object, the control input can be calculated as a value which reflects the dynamic characteristic of the controlled object by defining the controlled object model so as to appropriately reflect the dynamic characteristic such as a phase delay, a dead time, and the like of the controlled object. As a result, the control apparatus of the invention can ensure the stability of the control and an improvement of the controllability.

Preferably, in the control method described above, the step of calculating a control input includes calculating the control input in accordance with the deviation based further on a controlled object model which models the controlled object.

This preferred embodiment of the control method provides the same advantageous effects provided by the corresponding preferred embodiment of the control apparatus.

Preferably, in the engine control unit described above, the control program causes the computer to calculate the control input in accordance with the deviation based further on a controlled object model which models the controlled object.

This preferred embodiment of the engine control unit provides the same advantageous effects provided by the corresponding preferred embodiment of the control apparatus.

Preferably, the control apparatus described above, further comprises identifying means for identifying a model parameter for the controlled object model in accordance with one of the calculated control input and a value reflecting the control input inputted to the controlled object, and an output of the controlled object.

According to this preferred embodiment of the control apparatus, the model parameter can be identified for the controlled object model in accordance with one of the calculated control input and a value reflecting the control input inputted to the controlled object, and an output of the controlled object, and accordingly, the control input can be calculated based on the controlled object model.

Preferably, the control method described above, further comprising the step of identifying a model parameter for the controlled object model in accordance with one of the calculated control input and a value reflecting the control input inputted to the controlled object, and an output of the controlled object.

This preferred embodiment of the control method provides the same advantageous effects provided by the corresponding preferred embodiment of the control apparatus.

Preferably, in the engine control unit described above, the control program further causes the computer to identify a model parameter for the controlled object model in accordance with one of the calculated control input and a value reflecting the control input inputted to the controlled object, and an output of the controlled object.

This preferred embodiment of the engine control unit provides the same advantageous effects provided by the corresponding preferred embodiment of the control apparatus.

Preferably, in the control apparatus described above, the controlled object model comprises a discrete time system model, wherein the identifying means identifies a model parameter for the discrete time system model in accordance with one of discrete data of the control input and discrete data of the value reflecting the control input inputted to the controlled object, and discrete data of the output of the controlled object.

According to this preferred embodiment of the control apparatus, the model parameter is identified for the discrete time system model in accordance with one of discrete data of the control input and discrete data of the value reflecting the control input inputted to the controlled object, and discrete data of the output of the controlled object. Therefore, even if the dynamic characteristic of the controlled object changes over time or varies, the model parameter can be appropriately identified in accordance with such dynamic characteristic, so that the dynamic characteristic of the controlled object model can be fitted to the actual dynamic characteristic of the controlled object. As a result, the control apparatus of the invention can improve the controllability and the stability of the control. In addition, the use of the discrete time system model can facilitate the identification of the model parameter and reduce a time required for the identification with a general identification algorithm, for example, a least square method or the like, as compared with the use of a continuous time system model.

Preferably, in the control method described above, the controlled object model comprises a discrete time system model, wherein the step of identifying includes identifying a model parameter for the discrete time system model in accordance with one of discrete data of the control input and discrete data of the value reflecting the control input inputted to the controlled object, and discrete data of the output of the controlled object.

This preferred embodiment of the control method provides the same advantageous effects provided by the corresponding preferred embodiment of the control apparatus.

Preferably, in the engine control unit described above, the controlled object model comprises a discrete time system model, wherein the control program causes the computer to identify a model parameter for the discrete time system model in accordance with one of discrete data of the control input and discrete data of the value reflecting the control input inputted to the controlled object, and discrete data of the output of the controlled object.

This preferred embodiment of the engine control unit provides the same advantageous effects provided by the corresponding preferred embodiment of the control apparatus.

Preferably, the control apparatus described above, further comprises dynamic characteristic parameter detecting means for detecting a dynamic characteristic parameter indicative of a change in a dynamic characteristic of the controlled object; and model parameter setting means for setting a model parameter for the controlled object model in accordance with the detected dynamic characteristic parameter.

According to this preferred embodiment of the control apparatus, since the dynamic characteristic parameter detecting means detects a dynamic characteristic parameter indicative of a change in a dynamic characteristic of the controlled object, and the model parameter setting means sets a model parameter for the controlled object model in accordance with the detected dynamic characteristic parameter, the dynamic characteristic of the controlled object model can be rapidly fitted to the actual dynamic characteristic of the controlled object. As a result, the control apparatus can rapidly and appropriately correct a slippage in control timing between the input and output, caused by the dynamic characteristic of the controlled object, for example, a response delay, a dead time, or the like, thereby making it possible to improve the stability of the control and the controllability.

Preferably, the control method described above further comprises the steps of detecting a dynamic characteristic parameter indicative of a change in a dynamic characteristic of the controlled object; and setting a model parameter for the controlled object model in accordance with the detected dynamic characteristic parameter.

This preferred embodiment of the control method provides the same advantageous effects provided by the corresponding preferred embodiment of the control apparatus.

Preferably, in the engine control unit described above, the control program further causes the computer to detect a dynamic characteristic parameter indicative of a change in a dynamic characteristic of the controlled object; and set a model parameter for the controlled object model in accordance with the detected dynamic characteristic parameter.

This preferred embodiment of the engine control unit provides the same advantageous effects provided by the corresponding preferred embodiment of the control apparatus.

To achieve the above object, according to a fourth aspect of the present invention, there is provided a control apparatus characterized by comprising deviation calculating means for calculating a deviation of an output of a controlled object from a predetermined target value; first control input calculating means for calculating a control input to the controlled object based on one modulation algorithm selected from a $\Delta$ modulation algorithm, a $\Delta\Sigma$ modulation algorithm, and a $\Sigma\Delta$ modulation algorithm for converging the output of the controlled object to the target value in accordance with the calculated deviation; second control input calculating means for calculating a control input to the controlled object in accordance with the calculated deviation based on a response specifying control algorithm for converging the output of the controlled object to the target value; controlled object state detecting means for detecting a state of the controlled object; and control input selecting means for selecting one of the control input calculated by the first control input calculating means and the control input calculated by the second control input calculating means in accordance with the detected state of the controlled object as a control input which should be inputted to the controlled object.

According to this control apparatus, the first control input calculating means calculates a control input to the controlled object in accordance with the calculated deviation of the output of the controlled object to the predetermined target value based on one modulation algorithm selected from the $\Delta$ modulation algorithm, $\Delta\Sigma$ modulation algorithm, and $\Sigma\Delta$ modulation algorithm for converging the output of the controlled object to the target value, and the second control input calculating means calculates a control input to the controlled object in accordance with the deviation based on a response specifying control algorithm for converging the output of the controlled object to the target value. Further, the control input selecting means selects one of the control input calculated by the first control input calculating means and the control input calculated by the second control input calculating means in accordance with the detected state of the controlled object as a control input which should be inputted to the controlled object. As described above, the $\Delta$ modulation algorithm, $\Delta\Sigma$ modulation algorithm, and $\Sigma\Delta$ modulation algorithm are characterized by the ability to calculate a control input to derive the output of the controlled object for generating the deviation having the opposite phase waveform to the deviation of the output of the controlled object from the target value so as to cancel the same. The response specifying control algorithm in turn is characterized by the ability to calculate a control input so as to specify the responsibility of the output of the controlled object to the target value, for example, a rate at which the output converges to the target value.

When the controlled object is controlled in accordance with the two types of control algorithms, the output of the controlled object presents different tendencies in the convergence to the target value depending on the state of the controlled object, due to the characteristics of the control algorithms. For example, with the controlled object having a large response delay, dead time, and the like, the response specifying control algorithm can more accurately and rapidly converge the output of the controlled object to the target value when the controlled object is in a steady state. On the other hand, when the controlled object is in a transient state, the $\Delta$ modulation algorithm, $\Delta\Sigma$ modulation algorithm, or $\Sigma\Delta$ modulation algorithm can more accurately and rapidly converge the output of the controlled object to the target value. Therefore, when the controlled object has a large response delay, dead time, or the like, it is possible to ensure more satisfactory controllability and higher stability of the control by appropriately selecting one of the two types of control algorithms which permits the output of the controlled object to more satisfactorily converge to the target value depending on the state of the controlled object than when the control input is calculated based only on the response specifying control algorithm.

To achieve the above object, according to a fifth aspect of the invention, there is provided a control method comprising the steps of calculating a deviation of an output of a controlled object from a predetermined target value; calculating a control input to the controlled object based on one modulation algorithm selected from a $\Delta$ modulation algorithm, a $\Delta\Sigma$ modulation algorithm, and a $\Sigma\Delta$ modulation algorithm for converging the output of the controlled object to the target value in accordance with the calculated deviation; calculating a control input to the controlled object in accordance with the calculated deviation based on a response specifying control algorithm for converging the output of the controlled object to the target value; detecting a state of the controlled object; and selecting one of the control input calculated based on the one modulation algorithm and the control input calculated based on the response specifying control algorithm in accordance with the detected state of the controlled object as a control input which should be inputted to the controlled object.

This control method provides the same advantageous effects as described above concerning the control apparatus according to the fourth aspect of the invention.

To achieve the above object, according to a sixth aspect of the invention, there is provided an engine control unit including a control program for causing a computer to calculate a deviation of an output of a controlled object from a predetermined target value; calculate a control input to the controlled object based on one modulation algorithm selected from a $\Delta$ modulation algorithm, a $\Delta\Sigma$ modulation algorithm, and a $\Sigma\Delta$ modulation algorithm for converging the output of the controlled object to the target value in accordance with the calculated deviation; calculate a control input to the controlled object in accordance with the calculated deviation based on a response specifying control algorithm for converging the output of the controlled object to the target value; detect a state of the controlled object; and select one of the control input calculated based on the one modulation algorithm and the control input calculated based on the response specifying control algorithm in accordance with the detected state of the controlled object as a control input which should be inputted to the controlled object.

This engine control unit provides the same advantageous effects as described above concerning the control apparatus according to the fourth aspect of the invention.

Preferably, in the control apparatus described above, the first control input calculating means calculates a first intermediate value in accordance with the deviation based on the one modulation algorithm, and calculates the control input based on a product of the calculated first intermediate value and a predetermined gain.

According to this preferred embodiment of the control apparatus, when the value calculated by the first control input calculating means is selected as the control input, the control input is calculated based on the first intermediate value, which is calculated based on the one modulation algorithm, multiplied by a predetermined gain, so that a satisfactory controllability can be ensured by setting the predetermined gain to an appropriate value.

Preferably, in the control method described above, the step of calculating a control input to the controlled object based on one modulation algorithm includes calculating a first intermediate value in accordance with the deviation based on the one modulation algorithm, and calculating the control input based on a product of the calculated first intermediate value and a predetermined gain.

This preferred embodiment of the control method provides the same advantageous effects provided by the corresponding preferred embodiment of the control apparatus.

Preferably, in the engine control unit described above, the control program causes the computer to calculate a first intermediate value in accordance with the deviation based on the one modulation algorithm, and calculate the control input based on a product of the calculated first intermediate value and a predetermined gain.

This preferred embodiment of the engine control unit provides the same advantageous effects provided by the corresponding preferred embodiment of the control apparatus.

Preferably, in the control apparatus described above, the controlled object state detecting means includes gain parameter detecting means for detecting a gain parameter indicative of a gain characteristic of the controlled object, and the control apparatus further comprises gain setting means for setting the gain in accordance with the detected gain parameter.

According to this preferred embodiment of the control apparatus, when the value calculated by the first control input calculating means is selected as the control input, since the gain for use in the calculation of the control input is set in accordance with the gain characteristic of the controlled object, the control input can be calculated as a value which has appropriate energy in accordance with the gain characteristic of the controlled object, thereby making it possible to avoid an over-gain condition and the like to ensure a satisfactory controllability.

Preferably, in the control method described above, the step of detecting a controlled object state includes detecting a gain parameter indicative of a gain characteristic of the controlled object, and the control method further comprises the step of setting the gain in accordance with the detected gain parameter.

This preferred embodiment of the control method provides the same advantageous effects provided by the corresponding preferred embodiment of the control apparatus.

Preferably, in the engine control unit described above, the control program causes the computer to detect a controlled object state includes detecting a gain parameter indicative of a gain characteristic of the controlled object, and set the gain in accordance with the detected gain parameter.

This preferred embodiment of the engine control unit provides the same advantageous effects provided by the corresponding preferred embodiment of the control apparatus.

Preferably, in the control apparatus described above, the first control input calculating means calculates a second intermediate value in accordance with the deviation based on the one modulation algorithm, and calculates the control input by adding a predetermined value to the calculated second intermediate value.

According to this preferred embodiment of the control apparatus, when the value calculated by the first control input calculating means is selected as the control input, the control input calculating means calculates the control input by adding the predetermined value to the second intermediate value calculated based on the one modulation algorithm, so that the control input calculating means can calculate the control input not only as a value which positively and negatively inverts about zero, but also as a value which repeats predetermined increase and decrease about a predetermined value, thereby making it possible to improve the degree of freedom in control.

Preferably, in the control method described above, the step of calculating a control input to the controlled object based on one modulation algorithm includes calculating a second intermediate value in accordance with the deviation based on the one modulation algorithm, and calculating the control input by adding a predetermined value to the calculated second intermediate value.

This preferred embodiment of the control method provides the same advantageous effects provided by the corresponding preferred embodiment of the control apparatus.

Preferably, in the engine control unit described, the control program causes the computer to calculate a second intermediate value in accordance with the deviation based on the one modulation algorithm, and calculate the control input by adding a predetermined value to the calculated second intermediate value.

This preferred embodiment of the engine control unit provides the same advantageous effects provided by the corresponding preferred embodiment of the control apparatus.

Preferably, in the control apparatus described above, the deviation calculating means includes predicted value calculating means for calculating a predicted value of the deviation in accordance with the deviation based on a prediction algorithm, wherein the first control input calculating means calculates the control input in accordance with the calculated predicted value of the deviation based on the one modulation algorithm, and the second control input calculating means calculates the control input in accordance with the calculated predicted value of the deviation based on the response specifying control algorithm.

According to this preferred embodiment of the control apparatus, when the value calculated by the first control input calculating means is selected as the control input, since the predicted value of the deviation is calculated in accordance with the deviation based on the prediction algorithm, and the control input is calculated in accordance with this predicted value, it is possible to eliminate slippage in control timing between the input and output of the controlled object by calculating such a predicted value as a value which reflects a dynamic characteristic, for example, a phase delay, a dead time, and the like of the controlled object. As a result, the control apparatus of the invention can ensure the stability of the control and an improvement of the controllability. In addition, when the value calculated by the second control input calculating means is selected as the control input, the control input is likewise calculated in accordance with the predicted value, so that the control apparatus provides similar advantageous effects to the above.

Preferably, in the control method described above, the step of calculating a deviation includes calculating a predicted value of the deviation in accordance with the deviation based on a prediction algorithm, wherein the step of calculating a control input to the controlled object based on one modulation algorithm includes calculating the control input in accordance with the calculated predicted value of the deviation based on the one modulation algorithm; and the step of calculating a control input to the controlled object based on a response specifying control algorithm includes calculating the control input in accordance with the calculated predicted value of the deviation based on the response specifying control algorithm.

This preferred embodiment of the control method provides the same advantageous effects provided by the corresponding preferred embodiment of the control apparatus.

Preferably, in the engine control unit described above, the control program causes the computer to calculate a predicted value of the deviation in accordance with the deviation based on a prediction algorithm; calculate the control input in accordance with the calculated predicted value of the deviation based on the one modulation algorithm; and calculate a control input to the controlled object based on a response specifying control algorithm includes calculating the control input in accordance with the calculated predicted value of the deviation based on the response specifying control algorithm.

This preferred embodiment of the engine control unit provides the same advantageous effects provided by the corresponding preferred embodiment of the control apparatus.

Preferably, in the control apparatus described above, the first control input calculating means and the second control input calculating means calculate the control input in accordance with the deviation based further on a controlled object model which models the controlled object.

According to this preferred embodiment of the control apparatus, when the value calculated by the first control input calculating means is selected as the control input, since the control input is calculated based on any of the $\Delta$ modulation algorithm, $\Delta\Sigma$ modulation algorithm, and $\Sigma\Delta$ modulation algorithm, and the controlled object model which models the controlled object, the control input can be calculated as a value which reflects the dynamic characteristic of the controlled object by defining the controlled object model so as to appropriately reflect the dynamic characteristic such as a phase delay, a dead time, and the like of the controlled object. As a result, the control apparatus of the invention can ensure the stability of the control and an improvement of the controllability. In addition, when the value calculated by the second control input calculating means is selected as the control input, the control input is likewise calculated based further on the controlled object model, so that the control apparatus provides similar advantageous effects to the above.

Preferably, in the control method described, the step of calculating a control input to the controlled object based on one modulation algorithm includes calculating the control input in accordance with the deviation based further on a controlled object model which models the controlled object; and the step of calculating a control input to the controlled object based on a response specifying control algorithm includes calculating the control input in accordance with the deviation based further on a controlled object model which models the controlled object.

This preferred embodiment of the control method provides the same advantageous effects provided by the corresponding preferred embodiment of the control apparatus.

Preferably, in the engine control unit described above, the control program causes the computer to calculate the control input in accordance with the deviation based on the one modulation algorithm, and a controlled object model which models the controlled object; and calculate the control input in accordance with the deviation based on the response specifying control algorithm, and a controlled object model which models the controlled object.

This preferred embodiment of the engine control unit provides the same advantageous effects provided by the corresponding preferred embodiment of the control apparatus.

Preferably, the control apparatus described above further comprises identifying means for identifying a model parameter for the controlled object model in accordance with one of the calculated control input and a value reflecting the control input inputted to the controlled object, and an output of the controlled object.

According to this preferred embodiment of the control apparatus, when the value calculated by the first control input calculating means is selected as the control input, the model parameter can be identified for the controlled object model in accordance with one of the calculated control input and a value reflecting the control input inputted to the controlled object, and an output of the controlled object, and accordingly, the control input can be calculated based on the controlled object model. In addition, when the value calculated by the second control input calculating means is selected as the control input, the model parameter is likewise identified for the controlled object model in accordance with one of the calculated control input and a value reflecting the control input inputted to the controlled object, and an output of the controlled object, so that the control apparatus provides similar advantageous effects to the above.

Preferably, the control method described above further comprises the step of identifying a model parameter for the controlled object model in accordance with one of the calculated control input and a value reflecting the control input inputted to the controlled object, and an output of the controlled object.

This preferred embodiment of the control method provides the same advantageous effects provided by the corresponding preferred embodiment of the control apparatus.

Preferably, in the engine control unit described above, the control program further causes the computer to identify a model parameter for the controlled object model in accordance with one of the calculated control input and a value reflecting the control input inputted to the controlled object, and an output of the controlled object.

This preferred embodiment of the engine control unit provides the same advantageous effects provided by the corresponding preferred embodiment of the control apparatus.

Preferably, in the control apparatus described above, the controlled object model comprises a discrete time system model, wherein the identifying means identifies a model parameter for the discrete time system model in accordance with one of discrete data of the control input and discrete data of the value reflecting the control input inputted to the controlled object, and discrete data of the output of the controlled object.

According to this preferred embodiment of the control apparatus, when the value calculated by the first control input calculating means is selected as the control input, the model parameter is identified for the discrete time system model in accordance with one of discrete data of the control input and discrete data of the value reflecting the control input inputted to the controlled object, and discrete data of the output of the controlled object. Therefore, even if the dynamic characteristic of the controlled object changes over time or varies, the model parameter can be appropriately identified in accordance with such dynamic characteristic, so that the dynamic characteristic of the controlled object model can be fitted to the actual dynamic characteristic of the controlled object. As a result, the control apparatus of the invention can improve the controllability and the stability of the control. Also, the use of the discrete time system model can facilitate the identification of the model parameter and reduce a time required for the identification with a general identification algorithm, for example, a least square method or the like, as compared with the use of a continuous time system model. In addition, when the value calculated by the second control input calculating means is selected as the control input, the model parameter is likewise identified for the discrete time system model in accordance with one of discrete data of the control input and discrete data of the value reflecting the control input inputted to the controlled object, and discrete data of the output of the controlled object, so that the control apparatus provides similar advantageous effects to the above.

Preferably, in the control method described above, the controlled object model comprises a discrete time system model, wherein the step of identifying includes identifying a model parameter for the discrete time system model in accordance with one of discrete data of the control input and discrete data of the value reflecting the control input inputted to the controlled object, and discrete data of the output of the controlled object.

This preferred embodiment of the control method provides the same advantageous effects provided by the corresponding preferred embodiment of the control apparatus.

Preferably, in the engine control unit described above, the controlled object model comprises a discrete time system model, wherein the control program causes the computer to identify a model parameter for the discrete time system model in accordance with one of discrete data of the control input and discrete data of the value reflecting the control input inputted to the controlled object, and discrete data of the output of the controlled object.

This preferred embodiment of the engine control unit provides the same advantageous effects provided by the corresponding preferred embodiment of the control apparatus.

Preferably, the control apparatus described above further comprises dynamic characteristic parameter detecting means for detecting a dynamic characteristic parameter indicative of a change in a dynamic characteristic of the controlled object; and model parameter setting means for setting a model parameter for the controlled object model in accordance with the detected dynamic characteristic parameter.

According to this preferred embodiment of the control apparatus, when the value calculated by the first control input calculating means is selected as the control input, the dynamic characteristic parameter detecting means detects a dynamic characteristic parameter indicative of a change in a dynamic characteristic of the controlled object, and the model parameter setting means sets a model parameter for the controlled object model in accordance with the detected dynamic characteristic parameter, so that the dynamic characteristic of the controlled object model can be rapidly fitted to the actual dynamic characteristic of the controlled object. As a result, the control apparatus can rapidly and appropriately correct a slippage in control timing between the input and output, caused by the dynamic characteristic of the controlled object, for example, a response delay, a dead time, or the like, thereby making it possible to improve the stability of the control and the controllability. In addition, when the value calculated by the second control input calculating means is selected as the control input, the model parameter setting means sets the model parameter for the controlled object model in accordance with the dynamic characteristic parameter, so that the control apparatus provides similar advantageous effects to the above.

Preferably, the control method described above further comprises the steps of detecting a dynamic characteristic parameter indicative of a change in a dynamic characteristic of the controlled object; and setting a model parameter for the controlled object model in accordance with the detected dynamic characteristic parameter.

This preferred embodiment of the control method provides the same advantageous effects provided by the corresponding preferred embodiment of the control apparatus.

Preferably, in the engine control unit described above, the control program further causes the computer to detect a dynamic characteristic parameter indicative of a change in a dynamic characteristic of the controlled object; and set a model parameter for the controlled object model in accordance with the detected dynamic characteristic parameter.

This preferred embodiment of the engine control unit provides the same advantageous effects provided by the corresponding preferred embodiment of the control apparatus.

Preferably, in the control apparatus described above, the response specifying control algorithm is a sliding mode control algorithm.

According to this preferred embodiment of the control apparatus, since the sliding mode control algorithm is used as the response specifying control algorithm, the control apparatus of the invention can conduct the control with good robust and response specifying characteristics when the value calculated by the second control input calculating means is selected as the control input.

Preferably, in the control method described above, the response specifying control algorithm is a sliding mode control algorithm.

This preferred embodiment of the control method provides the same advantageous effects provided by the corresponding preferred embodiment of the control apparatus.

Preferably, in the engine control unit described above, the response specifying control algorithm is a sliding mode control algorithm.

This preferred embodiment of the engine control unit provides the same advantageous effects provided by the corresponding preferred embodiment of the control apparatus.

To achieve the above object, according to a seventh aspect of the present invention, there is provided a control apparatus characterized by comprising a downstream air/fuel ratio sensor for outputting a detection signal indicative of an air/fuel ratio of exhaust gases at a location downstream of a catalyzer in an exhaust pipe of an internal combustion engine; output deviation calculating means for calculating an output deviation of an output of the downstream air/fuel ratio sensor from a predetermined target value; and air/fuel ratio control means for controlling an air/fuel ratio of an air/fuel mixture supplied to the internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of the downstream air/fuel ratio sensor converges to the target value.

According to this control apparatus, the air/fuel ratio of the air/fuel mixture is controlled in accordance with the output deviation which is a deviation of the output of the downstream air/fuel ratio sensor from the target value based on one of the $\Delta$ modulation algorithm, $\Delta\Sigma$ modulation algorithm, and $\Sigma\Delta$ modulation algorithm such that the output of the downstream air/fuel ratio sensor converges to the target value, the air/fuel ratio of the air/fuel mixture can be controlled to generate the output of the downstream air/fuel ratio sensor to derive the output deviation having an opposite phase waveform to the output deviation so as to cancel the same. Therefore, the output of the downstream air/fuel ratio sensor can be accurately and rapidly converged to the target value without variations even in an operation mode in which the output of the downstream air/fuel ratio sensor, i.e., the air/fuel ratio of exhaust gases presents a large response delay to an air/fuel mixture supplied to the internal combustion engine, for example, in an operation mode in which the internal combustion engine is susceptible to disturbance and encounters difficulties in ensuring the stability of the air/fuel ratio control such as in an operation mode in which air/fuel ratio of the air/fuel mixture supplied to the internal combustion engine fluctuates, in an operation mode in which the air/fuel ratio of the air/fuel mixture is controlled with a lower accuracy, in a transient operation mode in which a load largely fluctuates, and the like. For the same reason, the output of the downstream air/fuel ratio sensor can be accurately and rapidly converged to the target value without variations even in an operation mode in which the output of the downstream air/fuel ratio sensor, i.e., the air/fuel ratio of exhaust gases presents a large response delay and dead time to the air/fuel mixture supplied to the internal combustion engine, for example, in an operation mode in which the internal combustion engine is particularly lightly loaded, for example, in an idle operation mode and the like, that is, even when the target air/fuel ratio of the air/fuel mixture, as a control input, changes in an extremely narrow range. From the foregoing, the control apparatus of the invention can provide a favorable post-catalyst exhaust gas characteristic.

To achieve the above object, according to an eighth aspect of the invention, there is provided a control method comprising the steps of outputting a detection signal indicative of an air/fuel ratio of exhaust gases at a location downstream of a catalyzer in an exhaust pipe of an internal combustion engine; calculating an output deviation of an output of the downstream air/fuel ratio sensor from a predetermined target value; and controlling an air/fuel ratio of an air/fuel mixture supplied to the internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of the downstream air/fuel ratio sensor converges to the target value.

This control method provides the same advantageous effects as described above concerning the control apparatus according to the seventh aspect of the invention.

To achieve the above object, according to a ninth aspect of the invention, there is provided an engine control unit including a control program for causing a computer to output a detection signal indicative of an air/fuel ratio of exhaust gases at a location downstream of a catalyzer in an exhaust pipe of an internal combustion engine; calculate an output deviation of an output of the downstream air/fuel ratio sensor from a predetermined target value; and control an air/fuel ratio of an air/fuel mixture supplied to the internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of the downstream air/fuel ratio sensor converges to the target value.

This engine control unit provides the same advantageous effects as described above concerning the control apparatus according to the seventh aspect of the invention.

Preferably, in the control apparatus described above, the air/fuel ratio control means includes air/fuel ratio calculating means for calculating a first intermediate value in accordance with the output deviation based on the one modulation algorithm, and calculating a target air/fuel ratio of the air/fuel mixture for converging the output of the downstream air/fuel ratio sensor to the target value based on a product of the calculated first intermediate value and a predetermined gain, wherein the air/fuel ratio control means controls the air/fuel ratio of the air/fuel mixture in accordance with the calculated target air/fuel ratio.

Generally, each of the $\Delta\Sigma$ modulation algorithm, $\Sigma\Delta$ modulation algorithm, and $\Delta$ modulation algorithm calculates a control input, i.e., the target air/fuel ratio on the assumption that a controlled object has a unity gain, so that if the controlled object has an actual gain different from a unity value, the controllability for the air/fuel ratio control may be degraded due to a failure in appropriately calculating the target air/fuel ratio. For example, when the controlled object has an actual gain larger than one, the target air/fuel ratio is calculated as a value larger than necessity, resulting in an over-gain condition. On the other hand, according to this preferred embodiment of the control apparatus, the target air/fuel ratio is calculated based on the first intermediate value, which is calculated based on the one modulation algorithm, multiplied by a predetermined gain, so that a satisfactory controllability can be ensured for the air/fuel ratio control by setting the predetermined gain to an appropriate value.

Preferably, in the control method described above, the step of controlling an air/fuel ratio includes calculating a first intermediate value in accordance with the output deviation based on the one modulation algorithm; calculating a target air/fuel ratio of the air/fuel mixture for converging the output of the downstream air/fuel ratio sensor to the target value based on a product of the calculated first intermediate value and a predetermined gain; and controlling the air/fuel ratio of the air/fuel mixture in accordance with the calculated target air/fuel ratio.

This preferred embodiment of the control method provides the same advantageous effects provided by the corresponding preferred embodiment of the control apparatus.

Preferably, in the engine control unit described above, the control program causes the computer to calculate a first intermediate value in accordance with the output deviation based on the one modulation algorithm, and calculate a target air/fuel ratio of the air/fuel mixture for converging the output of the downstream air/fuel ratio sensor to the target value based on a product of the calculated first intermediate value and a predetermined gain; and control the air/fuel ratio of the air/fuel mixture in accordance with the calculated target air/fuel ratio.

This preferred embodiment of the engine control unit provides the same advantageous effects provided by the corresponding preferred embodiment of the control apparatus.

Preferably, the control apparatus according described above further comprises operating condition parameter detecting means for detecting an operating condition parameter indicative of an operating condition of the internal combustion engine; and gain setting means for setting the gain in accordance with the detected operating condition parameter.

According to this preferred embodiment of the control apparatus, the target air/fuel ratio of the air/fuel mixture is calculated based on the first intermediate value multiplied by the gain, and the gain is set in accordance with the operating condition parameter indicative of an operating condition of the internal combustion engine. With such setting, even when a change in the operating condition of the internal combustion engine results in a change in the output of the downstream air/fuel ratio sensor, i.e., the air/fuel ratio of exhaust gases (gain characteristic), the target air/fuel ratio can be appropriately calculated for the air/fuel mixture by using the gain which is set in accordance with the change, thereby providing good convergence and high responsibility for the air/fuel ratio control.

Preferably, the control method described above further comprises the steps of detecting an operating condition parameter indicative of an operating condition of the internal combustion engine; and setting the gain in accordance with the detected operating condition parameter.

This preferred embodiment of the control method provides the same advantageous effects provided by the corresponding preferred embodiment of the control apparatus.

Preferably, in the engine control unit described above, the control program further causes the computer to detect an operating condition parameter indicative of an operating condition of the internal combustion engine; and set the gain in accordance with the detected operating condition parameter.

This preferred embodiment of the engine control unit provides the same advantageous effects provided by the corresponding preferred embodiment of the control apparatus.

Preferably, in the control apparatus described above, the air/fuel ratio control means includes air/fuel ratio calculating means for calculating a second intermediate value in accordance with the output deviation based on the one modulation algorithm, and calculating a target air/fuel ratio of the air/fuel mixture for converging the output of the downstream air/fuel ratio sensor to the target value by adding a predetermined value to the calculated second intermediate value, wherein the air/fuel ratio control means controls the air/fuel ratio of the air/fuel mixture in accordance with the calculated target air/fuel ratio.

Generally, any of the $\Delta$ modulation algorithm, $\Delta\Sigma$ modulation algorithm, and $\Sigma\Delta$ modulation algorithm can only calculate a positive-negative inversion type control input centered at zero. On the contrary, according to this preferred embodiment of the control apparatus, the air/fuel ratio calculating means calculates the target air/fuel ratio as a control input by adding the predetermined value to the second intermediate value calculated based on the one modulation algorithm, so that the air/fuel ratio calculating means can calculate the target air/fuel ratio not only as a value which positively and negatively inverts about zero, but also as a value which repeats predetermined increase and decrease about a predetermined value, thereby making it possible to improve the degree of freedom in the control of air/fuel ratio.

Preferably, in the control method described above, the step of controlling an air/fuel ratio includes calculating a second intermediate value in accordance with the output deviation based on the one modulation algorithm; calculating a target air/fuel ratio of the air/fuel mixture for converging the output of the downstream air/fuel ratio sensor to the target value by adding a predetermined value to the calculated second intermediate value; and controlling the air/fuel ratio of the air/fuel mixture in accordance with the calculated target air/fuel ratio.

This preferred embodiment of the control method provides the same advantageous effects provided by the corresponding preferred embodiment of the control apparatus.

Preferably, in the engine control unit described above, the control program causes the computer to calculate a second intermediate value in accordance with the output deviation based on the one modulation algorithm; calculate a target air/fuel ratio of the air/fuel mixture for converging the output of the downstream air/fuel ratio sensor to the target value by adding a predetermined value to the calculated second intermediate value; and control the air/fuel ratio of the air/fuel mixture in accordance with the calculated target air/fuel ratio.

This preferred embodiment of the engine control unit provides the same advantageous effects provided by the corresponding preferred embodiment of the control apparatus.

Preferably, in the control apparatus described above, the output deviation calculating means includes predicted value calculating means for calculating a predicted value of the output deviation in accordance with the output deviation based on a prediction algorithm, wherein the air/fuel ratio control means controls the air/fuel ratio of the air/fuel mixture in accordance with the calculated predicted value of the output deviation based on the one modulation algorithm such that the output of the downstream air/fuel ratio sensor converges to the target value.

According to this preferred embodiment of the control apparatus, the predicted value of the output deviation which is a deviation of the output of the downstream air/fuel ratio sensor from the predetermined target value is calculated in accordance with the output deviation based on the prediction algorithm, and the air/fuel ratio is calculated for the air/fuel mixture in accordance with the thus calculated predicted value of the output deviation based on the one modulation algorithm such that the output of the downstream air/fuel ratio sensor converges to the predetermined target value. Therefore, by calculating such a predicted value as a value which reflects a response delay, a dead time, and the like of the output of the downstream air/fuel ratio sensor, it is possible to appropriately correct a slippage in control timing in the air/fuel ratio control caused by a response delay, a dead time, and the like of exhaust gases with respect to an air/fuel mixture supplied to the internal combustion engine and accordingly more rapidly converge the output of the downstream air/fuel ratio sensor to the target value. As a result, the control apparatus of the invention can improve the stability of the air/fuel ratio control and further improve the post-catalyst exhaust gas characteristic.

Preferably, in the control method described above, the step of calculating an output deviation includes calculating a predicted value of the output deviation in accordance with the output deviation based on a prediction algorithm, and the step of controlling an air/fuel ratio includes controlling the air/fuel ratio of the air/fuel mixture in accordance with the calculated predicted value of the output deviation based on the one modulation algorithm such that the output of the downstream air/fuel ratio sensor converges to the target value.

This preferred embodiment of the control method provides the same advantageous effects provided by the corresponding preferred embodiment of the control apparatus.

Preferably, in the engine control unit described above, the control program causes the computer to calculate a predicted value of the output deviation in accordance with the output deviation based on a prediction algorithm; and control the air/fuel ratio of the air/fuel mixture in accordance with the calculated predicted value of the output deviation based on the one modulation algorithm such that the output of the downstream air/fuel ratio sensor converges to the target value.

This preferred embodiment of the engine control unit provides the same advantageous effects provided by the corresponding preferred embodiment of the control apparatus.

Preferably, in the control apparatus described above, the air/fuel ratio control means includes air/fuel ratio calculating means for calculating the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm, wherein the air/fuel ratio control means controls the air/fuel ratio of the air/fuel mixture in accordance with the calculated target air/fuel ratio.

According to this preferred embodiment of the control apparatus, the target air/fuel ratio is calculated in accordance with the output deviation based on an algorithm which applies a controlled object model and the one modulation algorithm, wherein the controlled object model has a variable associated with a value indicative of the output of the downstream air/fuel ratio sensor and a variable associated with a value indicative of the target air/fuel ratio. Therefore, when the controlled object model is defined to reflect the dynamic characteristic of the controlled object such as a phase delay, a dead time, and the like, the air/fuel ratio can be calculated as a value which reflects the dynamic characteristic of the controlled object such as the phase delay, dead time, and the like. As such, the control apparatus of the invention can more rapidly converge the output of the downstream air/fuel ratio sensor to the target value to consequently improve the stability of the air/fuel ratio control, and further improve the post-catalyst exhaust gas characteristic.

Preferably, in the control method described above, the step of controlling an air/fuel ratio includes calculating the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm; and controlling the air/fuel ratio of the air/fuel mixture in accordance with the calculated target air/fuel ratio.

This preferred embodiment of the control method provides the same advantageous effects provided by the corresponding preferred embodiment of the control apparatus.

Preferably, in the engine control unit described above, the control program causes the computer to calculate the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm; and control the air/fuel ratio of the air/fuel mixture in accordance with the calculated target air/fuel ratio.

This preferred embodiment of the engine control unit provides the same advantageous effects provided by the corresponding preferred embodiment of the control apparatus.

Preferably, the control apparatus described above further comprises identifying means for identifying a model parameter for the controlled object model in accordance with the target air/fuel ratio and the output of the downstream air/fuel ratio sensor.

According to this preferred embodiment of the control apparatus, the model parameter for the controlled object model can be identified in accordance with the target air/fuel ratio and the output of the downstream air/fuel ratio sensor, thereby calculating the target air/fuel ratio based on the algorithm which applies the controlled object model.

Preferably, the control method described above further comprises the step of identifying a model parameter for the controlled object model in accordance with the target air/fuel ratio and the output of the downstream air/fuel ratio sensor.

This preferred embodiment of the control method provides the same advantageous effects provided by the corresponding preferred embodiment of the control apparatus.

Preferably, in the engine control unit described above, the control program further causes the computer to identify a model parameter for the controlled object model in accordance with the target air/fuel ratio and the output of the downstream air/fuel ratio sensor.

This preferred embodiment of the engine control unit provides the same advantageous effects provided by the corresponding preferred embodiment of the control apparatus.

Preferably, in the control apparatus described above, the controlled object model comprises a discrete time system model, wherein the identifying means identifies a model parameter for the discrete time system model in accordance with discrete data of the target air/fuel ratio, and discrete data of the output of the downstream air/fuel ratio sensor.

According to this preferred embodiment of the control apparatus, the model parameter for the discrete time system model is identified in accordance with discrete data of the target air/fuel ratio, and discrete data of the output of the downstream air/fuel ratio sensor. Therefore, even if the purification percentage of the catalyzer and the output characteristic of the downstream air/fuel ratio sensor change over time or vary, the model parameter can be appropriately identified in accordance with such changes and variations to fit the dynamic characteristic of the controlled object model to the actual dynamic characteristic. Also, since the target air/fuel ratio is calculated for converging the output of the downstream air/fuel ratio sensor to the target value based on the controlled object model for which the model parameter is calculated as described above, and the one modulation algorithm, the output of the downstream air/fuel ratio sensor can be rapidly converged to the target value. From the foregoing, the control apparatus of the invention can rapidly and appropriately correct a slippage in control timing for the air/fuel ratio control caused by a response delay, a dead time, and the like of exhaust gases with respect to an air/fuel mixture supplied to the internal combustion engine, and further improve the stability of the air/fuel ratio control and the post-catalyst exhaust gas characteristic. In addition, the use of the discrete time system model can facilitate the identification of the model parameter and reduce a time required for the identification with a general identification algorithm, for example, a least square method or the like, as compared with a continuous time system model.

Preferably, in the control method described above, the controlled object model comprises a discrete time system model, wherein the step of identifying includes identifying a model parameter for the discrete time system model in accordance with discrete data of the target air/fuel ratio, and discrete data of the output of the downstream air/fuel ratio sensor.

This preferred embodiment of the control method provides the same advantageous effects provided by the corresponding preferred embodiment of the control apparatus.

Preferably, in the engine control unit described above, the controlled object model comprises a discrete time system model, wherein the control program causes the computer to identify a model parameter for the discrete time system model in accordance with discrete data of the target air/fuel ratio, and discrete data of the output of the downstream air/fuel ratio sensor.

This preferred embodiment of the engine control unit provides the same advantageous effects provided by the corresponding preferred embodiment of the control apparatus.

Preferably, the control apparatus described above further comprises operating condition parameter detecting means for detecting an operating condition parameter indicative of an operating condition of the internal combustion engine; and model parameter setting means for setting a model parameter for the controlled object model in accordance with the detected operating condition parameter.

According to this preferred embodiment of the control apparatus, since the control parameter for the controlled object model is set in accordance with the detected operating condition parameter, the model parameter can be rapidly calculated even when the internal combustion engine suddenly changes in the operating condition, while precisely reflecting the state of exhaust gases supplied to the catalyzer. Also, since the target air/fuel ratio of the air/fuel mixture is calculated for converging the output of the downstream air/fuel ratio sensor to the target value based on the controlled object model for which the model parameter is calculated as described above, and the one modulation algorithm, the output of the downstream air/fuel ratio sensor can be rapidly converged to the target value. From the foregoing, the control apparatus of the invention can rapidly and appropriately correct a slippage in control timing for the air/fuel ratio control caused by a response delay, a dead time, and the like of exhaust gases with respect to an air/fuel mixture supplied to the internal combustion engine, and further improve the stability of the air/fuel ratio control and the post-catalyst exhaust gas characteristic.

Preferably, the control method described above further comprises the steps of detecting an operating condition parameter indicative of an operating condition of the internal combustion engine; and setting a model parameter for the controlled object model in accordance with the detected operating condition parameter.

This preferred embodiment of the control method provides the same advantageous effects provided by the corresponding preferred embodiment of the control apparatus.

Preferably, in the engine control unit described above, the control program further causes the computer to detect an operating condition parameter indicative of an operating condition of the internal combustion engine; and set a model parameter for the controlled object model in accordance with the detected operating condition parameter.

This preferred embodiment of the engine control unit provides the same advantageous effects provided by the corresponding preferred embodiment of the control apparatus.

Preferably, the control apparatus described above further comprises an upstream air/fuel ratio sensor for outputting a detection signal indicative of an air/fuel ratio of exhaust gases at a location upstream of the catalyzer in the exhaust pipe of the internal combustion engine, wherein the air/fuel ratio control means includes air/fuel ratio calculating means for calculating the target air/fuel ratio in accordance with the output deviation based on an algorithm which applies a controlled object model that has a variable associated with a value indicative of, one of the target air/fuel ratio of the air/fuel mixture for converging the output of the downstream air/fuel ratio sensor to the target value and a value indicative of an output of the upstream air/fuel ratio sensor, and a variable associated with a value indicative of the output of the downstream air/fuel ratio sensor, and based on the one modulation algorithm, wherein the air/fuel ratio control means controls the air/fuel ratio of the air/fuel mixture supplied to the internal combustion engine in accordance with the calculated target air/fuel ratio.

According to this preferred embodiment of the control apparatus, when the target air/fuel ratio is calculated for converging the output of the downstream air/fuel ratio sensor to the target value based on the algorithm which applies the controlled object model and the one modulation algorithm, where the controlled object model has a variable associated with a value indicative of the output of the downstream air/fuel ratio sensor and a variable associated with a value indicative of the target air/fuel ratio, the air/fuel ratio can be calculated as a value which reflects the dynamic characteristic of the controlled object such as the phase delay, dead time, and the like. As such, the control apparatus of the invention can more rapidly converge the output of the downstream air/fuel ratio sensor to the target value to consequently improve the stability of the air/fuel ratio control, and further improve the post-catalyst exhaust gas characteristic. Also, when the air/fuel ratio is calculated based on the algorithm which applies the controlled object model and the one modulation algorithm, where the controlled object model has the variable associated with the value indicative of the output of the downstream air/fuel ratio sensor and the variable associated with a value indicative of the output of the upstream air/fuel ratio sensor, the air/fuel ratio of exhaust gases actually supplied to the catalyzer can be reflected to the target air/fuel ratio, so that the target air/fuel ratio can be calculated with a correspondingly improved accuracy.

Preferably, the control method described above further comprises the step of outputting a detection signal indicative of an air/fuel ratio of exhaust gases at a location downstream of the catalyzer in the exhaust pipe of the internal combustion engine, wherein the step of controlling an air/fuel ratio includes calculating the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm; and controlling the air/fuel ratio of the air/fuel mixture supplied to the internal combustion engine in accordance with the calculated target air/fuel ratio.

This preferred embodiment of the control method provides the same advantageous effects provided by the corresponding preferred embodiment of the control apparatus.

Preferably, in the engine control unit described above, the control program further causes the computer to output a detection signal indicative of an air/fuel ratio of exhaust gases at a location downstream of the catalyzer in the exhaust pipe of the internal combustion engine; calculate the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm; and control the air/fuel ratio of the air/fuel mixture supplied to the internal combustion engine in accordance with the calculated target air/fuel ratio.

This preferred embodiment of the engine control unit provides the same advantageous effects provided by the corresponding preferred embodiment of the control apparatus.

Preferably, the control apparatus described above further comprises identifying means for identifying a model parameter for the controlled object model in accordance with one of the target air/fuel ratio and the output of the upstream air/fuel ratio sensor, and the output of the downstream air/fuel ratio sensor.

According to this preferred embodiment of the control apparatus, when the target air/fuel ratio is identified in accordance with the target air/fuel ratio and the output of the downstream air/fuel ratio sensor, the target air/fuel ratio can be calculated based on the algorithm which applies the controlled object model. In addition, when the air/fuel ratio is identified based on the output of the downstream air/fuel ratio sensor and the output of the upstream air/fuel ratio sensor, the air/fuel ratio of exhaust gases actually supplied to the catalyzer can be reflected to the target air/fuel ratio, so that the target air/fuel ratio can be calculated with a correspondingly improved accuracy.

Preferably, the control method described above further comprises the step of identifying a model parameter for the controlled object model in accordance with one of the target air/fuel ratio and the output of the upstream air/fuel ratio sensor, and the output of the downstream air/fuel ratio sensor.

This preferred embodiment of the control method provides the same advantageous effects provided by the corresponding preferred embodiment of the control apparatus.

Preferably, in the engine control unit described above, the control program further causes the computer to identify a model parameter for the controlled object model in accordance with one of the target air/fuel ratio and the output of the upstream air/fuel ratio sensor, and the output of the downstream air/fuel ratio sensor.

This preferred embodiment of the engine control unit provides the same advantageous effects provided by the corresponding preferred embodiment of the control apparatus.

Preferably, in the control apparatus described above, the controlled object model comprises a discrete time system model, wherein the identifying means identifies the model parameter for the discrete time system model in accordance with one of discrete data of the target air/fuel ratio and discrete data of the output of the upstream air/fuel ratio sensor, and discrete data of the output of the downstream air/fuel ratio sensor.

According to this preferred embodiment of the control apparatus, when the model parameter for the discrete time system model in accordance with the discrete data of the target air/fuel ratio and the discrete data of the output of the upstream air/fuel ratio sensor, the model parameter can be appropriately identified in accordance with changes or variations in the purification percentage of the catalyzer and the output characteristic of the downstream air/fuel ratio sensor over time to fit the dynamic characteristic of the controlled object model to the actual dynamic characteristic. Also, when the model parameter for the discrete time system model is identified in accordance with the discrete data of the downstream air/fuel ratio sensor and the discrete data of the output of the upstream air/fuel ratio sensor, the air/fuel ratio of exhaust gases actually supplied to the catalyzer can be reflected to the target air/fuel ratio, so that the target air/fuel ratio can be calculated with a correspondingly improved accuracy.

Preferably, in the control method described above, the controlled object model comprises a discrete time system model, wherein the step of identifying includes identifying the model parameter for the discrete time system model in accordance with one of discrete data of the target air/fuel ratio and discrete data of the output of the upstream air/fuel ratio sensor, and discrete data of the output of the downstream air/fuel ratio sensor.

This preferred embodiment of the control method provides the same advantageous effects provided by the corresponding preferred embodiment of the control apparatus.

Preferably, in the engine control unit described above, the controlled object model comprises a discrete time system model, wherein the control program causes the computer to identify the model parameter for the discrete time system model in accordance with one of discrete data of the target air/fuel ratio and discrete data of the output of the upstream air/fuel ratio sensor, and discrete data of the output of the downstream air/fuel ratio sensor.

This preferred embodiment of the engine control unit provides the same advantageous effects provided by the corresponding preferred embodiment of the control apparatus.

Preferably, the control apparatus described above further comprises operating condition parameter detecting means for detecting an operating condition parameter indicative of an operating condition of the internal combustion engine; and model parameter setting means for setting a model parameter for the controlled object model in accordance with the detected operating condition parameter.

According to this preferred embodiment of the control apparatus, since the control parameter for the controlled object model is set in accordance with the detected operating condition parameter, the model parameter can be rapidly calculated even when the internal combustion engine suddenly changes in the operating condition, while precisely reflecting the state of exhaust gases supplied to the catalyzer. Also, since the target air/fuel ratio of the air/fuel mixture is calculated for converging the output of the downstream air/fuel ratio sensor to the target value based on the controlled object model for which the model parameter is calculated as described above, and the one modulation algorithm, the output of the downstream air/fuel ratio sensor can be rapidly converged to the target value. From the foregoing, the control apparatus of the invention can rapidly and appropriately correct a slippage in control timing for the air/fuel ratio control caused by a response delay, a dead time, and the like of exhaust gases with respect to an air/fuel mixture supplied to the internal combustion engine, and further improve the stability of the air/fuel ratio control and the post-catalyst exhaust gas characteristic.

Preferably, the control method described above further comprises the steps of detecting an operating condition parameter indicative of an operating condition of the internal combustion engine; and setting a model parameter for the controlled object model in accordance with the detected operating condition parameter.

This preferred embodiment of the control method provides the same advantageous effects provided by the corresponding preferred embodiment of the control apparatus.

Preferably, in the engine control unit described above, the control program further causes the computer to detect an operating condition parameter indicative of an operating condition of the internal combustion engine; and set a model parameter for the controlled object model in accordance with the detected operating condition parameter.

This preferred embodiment of the engine control unit provides the same advantageous effects provided by the corresponding preferred embodiment of the control apparatus.

To achieve the above object, according to a tenth aspect of the present invention, there is provided a control apparatus characterized by comprising a downstream air/fuel ratio sensor for outputting a detection signal indicative of an air/fuel ratio of exhaust gases at a location downstream of a catalyzer in an exhaust pipe of an internal combustion engine; output deviation calculating means for calculating an output deviation of an output of the downstream air/fuel ratio sensor from a predetermined target value; first air/fuel ratio control means for controlling an air/fuel ratio of an air/fuel mixture supplied to the internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of the downstream air/fuel ratio sensor converges to the target value; second air/fuel ratio control means for controlling the air/fuel ratio of the air/fuel mixture supplied to the internal combustion engine in accordance with the calculated output deviation based on a response specifying control algorithm such that the output of the downstream air/fuel ratio sensor converges to the target value; operating condition parameter detecting means for detecting an operating condition parameter indicative of an operating condition of the internal combustion engine; and selecting means for selecting one of the first air/fuel ratio control means and the second air/fuel ratio control means in accordance with the detected operating condition parameter to control the air/fuel ratio of the air/fuel mixture.

According to this control apparatus, the first air/fuel ratio control means controls the air/fuel ratio of the air/fuel mixture supplied to the internal combustion engine in accordance with the calculated output deviation based on the one modulation algorithm selected from the $\Delta$ modulation algorithm, $\Delta\Sigma$ modulation algorithm, and $\Sigma\Delta$ modulation algorithm such that the output of the downstream air/fuel ratio sensor converges to the target value, while the second air/fuel ratio control means controls the air/fuel ratio of the air/fuel mixture supplied to the internal combustion engine in accordance with the calculated deviation based on a response specifying control algorithm such that the output of the downstream air/fuel ratio sensor converges to the target value. Further, the selecting means selects one of the first air/fuel ratio control means and the second air/fuel ratio control means in accordance with the detected operating condition parameter to control the air/fuel ratio of the air/fuel mixture. Therefore, when the selecting means selects the first air/fuel ratio control means for controlling the air/fuel ratio, the output of the downstream air/fuel ratio sensor can be accurately and rapidly converged to the target value without variations even in an operation mode in which the output of the downstream air/fuel ratio sensor, i.e., the air/fuel ratio of exhaust gases presents a large response delay to an air/fuel mixture supplied to the internal combustion engine, for example, in an operation mode in which the internal combustion engine is susceptible to disturbance and encounters difficulties in ensuring the stability of the air/fuel ratio control such as in an operation mode in which air/fuel ratio of the air/fuel mixture supplied to the internal combustion engine fluctuates, in an operation mode in which the air/fuel ratio of the air/fuel mixture is controlled with a lower accuracy, in a transient operation mode in which a load largely fluctuates, and the like. For the same reason, the output of the downstream air/fuel ratio sensor can be accurately and rapidly converged to the target value without variations even in an operation mode in which the output of the downstream air/fuel ratio sensor, i.e., the air/fuel ratio of exhaust gases presents a large response delay and dead time to the air/fuel mixture supplied to the internal combustion engine, for example, in an operation mode in which the internal combustion engine is particularly lightly loaded, for example, in an idle operation mode and the like, that is, even when the target air/fuel ratio of the air/fuel mixture, as a control input, changes in an extremely narrow range.

On the other hand, the response specifying control algorithm is characterized by the ability to calculate the target air/fuel ratio so as to specify the responsibility of the output of the downstream air/fuel ratio sensor to the target value, for example, a rate at which the output converges to the target value. For this reason, in an operation mode in which the load on the internal combustion engine does not frequently change to cause less disturbance and ensure the stability of the air/fuel ratio control, for example, in a steady-state operation mode, the output of the downstream air/fuel ratio sensor more stably converges to the target value, so that the output of the downstream air/fuel ratio sensor can be more accurately converged to the target value when the air/fuel ratio is controlled for the air/fuel mixture based on the response specifying control algorithm than when the air/fuel ratio is controlled for the air/fuel mixture based on the one modulation algorithm. In addition, the response specifying control algorithm can reduce a range of fluctuations of the air/fuel ratio of exhaust gases flowing into the catalyzer to improve the post-catalyst exhaust gas characteristic. It is therefore possible to ensure a more satisfactory post-catalyst exhaust gas characteristic by appropriately selecting one of the first and second air/fuel ratio control means which permits the output of the downstream air/fuel ratio sensor to more rapidly converge to the target value, i.e., the air/fuel ratio of exhaust gases purified by the catalyzer to more rapidly converge to the target value depending on a variety of operation modes of the internal combustion engine than the prior art control apparatus which calculates the target air/fuel ratio based only on the sliding mode control algorithm equivalent to the response specifying control algorithm of the second air/fuel ratio control means.

To achieve the above object, according to an eleventh aspect of the invention, there is provided a control method comprising the steps of outputting a detection signal indicative of an air/fuel ratio of exhaust gases at a location downstream of a catalyzer in an exhaust pipe of an internal combustion engine; calculating an output deviation of an output of the downstream air/fuel ratio sensor from a predetermined target value; controlling an air/fuel ratio of an air/fuel mixture supplied to the internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of the downstream air/fuel ratio sensor converges to the target value; controlling the air/fuel ratio of the air/fuel mixture supplied to the internal combustion engine in accordance with the calculated output deviation based on a response specifying control algorithm such that the output of the downstream air/fuel ratio sensor converges to the target value; detecting an operating condition parameter indicative of an operating condition of the internal combustion engine; and selecting one of the air/fuel ratio controlled based on the one modulation algorithm and the air/fuel ratio controlled based on the response specifying control algorithm in accordance with the detected operating condition parameter to control the air/fuel ratio of the air/fuel mixture.

This control method provides the same advantageous effects as described above concerning the control apparatus according to the tenth aspect of the invention.

To achieve the above object, according to a twelfth aspect of the invention, there is provided an engine control unit including a control program for causing a computer to output a detection signal indicative of an air/fuel ratio of exhaust gases at a location downstream of a catalyzer in an exhaust pipe of an internal combustion engine; calculate an output deviation of an output of the downstream air/fuel ratio sensor from a predetermined target value; control an air/fuel ratio of an air/fuel mixture supplied to the internal combustion engine in accordance with the calculated output deviation based on one modulation algorithm selected from a Δ modulation algorithm, a ΔΣ modulation algorithm, and a ΣΔ modulation algorithm such that the output of the downstream air/fuel ratio sensor converges to the target value; control the air/fuel ratio of the air/fuel mixture supplied to the internal combustion engine in accordance with the calculated output deviation based on a response specifying control algorithm such that the output of the downstream air/fuel ratio sensor converges to the target value; detect an operating condition parameter indicative of an operating condition of the internal combustion engine; and select one of the air/fuel ratio controlled based on the one modulation algorithm and the air/fuel ratio controlled based on the response specifying control algorithm in accordance with the detected operating condition parameter to control the air/fuel ratio of the air/fuel mixture.

This engine control unit provides the same advantageous effects as described above concerning the control apparatus according to the tenth aspect of the invention.

Preferably, in the control apparatus described above, wherein the selecting means selects one of the first air/fuel ratio control means and the second air/fuel ratio control means in accordance with at least one of whether or not the catalyzer has a total amount of catalyst loaded therein equal to or larger than a predetermined load amount, and whether or not a carrier for carrying the catalyst in the catalyzer has a length in a direction in which the exhaust pipe extends equal to or longer than a predetermined length.

Generally, in this type of control apparatus, the output of the downstream air/fuel ratio sensor presents a larger response delay, dead time, and the like with respect to exhaust gases supplied to the catalyzer as a larger total amount of catalyst is loaded in the catalyzer of the internal combustion engine, or as the carrier for carrying the catalyst is longer. On the other hand, according to this preferred embodiment of the control apparatus, since the selecting means selects one of the first air/fuel ratio control means and the second air/fuel ratio control means in accordance with at least one of whether or not the catalyzer has a total amount of catalyst loaded therein equal to or larger than a predetermined load amount, and/or whether or not a carrier for carrying the catalyst in the catalyzer has a longitudinal length in a direction of the exhaust pipe equal to or longer than a predetermined length, it is possible to appropriately select the air/fuel ratio control depending on whether or not the output of the downstream air/fuel ratio sensor presents a large response delay and dead time. As a result, the control apparatus of the invention can ensure rapid convergence of the output of the downstream air/fuel ratio sensor to the target value to provide a satisfactory post-catalyst exhaust gas characteristic.

Preferably, in the control method described above, the step of selecting includes selecting one of the air/fuel ratio controlled based on the one modulation algorithm and the air/fuel ratio controlled based on the response specifying control algorithm in accordance with at least one of whether or not the catalyzer has a total amount of catalyst loaded therein equal to or larger than a predetermined load amount, and whether or not a carrier for carrying the catalyst in the catalyzer has a length in a direction in which the exhaust pipe extends equal to or longer than a predetermined length.

This preferred embodiment of the control method provides the same advantageous effects provided by the corresponding preferred embodiment of the control apparatus.

Preferably, in the engine control unit described above, the control program causes the computer to select one of the air/fuel ratio controlled based on the one modulation algorithm and the air/fuel ratio controlled based on the response specifying control algorithm in accordance with at least one of whether or not the catalyzer has a total amount of catalyst loaded therein equal to or larger than a predetermined load amount, and whether or not a carrier for carrying the catalyst in the catalyzer has a length in a direction in which the exhaust pipe extends equal to or longer than a predetermined length.

This preferred embodiment of the engine control unit provides the same advantageous effects provided by the corresponding preferred embodiment of the control apparatus.

Preferably, in the control apparatus described above, the selecting means includes operation mode discriminating means for discriminating an operation mode of the internal combustion engine in accordance with the operating condition parameter, wherein the selecting means selects the first air/fuel ratio control means when the discriminated operation mode is a predetermined first operation mode, and selects the second air/fuel ratio control means when the discriminated operation mode is a predetermined second operation mode.

As described above, in this type of control apparatus, the output of the downstream air/fuel ratio sensor, i.e., the air/fuel ratio of exhaust gases purified by the catalyzer converges to the target value in a different tendency, and the air/fuel ratio upstream of the catalyzer also has a different range of fluctuations and a different behavior when the air/fuel ratio is controlled by one of the first and second air/fuel ratio control means and when it is controlled by the other, depending on a particular operation mode of the internal combustion engine. It is therefore possible to ensure a satisfactory post-catalyst exhaust gas characteristic by previously setting the first and second operation modes as suitable for the air/fuel ratio control by the first and second air/fuel ratio control means, respectively.

Preferably, in the control method described above, the step of selecting includes discriminating an operation mode of the internal combustion engine in accordance with the operating condition parameter; and selecting the air/fuel ratio controlled based on the one modulation algorithm when the discriminated operation mode is a predetermined first operation mode, and selecting the air/fuel ratio controlled based on the response specifying control algorithm when the discriminated operation mode is a predetermined second operation mode.

This preferred embodiment of the control method provides the same advantageous effects provided by the corresponding preferred embodiment of the control apparatus.

Preferably, in the engine control unit described above, the control program causes the computer to discriminate an operation mode of the internal combustion engine in accordance with the operating condition parameter; select the air/fuel ratio controlled based on the one modulation algorithm when the discriminated operation mode is a predetermined first operation mode; and select the air/fuel ratio controlled based on the response specifying control algorithm when the discriminated operation mode is a predetermined second operation mode.

This preferred embodiment of the engine control unit provides the same advantageous effects provided by the corresponding preferred embodiment of the control apparatus.

Preferably, in the control apparatus described above, the catalyzer comprises a plurality of catalyzers disposed along the exhaust pipe of the internal combustion engine and spaced apart from each other, and the selecting means includes operation mode discriminating means for discriminating an operation mode of the internal combustion engine in accordance with the operating condition parameter, wherein the selecting means selects the first air/fuel ratio control means when the discriminated operation mode is a predetermined first operation mode, and selects the second air/fuel ratio control means when the discriminated operation mode is a predetermined second operation mode.

Generally, in this type of control apparatus, the output of the downstream air/fuel ratio sensor presents a larger response delay, dead time, and the like with respect to exhaust gases supplied to the catalyzer when a plurality of catalyzers are disposed upstream of the downstream air/fuel ratio sensor than when a single catalyzer is disposed. For this reason, with the intention to more rapidly converge the output of the downstream air/fuel ratio sensor to the target value, the internal combustion engine is provided with an extended operation mode in which the air/fuel ratio is controlled by the first air/fuel ratio control means rather than the second air/fuel ratio control means. Thus, according to this preferred embodiment of the control apparatus, the advantages provided by controlling the air/fuel ratio by the first air/fuel ratio control means can be particularly effectively produced by setting an extended region for the first operation mode, to ensure a satisfactory post-catalyst exhaust gas characteristic.

Preferably, in the control method described above, the catalyzer comprises a plurality of catalyzers disposed along the exhaust pipe of the internal combustion engine and spaced apart from each other, and the step of selecting includes discriminating an operation mode of the internal combustion engine in accordance with the operating condition parameter; and selecting the air/fuel ratio controlled based on the one modulation algorithm when the discriminated operation mode is a predetermined first operation mode, and selecting the air/fuel ratio controlled based on the response specifying control algorithm when the discriminated operation mode is a predetermined second operation mode.

This preferred embodiment of the control method provides the same advantageous effects provided by the corresponding preferred embodiment of the control apparatus.

Preferably, in the engine control unit described above, the catalyzer comprises a plurality of catalyzers disposed along the exhaust pipe of the internal combustion engine and spaced apart from each other, wherein the control program causes the computer to discriminate an operation mode of the internal combustion engine in accordance with the operating condition parameter; select the air/fuel ratio controlled based on the one modulation algorithm when the discriminated operation mode is a predetermined first operation mode; and select the air/fuel ratio controlled based on the response specifying control algorithm when the discriminated operation mode is a predetermined second operation mode.

This preferred embodiment of the engine control unit provides the same advantageous effects provided by the corresponding preferred embodiment of the control apparatus.

Preferably, in the control apparatus described above, the internal combustion engine comprises a downstream catalyzer in the exhaust pipe at a location downstream of the downstream air/fuel ratio sensor, and the selecting means includes operation mode discriminating means for discriminating an operation mode of the internal combustion engine in accordance with the operating condition parameter, wherein the selecting means selects the first air/fuel ratio control means when the discriminated operation mode is a predetermined first operation mode, and selects the second air/fuel ratio control means when the discriminated operation mode is a predetermined second operation mode.

According to this preferred embodiment of the control apparatus, since the downstream catalyzer is provided at a location downstream of the downstream air/fuel ratio sensor, the purification capability can be readily increased as the entire catalyzer, as compared with a single catalyzer disposed upstream of the downstream air/fuel ratio sensor. In addition, such an effect can be provided without changing a response delay, a dead time, and the like of the output of the downstream air/fuel ratio sensor with respect to exhaust gases supplied to the catalyzer. As a result, the control apparatus of the invention can ensure a more satisfactory post-catalyst exhaust gas characteristic.

Preferably, in the control method described above, the internal combustion engine comprises a downstream catalyzer in the exhaust pipe at a location downstream of the downstream air/fuel ratio sensor, and the step of selecting includes discriminating an operation mode of the internal combustion engine in accordance with the operating condition parameter; and selecting the air/fuel ratio controlled based on the one modulation algorithm when the discriminated operation mode is a predetermined first operation mode, and selecting the air/fuel ratio controlled based on the response specifying control algorithm when the discriminated operation mode is a predetermined second operation mode.

This preferred embodiment of the control method provides the same advantageous effects provided by the corresponding preferred embodiment of the control apparatus.

Preferably, in the engine control unit described above, the internal combustion engine comprises a downstream catalyzer in the exhaust pipe at a location downstream of the downstream air/fuel ratio sensor, wherein the control program causes the computer to discriminate an operation mode of the internal combustion engine in accordance with the operating condition parameter; select the air/fuel ratio controlled based on the one modulation algorithm when the discriminated operation mode is a predetermined first operation mode; and select the air/fuel ratio controlled based on the response specifying control algorithm when the discriminated operation mode is a predetermined second operation mode.

This preferred embodiment of the engine control unit provides the same advantageous effects provided by the corresponding preferred embodiment of the control apparatus.

Preferably, in the control apparatus described above, the total amount of catalyst loaded in the downstream catalyzer is set smaller than the total amount of catalyst loaded in the catalyzer, and the target value is set to provide the highest purification percentage for the catalyzer.

It has been confirmed by an experiment (see FIG. 3) that in the control apparatus in which the target value for the output of the downstream air/fuel ratio sensor is set to provide a maximum purification percentage for the catalyzer, carbon monoxide within exhaust gases is not purified but, on the contrary, carbon monoxide is generated in the downstream catalyzer if the total amount of catalyst loaded in the downstream catalyzer is equal to or larger than the total amount of catalyst loaded in the catalyzer. Therefore, according to this preferred embodiment of the control apparatus, since the total amount of catalyst loaded in the downstream catalyzer is set smaller than the total amount of catalyst loaded in the catalyzer, it is possible to avoid the phenomenon described above and accordingly ensure a satisfactory post-catalyst exhaust gas characteristic.

Preferably, in the control method described above, the total amount of catalyst loaded in the downstream catalyzer is set smaller than the total amount of catalyst loaded in the catalyzer, and the target value is set to provide the highest purification percentage for the catalyzer.

This preferred embodiment of the control method provides the same advantageous effects provided by the corresponding preferred embodiment of the control apparatus.

Preferably, in the engine control unit described above, the total amount of catalyst loaded in the downstream catalyzer is set smaller than the total amount of catalyst loaded in the catalyzer, and the target value is set to provide the highest purification percentage for the catalyzer.

This preferred embodiment of the engine control unit provides the same advantageous effects provided by the corresponding preferred embodiment of the control apparatus.

Preferably, in the control apparatus described above, the first operation mode includes a transient operation mode of the internal combustion engine.

As described above, in this type of control apparatus, the output of the downstream air/fuel ratio sensor can be accurately and rapidly converged to the target value without variations in a transient operation mode of the internal combustion engine in which the internal combustion engine is susceptible to disturbance and hence experiences difficulties in ensuring the stability of the air/fuel ratio control, when the air/fuel ratio is controlled based on the one modulation algorithm than when the air/fuel ratio is controlled based on the response specifying control algorithm. Therefore, according to this preferred embodiment of the control apparatus, since the air/fuel ratio control by the first air/fuel ratio control mean is selected when the internal combustion engine is in the transient operation mode, the output of the downstream air/fuel ratio sensor can be more accurately and rapidly converged to the target value without variation than when the air/fuel ratio control by the second air/fuel ratio control means is selected. As a result, the control apparatus of the invention can ensure a more satisfactory post-catalyst exhaust gas characteristic.

Preferably, in the control method described above, the first operation mode includes a transient operation mode of the internal combustion engine.

This preferred embodiment of the control method provides the same advantageous effects provided by the corresponding preferred embodiment of the control apparatus.

Preferably, in the engine control unit described above, the first operation mode includes a transient operation mode of the internal combustion engine.

This preferred embodiment of the engine control unit provides the same advantageous effects provided by the corresponding preferred embodiment of the control apparatus.

Preferably, in the control apparatus described above, the first operation mode includes an idle operation mode.

As described above, in this type of control apparatus, an exhaust gas volume is reduced in the idle operation mode to cause an increase in a response delay and a dead time of the downstream air/fuel ratio sensor and a narrower range of air/fuel ratio in which a stable combustion state can be ensured in the internal combustion engine, so that the output of the downstream air/fuel ratio sensor can be accurately and rapidly converged to the target value without variations when the air/fuel ratio is controlled based on the one modulation algorithm than when the air/fuel ratio is controlled based on the response specifying control algorithm. Therefore, according to this preferred embodiment of the control apparatus, since the air/fuel ratio control by the first air/fuel ratio control means is selected when the internal combustion engine is in the idle operation mode, the output of the downstream air/fuel ratio sensor can be more rapidly converged to the target value than when the air/fuel ratio control by the second control means is selected, thereby ensuring a more satisfactory post-catalyst exhaust gas characteristic.

Preferably, in the control method described above, the first operation mode includes an idle operation mode.

This preferred embodiment of the control method provides the same advantageous effects provided by the corresponding preferred embodiment of the control apparatus.

Preferably, in the engine control unit described above, the first operation mode includes an idle operation mode.

This preferred embodiment of the engine control unit provides the same advantageous effects provided by the corresponding preferred embodiment of the control apparatus.

Preferably, in the control apparatus described above, the second operation mode includes a steady-state operation mode in which the internal combustion engine is loaded substantially in a steady-state.

As described above, in this type of control apparatus, disturbance is less frequent and therefore the stability can be ensured for the air/fuel ratio control in the steady-state operation mode, so that the output of the downstream air/fuel ratio sensor can be accurately and rapidly converged to the target value without variations (steady-state deviation) when the air/fuel ratio is controlled based on the response specifying control algorithm than when the air/fuel ratio is controlled based on the one modulation algorithm. In addition, a range of fluctuations in exhaust gases flowing into the catalyzer can be reduced. Therefore, according to this preferred embodiment of the control apparatus, since the air/fuel ratio control by the second air/fuel ratio control means is selected when the internal combustion engine is in the steady-state operation mode, the output of the downstream air/fuel ratio sensor can be more rapidly converged to the target value than when the air/fuel ratio control by the first air/fuel ratio control means is selected, thereby ensuring a more satisfactory post-catalyst exhaust gas characteristic.

Preferably, in the control method described above, the second operation mode includes a steady-state operation mode in which the internal combustion engine is loaded substantially in a steady-state.

This preferred embodiment of the control method provides the same advantageous effects provided by the corresponding preferred embodiment of the control apparatus.

Preferably, in the engine control unit described above, the second operation mode includes a steady-state operation mode in which the internal combustion engine is loaded substantially in a steady-state.

This preferred embodiment of the engine control unit provides the same advantageous effects provided by the corresponding preferred embodiment of the control apparatus.

Preferably, in the control apparatus described above, the first air/fuel ratio control means includes first air/fuel ratio calculating means for calculating a first intermediate value in accordance with the output deviation based on the one modulation algorithm, and calculating a target air/fuel ratio of the air/fuel mixture for converging the output of the downstream air/fuel ratio sensor to the target value based on a product of the calculated first intermediate value and a predetermined gain, wherein the first air/fuel ratio control means controls the air/fuel ratio of the air/fuel mixture in accordance with the calculated target air/fuel ratio.

According to this preferred embodiment of the control apparatus, when the air/fuel ratio control by the first air/fuel ratio control means is selected, the target air/fuel ratio is calculated based on the first intermediate value, which is calculated based on the one modulation algorithm, multiplied by a predetermined gain, so that a satisfactory controllability can be ensured for the air/fuel ratio control by setting the predetermined gain to an appropriate value.

Preferably, in the control method described above, the step of controlling an air/fuel ratio based on one modulation algorithm includes calculating a first intermediate value in accordance with the output deviation based on the one modulation algorithm; calculating a target air/fuel ratio of the air/fuel mixture for converging the output of the downstream air/fuel ratio sensor to the target value based on a product of the calculated first intermediate value and a predetermined gain; and controlling the air/fuel ratio of the air/fuel mixture in accordance with the calculated target air/fuel ratio.

This preferred embodiment of the control method provides the same advantageous effects provided by the corresponding preferred embodiment of the control apparatus.

Preferably, in the engine control unit described above, the control program causes the computer to calculate a first intermediate value in accordance with the output deviation based on the one modulation algorithm; calculate a target air/fuel ratio of the air/fuel mixture for converging the output of the downstream air/fuel ratio sensor to the target value based on a product of the calculated first intermediate value and a predetermined gain; and control the air/fuel ratio of the air/fuel mixture in accordance with the calculated target air/fuel ratio.

This preferred embodiment of the engine control unit provides the same advantageous effects provided by the corresponding preferred embodiment of the control apparatus.

Preferably, the control apparatus described above further comprises gain setting means for setting the gain in accordance with the operating condition parameter.

According to this preferred embodiment of the control apparatus, when the air/fuel ratio control by the first air/fuel ratio control means is selected, the target air/fuel ratio of the air/fuel mixture is calculated based on the first intermediate value multiplied by the gain, and the gain is set in accordance with the operating condition parameter indicative of an operating condition of the internal combustion engine. With such setting, even when a change in the operating condition of the internal combustion engine results in a change in the output of the downstream air/fuel ratio sensor, i.e., the air/fuel ratio of exhaust gases (gain characteristic), the target air/fuel ratio can be appropriately calculated for the air/fuel mixture by using the gain which is set in accordance with the change, thereby providing good convergence and high responsibility for the air/fuel ratio control.

Preferably, the control method described above further comprises the step of setting the gain in accordance with the operating condition parameter.

This preferred embodiment of the control method provides the same advantageous effects provided by the corresponding preferred embodiment of the control apparatus.

Preferably, in the engine control unit described above, the control program further causes the computer to set the gain in accordance with the operating condition parameter.

This preferred embodiment of the engine control unit provides the same advantageous effects provided by the corresponding preferred embodiment of the control apparatus.

Preferably, in the control apparatus described above, the first air/fuel ratio control means includes first air/fuel ratio calculating means for calculating a second intermediate value in accordance with the output deviation based on the one modulation algorithm, and calculating a target air/fuel ratio of the air/fuel mixture for converging the output of the downstream air/fuel ratio sensor to the target value by adding a predetermined value to the calculated second intermediate value, wherein the first air/fuel ratio control means controls the air/fuel ratio of the air/fuel mixture in accordance with the calculated target air/fuel ratio.

According to this preferred embodiment of the control apparatus, when the air/fuel ratio control by the first air/fuel ratio control means is selected, the air/fuel ratio calculating means calculates the target air/fuel ratio as a control input by adding the predetermined value to the second intermediate value calculated based on the one modulation algorithm, so that the target air/fuel ratio calculating means can calculate the air/fuel ratio not only as a value which positively and negatively inverts about zero, but also as a value which repeats predetermined increase and decrease about a predetermined value, thereby making it possible to improve the degree of freedom in the control of air/fuel ratio.

Preferably, in the control method described above, the step of controlling an air/fuel ratio control based on one modulation algorithm includes calculating a second intermediate value in accordance with the output deviation based on the one modulation algorithm; calculating a target air/fuel ratio of the air/fuel mixture for converging the output of the downstream air/fuel ratio sensor to the target value by adding a predetermined value to the calculated second intermediate value; and controlling the air/fuel ratio of the air/fuel mixture in accordance with the calculated target air/fuel ratio.

This preferred embodiment of the control method provides the same advantageous effects provided by the corresponding preferred embodiment of the control apparatus.

Preferably, in the engine control unit described above, the control program causes the computer to calculate a second intermediate value in accordance with the output deviation based on the one modulation algorithm; calculate a target air/fuel ratio of the air/fuel mixture for converging the output of the downstream air/fuel ratio sensor to the target value by adding a predetermined value to the calculated second intermediate value; and control the air/fuel ratio of the air/fuel mixture in accordance with the calculated target air/fuel ratio.

This preferred embodiment of the engine control unit provides the same advantageous effects provided by the corresponding preferred embodiment of the control apparatus.

Preferably, in the control apparatus described above, the output deviation calculating means includes predicted value calculating means for calculating a predicted value of the output deviation in accordance with the output deviation based on a prediction algorithm, the first air/fuel ratio control means controls the air/fuel ratio of the air/fuel mixture in accordance with the calculated predicted value of the output deviation based on the one modulation algorithm such that the output of the downstream air/fuel ratio sensor converges to the target value, and the second air/fuel ratio control means controls the air/fuel ratio of the air/fuel mixture in accordance with the calculated predicted value of the output deviation based on the response specifying control algorithm such that the output of the downstream air/fuel ratio sensor converges to the target value.

According to this preferred embodiment of the control apparatus, when the air/fuel ratio control by the first air/fuel ratio control means is selected, the predicted value of the output deviation which is a deviation of the output of the downstream air/fuel ratio sensor from the predetermined target value is calculated in accordance with the output deviation based on the prediction algorithm, and the air/fuel ratio is calculated for the air/fuel mixture in accordance with the thus calculated predicted value of the output deviation based on the one modulation algorithm such that the output of the downstream air/fuel ratio sensor converges to the predetermined target value. Therefore, by calculating such a predicted value as a value which reflects a response delay, a dead time, and the like of the output of the downstream air/fuel ratio sensor, it is possible to appropriately correct a slippage in control timing in the air/fuel ratio control caused by a response delay, a dead time, and the like of exhaust gases with respect to an air/fuel mixture supplied to the internal combustion engine and accordingly more rapidly converge the output of the downstream air/fuel ratio sensor to the target value. As a result, the control apparatus of the invention can improve the stability of the air/fuel ratio control and further improve the post-catalyst exhaust gas characteristic. Also, when the air/fuel ratio control by the second air/fuel ratio control means is selected, the air/fuel ratio of the air/fuel mixture is likewise controlled in accordance with the predicted value of the output deviation based on the response specifying control algorithm, so that the control apparatus provides similar advantageous effects to the above.

Preferably, in the control method described above, the step of calculating an output deviation includes calculating a predicted value of the output deviation in accordance with the output deviation based on a prediction algorithm; the step of controlling an air/fuel ratio based on one modulation algorithm includes controlling the air/fuel ratio of the air/fuel mixture in accordance with the calculated predicted value of the output deviation based on the one modulation algorithm such that the output of the downstream air/fuel ratio sensor converges to the target value; and the step of controlling the air/fuel ratio based on a response specifying control algorithm includes controlling the air/fuel ratio of the air/fuel mixture in accordance with the calculated predicted value of the output deviation based on the response specifying control algorithm such that the output of the downstream air/fuel ratio sensor converges to the target value.

This preferred embodiment of the control method provides the same advantageous effects provided by the corresponding preferred embodiment of the control apparatus.

Preferably, in the engine control unit described above, the control program causes the computer to calculate a predicted value of the output deviation in accordance with the output deviation based on a prediction algorithm; control the air/fuel ratio of the air/fuel mixture in accordance with the calculated predicted value of the output deviation based on the one modulation algorithm such that the output of the downstream air/fuel ratio sensor converges to the target value; and control the air/fuel ratio of the air/fuel mixture in accordance with the calculated predicted value of the output deviation based on the response specifying control algorithm such that the output of the downstream air/fuel ratio sensor converges to the target value.

This preferred embodiment of the engine control unit provides the same advantageous effects provided by the corresponding preferred embodiment of the control apparatus.

Preferably, in the control apparatus described above, the first air/fuel ratio control means includes first air/fuel ratio calculating means for calculating the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm, wherein the first air/fuel ratio control means controls the air/fuel ratio of the air/fuel mixture in accordance with the calculated target air/fuel ratio, and the second air/fuel ratio control means includes second air/fuel ratio calculating means for calculating the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the response specifying control algorithm, wherein the second air/fuel ratio control means controls the air/fuel ratio of the air/fuel mixture in accordance with the calculated target air/fuel ratio.

According to this preferred embodiment of the control apparatus, when the air/fuel ratio control by the first air/fuel ratio control means is selected, the target air/fuel ratio is calculated in accordance with the output deviation based on an algorithm which applies a controlled object model and the one modulation algorithm, wherein the controlled object model has a variable associated with a value indicative of the output of the downstream air/fuel ratio sensor and a variable associated with a value indicative of the target air/fuel ratio. Therefore, when the controlled object model is defined to reflect the dynamic characteristic of the controlled object such as a phase delay, a dead time, and the like, the air/fuel ratio can be calculated as a value which reflects the dynamic characteristic of the controlled object such as the phase delay, dead time, and the like. As such, the control apparatus of the invention can more rapidly converge the output of the downstream air/fuel ratio sensor to the target value to consequently improve the stability of the air/fuel ratio control, and further improve the post-catalyst exhaust gas characteristic when the air/fuel ratio control by the second air/fuel ratio control means is selected, the target air/fuel ratio is calculated in accordance with the output deviation based on the algorithm which applies the controlled object model and the response specifying control algorithm to control the air/fuel ratio of the air/fuel mixture in accordance with this target air/fuel ratio, so that the control apparatus provides similar advantageous effects to the above.

Preferably, in the control method described above, the step of controlling an air/fuel ratio based on one modulation algorithm includes calculating the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm; and controlling the air/fuel ratio of the air/fuel mixture in accordance with the calculated target air/fuel ratio, and the step of controlling the air/fuel ratio control based on a response specifying control algorithm includes calculating the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the response specifying control algorithm; and controlling the air/fuel ratio of the air/fuel mixture in accordance with the calculated target air/fuel ratio.

This preferred embodiment of the control method provides the same advantageous effects provided by the corresponding preferred embodiment of the control apparatus.

Preferably, in the engine control unit described above, the control program causes the computer to calculate the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm; and control the air/fuel ratio of the air/fuel mixture in accordance with the calculated target air/fuel ratio; calculate the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the response specifying control algorithm; and control the air/fuel ratio of the air/fuel mixture in accordance with the calculated target air/fuel ratio.

This preferred embodiment of the engine control unit provides the same advantageous effects provided by the corresponding preferred embodiment of the control apparatus.

Preferably, the control apparatus described above further comprises identifying means for identifying a model parameter for the controlled object model in accordance with the target air/fuel ratio and the output of the downstream air/fuel ratio sensor.

According to this preferred embodiment of the control apparatus, when the air/fuel ratio control by the first air/fuel ratio control means is selected, the model parameter for the controlled object model can be identified in accordance with the target air/fuel ratio and the output of the downstream air/fuel ratio sensor, thereby calculating the target air/fuel ratio based on the algorithm which applies the controlled object model. Also, when the air/fuel ratio control by the second air/fuel ratio control means is selected, the model parameter for the controlled object model is identified in accordance with the target air/fuel ratio and the output of the downstream air/fuel ratio sensor, so that the control apparatus provides similar advantageous effects to the above.

Preferably, the control method described above further comprises the step of identifying a model parameter for the controlled object model in accordance with the target air/fuel ratio and the output of the downstream air/fuel ratio sensor.

This preferred embodiment of the control method provides the same advantageous effects provided by the corresponding preferred embodiment of the control apparatus.

Preferably, in the engine control unit described above, the control program further causes the computer to identify a model parameter for the controlled object model in accordance with the target air/fuel ratio and the output of the downstream air/fuel ratio sensor.

This preferred embodiment of the engine control unit provides the same advantageous effects provided by the corresponding preferred embodiment of the control apparatus.

Preferably, in the control apparatus described above, the controlled object model comprises a discrete time system model, wherein the identifying means identifies the model parameter for the discrete time system model in accordance with discrete data of the target air/fuel ratio and discrete data of the output of the downstream air/fuel ratio sensor.

According to this preferred embodiment of the control apparatus, when the air/fuel ratio control by the first air/fuel ratio control means is selected, the model parameter for the discrete time system model is identified in accordance with discrete data of the target air/fuel ratio, and discrete data of the output of the downstream air/fuel ratio sensor. Therefore, even if the purification percentage of the catalyzer and the output characteristic of the downstream air/fuel ratio sensor change over time or vary, the model parameter can be appropriately identified in accordance with such changes and variations to fit the dynamic characteristic of the controlled object model to the actual dynamic characteristic. Also, since the target air/fuel ratio is calculated for converging the output of the downstream air/fuel ratio sensor to the target value based on the controlled object model for which the model parameter is calculated as described above, and the one modulation algorithm, the output of the downstream air/fuel ratio sensor can be rapidly converged to the target value. From the foregoing, the control apparatus of the invention can rapidly and appropriately correct a slippage in control timing for the air/fuel ratio control caused by a response delay, a dead time, and the like of exhaust gases with respect to an air/fuel mixture supplied to the internal combustion engine, and further improve the stability of the air/fuel ratio control and the post-catalyst exhaust gas characteristic. In addition, the use of the discrete time system model can facilitate the identification of the model parameter and reduce a time required for the identification with a general identification algorithm, for example, a least square method or the like, as compared with a continuous time system model. Also, when the air/fuel ratio control by the second air/fuel ratio control means is selected, the model parameter for the discrete time system model is likewise identified in accordance with the discrete data of the target air/fuel ratio and the discrete data of the output of the downstream air/fuel ratio sensor, so that the control apparatus provides similar advantageous effects to the above.

Preferably, in the control method described above, the controlled object model comprises a discrete time system model, wherein the step of identifying includes identifying the model parameter for the discrete time system model in accordance with discrete data of the target air/fuel ratio and discrete data of the output of the downstream air/fuel ratio sensor.

This preferred embodiment of the control method provides the same advantageous effects provided by the corresponding preferred embodiment of the control apparatus.

Preferably, in the engine control unit described above, the controlled object model comprises a discrete time system model, wherein the control program causes the computer to identify the model parameter for the discrete time system model in accordance with discrete data of the target air/fuel ratio and discrete data of the output of the downstream air/fuel ratio sensor.

This preferred embodiment of the engine control unit provides the same advantageous effects provided by the corresponding preferred embodiment of the control apparatus.

Preferably, the control apparatus described above further comprises model parameter setting means for setting the model parameter for the controlled object model in accordance with the operating condition parameter.

According to this preferred embodiment of the control apparatus, when the air/fuel ratio control by the first air/fuel ratio control means is selected, the model parameter can be rapidly calculated even when the internal combustion engine suddenly changes in the operating condition, while precisely reflecting the state of exhaust gases supplied to the catalyzer. Also, since target the air/fuel ratio of the air/fuel mixture is calculated for converging the output of the downstream air/fuel ratio sensor to the target value based on the controlled object model for which the model parameter is calculated as described above, and the one modulation algorithm, the output of the downstream air/fuel ratio sensor can be rapidly converged to the target value. From the foregoing, the control apparatus of the invention can rapidly and appropriately correct a slippage in control timing for the air/fuel ratio control caused by a response delay, a dead time, and the like of exhaust gases with respect to an air/fuel mixture supplied to the internal combustion engine, and further improve the stability of the air/fuel ratio control and the post-catalyst exhaust gas characteristic. Also, when the air/fuel ratio control by the second air/fuel ratio control means is selected, the model parameter for the controlled object model is likewise identified in accordance with operating condition parameter, so that the control apparatus provides similar advantageous effects to the above.

Preferably, the control method described above further comprises the step of setting the model parameter for the controlled object model in accordance with the operating condition parameter.

This preferred embodiment of the control method provides the same advantageous effects provided by the corresponding preferred embodiment of the control apparatus.

Preferably, in the engine control unit described above, the control program further causes the computer to set the model parameter for the controlled object model in accordance with the operating condition parameter.

This preferred embodiment of the engine control unit provides the same advantageous effects provided by the corresponding preferred embodiment of the control apparatus.

Preferably, the control apparatus described above further comprises an upstream air/fuel ratio sensor for outputting a detection signal indicative of an air/fuel ratio of exhaust gases at a location upstream of the catalyzer in the exhaust pipe of the internal combustion engine. The first air/fuel ratio control means includes first air/fuel ratio calculating means for calculating the target air/fuel ratio in accordance with the output deviation based on an algorithm which applies a controlled object model and the one modulation algorithm, where the controlled object model has a variable associated with a value indicative of one of the target air/fuel ratio of the air/fuel mixture for converging the output of the downstream air/fuel ratio sensor to the target value and a value indicative of an output of the upstream air/fuel ratio sensor, and a variable associated with a value indicative of the output of the downstream air/fuel ratio sensor. The first air/fuel ratio control means controls the air/fuel ratio of the air/fuel mixture in accordance with the calculated target air/fuel ratio. The second air/fuel ratio control means includes second air/fuel ratio calculating means for calculating the target air/fuel ratio in accordance with the output deviation based on an algorithm which applies a controlled object model and the response specifying control algorithm, wherein the controlled object model has a variable associated with a value indicative of one of the target air/fuel ratio of the air/fuel mixture for converging the output of the downstream air/fuel ratio sensor to the target value and a value indicative of an output of the upstream air/fuel ratio sensor, and a variable associated with a value indicative of the output of the downstream air/fuel ratio sensor. The second air/fuel ratio control means controls the air/fuel ratio of the air/fuel mixture in accordance with the calculated target air/fuel ratio.

According to this preferred embodiment of the control apparatus, when the air/fuel ratio control by the first air/fuel ratio control means is selected, the air/fuel ratio can be calculated as a value which reflects the dynamic characteristic of the controlled object such as the phase delay, dead time, and the like. As such, the control apparatus of the invention can more rapidly converge the output of the downstream air/fuel ratio sensor to the target value to consequently improve the stability of the air/fuel ratio control, and further improve the post-catalyst exhaust gas characteristic. Also, when the air/fuel ratio control by the second air/fuel ratio control means is selected, the target air/fuel ratio is calculated in accordance with the output deviation based on the algorithm which applies the controlled object model that has the variable associated with the value indicative of the output of the downstream air/fuel ratio sensor and the variable associated with the value indicative of one of the target air/fuel ratio and the value indicative of the output of the upstream air/fuel ratio sensor, so that the control apparatus provides similar advantageous effects to the above.

Preferably, the control method described above further comprises the step of outputting a detection signal indicative of an air/fuel ratio of exhaust gases at a location upstream of the catalyzer in the exhaust pipe of the internal combustion engine, wherein the step of controlling an air/fuel ratio based on one modulation algorithm includes calculating the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm; and controlling the air/fuel ratio of the air/fuel mixture in accordance with the calculated target air/fuel ratio, and the step of controlling the air/fuel ratio based on a response specifying control algorithm includes calculating the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the response specifying control algorithm; and controlling the air/fuel ratio of the air/fuel mixture in accordance with the calculated target air/fuel ratio.

This preferred embodiment of the control method provides the same advantageous effects provided by the corresponding preferred embodiment of the control apparatus.

Preferably, in the engine control unit described above, the control program further causes the computer to output a detection signal indicative of an air/fuel ratio of exhaust gases at a location upstream of the catalyzer in the exhaust pipe of the internal combustion engine; calculate the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the one modulation algorithm; and control the air/fuel ratio of the air/fuel mixture in accordance with the calculated target air/fuel ratio; and calculate the target air/fuel ratio in accordance with the output deviation based on an algorithm which applies a controlled object model that has a variable associated with a value indicative of the target air/fuel ratio of the air/fuel mixture for converging the output of the downstream air/fuel ratio sensor to the target value, and a variable associated with a value indicative of the output of the downstream air/fuel ratio sensor, and the response specifying control algorithm; and control the air/fuel ratio of the air/fuel mixture in accordance with the calculated target air/fuel ratio.

This preferred embodiment of the engine control unit provides the same advantageous effects provided by the corresponding preferred embodiment of the control apparatus.

Preferably, the control apparatus described above further comprises identifying means for identifying the model parameter for the controlled object model in accordance with one of the target air/fuel ratio and the output of the upstream air/fuel ratio sensor, and the output of the downstream air/fuel ratio sensor.

According to this preferred embodiment of the control apparatus, when the air/fuel ratio control by the first air/fuel ratio control means is selected, the target air/fuel ratio can be calculated based on the algorithm which applies the controlled object model. Also, when the air/fuel ratio control by the second air/fuel ratio control means is selected, the air/fuel ratio is likewise identified based on the output of the downstream air/fuel ratio sensor and the output of the upstream air/fuel ratio sensor, so that the control apparatus provides similar advantageous effects to the above.

Preferably, the control method described above further comprises the step of identifying the model parameter for the controlled object model in accordance with one of the target air/fuel ratio and the output of the upstream air/fuel ratio sensor, and the output of the downstream air/fuel ratio sensor.

This preferred embodiment of the control method provides the same advantageous effects provided by the corresponding preferred embodiment of the control apparatus.

Preferably, in the engine control unit described above, the control program further causes the computer to identify the model parameter for the controlled object model in accordance with one of the target air/fuel ratio and the output of the upstream air/fuel ratio sensor, and the output of the downstream air/fuel ratio sensor.

This preferred embodiment of the engine control unit provides the same advantageous effects provided by the corresponding preferred embodiment of the control apparatus.

Preferably, in the control apparatus described above, the controlled object model comprises a discrete time system model, wherein the identifying means identifies the model parameter for the discrete time system model in accordance with one of discrete data of the target air/fuel ratio and discrete data of the output of the upstream air/fuel ratio sensor, and discrete data of the output of the downstream air/fuel ratio sensor.

According to this preferred embodiment of the control apparatus, when the air/fuel ratio control by the first air/fuel ratio control means is selected, the model parameter can be appropriately identified in accordance with changes or variations in the purification percentage of the catalyzer and the output characteristic of the downstream air/fuel ratio sensor over time to fit the dynamic characteristic of the controlled object model to the actual dynamic characteristic. Also, when the air/fuel ratio control by the second air/fuel ratio control means is selected, the model parameter for the discrete time system model is identified in accordance with the discrete data of the downstream air/fuel ratio sensor and the discrete data of the output of the upstream air/fuel ratio sensor, so that the control apparatus provides similar advantageous effects to the above.

Preferably, in the control method described above, the controlled object model comprises a discrete time system model, wherein the step of identifying includes identifying the model parameter for the discrete time system model in accordance with one of discrete data of the target air/fuel ratio and discrete data of the output of the upstream air/fuel ratio sensor, and discrete data of the output of the downstream air/fuel ratio sensor.

This preferred embodiment of the control method provides the same advantageous effects provided by the corresponding preferred embodiment of the control apparatus.

Preferably, in the engine control unit described above, the controlled object model comprises a discrete time system model, wherein the control program causes the computer to identify the model parameter for the discrete time system model in accordance with one of discrete data of the target air/fuel ratio and discrete data of the output of the upstream air/fuel ratio sensor, and discrete data of the output of the downstream air/fuel ratio sensor.

This preferred embodiment of the engine control unit provides the same advantageous effects provided by the corresponding preferred embodiment of the control apparatus.

Preferably, the control apparatus described above further comprises a model parameter setting means for setting a model parameter for the controlled object model in accordance with the operating condition parameter.

According to this preferred embodiment of the control apparatus, when the air/fuel ratio control by the first air/fuel ratio control means is selected, since the control parameter for the controlled object model is set in accordance with the detected operating condition parameter, the model parameter can be rapidly calculated even when the internal combustion engine suddenly changes in the operating condition, while precisely reflecting the state of exhaust gases supplied to the catalyzer. Also, since the target air/fuel ratio of the air/fuel mixture is calculated for converging the output of the downstream air/fuel ratio sensor to the target value based on the controlled object model for which the model parameter is calculated as described above, and the one modulation algorithm, the output of the downstream air/fuel ratio sensor can be rapidly converged to the target value. From the foregoing, the control apparatus of the invention can rapidly and appropriately correct a slippage in control timing for the air/fuel ratio control caused by a response delay, a dead time, and the like of exhaust gases with respect to an air/fuel mixture supplied to the internal combustion engine, and further improve the stability of the air/fuel ratio control and the post-catalyst exhaust gas characteristic. Also, when the air/fuel ratio control by the second air/fuel ratio control means is selected, the model parameter for the controlled object model is likewise identified in accordance with the detected operating condition parameter, so that the control apparatus provides similar advantageous effects to the above.

Preferably, the control method described above further comprises the step of setting a model parameter for the controlled object model in accordance with the operating condition parameter.

This preferred embodiment of the control method provides the same advantageous effects provided by the corresponding preferred embodiment of the control apparatus.

Preferably, in the engine control unit described above, the control program further causes the computer to set a model parameter for the controlled object model in accordance with the operating condition parameter.

This preferred embodiment of the engine control unit provides the same advantageous effects provided by the corresponding preferred embodiment of the control apparatus.

Preferably, in the control apparatus described above, the response specifying control algorithm is a sliding mode control algorithm.

According to this preferred embodiment of the control apparatus, the sliding mode control algorithm is used as the response specifying control algorithm, thereby making it possible to realize an air/fuel ratio control apparatus for an internal combustion engine which excels in the robustness and response specifying characteristic.

Preferably, in the control method described above, the response specifying control algorithm is a sliding mode control algorithm.

This preferred embodiment of the control method provides the same advantageous effects provided by the corresponding preferred embodiment of the control apparatus.

Preferably, in the engine control unit described above, the response specifying control algorithm is a sliding mode control algorithm.

This preferred embodiment of the engine control unit provides the same advantageous effects provided by the corresponding preferred embodiment of the control apparatus.

BRIEF DESCRIPTION OF THE DRAWINGS

FIG. 7 is a block diagram illustrating the $\Delta\Sigma$ modulation controller, and an exemplary control system which applies the $\Delta\Sigma$ modulation controller;

FIG. 14 is a diagram showing an exemplary table for use in calculating a gain FDSM at step 39 in FIG. 13;

FIG. 18 shows a set of exemplary equations which express a prediction algorithm for a state predictor;

FIG. 19 shows a set of exemplary equations which express an identification algorithm for an on-board identifier;

FIG. 20 shows another set of exemplary equations which express an identification algorithm for the on-board identifier;

FIG. 23 shows equations which express a sliding mode control algorithm;

FIG. 24 shows equations which express a sliding mode control algorithm for the PRISM controller;

FIG. 52 is a block diagram generally illustrating the configuration of a control apparatus according to a fifth embodiment;

DETAILED DESCRIPTION OF THE EMBODIMENTS

Figure 1:
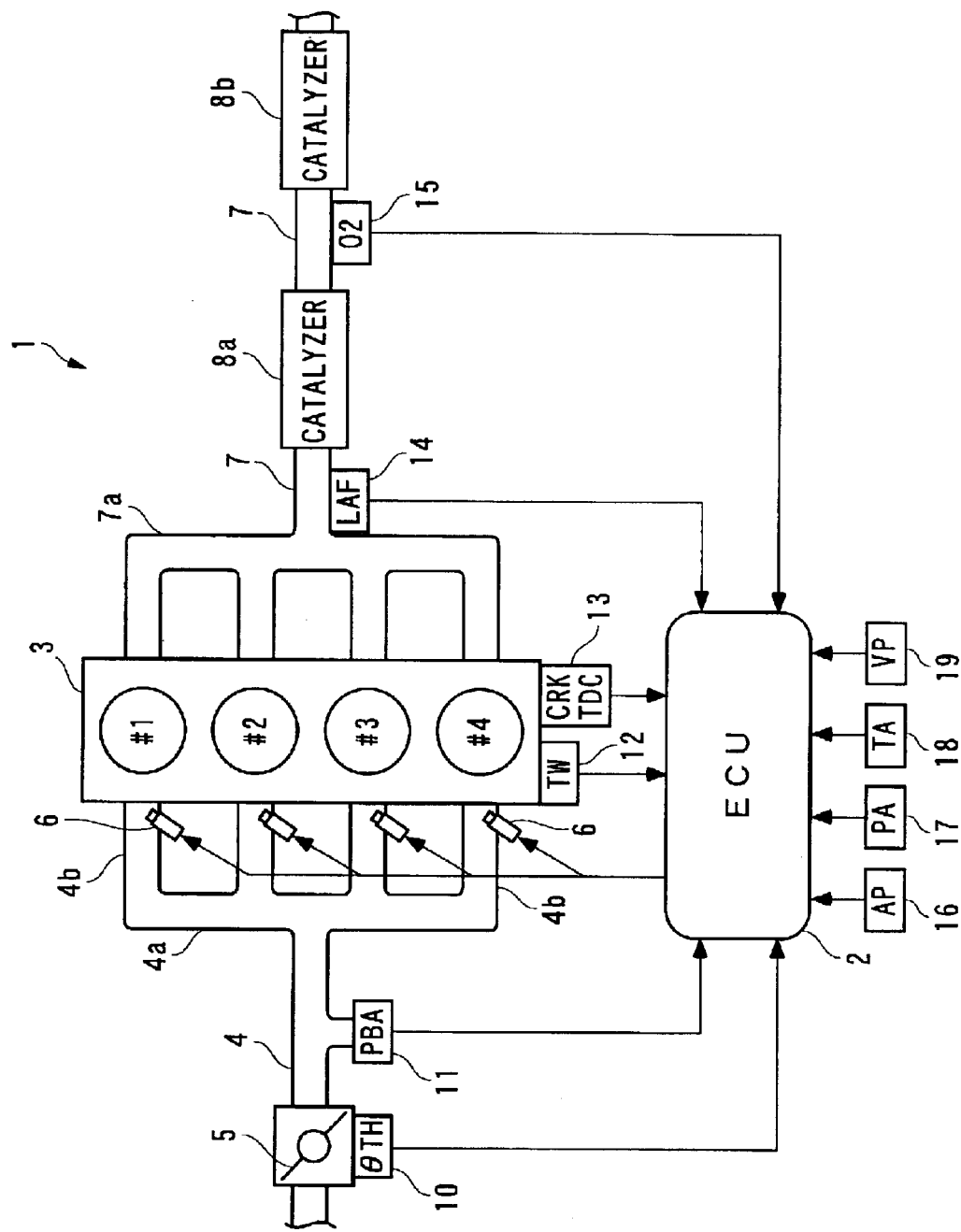
FIG. 1 is a block diagram generally illustrating a control apparatus according to a first embodiment of the present invention, and an internal combustion engine to which the control apparatus is applied.

In the following, a control apparatus according to a first embodiment of the present invention will be described with reference to the accompanying drawings. The control apparatus according to the first embodiment is configured to control, by way of example, an air/fuel ratio of an internal combustion engine. FIG. 1 generally illustrates the configuration of the control apparatus 1 and an internal combustion engine (hereinafter called the "engine") 3 which applies the control apparatus 1. As illustrated, the control apparatus 1 comprises an electronic control unit (ECU) 2 which controls the air/fuel ratio of an air/fuel mixture supplied to the engine 3 in accordance with an operating condition thereof, as will be later described.

The engine 3 is an in-line four-cylinder gasoline engine equipped in a vehicle, not shown, and has four, a first to a fourth cylinder #1–#4. A throttle valve opening sensor 10, for example, comprised of a potentiometer or the like, is provided near a throttle valve 5 in an intake pipe 4 of the engine 3. The throttle valve opening sensor 10 implements controlled object state detecting means, and operating condition parameter detecting means. The throttle valve opening sensor 10 detects an opening θTH of the throttle valve 5 (hereinafter called the "throttle valve opening"), and sends a detection signal indicative of the throttle valve opening θTH to the ECU 2. In this embodiment, the throttle opening θTH corresponds to an operating condition parameter and a parameter indicative of the state of an controlled object.

An absolute intake pipe inner pressure sensor 11 is further provided at a location of the intake pipe 4 downstream of the throttle valve 5. The absolute intake pipe inner pressure sensor 11, which implements gain parameter detecting means, dynamic characteristic parameter detecting means, controlled object state detecting means, and operating condition parameter detecting means, and, is comprised, for example, of a semiconductor pressure sensor or the like for detecting an absolute intake pipe inner pressure PBA within the intake pipe 4 to output a detection signal indicative of the absolute intake pipe inner pressure PBA to the ECU 2. In this embodiment, the absolute intake pipe inner pressure PBA corresponds to a gain parameter, a dynamic characteristic parameter, a parameter indicative of the state of a controlled object, and an operating condition parameter.

The intake pipe 4 is connected to the four cylinders #1–#4, respectively, through four branches 4b of an intake manifold 4a. An injector 6 is attached to each of the branches 4b at a location upstream of an intake port, not shown of each cylinder. Each injector 6 is controlled by a driving signal from the ECU 2 in terms of a final fuel injection amount TOUT, which indicates a valve opening time, and an injection timing when the engine 3 is in operation.

A water temperature sensor 12 comprised, for example, of a thermistor or the like is attached to the body of the engine 3. The water temperature sensor 12 detects an engine water temperature TW, which is the temperature of cooling water that circulates within a cylinder block of the engine 3, and outputs a detection signal indicative of the engine water temperature TW to the ECU 2.

A crank angle sensor 13 is mounted on a crank shaft (not shown) of the engine 3. The crank angle sensor 13, which implements gain parameter detecting means, dynamic characteristic parameter detecting means, controlled object state detecting means, and operating condition detecting means, outputs a CRK signal and a TDC signal, both of which are pulse signals, to the ECU 2 as the crank shaft is rotated.

The CRK signal generates one pulse every predetermined crank angle (for example, 30°). The ECU 2 calculates a rotational speed NE of the engine 3 (hereinafter called the "engine rotational speed") in response to the CRK signal. In this embodiment, the engine rotational speed NE corresponds to a gain parameter, a dynamic characteristic parameter, a parameter indicative of the state of a controlled object, and an operating condition parameter. The TDC signal in turn indicates that a piston (not shown) of each cylinder is present at a predetermined crank angle position which is slightly in front of a TDC (top dead center) position in an intake stroke, and generates one pulse every predetermined crank angle.

At locations downstream of an exhaust manifold 7a in an exhaust pipe 7 (exhaust passage), a first and a second catalyzer 8a, 8b (catalysts) are provided in this order from the upstream side, spaced apart from each other. Each catalyzer 8a, 8b is a combination of an NOx catalyst and a three-way catalyst. Though not shown, the NOx catalyst is made up of an iridium catalyst (a sintered product of iridium supported on silicon carbide whisker powder, and silica) coated on the surface of a base material in honeycomb structure, and a perovskite double oxide (a sintered product of LaCoO$_3$ powder and silica) further coated on the iridium catalyst. The catalyzers 8a, 8b purify NOx in exhaust gases during a lean burn operation through oxidation/reduction actions of the NOx catalyst, and purify CO, HC and NOx in exhaust gases during an operation other than the lean burn operation through oxidation/reduction actions of the three-way catalyst. It should be noted that both catalyzers 8a, 8b are not limited to a combination of NOx catalyst and three-way catalyst, but may be made of any material as long as it can purify CO, HC and NOx in exhaust gases. For example, the catalyzers 8a, 8b may be made of a non-metal catalyst such as a perovskite catalyst and the like, and/or a metal-based catalyst such as a three-way catalyst and the like.

For the reason set forth later, the total amount of the non-metal catalyst and metal catalyst loaded in the first catalyzer 8a is set to a predetermined load amount M1 (for example, 8 g), while the total amount of the non-metal catalyst and metal catalyst loaded in the second catalyzer 8b is set to a predetermined load amount M2 (for example, 0.75–1.5 g) smaller than the predetermined load amount M1.

Further, the first catalyzer 8a includes a carrier, the length (along the exhaust pipe 7) of which is set to a predetermined length L1 (for example, 115 mm for a catalyst having a capacity of one liter).

An oxygen concentration sensor (hereinafter called the "O2 sensor) 15 is mounted between the first and second catalyzers 8a, 8b. The O2 sensor 15 (which implements a downstream air/fuel ratio sensor) is made of zirconium, a platinum electrode, and the like, and sends an output Vout to the ECU 2 based on the oxygen concentration in exhaust gases downstream of the first catalyzer 8a. The output Vout of the O2 sensor 15 (output of a controlled object) goes to a voltage value at high level (for example, 0.8 V) when an air/fuel mixture richer than the stoichiometric air/fuel ratio is burnt, and goes to a voltage value at low level (for example, 0.2 V) when the air/fuel mixture is lean. Also, the output Vout goes to a predetermined target value Vop (for example, 0.6 V) between the high level and low level when the air/fuel mixture is near the stoichiometric air/fuel ratio (see FIG. 2).

An LAF sensor 14 (which implements an upstream air/fuel ratio sensor) is mounted near a junction of the exhaust manifold 7a upstream of the first catalyzer 8a. The LAF sensor 14 is comprised of a sensor similar to the O2 sensor 15, and a detecting circuit such as a linearizer in combination for linearly detecting an oxygen concentration in exhaust gases over a wide range of the air/fuel ratio extending from a rich region to a lean region to send an output KACT proportional to the detected oxygen concentration to the ECU 2. The output KACT is represented as an equivalent ratio proportional to an inverse of the air/fuel ratio.

Figure 2:
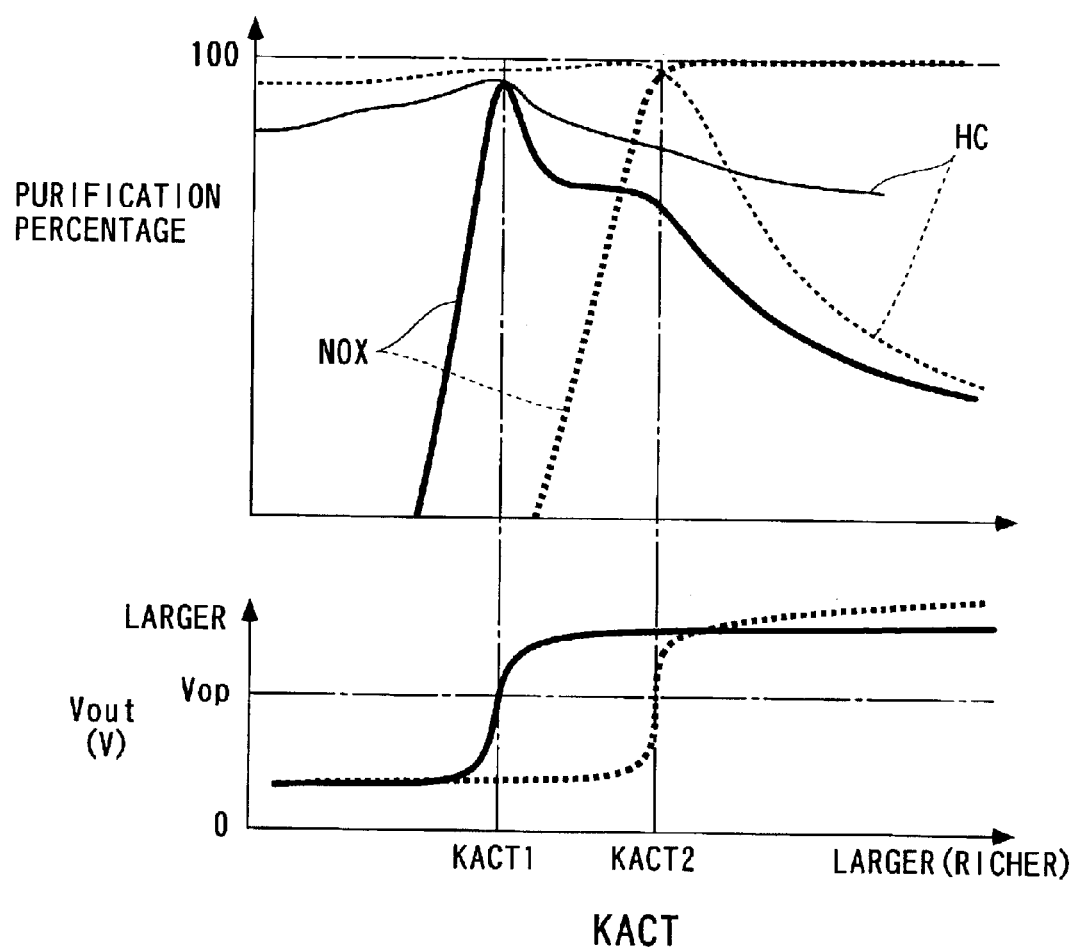
FIG. 2 is a graph showing an exemplary result of measurements made with a deteriorated and a normal first catalyzer for HC and NOx purification percentages of both first catalyzers and an output Vout of an O2 sensor 15, with respect to an output KACT of an LAF sensor, respectively.

Next, referring to FIG. 2, description will be made on the relationship between an exhaust gas purifying percentage provided by the first catalyzer 8a and the output Vout (voltage value) of the O2 sensor 15. FIG. 2 shows exemplary results of measuring the HC and NOx purifying percentage provided by the first catalyzer 8a and the output Vout of the O2 sensor 15 when the output KACT of the LAF sensor 14, i.e., the air/fuel ratio of an air/fuel mixture supplied to the engine 3 varies near the stoichiometric air/fuel ratio, for two cases where the first catalyzer 8a is deteriorated due to a long-term use and therefore has degraded capabilities of purifying, and where the first catalyzer 8a is not deteriorated and therefore has high capabilities of purifying. In FIG. 2, data indicated by broken lines show the results of measurements when the first catalyzer 8a is not deteriorated, and data indicated by solid lines show the results of measurements when the first catalyzer 8a is deteriorated. FIG. 2 also shows that the air/fuel ratio of the air/fuel mixture is richer as the output KACT of the LAF sensor 14 is larger.

As shown in FIG. 2, when the first catalyzer 8a is deteriorated, its capabilities of purifying exhaust gases are degraded, as compared with the one not deteriorated, so that the output Vout of the O2 sensor 15 crosses the target value Vop when the output KACT of the LAF sensor 14 is at a value KACT1 deeper in a lean region. On the other hand, the first catalyzer 8a has the characteristic of most efficiently purifying HC and NOx when the output Vout of the O2 sensor 15 is at the target value Vop, irrespective of whether the first catalyzer 8a is deteriorated or not. It is therefore appreciated that exhaust gases can be most efficiently purified by the first catalyzer 8a by controlling the air/fuel ratio of the air/fuel mixture to bring the output Vout of the O2 sensor 15 to the target value Vop. For this reason, in the air/fuel ratio control later described, a target air/fuel ratio KCMD is controlled such that the output Vout of the O2 sensor 15 converges to the target value Vop.

Figure 3:
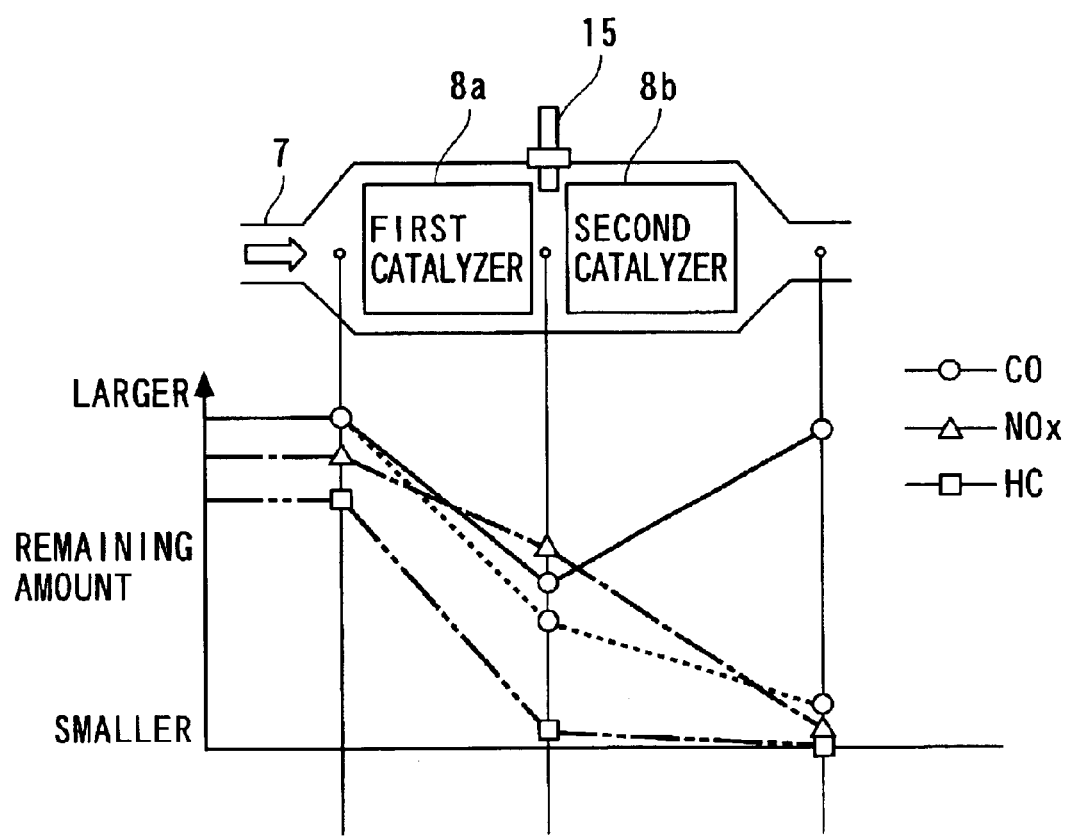
FIG. 3 is a graph showing the result of measuring the mounts of CO, HC, and O2 remaining in exhaust gases near a first and a second catalyzer during an air/fuel ratio control.

Referring next to FIG. 3, description will be made on the relationship between the state of exhaust gases purified by the first and second catalyzers 8a, 8b and the total amount of the non-metal catalyst and metal catalyst loaded in the first and second catalyzers 8a, 8b. FIG. 3 shows the result of measuring the amounts of CO, HC, and NOx remaining in exhaust gases in the exhaust pipe 7 at a location upstream of the first catalyzer 8a, at a location between the first catalyzer 8a and second catalyzer 8b, and at a location downstream of the second catalyzer 8b when the target air/fuel ratio KCMD is controlled such that the output Vout of the O2 sensor 15 converges to the target value Vop for the reason set forth above. Particularly, for the amount of remaining CO, the result of measurement indicated by a solid line is acquired when the first and second catalyzers 8a, 8b in this embodiment are used, while the result of measurement indicated by a broken line is acquired in a comparative example in which the total amount of the non-metal catalyst and metal catalyst loaded in the second catalyzer 8b is set identical to the total amount of the non-metal catalyst and metal catalyst loaded in the first catalyzer 8a for purposes of comparison.

Referring to FIG. 3, it can be seen that when the first and second catalyzers 8a, 8b in this embodiment are used, the amounts of remaining CO, HC, and NOx are smaller at the location downstream of the first catalyzer 8a than at the location upstream of the first catalyzer 8a, and smaller at the location downstream of the second catalyzer 8b than at the location downstream of the first catalyzer 8a, so that the two catalyzers 8a, 8b fully demonstrate their purification performance. However, it can be seen in the result of measurement in the comparative example indicated by the broken line that the amount of remaining CO is smaller at the location downstream of the first catalyzer 8a than at the location upstream of the first catalyzer 8a, whereas the amount of remaining CO is larger at the location downstream of the second catalyzer 8b than at the location downstream of the first catalyzer 8a. Thus, when the second catalyzer 8b comprises the total amount of non-metal catalyst and metal catalyst loaded therein larger than the total amount of non-metal catalyst and metal catalyst loaded in the first catalyzer 8a, CO is regenerated in the second catalyzer 8b. This fact has been recognized by an experiment. The same is true when the second catalyzer 8b has only the non-metal catalyst or metal catalyst carried by the carrier. For the foregoing reason, in this embodiment, the total amount of non-metal catalyst and metal catalyst loaded in the second catalyzer 8b is set to the predetermined load amount M2 smaller than the total amount M1 of non-metal catalyst and metal catalyst loaded in the first catalyzer 8a.

The ECU 2 is further connected to an accelerator opening sensor 16, an atmospheric pressure sensor 17, an intake air temperature sensor 18, a vehicle speed sensor 19, and the like. The vehicle speed sensor 19 implements controlled object state detecting means and operating condition parameter detecting means. The accelerator opening sensor 16 detects an amount AP by which the driver treads on an accelerating pedal, not shown, of the vehicle (hereinafter called the "accelerator opening"), and outputs a detection signal indicative of the accelerator opening AP to the ECU 2. Likewise, the atmospheric pressure sensor 17, intake air temperature sensor 18 and vehicle speed sensor 19 detect the atmospheric pressure PA, an intake air temperature TA, and a vehicle speed VP, respectively, and output detection signals indicative of the respective detected values to the ECU 2.

The ECU 2 is based on a microcomputer which comprises an I/O interface, a CPU, a RAM, a ROM, and the like. The ECU 2 determines an operating condition of the engine 3 in accordance with the outputs of the variety of sensors 10–19 mentioned above, and calculates the target air/fuel ratio KCMD (control input) by executing $\Delta\Sigma$ modulation control processing, adaptive sliding mode control processing or map search processing, later described, in accordance with a control program previously stored in the ROM and data stored in the RAM. Further, as will be described later, the ECU 2 calculates the final fuel injection amount TOUT of the injector 6 for each cylinder based on the calculated target air/fuel ratio KCMD, and drives the injector 6 using a driving signal based on the calculated final fuel injection amount TOUT to control the air/fuel ratio of the air/fuel mixture. In this embodiment, the ECU 2 implements deviation calculating means, control input calculating means, gain parameter detecting means, gain setting means, first control input calculating means, second control input calculating means, controlled object state detecting means, control input selecting means, output deviation calculating means, air/fuel ratio calculating means, air/fuel ratio control means, operating condition parameter detecting means, first air/fuel ratio calculating means, second air/fuel ratio calculating means, target air/fuel ratio selecting means, and operation mode discriminating means.

Next, the $\Delta\Sigma$ modulation control executed by the ECU 2 will be described below. In the $\Delta\Sigma$ modulation control, a $\Delta\Sigma$ modulation controller 40, which applies the $\Delta\Sigma$ modulation algorithm, is used to calculate a control input $\phi op(k)$ (=target air/fuel ratio KCMD) based on a deviation of the output Vout of the O2 sensor from the target value Vop, and the control input $\phi op(k)$ is inputted to a controlled object, i.e., the O2 sensor to control the O2 sensor such that its output Vout converges the target value Vop. A specific program for executing the $\Delta\Sigma$ modulation control will be described later in detail.

Figure 4:
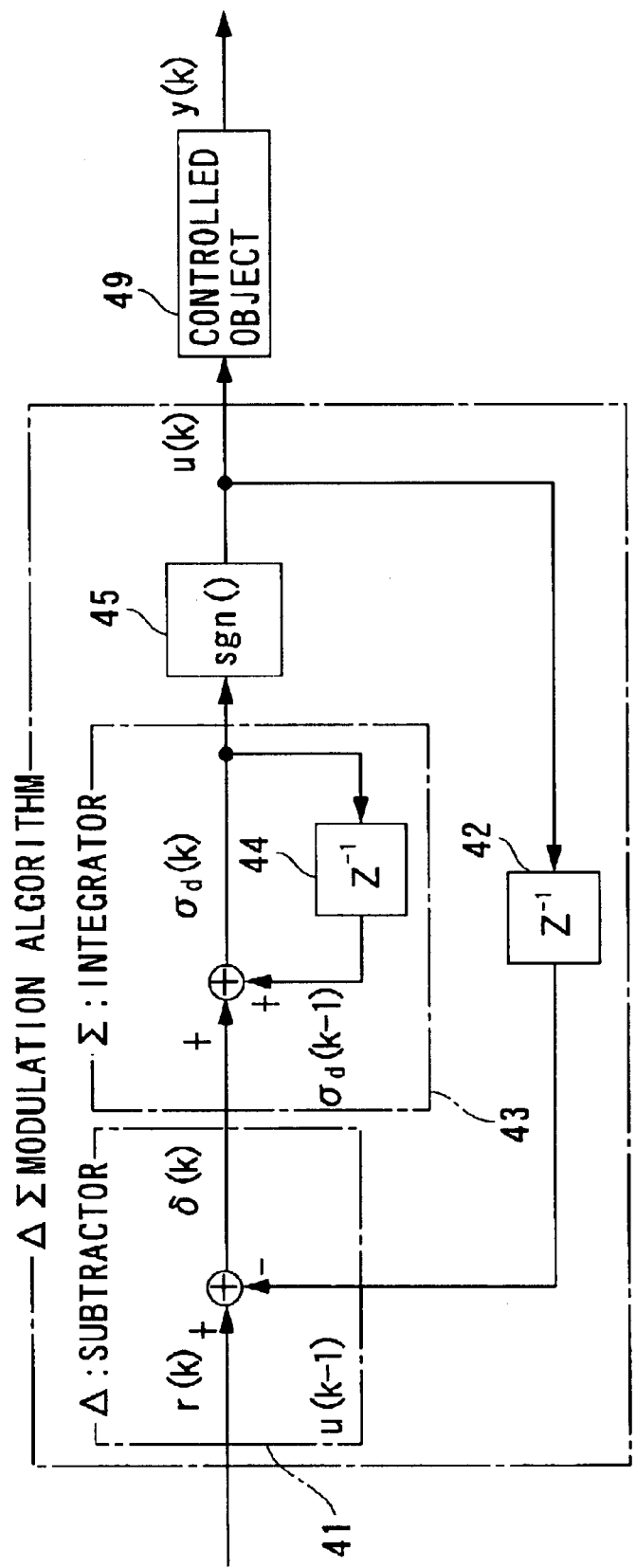
FIG. 4 is a block diagram illustrating the configuration of a $\Delta\Sigma$ modulation algorithm, and an exemplary control system which applies the $\Delta\Sigma$ modulation algorithm.

Referring first to a block diagram of FIG. 4, the characteristic of the $\Delta\Sigma$ modulation algorithm will be described. As illustrated in FIG. 4, in a control system which implements the $\Delta\Sigma$ modulation algorithm, a subtractor 41 generates a deviation $\delta(k)$ between a reference signal $r(k)$ and a DSM signal $u(k-1)$ delayed by a delay element 42. Next, an integrator 43 generates an integrated deviation value $\sigma_d(k)$ as a signal indicative of the sum of the deviation $\delta(k)$ and an integrated deviation value $\sigma_d(k-1)$ delayed by a delay element 44.

Next, a quantizer 45 (sign function) generates a DSM signal $u(k)$ as a sign of the integrated deviation value $\sigma_d(k)$. Consequently, the DSM signal $u(k)$ thus generated is inputted to a controlled object 49 which responsively delivers an output signal $y(k)$.

The foregoing $\Delta\Sigma$ modulation algorithm is expressed by the following equations (1)–(3):

$$\delta(k)=r(k)-u(k-1) \tag{1}$$

$$\sigma_d(k)=\sigma_d(k-1)+\delta(k) \tag{2}$$

$$u(k)=sgn(\sigma_d(k)) \tag{3}$$

where the value of the sign function $sgn(\sigma_d(k))$ takes 1 ($sgn(\sigma_d(k))=1$) when $\sigma_d(k)\geq 0$, and $-1$ ($sgn(\sigma_d(k))=-1$) when $\sigma_d(k)<0$ ($sgn(\sigma_d(k))$ may be set to zero ($sgn(\sigma_d(k))=0$) when $\sigma_d(k)=0$).

Figure 5:
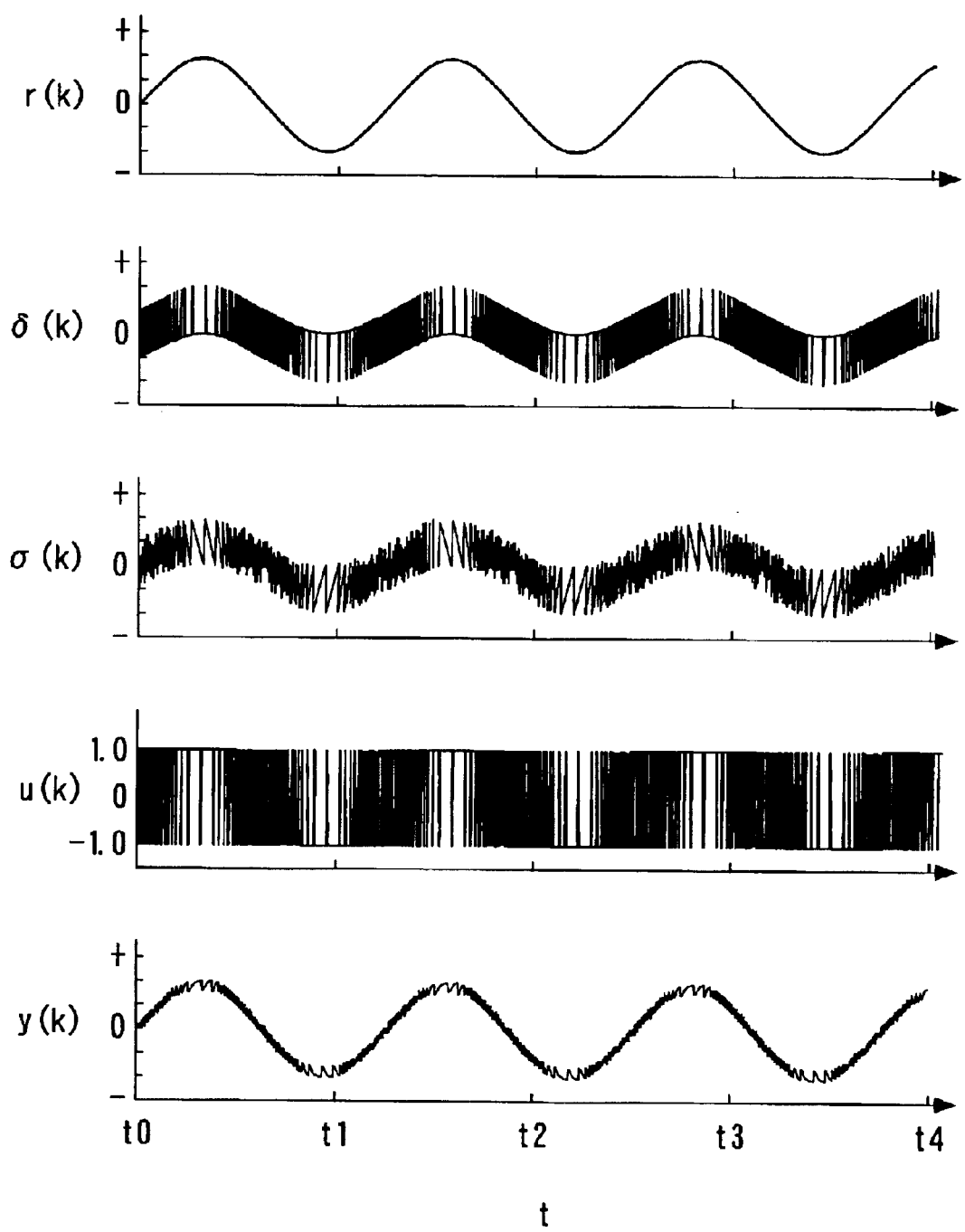
FIG. 5 shows the result of an exemplary control simulation for the control system of FIG. 4.

Referring next to FIG. 5, description will be made on the result of a control simulation for a control system which applies the foregoing $\Delta\Sigma$ modulation algorithm. As shown in FIG. 5, when the sinusoidal reference signal $r(k)$ is inputted to the control system, the DSM signal $u(k)$ is generated as a square-wave signal and is fed to the controlled object 49 which responsively outputs the output signal y(k) which has a different amplitude from and the same frequency as the reference signal r(k), and is generally in a similar waveform though noise is included. As described, the ΔΣ modulation algorithm is characterized in that the DSM signal u(k) can be generated when the controlled object 49 is fed with the DSM signal u(k) generated from the reference signal r(k) such that the controlled object 49 generates the output signal y(k) which has a different amplitude from and the same frequency as the reference signal r(k) and is generally similar in waveform to the reference signal r(k). In other words, the ΔΣ modulation algorithm is characterized in that the DSM signal u(k) can be generated (calculated) such that the reference signal r(k) is reproduced in the actual output y(k) of the controlled object 49.

Figure 6:
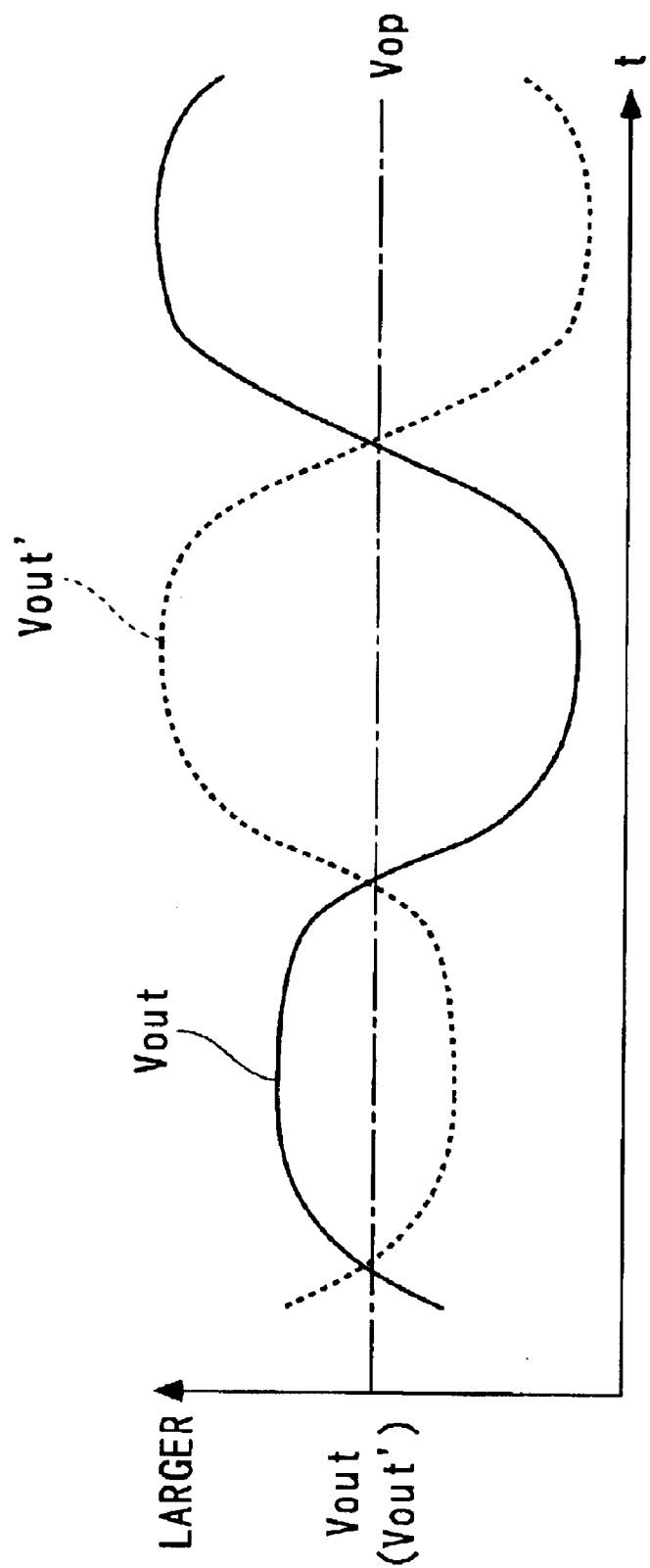
FIG. 6 is an explanatory diagram for explaining the control characteristic of a $\Delta\Sigma$ modulation controller.

Referring next to FIG. 6, description will be made on the characteristic of the DSM controller 40 in this embodiment. The DSM controller 40 takes advantage of the characteristic of the ΔΣ modulation algorithm described above to generate the control input $\phi op(k)$ for converging the output Vout of the O2 sensor to the target value Vop. Describing the principles of the calculation, when the output Vout of the O2 sensor fluctuates with respect to the target value Vop, for example, as indicated by a solid line in FIG. 6, the control input $\phi op(k)$ may be generated to produce an output Vout' having an opposite phase waveform, as indicated by a broken line in FIG. 6, from the controlled object 49 in order to converge the output Vout of the O2 sensor to the target value Vop. Assuming herein that a deviation of sample data Vout(k) of the output from the O2 sensor from the target value Vop is an output deviation VO2(k) (=Vout(k)−Vop), an output deviation VO2'(k) having an opposite phase waveform to cancel the deviation presents a value which satisfies a relationship VO2'(k)=−VO2(k). Therefore, the control input $\phi op(k)$ may be generated to derive the output deviation VO2'(k). The DSM controller 40 generates the control input $\phi op(k)$ to derive the output Vout for generating the output deviation VO2'(k) having the opposite phase waveform to the output deviation VO2 (k) so as to cancel the same. With this control input $\phi op(k)$, the output Vout can be converged to the target value Vop.

Referring next to a block diagram of FIG. 7, the DSM controller 40 will be described. In this embodiment, the DSM controller 40 implements control input calculating means, first control input calculating means, air/fuel ratio calculating means, and first air/fuel ratio calculating means. In FIG. 7, components identical to those in FIG. 4 are designated the same reference numerals, and description thereon is omitted. In the DSM controller 40, a subtractor 48 generates a reference signal r(k) as a deviation (output deviation VO2'(k) of an output y(k) (=Vout(k)) of the controlled object 49 from the target value Vop.

An amplifier 46 generates an amplified DSM signal u'(k) as the product of a DSM signal u"(k) generated by a quantizer 45 and a gain F. Next, an adder 47 generates the control input $\phi op(k)$ as the sum of the amplified DSM signal u'(k) and one. Then, as the control input $\phi op(k)$ (target air/fuel ratio KCMD) thus generated is inputted to the controlled object 49, the controlled object 49 outputs the output Vout(k) which converges to the target value Vop. As described later, in this embodiment, the target air/fuel ratio KCMD, which is the control input $\phi op$ (k), is inputted to the controlled object 49 as a driving signal based on the final fuel injection amount TOUT which has been corrected in accordance with the operating condition of the engine 3. The control object 49 corresponds to a system from an intake system of the engine 3 including the injectors 6 to the downstream of the first catalyzer 8a in the exhaust system including the first catalyzer 8a.

The algorithm of the foregoing DSM controller 40 is expressed by the following equations (4)–(9):

$$r(k)=VO2'(k)=Vop-Vout(k) \tag{4}$$

$$\delta(k)=r(k)-u''(k-1) \tag{5}$$

$$\sigma_d(k)=\sigma_d(k-1)+\delta(k) \tag{6}$$

$$u''(k)=sgn(\sigma_d(k)) \tag{7}$$

$$u'(k)=F_d \cdot u''(k) \tag{8}$$

$$\phi op(k)=1+u'(k) \tag{9}$$

The value of the sign function $sgn(\sigma_d(k))$ takes 1 ($sgn(\sigma_d(k))=1$) when $\sigma_d(k) \geq 0$, and −1 ($sgn(\sigma_d(k))=-1$) when $\sigma_d(k)<0$ ($sgn(\sigma_d(k))$) may be set to zero ($sgn(\sigma_d(k))=0$) when $\sigma_d(k)=0$).

Figure 8:
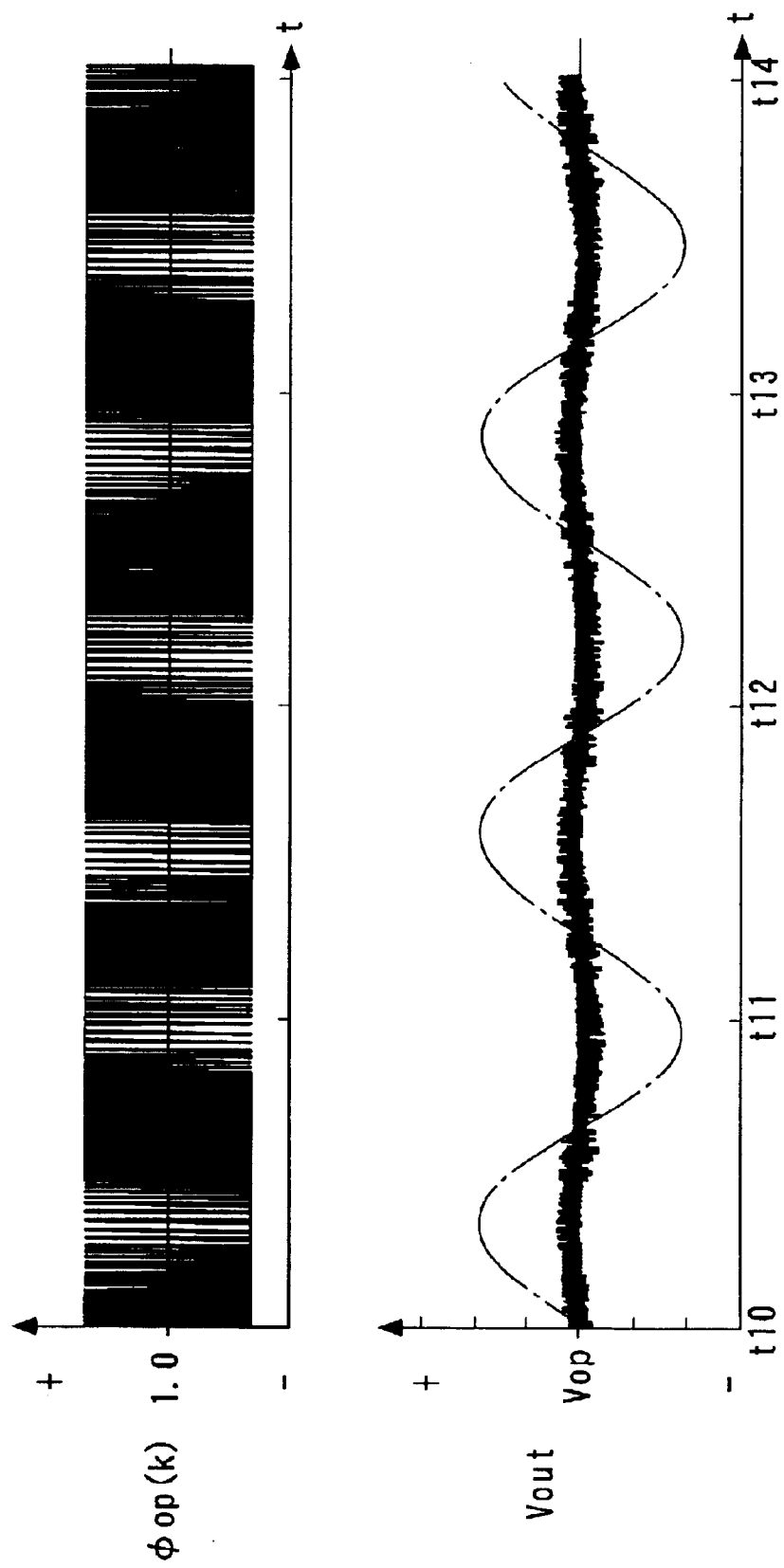
FIG. 8 shows the result of an exemplary control simulation for the control system of FIG. 7.

Referring next to FIG. 8, description will be made on the result of control simulation for the DSM controller 40 described above. FIG. 8 shows the result of an exemplary simulation in which a sinusoidal disturbance is inputted to the controlled object 49, wherein a solid-line curve indicates the waveform of the output Vout when the DSM controller 40 conducts the ΔΣ modulation control, and a one-dot-chain-line curve indicates the waveform of the output Vout when the ΔΣ modulation control is not conducted. Referring to both waveforms, it can be seen that the output Vout without the ΔΣ modulation control does not converge to the target value Vop but fluctuates as reflecting the disturbance, whereas the output Vout with the ΔΣ modulation control converges to the target value Vop. In this manner, it can be confirmed that the output Vout can be converged to the target value Vop in accordance with the ΔΣ modulation control conducted by the DSM controller 40.

Next, description will be made on the adaptive sliding mode control (on-board identification sliding mode control) executed by the ECU 2. The adaptive sliding mode control employs a sliding mode controller 52, later described, to calculate the target air/fuel ratio KCMD as a control input in accordance with an output KACT of the LAF sensor 14, the output Vout of the O2 sensor, and the target value Vop. A program for executing the adaptive sliding mode control will be described later.

Figure 9:
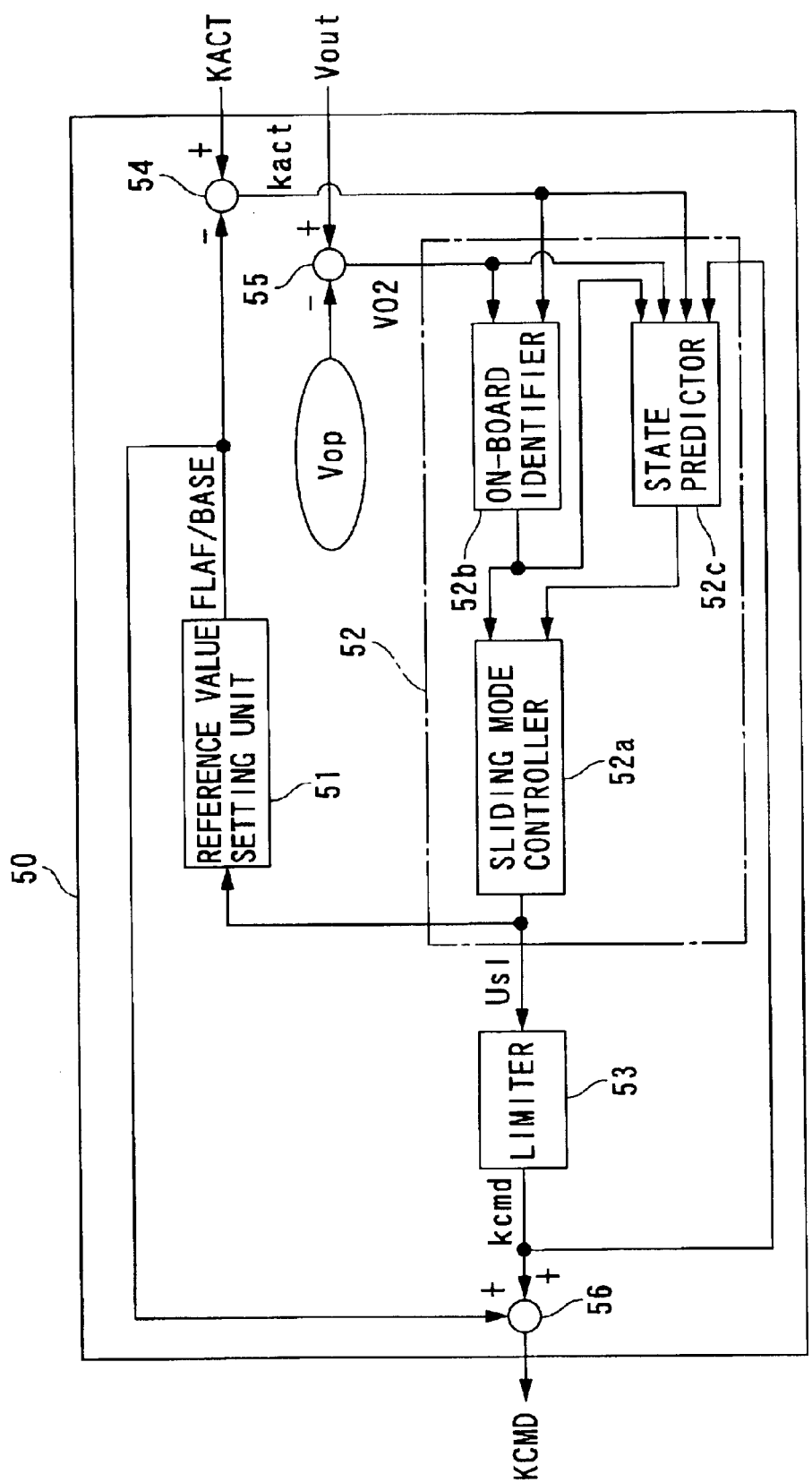
FIG. 9 is a block diagram of an adaptive sliding mode controller.

In the following, the PRISM controller 50 for executing the adaptive sliding mode control will be described with reference to a block diagram of FIG. 9. Though not described herein, the algorithm of the PRISM controller 50 is configured similar to the algorithm of a PRISM controller 21 in FIG. 17, later described. The PRISM controller 50 comprises a reference value setting unit 51, a control amount generator 52, a limiter 53, subtractors 54, 55, an adder 56, and the like.

In the PRISM controller 50, the reference value setting unit 51 generates a reference value FLAFBASE for an air/fuel ratio for the engine 3. The subtractor 54 calculates a deviation kact of the output KACT of the LAF sensor 14 from the reference value FLAFBASE. The subtractor 55 in turn calculates an output deviation VO2 of the output Vout of the O2 sensor from the target value Vop.

The control amount generator 52 generates a control amount Us1 for converging the output Vout to the target value Vop in accordance with the output deviation VO2 and deviation kact. The control amount generator 52 comprises a sliding mode controller 52a, an on-board identifier 52b, and a state predictor 52c. Though not described herein, the algorithms of the sliding mode controller 52a, on-board identifier 52b, and state predictor 52c are configured in a manner similar to the algorithms of a sliding mode controller 25, an on-board identifier 23, and a state predictor 22 in FIG. 17, later described.

Further, the limiter 55 limits the control amount Us1 to generate a control amount kcmd. Then, the adder 56 adds the reference value FLAFBASE to the control amount kcmd to generate the target air/fuel ratio KCMD.

Figure 10:
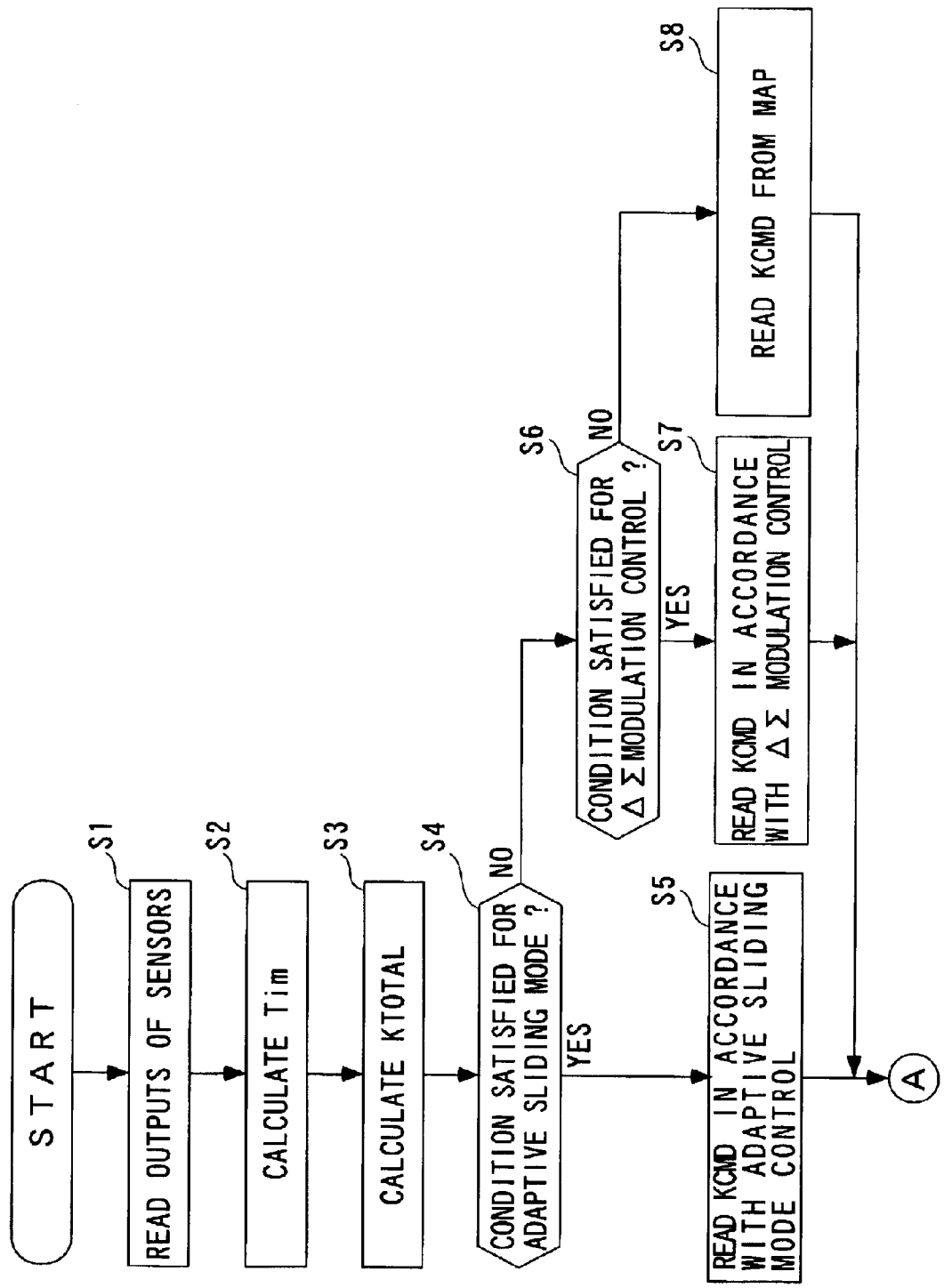
FIGS. 10 and 11 are flow charts illustrating in combination a routine for executing the processing for calculating a fuel injection amount.
Figure 11:
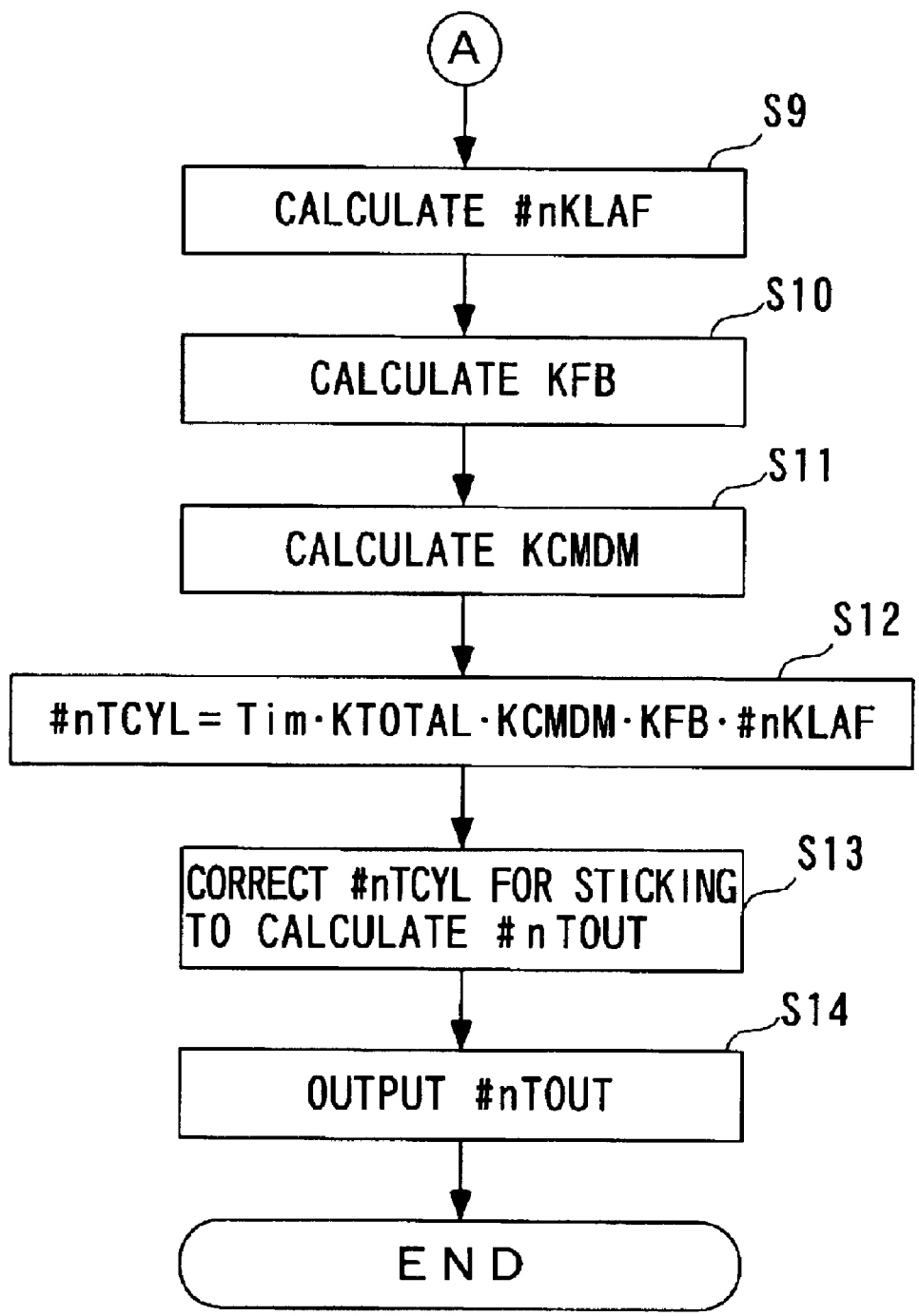

In the following, the processing for calculating a fuel injection amount executed by the ECU 2 will be described with reference to FIGS. 10 and 11. FIGS. 10 and 11 illustrate a main routine of this control processing which is executed in synchronism with an inputted TDC signal as an interrupt. In this processing, the ECU 2 uses the target air/fuel ratio KCMD calculated in accordance with ΔΣ modulation control processing, adaptive sliding mode control processing, or map search processing to calculate the fuel injection amount TOUT for each cylinder, as will be later described.

First at step 1 (abbreviated as "S1" in the figure. The same applies to subsequent figures), the ECU 2 reads outputs of the variety of aforementioned sensors 10–19.

Next, the routine proceeds to step 2, where the ECU 2 calculates a basic fuel injection amount Tim. In this processing, the ECU 2 calculates the basic fuel injection amount Tim by searching a map, not shown, in accordance with the engine rotational speed NE and absolute intake pipe inner pressure PBA.

Next, the routine proceeds to step 3, where the ECU 2 calculates a total correction coefficient KTOTAL. For calculating the total correction coefficient KTOTAL, the ECU 2 calculates a variety of correction coefficients by searching a variety of tables and maps in accordance with a variety of operating condition parameters (for example, the intake air temperature TA, atmospheric pressure PA, engine water temperature TW, accelerator opening AP, and the like), and multiplies these correction coefficients by one another.

Next, the routine proceeds to step 4, where it is determined whether or not a condition has been satisfied for using the target air/fuel ratio KCMD calculated in KCMD calculation processing in accordance with the adaptive sliding mode control, later described. In other words, it is determined whether or not the engine 3 is in an operation mode in which the air/fuel ratio should be controlled in an adaptive sliding mode. It is determined herein that the condition (selecting condition) is met for using the target air/fuel ratio KCMD in accordance with the adaptive sliding mode control when the following conditions (f1)–(f6) are fully satisfied.

(f1) The LAF sensor 14 and O2 sensor 15 are both activated;
(f2) the engine 3 is not in a lean burn operation;
(f3) the throttle valve 5 is not fully opened;
(f4) the ignition timing is not controlled to be retarded;
(f5) the engine 3 is not in a fuel cut operation; and
(f6) the engine rotational speed NE and absolute intake pipe inner pressure PBA are both within their respective predetermined adaptive sliding mode control ranges.

If the result of determination at step 4 is YES, i.e., when the condition is satisfied for using the target air/fuel ratio KCMD in accordance with the adaptive sliding mode control, the routine proceeds to step 5 on the assumption that the engine 3 is in an operation mode in which the air/fuel ratio should be controlled in accordance with the adaptive sliding mode control, where the ECU 2 reads the target air/fuel ratio KCMD calculated in KCMD calculation processing in accordance with the adaptive sliding mode control.

Figure 12:
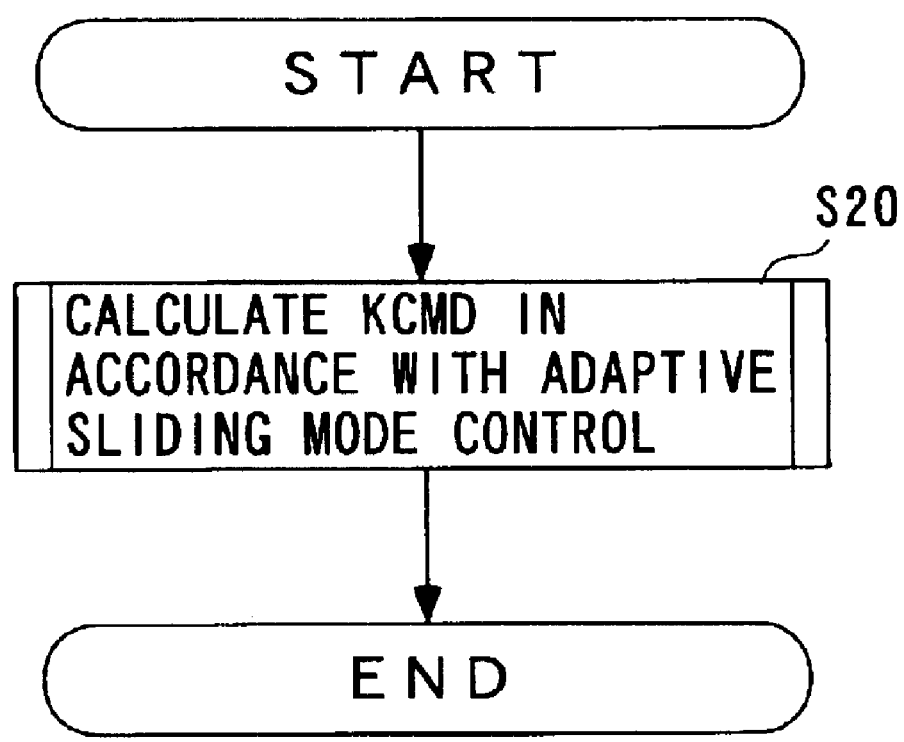
FIG. 12 is a flow chart illustrating a routine for executing the processing for calculating a target air/fuel ratio KCMD in accordance with an adaptive sliding mode control.

FIG. 12 illustrates KCMD calculation processing in accordance with the adaptive sliding mode control. At step 20, the ECU 2 calculates the target air/fuel ratio KCMD. Thout omitting specific details on step 20, the ECU 2 executes similar processing to steps 120–139 (except for step 137) in FIGS. 26, 27, later described.

Turning back to FIG. 10, if the result of determination at step 4 is NO, i.e., when the condition is not satisfied for using the target air/fuel ratio KCMD in accordance with the adaptive sliding mode control, the routine proceeds to step 6, where it is determined whether or not a condition is satisfied for using the target air/fuel ratio KCMD calculated in CKMD calculation processing in accordance with a ΔΣ modulation control, later described. Stated another way, it is determined whether or not the engine 3 is in an operation mode in which the air/fuel ratio should be controlled in accordance with the ΔΣ modulation control. It is determined herein that the condition (selecting condition) is satisfied for using the target air/fuel ratio KCMD in accordance with the ΔΣ modulation control when the following conditions (f7)–(f12) are fully satisfied:

(f7) the engine 3 is not in a lean burn operation;
(f8) The LAF sensor 14 and O2 sensor 15 are both activated;
(f9) the throttle valve 5 is not fully opened;
(f10) the engine 3 is not in a fuel cut operation;
(f11) the ignition timing is not controlled to be retarded; and
(f12) the engine rotational speed NE and absolute intake pipe inner pressure PBA are both within their respective predetermined ΔΣ modulation control ranges (for example, within an extremely low load operation mode).

Figure 13:
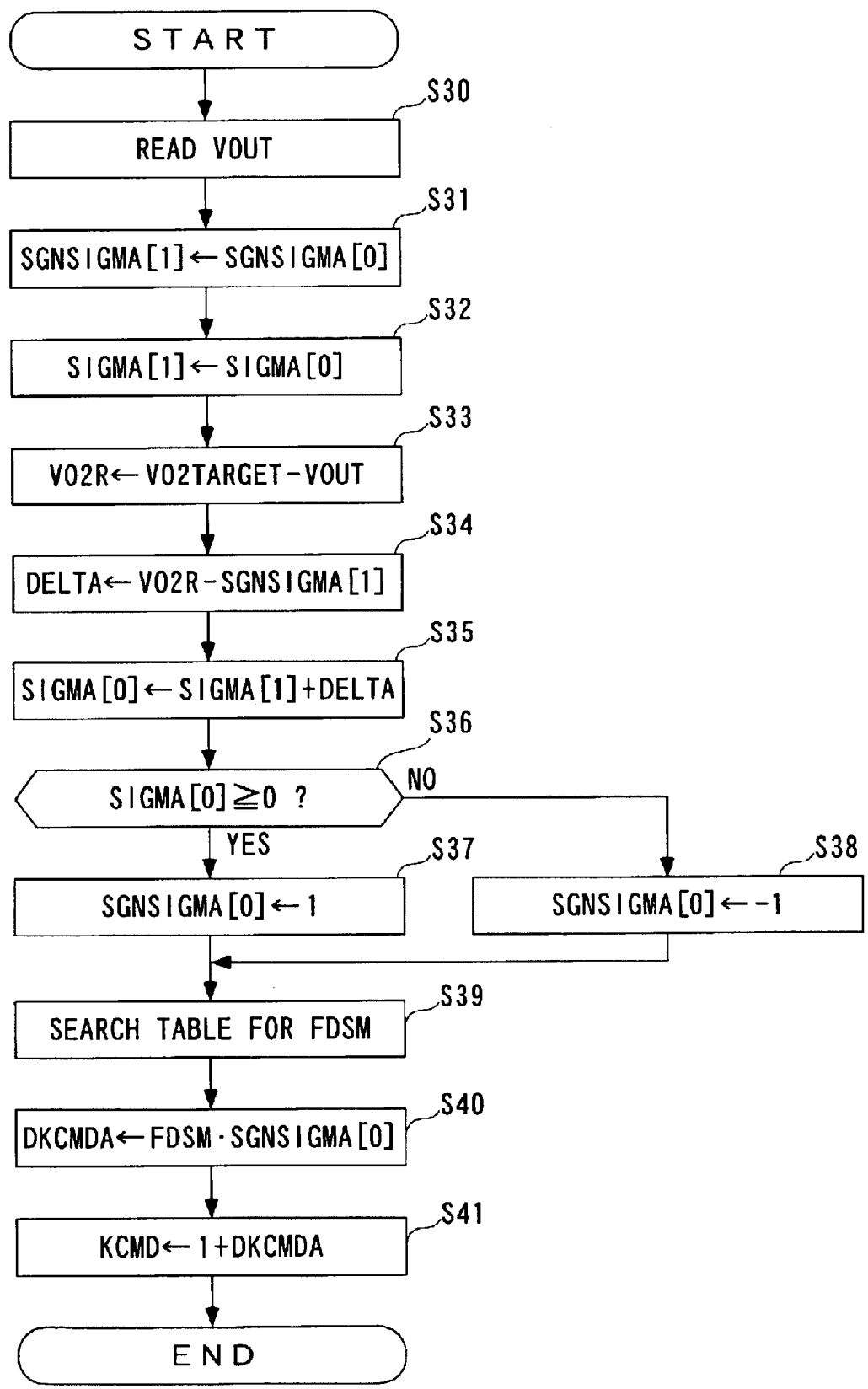
FIG. 13 is a flow chart illustrating a routine for executing the processing for calculating the target air/fuel ratio KCMD in accordance with the $\Delta\Sigma$ modulation control.

If the result of determination at step 6 is YES, i.e., the condition is satisfied for using the target air/fuel ratio KCMD in accordance with the ΔΣ modulation control, the routine proceeds to step 7 on the assumption that the engine is in an operation mode in which the air/fuel ratio should be controlled in accordance with the ΔΣ modulation control, where the ECU 2 reads the target air/fuel ratio KCMD calculated in the KCMD calculation processing in accordance with the ΔΣ modulation control illustrated in FIG. 13. Specific details on the KCMD calculation processing in accordance with the ΔΣ modulation control will be described later.

On the other hand, if the result of determination at step 6 is NO, i.e., when the condition is not satisfied for using the target air/fuel ratio KCMD in accordance with the ΔΣ modulation control, the flow proceeds to step 8, where the ECU 2 calculates the target air/fuel ratio KCMD by searching a map, not shown, in accordance with the engine rotational speed NE and absolute intake pipe inner pressure PBA.

At step 9 subsequent to the foregoing step 5, 7 or 8, the ECU 2 calculates an observer feedback correction coefficient #nKLAF for each cylinder. The observer feedback correction coefficient #nKLAF is provided for correcting variations in the actual air/fuel ratio for each cylinder. Specifically, the ECU 2 calculates the observer feedback correction coefficient #nKLAF based on a PID control in accordance with an actual air/fuel ratio estimated by an observer for each cylinder from the output KACT of the LAF sensor 14. The symbol #n in the observer feedback correction coefficient #nKLAF represents the cylinder number #1–#4. The same applies as well to a required fuel injection amount #nTCYL and a final fuel injection amount #nTOUT, later described.

Next, the routine proceeds to step 10, where the ECU 2 calculates a feedback correction coefficient KFB.

Specifically, the ECU 2 calculates the feedback coefficient KFB in the following manner. The ECU 2 calculates a feedback coefficient KLAF based on a PID control in accordance with a deviation of the output KACT of the LAF sensor 14 from the target air/fuel ratio KCMD. Also, the ECU 2 calculates a feedback correction coefficient KSTR by calculating the feedback correction coefficient KSTR by a self tuning regulator type adaptive controller, not shown, and dividing the feedback correction coefficient KSTR by the target air/fuel ratio KCMD. Then, the ECU 2 sets one of these two feedback coefficient KLAF and feedback correction coefficient KSTR as the feedback correction coefficient KFB in accordance with an operating condition of the engine 3.

Next, the routine proceeds to step 11, where the ECU 2 calculates a corrected target air/fuel ratio KCMDM. This corrected target air/fuel ratio KCMDM is provided for compensating a change in filling efficiency due to a change in the air/fuel ratio A/F. The ECU 2 calculates the corrected target air/fuel ratio KCMDM by searching a table, not shown, in accordance with the target air/fuel ratio KCMD calculated at step 5, 7 or 8.

Next, the routine proceeds to step 12, where the ECU 2 calculates the required fuel injection amount #nTCYL for each cylinder in accordance with the following equation (10) using the basic fuel injection amount Tim, total correction coefficient KTOTAL, observer feedback correction coefficient #nKLAF, feedback correction coefficient KFB, and corrected target air/fuel ratio KCMDM, which have been calculated as described above.

$$\#nTCYL = Tim \cdot KTOTAL \cdot KCMDM \cdot KFB \cdot \#nKLAF \quad (10)$$

Next, the routine proceeds to step 13, where the ECU 2 corrects the required fuel injection amount #nTCYL for sticking to calculate the final fuel injection amount #nTOUT. Specifically, the ECU 2 calculates this final fuel injection amount #nTOUT by calculating the proportion of fuel injected from the injector 6 which is stuck to the inner wall of the combustion chamber in the current combustion cycle in accordance with an operating condition of the engine 3, and correcting the required fuel injection amount #nTCYL based on the proportion thus calculated.

Next, the routine proceeds to step 14, where the ECU 2 outputs a driving signal based on the final fuel injection amount #nTOUT calculated in the foregoing manner to the injector 6 of a corresponding cylinder, followed by termination of this processing.

Next, the KCMD calculation processing in accordance with the ΔΣ modulation control, discussed above, will be described with reference to FIGS. 13 and 14. This processing is executed at a predetermined period (for example, every 30–60 msec) using a program timer, not shown.

First, at step 30, the ECU 2 reads sample data VOUT (=Vout(k), i.e., the output of the controlled object) of the output Vout o of the O2 sensor. Next, the routine proceeds to step 31, where the ECU 2 reads a current value SGNSIGMA[0] (=u"(k)) of a DSM signal stored in the RAM to a previous value SGNSIGMA[1] (=u"(k−1)).

The flow next proceeds to step 32, where the ECU 2 sets a current value SIGMA[0] (=$\sigma_d$(k)) of an integrated deviation stored in the RAM to a previous value SIGMA[1](= ($\sigma_d$(k−1)).

Next, the flow proceeds to step 33, where the ECU 2 subtracts the sample data VOUT read at step 30 from a target value VO2TARGET (=Vop), and sets the resulting value as an output deviation VO2R (=VO2'(k)=r(k)). This processing corresponds to the foregoing equation (4).

Next, the flow proceeds to step 34, where the ECU 2 subtracts the previous value SGNSIGMA[1] of the DSM signal from the output deviation VO2R, and sets the resulting value as a deviation DELTA (=$\sigma$(k)). This processing corresponds to the aforementioned equation (5).

Next, the flow proceeds to step 35, where the ECU 2 adds the deviation DELTA to the previous value SIGMA[1] of the integrated deviation, and sets the resulting sum to the current value SIGMA[0] of the integrated deviation. This processing corresponds to the aforementioned equation (6).

Next, the flow proceeds to step 36, where it is determined whether or not the current value SIGMA[0] of the integrated deviation calculated at step 35 is equal to or larger than "0." If the result of determination at step 36 is YES, the ECU 2 sets the current value SGNSIGMA[0] of the DSM signal to "1" (step 37). On the other hand, if the result of determination at step 36 is NO, the ECU 2 sets the current value SGNSIGMA[0] of the DSM signal to "−1" (step 38). The foregoing processing at steps 36–38 corresponds to the aforementioned equation (7).

At step 39 subsequent to step 37 or 38, the ECU 2 calculates a gain FDSM (=$F_d$) by searching a table shown in FIG. 14 in accordance with the basic fuel injection amount Tim calculated at step 2. In the table shown in FIG. 14, the gain FDSM is set to a larger value as the basic fuel injection amount Tim is smaller, i.e., as the engine 3 is more lightly loaded in operation. This setting is made in order to compensate the output Vout of the O2 sensor for the responsibility which is lower as the engine 3 is more lightly loaded in operation to reduce the exhaust gas volume. The table for use in the calculation of the gain FDSM is not limited to the foregoing table in which the gain FDSM is set in accordance with the basic fuel injection amount Tim, but any table may be employed instead as long as the gain FDSM has been previously set in accordance with a parameter indicative of the operating load on the engine 3 (for example, the exhaust gas volume AB_SV). When a deterioration checker is provided for the catalyzers 8a, 8b, the gain FDSM may be corrected to a smaller value as the catalyzers 8a, 8b are deteriorated to a higher degree, as determined by the deterioration checker.

Next, the flow proceeds to step 40, where the ECU 2 multiplies the current value SGNSIGMA[0] of the DSM signal by the gain FDSM, and sets the resulting product as an amplified intermediate value DKCMDA (=u'(k)) of the target air/fuel ratio KCMD. The processing at steps 39, 40 corresponds to the aforementioned equation (8).

Next, the flow proceeds to step 41, where the ECU 2 adds one to the amplified intermediate value DKCMDA, and sets the resulting sum to the target air/fuel ratio KCMD (=$\phi$op (k)), followed by termination of the processing for calculating the fuel injection amount. The processing at step 41 corresponds to the aforementioned equation (9).

As described above, according to the control apparatus 1 of this embodiment, the processing for calculating the target air/fuel ratio KCMD is switched to either the adaptive sliding mode control, ΔΣ modulation control, or map search in accordance with the operating condition of the engine 3. Therefore, with the target air/fuel ratio KCMD calculated in accordance with either of the foregoing strategies, it is possible to ensure a more satisfactory post-catalyst exhaust gas characteristic for a variety of operation modes of the engine 3 by previously determining, through experiments or the like, the target air/fuel ratio KCMD which permits the output Vout that most satisfactorily converges to the target value Vop.

When the condition is satisfied for using the target air/fuel ratio KCMD in accordance with the ΔΣ modulation control, for example, in an extremely low load operation mode such as an idle operation mode, the ECU 2 calculates the target air-fuel ratio KCMD in accordance with the ΔΣ modulation control to conform to the output deviation VO2'(k) of the output Vout of the O2 sensor from the target value Vop. It is therefore possible to calculate the target air/fuel ratio KCMD for an air/fuel mixture to generate the output Vout from which a deviation having the opposite phase waveform to the output deviation VO2(k) is derived to cancel the output deviation VO2(k). Then, by calculating the final fuel injection amount TOUT based on the target air/fuel ratio KCMD thus calculated, the final fuel injection amount TOUT can be calculated such that the resulting output Vout converges to the target value Vop. Consequently, when the air/fuel mixture having the target air/fuel ratio KCMD is supplied to the engine 3, the air/fuel ratio of exhaust gases which presents a response delay or a dead time, i.e., the output Vout of the O2 sensor can be accurately and rapidly converged to the target value Vop without variations. For the same reason, the output Vout of the O2 sensor can be accurately and rapidly converged to the target value Vop without variations even in an extremely low load operation mode in which a reduced exhaust gas volume causes the output Vout of the O2 sensor to increase the response delay or dead time. As appreciated from the foregoing, the output Vout of the O2 sensor can be accurately and rapidly converged to the target value Vop, so that the first catalyzer 8a can most efficiently purify exhaust gases, as described above, to provide an extremely satisfactory post-catalyst exhaust gases.

Also, in the ΔΣ modulation control, the ECU 2 calculates the target air/fuel ratio KCMD based on the product of the current value SGNSIGMA[0] of the DSM signal and the gain FDSM, and sets the gain FDSM in accordance with the required fuel injection amount TCYL, so that even if a change in the operating condition of the engine 3 results in a change in the responsibility of the air/fuel ratio of exhaust gases, the appropriate target air/fuel ratio KCMD can be calculated for the air/fuel mixture by using the gain FDSM which has been set in accordance with the required air/fuel injection amount TCYL to simultaneously provide fast convergence to the target value Vop and a high responsibility.

It should be understood that while the first embodiment has illustrated an exemplary configuration in which the control apparatus according to the present invention controls the air/fuel ratio for the internal combustion engine 3, the present invention is not limited to this particular configuration but may be widely applied to control apparatuses for controlling other arbitrary controlled objects. Also, the DSM controller 40 may be implemented by an electric circuit instead of the program as shown in the embodiment.

Also, while the control apparatus according to the first embodiment relies on the ΔΣ modulation algorithm to calculate (generate) the target air/fuel ratio KCMD, the ΣΔ modulation algorithm may be substituted for the ΔΣ modulation algorithm to calculate the target air/fuel ratio KCMD. In the following, the characteristic of the ΣΔ modulation algorithm will be described with reference to a block diagram of FIG. 15.

Figure 15:
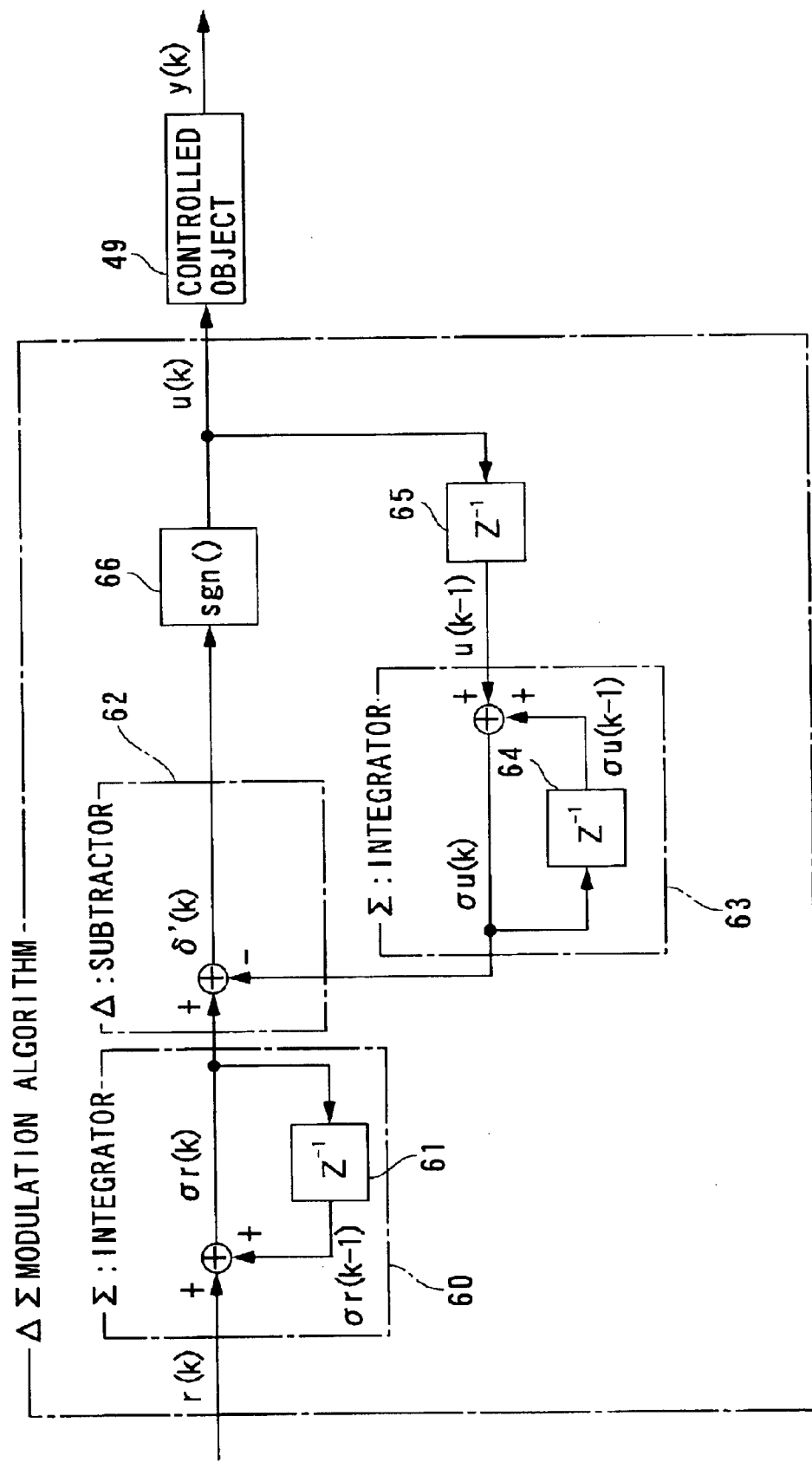
FIG. 15 is a block diagram illustrating a $\Sigma\Delta$ modulation algorithm, and an exemplary control system which applies the $\Sigma\Delta$ modulation algorithm.

As illustrated in FIG. 15, in a control system which applies the ΣΔ modulation algorithm, an integrator 60 generates a reference signal integrated value $\sigma_d r(k)$ as the sum of the reference signal r(k) and a reference signal integrated value $\sigma_d r(k-1)$ delayed by a delay element 61. On the other hand, an integrator 63 generates an SDM signal integrated value $\sigma_d u(k)$ as the sum of an SDM signal integrated value $\sigma_d u(k-1)$ delayed by a delay element 64, and an SDM signal u(k-1) delayed by a delay element 65. Then, a subtractor 62 generates a deviation δ'(k) of the SDM signal integrated value $\sigma_d u(k-1)$ from the reference signal integrated value $\sigma_d r(k)$.

Next, a quantizer 66 (sign function) generates an SDM signal u(k) as the sign of the deviation δ'(k). Then, the SDM signal u(k) generated in the foregoing manner is inputted to the controlled object 49 which responsively delivers the output signal y(k).

The foregoing ΣΔ modulation algorithm is expressed by the following equations (11)–(14):

$$\sigma_d r(k) = r(k) + \sigma_d r(k-1) \tag{11}$$

$$\sigma_d u(k) = \sigma_d u(k-1) + u(k-1) \tag{12}$$

$$\delta'(k) = \sigma_d r(k) - \sigma_d u(k) \tag{13}$$

$$u(k) = sgn(\delta'(k)) \tag{14}$$

The sign function sgn(δ'(k)) takes the value of 1 (sgn(δ'(k))=1) when δ'(k)≧0, and −1 (sgn(δ'(k))=−1) when δ'(k)<0 (alternatively, sgn(δ'(k)) may be set to 0 (sgn(δ'(k)=0) when δ'(k)=0.

Though not shown, like the aforementioned ΔΣ modulation algorithm, the foregoing ΣΔ modulation algorithm is characterized in that the SDM signal u(k) can be generated as a control input to the controlled object 49 such that the controlled object 49 generates the output y(k) which has a different amplitude from and the same frequency as the reference signal r(k) and is generally similar in waveform to the reference signal r(k). Therefore, a controller which utilizes the characteristic of the foregoing ΣΔ modulation algorithm can calculates the target air/fuel ratio KCMD to provide similar advantages to the control apparatus according to the first embodiment which relies on the ΔΣ modulation algorithm.

Further alternatively, the target air/fuel ratio KCMD may be calculated in accordance with a Δ modulation algorithm instead of the ΔΣ modulation algorithm in the first embodiment. In the following, the characteristic of the Δ modulation algorithm will be described with reference to a block diagram of FIG. 16.

Figure 16:
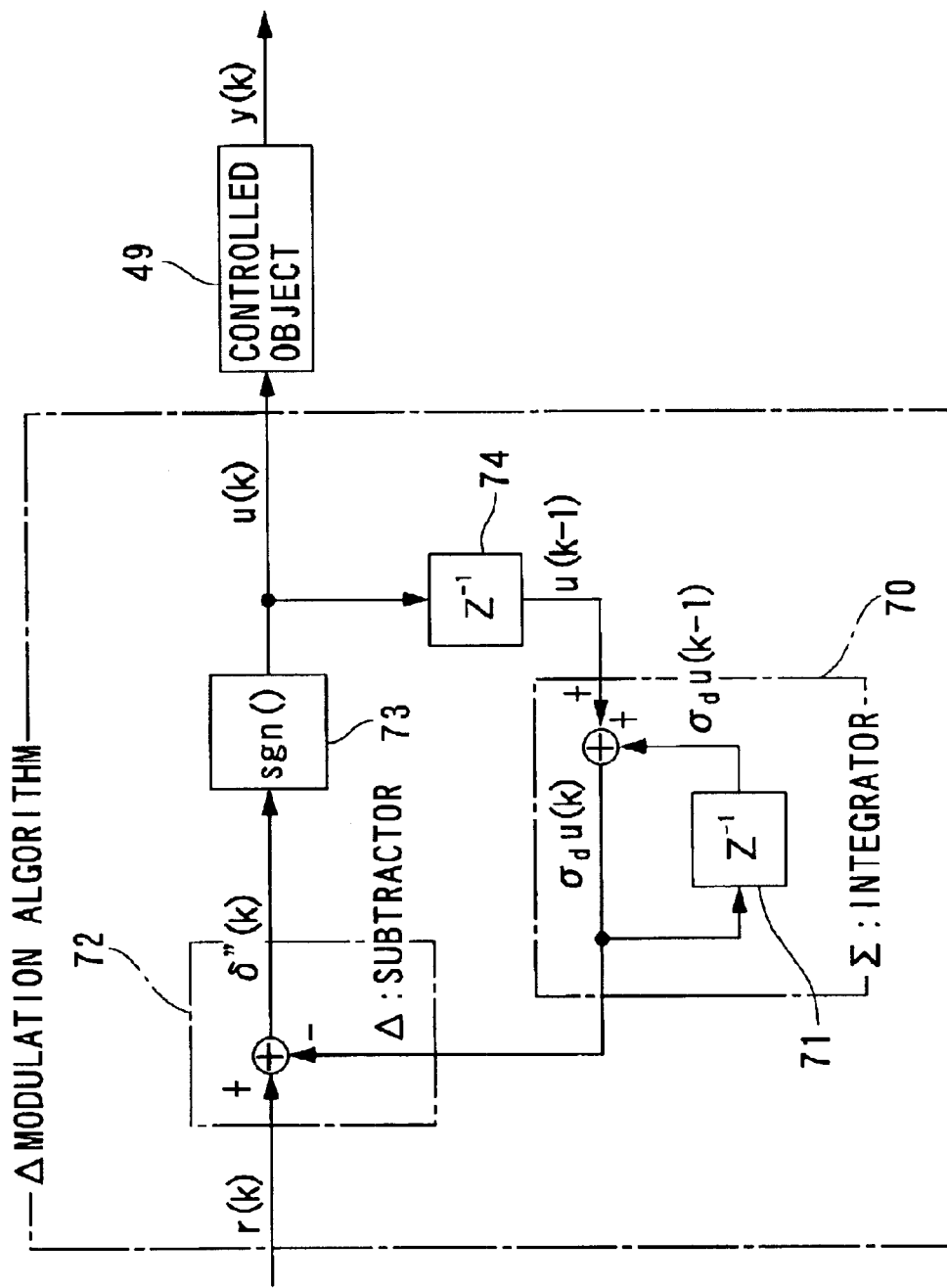
FIG. 16 is block diagram illustrating a $\Delta$ modulation algorithm, and an exemplary control system which applies the $\Delta$ modulation algorithm.

As illustrated in FIG. 16, in the Δ modulation algorithm, an integrator 70 generates a DM signal integrated value $\sigma_d u(k)$ as the sum of a DM signal integrated value $\sigma_d u(k-1)$ delayed by a delay element 71 and a DM signal u(k-1) delayed by a delay element 74. Then, a subtractor 72 generates a deviation signal δ"(k) of the DM signal integrated value $\sigma_d u(k)$ from the reference signal r(k).

Next, a quantizer 73 (sign function) generates a DM signal u(k) as a sign of the deviation signal δ"(k). Then, the SDM signal u(k) thus generated is inputted to the controlled object 49 which responsively delivers the output signal y(k).

The foregoing Δ modulation algorithm is expressed by the following equations (15)–(17):

$$\sigma_d u(k) = \sigma_d u(k-1) + u(k-1) \tag{15}$$

$$\delta"(k) = r(k) - \sigma_d u(k) \tag{16}$$

$$u(k) = sgn(\delta"(k)) \tag{17}$$

The sign function sgn(δ"(k)) takes the value of 1 (sgn(δ"(k)) 1) when σ(k)≧0, and −1 (sgn(δ"(k))=−1) when δ"(k)<0 (alternatively, sgn(δ"(k)) may be set to 0 (sgn(δ"(k)=0) when δ"(k)=0.

Though not shown, like the aforementioned ΔΣ modulation algorithm, the foregoing Δ modulation algorithm is characterized in that the DM signal u(k) can be generated as a control input to the controlled object 49 such that the controlled object 49 generates the output signal y(k) which has a different amplitude from and the same frequency as the reference signal r(k) and is generally similar in waveform to the reference signal r(k). Therefore, a controller which utilizes the characteristic of the foregoing Δ modulation algorithm can calculates the target air/fuel ratio KCMD to provide similar advantages to the control apparatus according to the first embodiment which relies on the ΔΣ modulation algorithm.

Next, a control apparatus according to a second embodiment of the present invention will be described. Like the control apparatus 1 according to the first embodiment, the control apparatus 201 is also configured to control an air/fuel ratio for an internal combustion engine generally in a similar manner to that illustrated in FIG. 1.

Specifically, the control apparatus 201 also comprises a microcomputer-based ECU 2. The ECU 2 determines an operating condition of an engine 3 in accordance with the outputs of the variety of sensors 10–19 mentioned above, calculates a target air/fuel ratio KCMD, and controls an air/fuel ratio of an air/fuel mixture by executing adaptive air/fuel ratio control processing or map search processing, later described, in accordance with a control program previously stored in the ROM and data stored in the RAM. Further, the ECU 2 calculates the final fuel injection amount TOUT. In the second embodiment, the ECU 2 implements deviation calculating means, control input calculating means, gain parameter detecting means, gain setting means, predicted value calculating means, identifying means, dynamic parameter detecting means, model parameter setting means, first control input calculating means, second control input calculating means, controlled object state detecting means, control input selecting means, output deviation calculating means, air/fuel ratio control means, air/fuel ratio calculating means, operating condition parameter detecting means, first air/fuel ratio control means, second air/fuel ratio control means, selecting means, operation mode discriminating means, first air/fuel ratio calculating means, and second air/fuel ratio calculating means.

Figure 17:
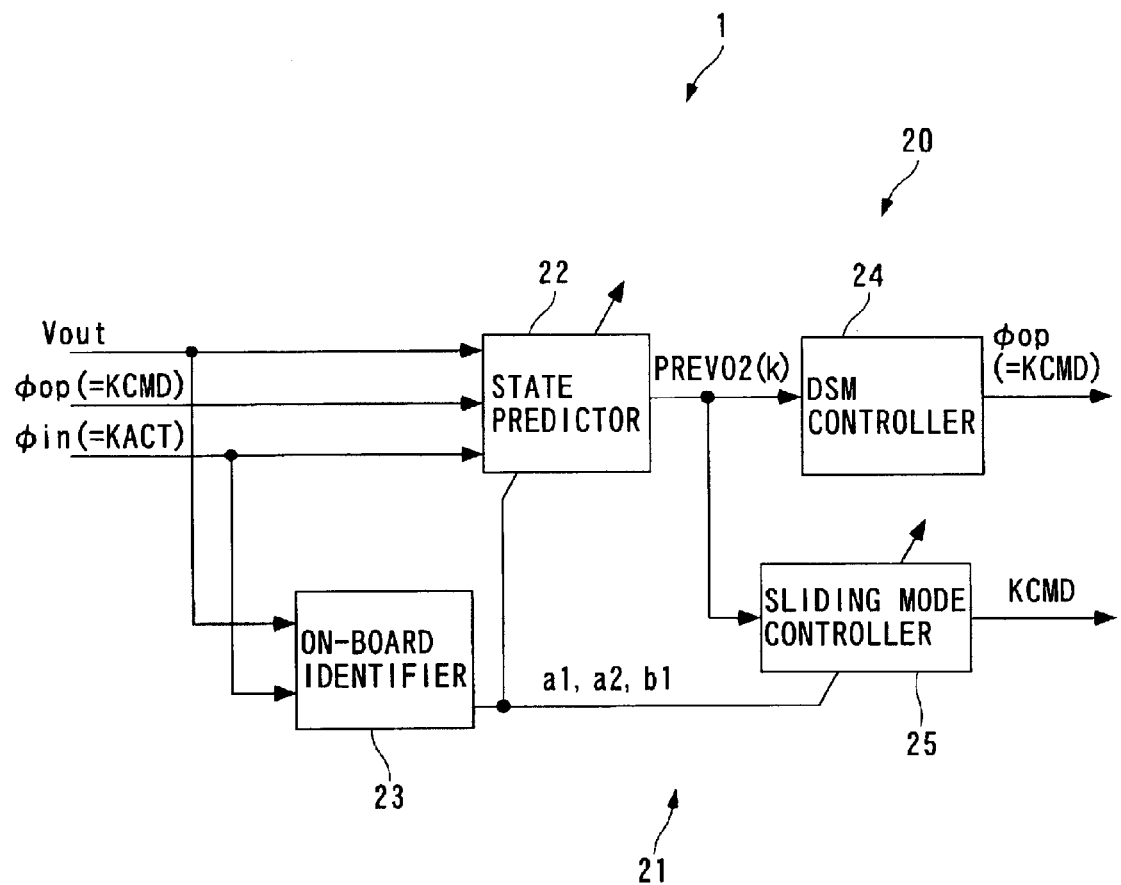
FIG. 17 is a block diagram illustrating the configuration of an ADSM controller and a PRISM controller in a control apparatus according to a second embodiment.

As illustrated in FIG. 17, the controller 201 comprises an ADSM controller 20 and a PRISM controller 21 for calculating the target air/fuel ratio KCMD. Specifically, both controllers 20, 21 are implemented by the ECU 2.

In the following, the ADSM controller 20 will be described. The ADSM controller 20 calculates the target air/fuel ratio KCMD for converging the output Vout of the O2 sensor 15 to the target value Vop in accordance with a control algorithm of adaptive prediction ΔΣ modulation control (hereinafter abbreviated as "ADSM"), later described. The ADSM controller 20 comprises a state predictor 22, an on-board identifier 23, and a DSM controller 24. A specific program for executing the ADSM processing will be described later.

Description will first be made on the state predictor 22 (which implements predicted value calculating means). The state predictor 22 predicts (calculates) a predicted value PREVO2 of an output deviation VO2 in accordance with a prediction algorithm, later described. Assume, in this embodiment, that a control input to a controlled object is the target air/fuel ratio KCMD of an air/fuel mixture; the output of the controlled object is the output Vout of the O2 sensor 15; and the controlled object is a system from an intake system of the engine 3 including the injectors 6 to the O2 sensor 15 downstream of the first catalyzer 8*a* in an exhaust system including the first catalyzer 8*a*. Then, this controlled object is modelled, as expressed by the following equation (18), as an ARX model (auto-regressive model with exogenous input) which is a discrete time system model.

$$VO2(k)=a1 \cdot VO2(k-1)+a2 \cdot VO2(K-2)+b1 \cdot DKCMD(k-dt) \quad (18)$$

where VO2 represents an output deviation which is a deviation (Vout-Vop) between the output Vout of the O2 sensor 15 and the aforementioned target value Vop; DKCMD represents an air/fuel ratio deviation which is a deviation (KCMD-FLAFBASE) between a target air/fuel ratio KCMD (=φop) and a reference value FLAFBASE; and a character k represents the order of each data in a sampling cycle. The reference value FLAFBASE is set to a predetermined fixed value. Model parameters a1, a2, b1 are sequentially identified by the on-board identifier 23 in a manner described below.

dt in the equation (18) represents a prediction time period from the time at which an air/fuel mixture set at the target air/fuel ratio KCMD is supplied to the intake system by the injectors 6 to the time at which the target air/fuel ratio KCMD is reflected to the output Vout of the O2 sensor 15, and is defined by the following equation (19):

$$dt=d+d'+dd \quad (19)$$

where d represents a dead time in the exhaust system from the LAF sensor 14 to the O2 sensor 15; d', a dead time in an air/fuel ratio manipulation system from the injectors 6 to the LAF sensor 14; and dd represents a phase delay time between the exhaust system and air/fuel ratio manipulation system, respectively (it should be noted that in a control program for the adaptive air/fuel ratio control processing, later described, the phase delay time dd is set to zero (dd=0) for calculating the target air/fuel ratio KCMD while switching between the ADSM processing and PRISM processing).

The controlled object model is comprised of time series data of the output deviation VO2 and the air/fuel ratio deviation DKCMD as described above for the reason set forth below. It is generally known in a controlled object model that the dynamic characteristic of the controlled object model can be fitted more closely to the actual dynamic characteristic of the controlled object when a deviation of input/output between the controlled object and a predetermined value is defined as a variable representative of the input/output than when an absolute value of the input/output is defined as a variable, because it can more precisely identify or define model parameters. Therefore, as is done in the control apparatus 1 of this embodiment, when the controlled object model is comprised of the time series data of the output deviation VO2 and the air/fuel ratio deviation DKCMD, the dynamic characteristic of the controlled object model can be fitted more closely to the actual dynamic characteristic of the controlled object, as compared with the case where absolute values of the output Vout of the O2 sensor 15 and target air/fuel ratio KCMD are chosen as variables, thereby making it possible to calculate the predicted value PREVO2 with a higher accuracy.

The predicted value PREVO2 in turn shows a predicted output deviation VO2(k+dt) after the lapse of the prediction time period dt from the time at which the air/fuel mixture set at the target air/fuel ratio KCMD has been supplied to the intake system. When an equation for calculating the predicted value PREVO2 is derived based on the aforementioned equation (18), the following equation (20) is defined:

$$PREVO2(k) \approx VO2(k+dt) \qquad (20)$$
$$= a1 \cdot VO2(k+dt-1) + a2 \cdot VO2(k+dt-2) +$$
$$b1 \cdot DKCMD(k)$$

In this equation (20), it is necessary to calculate VO2(k+dt−1), VO2(k+dt−2) corresponding to future values of the output deviation VO2(k), so that actual programming of the equation (20) is difficult. Therefore, matrixes A, B are defined using the model parameters a1, a2, b1, as equations (21), (22) shown in FIG. 18, and a recurrence formula of the equation (20) is repeatedly used to transform the equation (20) to derive equation (23) shown in FIG. 18. When the equation (23) is used as a prediction algorithm, i.e., an equation for calculating the predicted value PREVO2, the predicted value PREVO2 is calculated from the output deviation VO2 and air/fuel ratio deviation DKCMD.

Next, when an LAF output deviation DKACT is defined as a deviation (KACT−FLAFBASE) between the output KACT (=ϕin) of the LAF sensor 14 and the reference value FLAFBASE, a relationship expressed by DKACT(k)=DKCMD(k−d') is satisfied. Equation (24) shown in FIG. 18 is derived by applying this relationship to the equation (23) in FIG. 18.

The target air/fuel ratio KCMD can be calculated while appropriately compensating for a response delay and a dead time between the input/output of the controlled object by calculating the target air/fuel ratio KCMD using the predicted value PREVO2 calculated by the foregoing equation (23) or (24), as will be described later. Particularly, when the equation (24) is used as the prediction algorithm, the predicted value PREVO2 is calculated from the LAF output deviation VO2, output deviation DKACT and air/fuel ratio deviation DKCMD, so that the predicted value PREVO2 can be calculated as a value which reflects the air/fuel ratio of exhaust gases actually supplied to the first catalyzer 8a, thereby improving the calculation accuracy, i.e., the prediction accuracy more than when the equation (23) is used. Also, if d' can be regarded to be smaller than 1 (d'≦1) when the equation (24) is used, the predicted value PREVO2 can be calculated only from the output deviation VO2 and LAF output deviation DKACT without using the air/fuel ratio deviation DKCMD. In this embodiment, since the engine 3 is provided with the LAF sensor 14, the equation (24) is employed as the prediction algorithm.

The controlled object model expressed by the equation (18) can be defined as a model which employs the output deviation VO2 and LAF output deviation DKACT as variables by applying a relationship expressed by DKACT(k)=DKCMD(k−d') to the equation (18).

Next, description will be made on the on-board identifier 23 (which implements identifying means). The on-board identifier 23 identifies (calculates) the model parameters a1, a2, b1 in the aforementioned equation (18) in accordance with a sequential identification algorithm described below. Specifically, a vector θ(k) for model parameters is calculated by equations (25), (26) shown in FIG. 19. In the equation (25) in FIG. 19, KP(k) is a vector for a gain coefficient, and ide_f(k) is an identification error filter value. In the equation (26), θ(k)$^T$ represents a transposed matrix of θ(k), and a1'(k), a2'(k) and b1'(k) represent model parameters before they are limited in range in limit processing, later described. In the following description, the term "vector" is omitted if possible.

An identification error filter value ide_f(k) in the equation (25) is derived by applying moving average filtering processing expressed by equation (27) in FIG. 19 to an identification error ide(k) calculated by equations (28)–(30) shown in FIG. 19. n in the equation (27) in FIG. 19 represents the order of filtering (an integer equal to or larger than one) in the moving average filtering processing, and VO2HAT(k) in the equation (29) represents an identified value of the output deviation VO2.

The identification error filter value ide_f(k) is used for the reason set forth below. Specifically, the controlled object in this embodiment has the target air/fuel ratio KCMD as a control input, and the output Vout of the O2 sensor 15 as the output of the controlled object. The controlled object also has a low pass frequency characteristic. In such a controlled object having the low pass characteristic, model parameters are identified while the high frequency characteristic of the controlled object is emphasized due to a frequency weighting characteristic of the identification algorithm of the on-board identifier 23, more specifically, a weighted least-square algorithm, later described, so that the controlled object model tends to have a lower gain characteristic than the actual gain characteristic of the controlled object. As a result, when the ADSM processing or PRISM processing is executed by the control apparatus 1, the control system can diverge and therefore become instable due to an excessive gain possibly resulting from the processing.

Therefore, in this embodiment, the control apparatus 201 appropriately corrects the weighted least-square algorithm for the frequency weighting characteristic, and uses the identification error filter value ide_f(k) applied with the moving average filtering processing for the identification error ide(k), as well as sets the filter order n of the moving average filtering processing in accordance with an exhaust gas volume AB_SV in order to match the gain characteristic of the controlled object model with the actual gain characteristic of the controlled object, as will be later described.

Further, the vector KP(k) for the gain coefficient in the equation (25) in FIG. 19 is calculated by equation (31) in FIG. 19. P(k) in the equation 31 is a third-order square matrix as defined by equation (32) in FIG. 19.

In the identification algorithm described above, one is selected from the following four identification algorithms by setting weighting parameters λ1, λ2 in the equation (32):

λ1=1, λ2=0: Fixed Gain Algorithm;

λ1=1, λ2=1: Least-Square Algorithm;

λ1=1, λ2=λ: Gradually Reduced Gain Algorithm; and

λ1=λ, λ2=1: Weighted Least-Square Algorithm.

where λ is a predetermined value set in a range of 0<λ<1. (0197–0209)

This embodiment employs the weighted least-square algorithm from among the four identification algorithms. This is because the weighted least-square algorithm can appropriately set an identification accuracy, and a rate at which a model parameter converges to an optimal value, by setting the weighting parameter λ1 in accordance with an operating condition of the engine 3, more specifically, the exhaust gas volume AB_SV. For example, when the engine 3 is lightly loaded in operation, fluctuations of model parameters can be suppressed even when an increased dead time and response delay in a low load operation results in lower controllability (increased input/output fluctuations), so that a high identification accuracy can be ensured by setting the weighting parameter λ1 to a value close to one in accordance with this operating condition, i.e., by setting the algorithm close to the least-square algorithm. On the other hand, when the engine 3 is heavily loaded in operation, the model parameter can be rapidly converged to an optimal value by accordingly setting the weighting parameter λ1 to a value smaller than that during the low load operation. By setting the weighting parameter λ1 in accordance with the exhaust gas volume AB_SV in the foregoing manner, it is possible to appropriately set the identification accuracy, and the rate at which the model parameter converges to an optimal value, thereby improving the post-catalyst exhaust gas characteristic.

When the aforementioned relationship, DKACT(k)= DKCMD(k-d') is applied in the identification algorithm expressed by the equations (25)–(32), an identification algorithm is derived as expressed by equations (33)–(40) shown in FIG. 20. In the second embodiment, since the engine 3 is provided with the LAF sensor 14, these equations (33)–(40) are employed. When these equations (33)–(40) are employed, the model parameter can be identified as a value which more reflects the air/fuel ratio of exhaust gases actually fed to the first catalyzer 8a to a higher degree, for the reason set forth above, and accordingly, the model parameter can be identified with a higher accuracy than when using the identification algorithm expressed by the equations (25)–(32).

Also, the on-board identifier 23 applies the limit processing, later described, to the model parameters a1'(k), a2'(k), b1'(k) calculated by the foregoing identification algorithm to calculate the model parameters a1(k), a2(k), b1(k). Further, the aforementioned state predictor 22 calculates the predicted value PREVO2 based on the model parameters a1(k), a2(k), b1(k) after they have been limited in range in the limit processing.

Next, the DSM controller 24 (which implements control input calculating means, first control input calculating means, air/fuel ratio calculating means, and first air/fuel ratio calculating means) will be described. The DSM controller 24 generates (calculates) the control input φop(k) (=target air/fuel ratio KCMD) in accordance with a control algorithm applied with the ΔΣ modulation algorithm (expressed by the aforementioned equations (1)–(3)), based on the predicted value PREVO2 calculated by the state predictor 22, and inputs the calculated control input φop(k) to the controlled object to control the output Vout of the O2 sensor 15, as the output of the controlled object, such that it converges to the target value Vop. Since the characteristic of the ΔΣ modulation algorithm has been described in the first embodiment, description thereon is omitted here.

Figure 21:
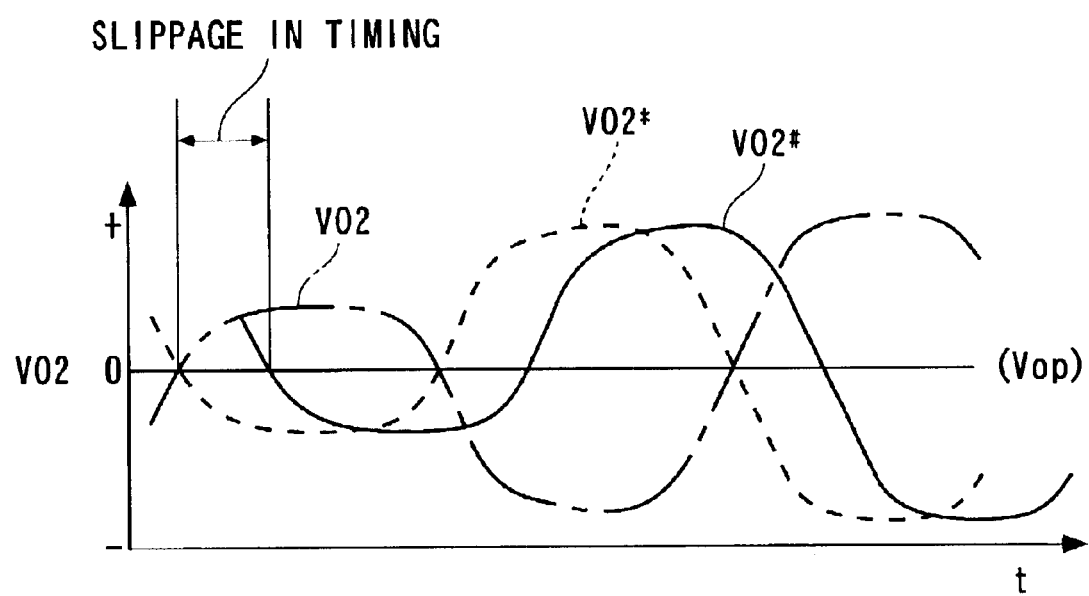
FIG. 21 is a timing chart for explaining the principles of an adaptive prediction type $\Delta\Sigma$ modulation control conducted by the ADSM controller in the second embodiment.

The principles of the DSM controller 24 will be described with reference to FIG. 21. When the output deviation VO2 fluctuates with respect to the value of zero, for example, as indicated by a one-dot chain line in FIG. 21 (i.e., the output Vout of the O2 sensor 15 fluctuates with respect to the target value Vop), the control input φop(k) may be generated to produce an output deviation VO2* having an opposite phase waveform to cancel the output deviation VO2, as indicated by a broken line in FIG. 21, in order to converge the output deviation VO2 to zero (i.e., to converge the output Vout to the target value Vop), as described in the first embodiment.

However, as described above, the controlled object in this embodiment experiences a time delay equal to the prediction time period dt from the time at which the target air/fuel ratio KCMD is inputted to the controlled object as the control input φop(k) to the time at which it is reflected to the output Vout of the O2 sensor 15. Therefore, an output deviation VO2# derived when the control input φop(k) is calculated based on the current output deviation VO2 delays from the output deviation VO2*, as indicated by a solid line in FIG. 21, thereby causing a slippage in control timing. To compensate the control timing for the slippage, the DSM controller 24 in the ADSM controller 20 according to this embodiment employs the predicted value PREVO2 of the output deviation VO2 to generate the control input φop(k) as a signal which generates an output deviation (an output deviation similar to the output deviation VO2* in opposite phase waveform) that cancels the current output deviation VO2 without causing a slippage in control timing.

Figure 22:
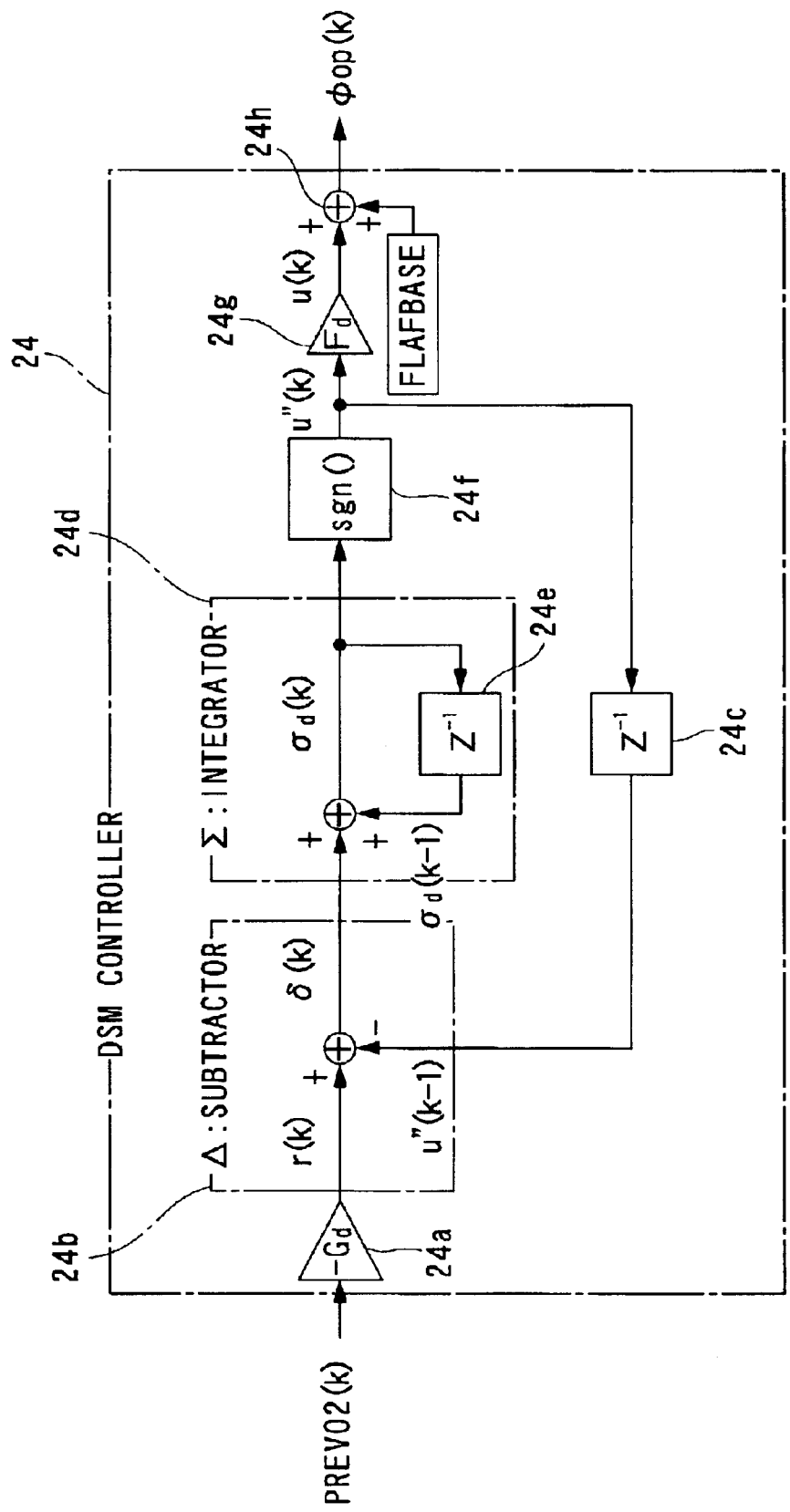
FIG. 22 is a block diagram illustrating the configuration of a DSM controller in the ADSM controller.

Specifically, as illustrated in FIG. 22, an inverting amplifier 24a in the DSM controller 24 generates the reference signal r(k) by multiplying the value of −1, a gain $G_d$ for the reference signal, and the predicted value PREVO2(k). Next, a subtractor 24b generates the deviation signal δ(k) as a deviation between the reference signal r(k) and a DSM signal u"(k−1) delayed by a delay element 24c.

Next, an integrator 24d generates the integrated deviation value $\sigma_d(k)$ as the sum of the deviation signal δ(k) and an integrated deviation value $\sigma_d(k-1)$ delayed by a delay element 24e. Then, a quantizer 24f (sign function) generates a DSM signal u"(k) as a sign of the integrated deviation value $\sigma_d(k)$. An amplifier 24g next generates an amplified DSM signal u(k) by amplifying the DSM signal u"(k) by a predetermined gain $F_d$. Finally, an adder 24h adds the amplified DSM signal u(k) to a predetermined reference value FLAFBASE to generate the control input φop(k).

The control algorithm of the DSM controller 24 described above is expressed by the following equations (41)–(46):

$$r(k)=-1 \cdot G_d \cdot PREVO2(k) \tag{41}$$

$$\delta(k)=r(k)-u"(k-1) \tag{42}$$

$$\sigma_d(k)=\sigma_d(k-1)+\delta(k) \tag{43}$$

$$u"(k)=sgn(\sigma_d(k)) \tag{44}$$

$$u(k)=F_d \cdot u"(k) \tag{45}$$

$$\phi op(k)=FLAFBASE+u(k) \tag{46}$$

where $G_d$, $F_d$ represents gains. The value of the sign function sgn(($\sigma_d(k)$)) takes 1 (sgn($\sigma_d(k)$)=1) when $\sigma_d(k) \geq 0$, and −1 (sgn($\sigma_d(k)$)=−1) when $\sigma_d(k)<0$ (sgn($\sigma_d(k)$) may be set to zero (sgn($\sigma_d(k)$)=0) when $\sigma_d(k)$=0).

The DSM controller 24 calculates the control input φop(k) in accordance with the control algorithm expressed by the foregoing equations (41)–(46) as a value which generates the output deviation VO2* that cancels the output deviation VO2 without causing a slippage in control timing, as described above. In other words, the DSM controller 24 calculates the control input φop(k) as a value which can converge the output Vout of the O2 sensor 15 to the target value Vop. Also, since the DSM controller 24 calculates the control input φop(k) by adding the amplified DSM signal u(k) to the predetermined reference value FLAFBASE, the resulting control input φop(k) not only inverts in the positive and negative directions about the value of zero, but also repeatedly increases and decreases about the reference value FLAFBASE. This can increase the degree of freedom for the control, as compared with a general ΔΣ modulation algorithm.

Next, the aforementioned PRISM controller 21 will be described. The PRISM controller 21 relies on a control algorithm for on-board identification sliding mode control processing (hereinafter called the "PRISM processing"), later described, to calculate the target air/fuel ratio KCMD for converging the output Vout of the O2 sensor 15 to the target value Vop. The PRISM controller 21 comprises the state predictor 22, on-board identifier 23, and sliding mode controller (hereinafter called the "SLD controller") 25. A specific program for executing the PRISM processing will be described later.

Since the state predictor 22 and on-board identifier 23 have been described in the PRISM controller 21, the following description will be centered on the SLD controller 25 (which implements second control input calculating means and second air/fuel ratio calculating means). The SLD controller 25 performs the sliding mode control based on the sliding mode control algorithm. In the following, a general sliding mode control algorithm will be described. Since the sliding mode control algorithm uses the aforementioned discrete time system model expressed by the equation (18) as a controlled object model, a switching function σ is set as a linear function of a time series data of the output deviation VO2 as expressed by the following equation (47):

$$\sigma(k)=S1 \cdot VO2(k)+S2 \cdot VO2(k-1) \qquad (47)$$

where S1, S2 are predetermined coefficients which are set to satisfy a relationship represented by $-1<(S2/S1)<1$.

Generally, in the sliding mode control algorithm, when the switching function σ is made up of two state variables (time series data of the output deviation VO2 in this embodiment), a phase space defined by the two state variables forms a two-dimensional phase plane in which the two state variables are represented by the vertical axis and horizontal axis, respectively, so that a combination of values of the two state variables satisfying σ=0 rests on a line called a "switching line" on this phase plane. Therefore, both the two state variables can be converged (slid) to a position of equilibrium at which the state variables take the value of zero by appropriately determining a control input to a controlled object such that a combination of the two state variables converges to (rests on) the switching line. Further, the sliding mode control algorithm can specify the dynamic characteristic, more specifically, convergence behavior and convergence rate of the state variables by setting the switching function σ. For example, when the switching function σ is made up of two state variables as in this embodiment, the state variables converge slower as the slope of the switching line is brought closer to one, and faster as it is brought closer to zero. As appreciated, the sliding mode control is one technique of a so-called response specifying control.

In this embodiment, as shown in the aforementioned equation (47), the switching function σ is made up of two time series data of the output deviation VO2, i.e., a current value VO2(k) and the preceding value VO2(k-1) of the output deviation VO2, so that the control input to the controlled object, i.e., the target air/fuel ratio KCMD may be set such that a combination of these current value VO2(k) and preceding vale VO2(k-1) of the output deviation VO2 (k) is converged onto the switching line. Specifically, assuming that the sum of a control amount Usl(k) and the reference value FLAFBASE is equal to the target air/fuel ratio KCMD, the control amount Usl(k) for converging the combination of the current value VO2(k) and preceding value VO2(k-1) onto the switching line is set as a total sum of an equivalent control input Ueq(k), an reaching law input Urch(k), and an adaptive law input Uadp(k), as shown in equation (48) shown in FIG. 23, in accordance with an adaptive sliding mode control algorithm.

The equivalent control input Ueq(k) is provided for restricting the combination of the current value VO2(k) and preceding value VO2(k-1) of the output deviation VO2 on the switching line, and specifically is defined as equation (49) shown in FIG. 23. The reaching law input Urch(k) is provided for converging the combination of the current value VO2(k) and preceding value VO2(k-1) of the output deviation VO2 onto the switching line if it deviates from the switching line due to disturbance, a modelling error or the like, and specifically is defined as equation (50) shown in FIG. 23. In the equation (50), F represents a gain.

The adaptive law input Uadp(k) is provided for securely converging the combination of the current value VO2(k) and preceding value VO2(k-1) of the output deviation VO2 onto a switching hyperplane while preventing the influence of a steady-state deviation of the controlled object, a modelling error, and disturbance, and specifically defined as equation (51) shown in FIG. 23. In the equation (51), G represents a gain, and ΔT a control period, respectively.

As described above, the SLD controller 25 in the PRISM controller 21 according to this embodiment uses the predicted value PREVO2 instead of the output deviation VO2, so that the algorithm expressed by the equations (47)–(51) is rewritten to equations (52)–(56) shown in FIG. 12 for use in the control by applying a relationship expressed by PREVO2(k)≈VO2(k+dt). σPRE in the equation (52) represents the value of the switching function when the predicted value PREVO2 is used (hereinafter called the "prediction switching function"). In other words, the SLD controller 25 calculates the target air/fuel ratio KCMD by adding the control amount Usl(k) calculated in accordance with the foregoing algorithm to the reference value FLAFBASE.

Figure 25:
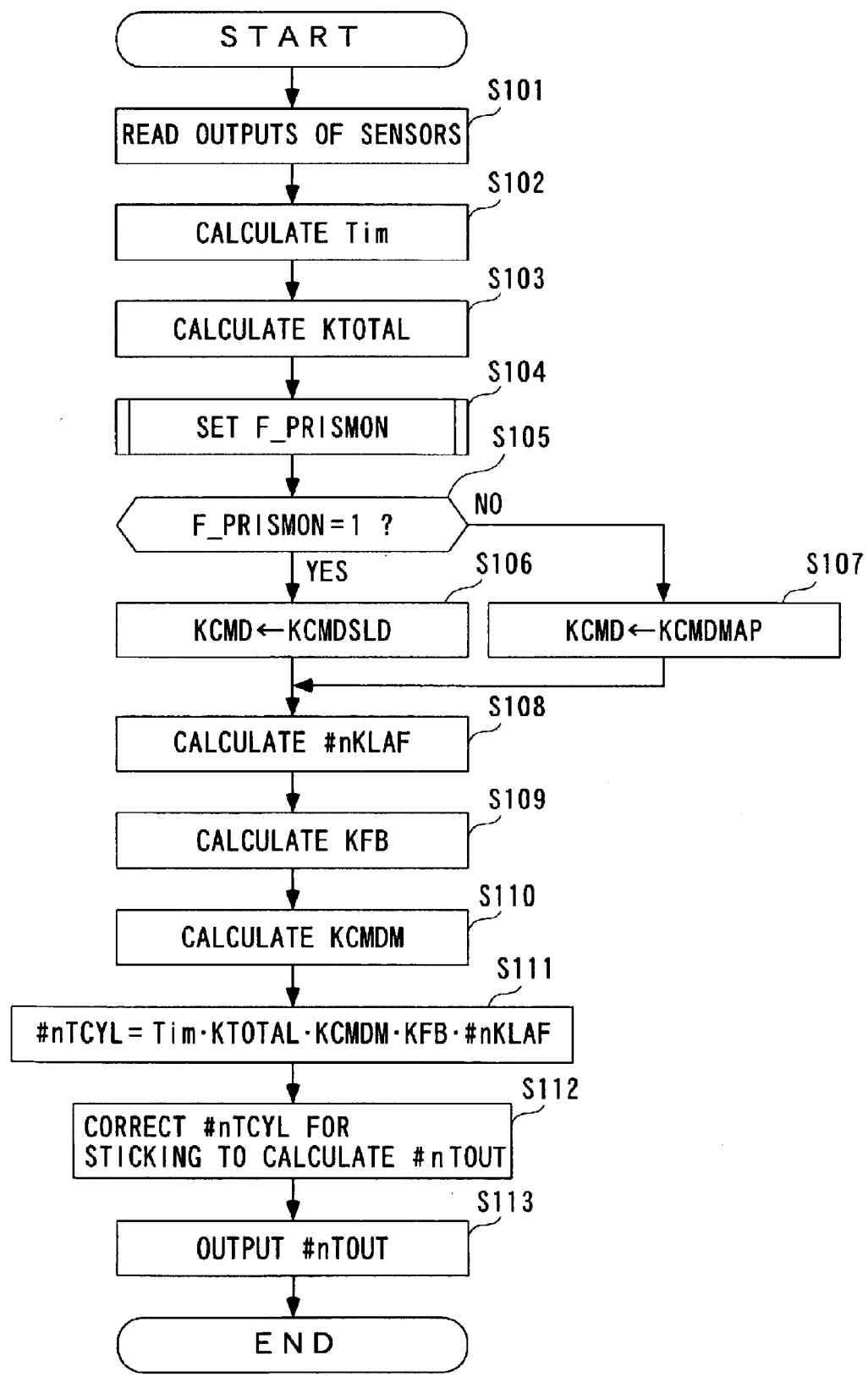
FIG. 25 is a flow chart illustrating a routine for executing fuel injection control processing for an internal combustion engine.

In the following, the processing for calculating a fuel injection amount executed by the ECU 2 will be described with reference to FIG. 25. As illustrated in FIG. 25, this calculation processing differs from the aforementioned calculation processing in FIGS. 10 and 11 only in steps 104–107 with the remaining steps being identical, so that the following description will be centered on steps 104–107. In the following description, the symbol (k), representing a current value, is omitted if possible.

In this processing, at step 104 subsequent to step 103, the ECU 2 sets an adaptive control flag F_PRISMON. Though details of this processing are not shown in the figure, specifically, when the following conditions (f14)–(f19) are fully satisfied, the ECU 2 sets the adaptive control flag F_PRISMON to "1," determining that the condition is met for using the target air/fuel ratio KCMD calculated in the adaptive air/fuel ratio control processing, in other words, that the engine 3 is in an operation mode in which the air/fuel ratio should be controlled in accordance with the adaptive air/fuel ratio control. On the other hand, if any of the conditions (f14)–(f19) is not satisfied, the ECU 2 sets the adaptive control flag F_PRISMON to "0."

(f14) The LAF sensor 14 and O2 sensor 15 are both activated;
(f15) the engine 3 is not in a lean burn operation;
(f16) the throttle valve 5 is not fully opened;
(f17) the ignition timing is not controlled to be retarded;
(f18) the engine 3 is not in a fuel cut operation; and
(f19) the engine rotational speed NE and absolute intake pipe inner pressure PBA are both within their respective predetermined ranges.

Next, the routine proceeds to step 105, where it is determined whether or not the adaptive control flag F_PRISMON set at step 104 is "1." If the result of determination at step 105 is YES, the routine proceeds to step 106, where the ECU 2 sets the target air/fuel ratio KCMD to an adaptive target air/fuel ratio KCMDSLD which is calculated by adaptive air/fuel ratio control processing, later described.

On the other hand, if the result of determination at step 105 is NO, the routine proceeds to step 107, where the ECU 2 sets the target air/fuel ratio KCMD to a map value KCMDMAP. The map value KCMDMAP is calculated by searching a map, not shown, in accordance with the engine rotational speed NE and intake pipe inner absolute pressure PBA. Then, subsequent steps 108–113 are executed in a manner similar to the aforementioned steps 9–14 in FIGS. 10 and 11.

Figure 26:
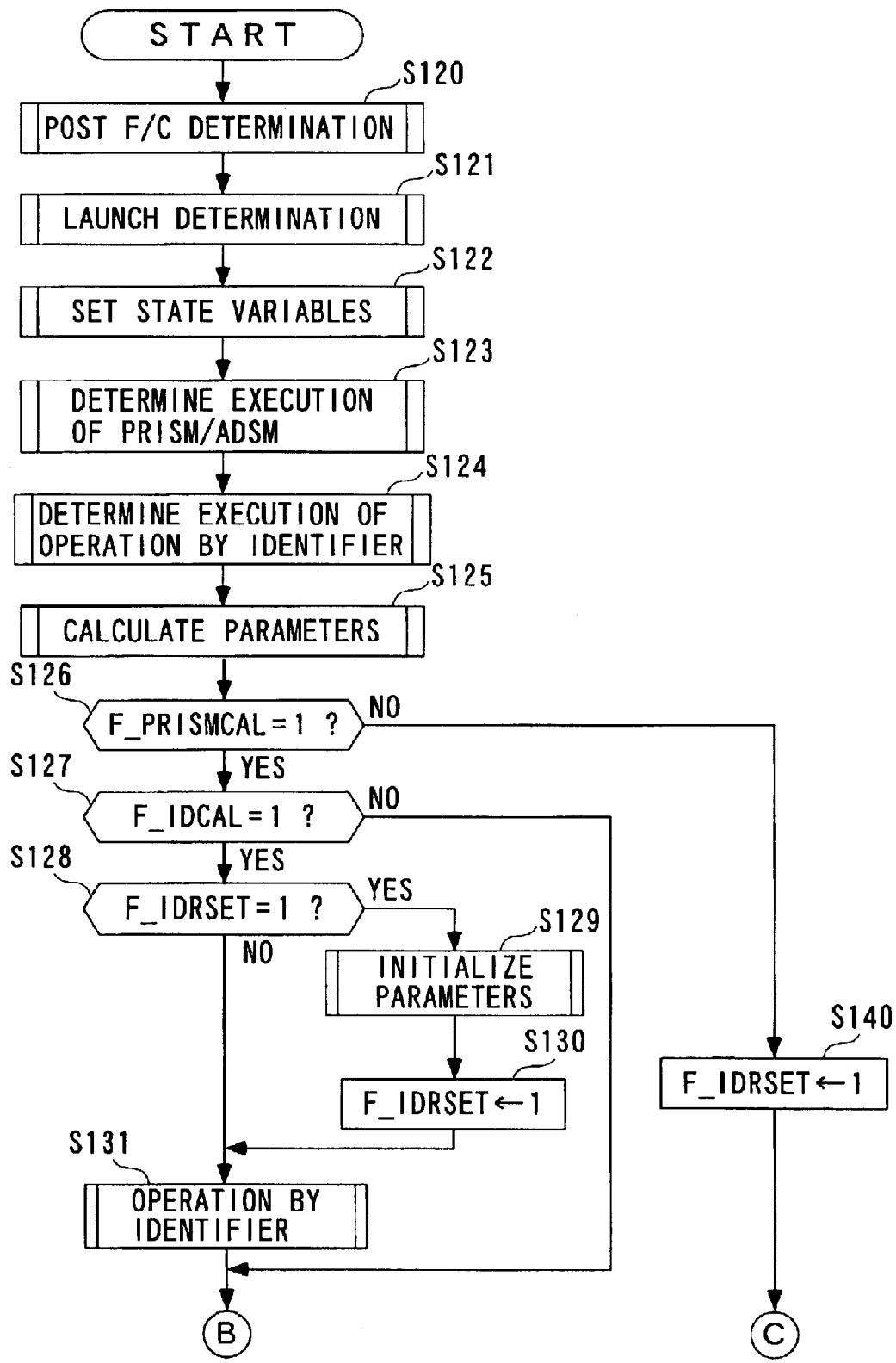
FIGS. 26 and 27 are flow charts illustrating in combination a routine for executing adaptive air/fuel ratio control processing.

Next, the adaptive air/fuel ratio control processing including the ADSM processing and PRISM processing will be described with reference to FIGS. 26 and 27 which illustrate routines for executing the ADSM and PRISM processing, respectively. This processing is executed at a predetermined period (for example, every 10 msec). Also, in this processing, the ECU 2 calculates the target air/fuel ratio KCMD in accordance with an operating condition of the engine 3 by the ADSM processing, PRISM processing, or processing for setting a sliding mode control amount DKCMDSLD to a predetermined value SLDHOLD.

First, in this processing, the ECU 2 executes post-F/C determination processing at step 120. Though not shown in detail in the figure, during a fuel cut operation, the ECU 2 sets a F/C post-determination flag F_AFC to "1" for indicating that the engine 3 is in a fuel cut operation. When a predetermined time X_TM_TM_AFC has elapsed after the end of the fuel cut operation, the ECU 2 sets the post-F/C determination flag F_AFC to "0" for indicating this situation.

Figure 28:
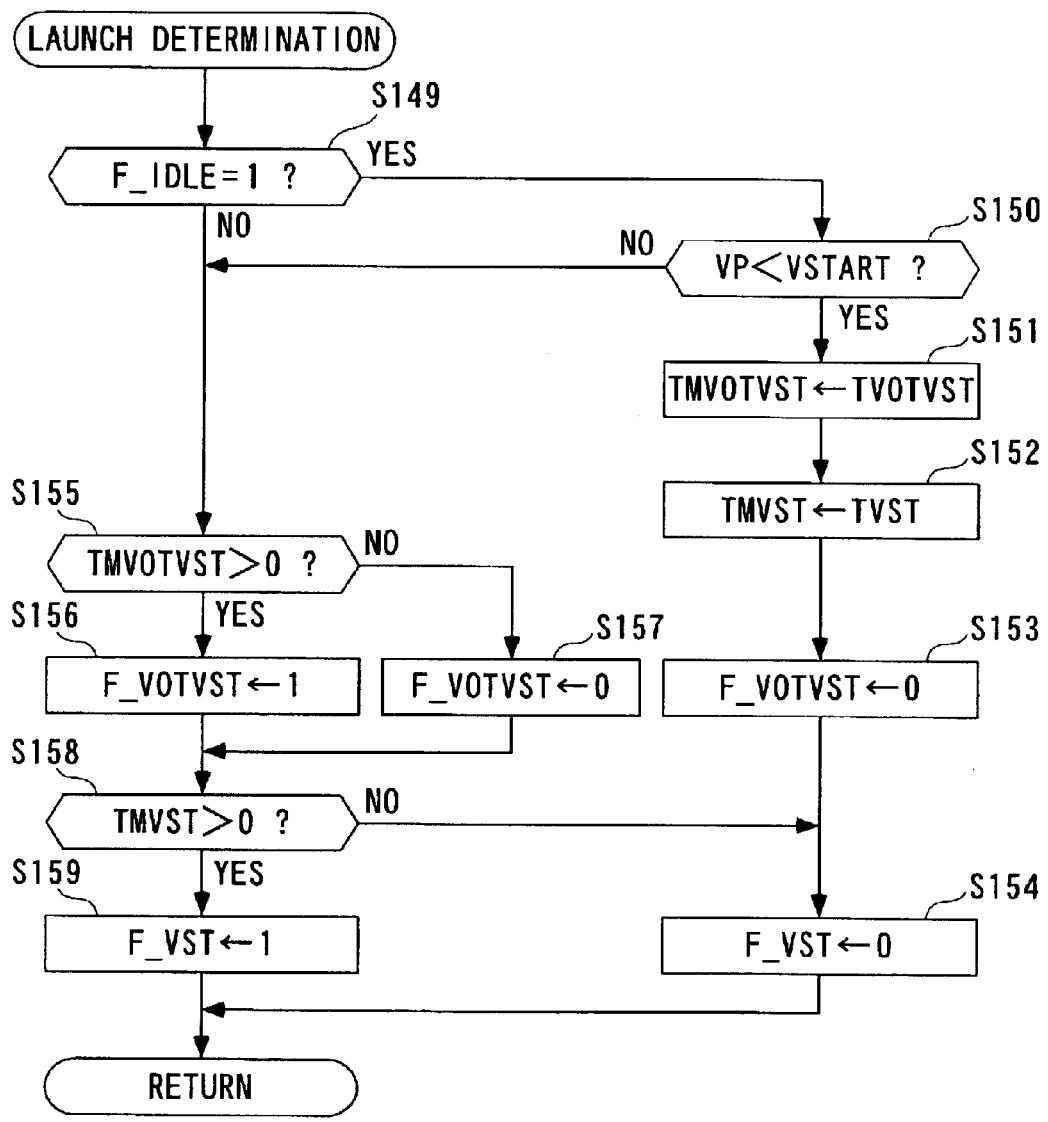
FIG. 28 is a flow chart illustrating a routine for executing launch determination processing at step 121 in FIG. 26.

Next, the routine proceeds to step 121, where the ECU 2 executes start determination processing based on the vehicle speed VP for determining whether or not the vehicle equipped with the engine 3 has started. As illustrated in FIG. 28 showing a routine for executing the start determination processing, it is first determined at step 149 whether or not an idle operation flag F_IDLE is "1." The idle operation flag F_IDLE is set based on the engine rotational speed NE, vehicle speed VP, throttle valve opening θTH, and the like by determining whether or not the engine 3 is in an idle operation mode. Specifically, the idle operation flag F_IDLE is set to "1" during an idle operation and otherwise to "0."

If the result of determination at step 149 is YES, indicating the idle operation, the routine proceeds to step 150, where it is determined whether or not the vehicle speed VP is lower than a predetermined vehicle speed VSTART (for example, 1 km/h). If the result of determination at step 150 is YES, indicating that the vehicle is stopped, the routine proceeds to step 151, where the ECU 2 sets a time value TMVOTVST of a fist launch determination timer of down-count type to a first predetermined time TVOTVST (for example, 3 msec).

Next, the routine proceeds to step 152, where the ECU 2 sets a timer value TMVST of a second launch determination timer of down-count type to a second predetermined time TVST (for example, 500 msec) longer than the first predetermined time TVOTVST. Then, at steps 153, 154, the ECU 2 sets a first and a second launch flag F_VOTVST, F_VST to "0," followed by termination of the processing.

On the other hand, if the determination result at step 149 or 150 is NO, i.e., when the vehicle is not in an idle operation or when the vehicle has been launched, the routine proceeds to step 155, where it is determined whether or not the timer value TMVOTVST of the first launch determination timer is larger than zero. If the result of determination at step 155 is YES, indicating that the first predetermined time TVOVST has not elapsed after the end of the idle operation or after the vehicle was launched, the routine proceeds to step 156, where the ECU 2 sets the first launch flag F_VOTVST to "1" for indicating that the vehicle is now in a first launch mode.

On the other hand, if the result of determination at step 155 is NO, indicating that the first predetermined time TVOTVST has elapsed after the end of the idle operation or after the vehicle was launched, the routine proceeds to step 157, where the ECU 2 sets the first launch flag F_VOTVST to "0" for indicating that the first launch mode has been terminated.

At step 158 subsequent to step 156 or 157, it is determined whether or not the timer value TMVST of the second launch determination timer is larger than zero. If the result of determination at step 158 is YES, i.e., when the second predetermined time TVST has not elapsed after the end of the idle operation or after the vehicle was launched, the routine proceeds to step 159, where the ECU 2 sets the second launch flag F_VST to "1," indicating that the vehicle is now in a second launch mode, followed by termination of this processing.

On the other hand, if the result of determination at step 158 is NO, i.e., when the second predetermined time TVST has elapsed after the end of the idle operation or after the vehicle was launched, the ECU 2 executes the aforementioned step 154, regarding that the second launch mode has been terminated, followed by termination of this processing.

Turning back to FIG. 26, at step 122 subsequent to step 121, the ECU 2 executes processing for setting state variables. Though not shown, in this processing, the ECU 2 shifts all of the target air/fuel ratio KCMD, the output KACT of the LAF sensor 14, and time series data of the output deviation VO2, stored in the RAM, to the past by one sampling cycle. Then, the ECU 2 calculates current values of KCMD, KACT and VO2 based on the latest values of KCMD, KACT and time series data of VO2, the reference value FLAFBASE, and an adaptive correction term FLFADP, later described.

Next, the routine proceeds to step 123, where it is determined whether or not the PRISM/ADSM processing should be executed. This processing determines whether or not the condition for executing the PRISM processing or ADSM processing is satisfied. Specifically, the processing is executed along a flow chart illustrated in FIG. 29.

Figure 29:
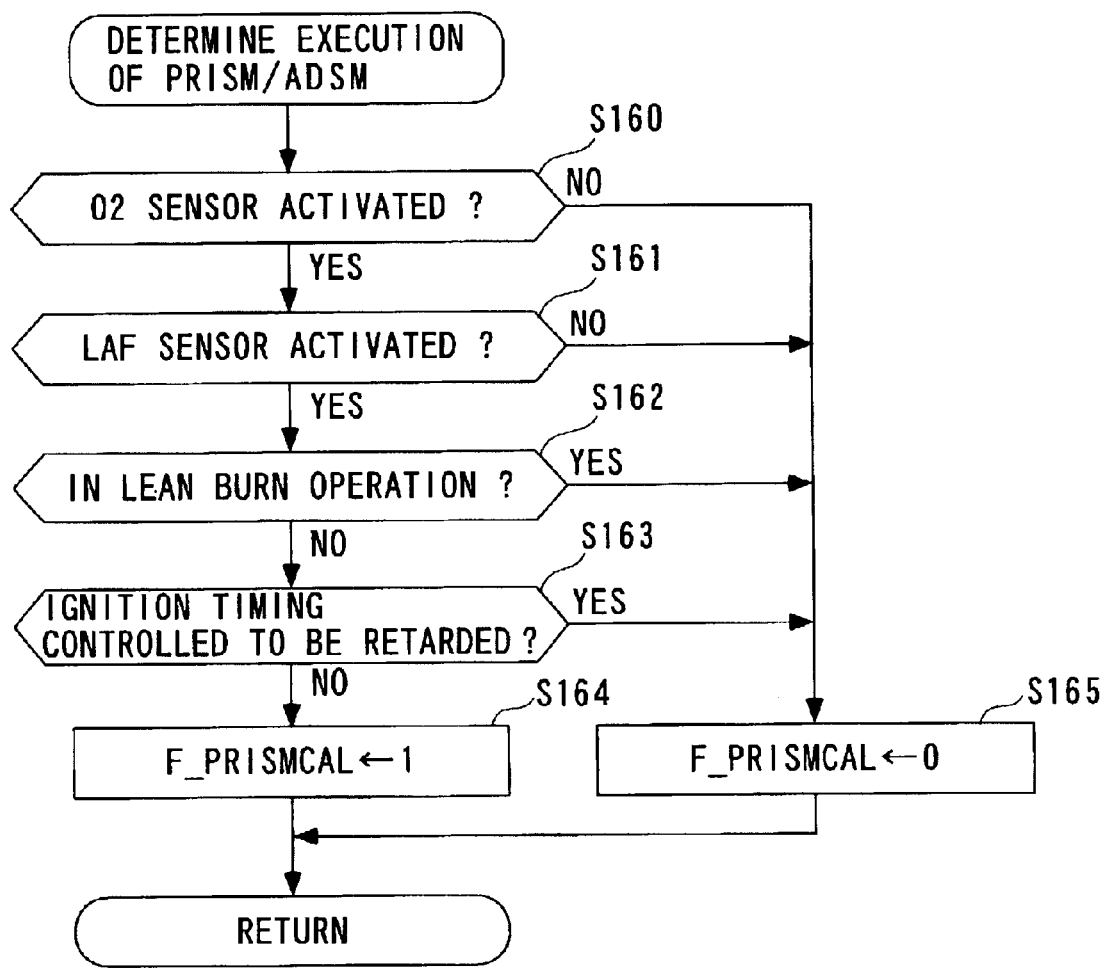
FIG. 29 is a flow chart illustrating a routine for executing PRISM/ADSM processing execution determination processing at step 123 in FIG. 26.

More specifically, at steps 160–163 in FIG. 29, when the following conditions (f20)–(f23) are fully satisfied, the ECU 2 sets a PRISM/ADSM execution flag F_PRISMCAL to "1" at step 164, for indicating that the vehicle is in an operating condition in which the PRISM processing or ADSM processing should be executed, followed by termination of this processing. On the other hand, if any of the conditions (f20)–(f23) is not satisfied, the ECU 2 sets the PRISM/ADSM execution flag F_PRISMCAL to "0" at step 165, for indicating that the vehicle is not in an operating condition in which the PRISM processing or ADSM processing should be executed, followed by termination of this processing.

(f20) The O2 sensor 15 is activated;
(f21) the LAF sensor 14 is activated;
(f22) the engine 3 is not in a lean burn operation; and
(f23) the ignition timing is not controlled to be retarded.

Turning back to FIG. 26, at step 124 subsequent to step 123, the ECU 2 executes processing for determining whether or not the identifier 23 should executes the operation. ECU 2 determines whether or not conditions are met for the on-board identifier 23 to identify parameters through this processing which is executed specifically along a flow chart illustrated in FIG. 30.

Figure 30:
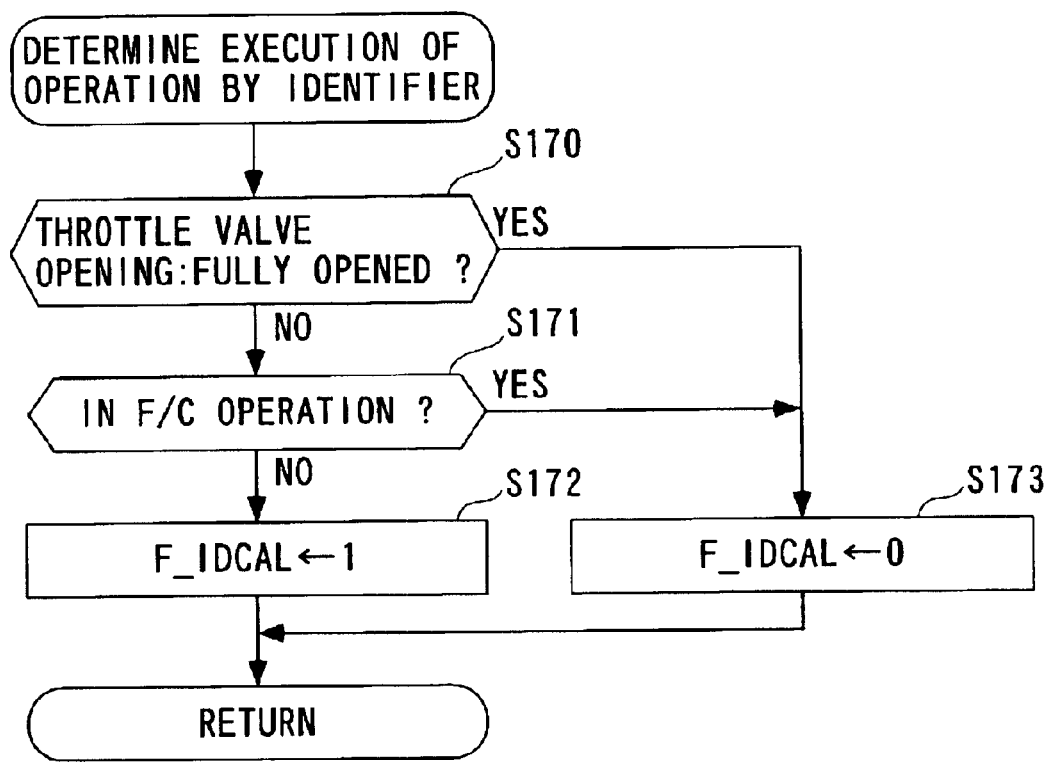
FIG. 30 is a flow chart illustrating a routine for executing the processing for determining whether or not the identifier should execute its operation at step 124 in FIG. 26.

When the results of determinations at steps 170 and 171 in FIG. 30 are both NO, in other words, when the throttle valve opening θTH is not fully opened and the engine 3 is not in a fuel cut operation, the routine proceeds to step 172, where the ECU 2 sets an identification execution flag F_IDCAL to "1," determining that the engine 3 is in an operating condition in which the identification of parameters should be executed, followed by termination of the processing. On the other hand, if the result of determination at step 170 or 171 is YES, the routine proceeds to step 173, where the ECU 2 sets the identification execution flag F_IDCAL to "0," determining that the engine 3 is not in an operating condition in which the identification of parameters should be executed, followed by termination of the processing.

Turning back to FIG. 26, at step 125 subsequent to step 124, the ECU 2 calculates a variety of parameters (exhaust gas volume AB_SV and the like). Specific details of this calculation will be described later.

Next, the routine proceeds to step 126, where it is determined whether or not the PRISM/ADSM execution flag F_PRISMCAL set at step 123 is "1." If the result of determination at step 126 is YES, i.e., when conditions are met for executing the PRISM processing or ADSM processing, the routine proceeds to step 127, where it is determined whether or not the identification execution flag F_IDCAL set at step 124 is "1."

If the result of determination at step 127 is YES, i.e., when the engine 3 is in an operating condition in which the on-board identifier 23 should execute the identification of parameters, the routine proceeds to step 128, where it is determined whether or not a parameter initialization flag F_IDRSET is "1." If the result of determination at step 128 is NO, i.e., when the initialization is not required for the model parameters a1, a2, b1 stored in the RAM, the routine proceeds to step 131, later described.

On the other hand, if the result of determination at step 128 is YES, i.e., when the initialization is required for the model parameters a1, a2, b1, the routine proceeds to step 129, where the ECU 2 sets the model parameters a1, a2, b1 to their respective initial values. Then, the routine proceeds to step 130, where the ECU 2 sets the parameter initialization flag F_IDRSET to "0" for indicating that the model parameters a1, a2, b1 have been set to the initial values.

At step 131 subsequent to step 130 or 128, the on-board identifier 23 executes the operation to identify the model parameters a1, a2, b1, followed by the routine proceeding to step 132 in FIG. 27, later described. Specific details on the operation of the on-board identifier 23 will be described later.

Figure 27:
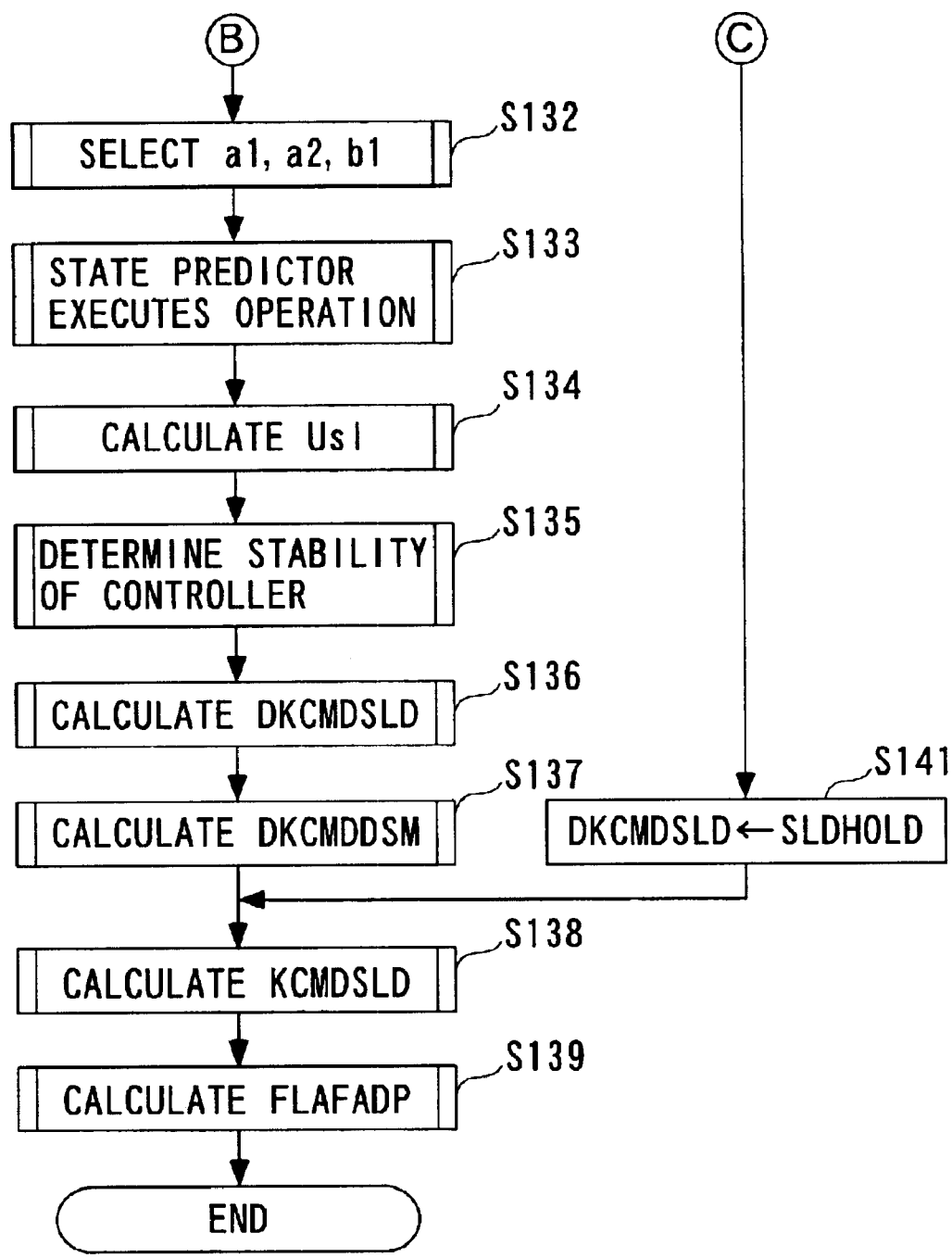

On the other hand, if the result of determination at step 127 is NO, i.e., when the engine 3 is not in an operating condition in which the identification of the parameters should not be executed, the routine skips the foregoing steps 128–131, and proceeds to step 132 in FIG. 27. At step 312 subsequent to step 127 or 131, the ECU 2 selects identified values or predetermined values for the model parameters a1, a2, b1. Though details on this operation are not shown, specifically, the model parameters a1, a2, b1 are set to the identified values identified at step 131 when the identification execution flag F_IDCAL set at step 124 is "1." On the other hand, when the identification execution flag F_IDCAL is "0," the model parameters a1, a2, b1 are set to the predetermined values.

Next, the routine proceeds to step 133, where the state predictor 22 executes the operation to calculate the predicted value PREVO2, as later described. Subsequently, the routine proceeds to step 134, where the ECU 2 calculates the control amount Usl, as later described.

Next, the routine proceeds to step 135, where the ECU 2 executes processing for determining whether or not the SLD controller 25 is stable. Though details on this processing are not shown, specifically, the ECU 2 determines based on the value of the prediction switching function cPRE to determine whether or not the sliding mode control conducted by the SLD controller 25 is stable.

Next, at steps 136 and 137, the SLD controller 25 and DSM controller 24 calculate the sliding mode control amount DKCMDSLD and $\Delta\Sigma$ modulation control amount DKCMDDSM, respectively, as described later.

Next, the routine proceeds to step 138, where the ECU 2 calculates the adaptive target air/fuel ratio KCMDSLD using the sliding mode control amount DKCMDSLD calculated by the SLD controller 25 or the $\Delta\Sigma$ modulation control amount DKCMDDSM calculated by the DSM controller 24. Subsequently, the routine proceeds to step 139, where the ECU 2 calculates an adaptive correction term FLAFADP, as later described, followed by termination of the processing.

Turning back again to FIG. 26, if the result of determination at step 126 is NO, i.e., when conditions are not met for executing either the PRISM processing or the ADSM processing, the routine proceeds to step 140, where the ECU 2 sets the parameter initialization flag F_IDRSET to "1." Next, the routine proceeds to step 141 in FIG. 17, where the ECU 2 sets the sliding mode control amount DKCMDSLD to a predetermined value SLDHOLD. Then, after executing the aforementioned steps 138, 139, the processing is terminated.

Next, the processing for calculating a variety of parameters at step 125 will be described with reference to FIG. 31 which illustrates a routine for executing this processing. First, in this processing, the ECU 2 calculates the exhaust gas volume AB_SV (estimated value of a space velocity) in accordance with the following equation (58) at step 180:

$$AB\_SV=(NE/1500)\cdot PBA\cdot X\_SVPRA \tag{58}$$

where X_SVPRA is a predetermined coefficient which is determined based on the displacement of the engine 3.

Next, the routine proceeds to step 181, where the ECU 2 calculates a dead time KACT_D (=d') in the aforementioned air/fuel ratio manipulation system, a dead time CAT_DELAY (=d) in the exhaust system, and a prediction time dt. Specifically, by searching a table shown in FIG. 32 in accordance with the exhaust gas volume AB_SV calculated at step 180, the ECU 2 calculates the dead times KACT_D, CAT_DELAY, respectively, and sets the sum of these dead times (KACT_D+CAT_DELAY) as the prediction time dt. In other words, in this control program, the phase delay time dd is set to zero.

Figure 32:
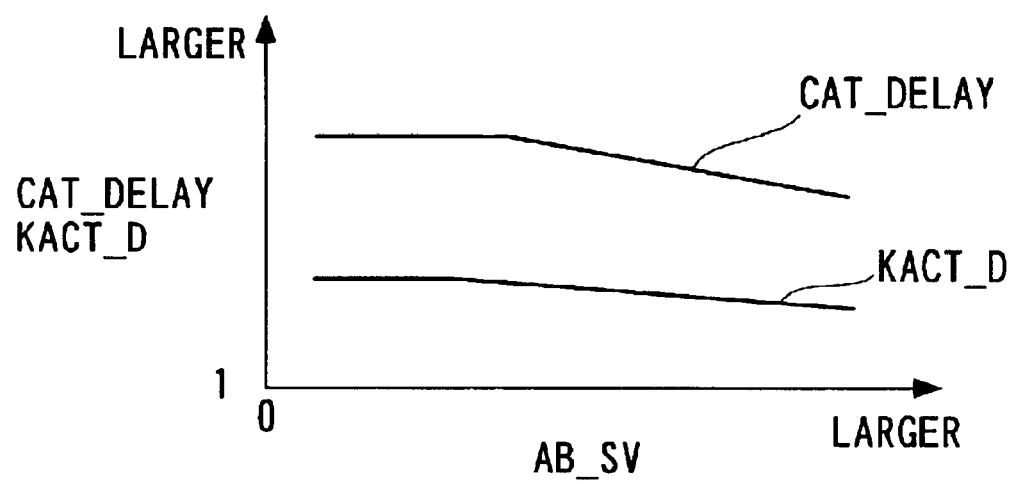
FIG. 32 shows an exemplary table for use in calculating dead times CAT_DELAY, KACT_D.

In the table shown in FIG. 32, the dead times KACT_D, CAT_DELAY are set to smaller values as the exhaust gas volume AB_SV is larger. This is because the dead times KACT_D, CAT_DELAY are shorter as the exhaust gas volume AB_SV is larger since exhaust gases flow faster. As described above, since the dead times KACT_D, CAT_DELAY and prediction time dt are calculated in accordance with the exhaust gas volume AB_SV, it is possible to eliminate a slippage in control timing between the input and output of the controlled object by calculating the adaptive target air/fuel ratio KCMDSLD, later described, based on the predicted value PREVO2 of the output deviation VO2 which has been calculated using them. Also, since the model parameters a1, a2, b1 are fixed using the dead time CAT_DELAY, the dynamic characteristic of the controlled object model can be fitted to the actual dynamic characteristic of the controlled object, thereby making it possible to more fully eliminate the slippage in control timing between the input and output of the controlled object.

Next, the routine proceeds to step 182, where the ECU 2 calculates weighting parameters λ1, λ2 of the identification algorithm. Specifically, the ECU 2 sets the weighting parameter λ2 to one, and simultaneously calculates the weighting parameter λ1 by searching a table shown in FIG. 33 in accordance with the exhaust gas volume AB_SV.

Figure 33:
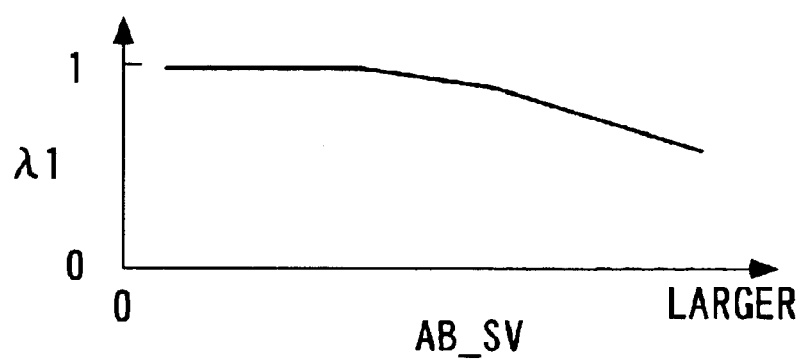
FIG. 33 shows an exemplary table for use in calculating a weighting parameter λ1.

In the table shown in FIG. 33, the weighting parameter λ1 is set to a smaller value as the exhaust gas volume AB_SV is larger. In other words, the weighting parameter λ1 is set to a larger value closer to one as the exhaust gas volume AB_SV is smaller. This setting is made for the following reason. Since the model parameters must be more rapidly identified as the exhaust gas volume AB_SV is larger, or in other words, as the engine 3 is more heavily loaded in operation, the model parameters are converged to optimal values faster by setting the weighting parameter λ1 to a smaller value. In addition, as the exhaust gas volume AB_SV is smaller, i.e., as the engine 3 is more lightly loaded in operation, the air/fuel ratio is more susceptible to fluctuations, causing the post-catalyst exhaust gas characteristic to become instable, so that a high accuracy must be ensured for the identification of the model parameters. Thus, the weighting parameter λ1 is brought closer to one (to the least square algorithm) to improve the identification accuracy for the model parameters.

Figure 34:
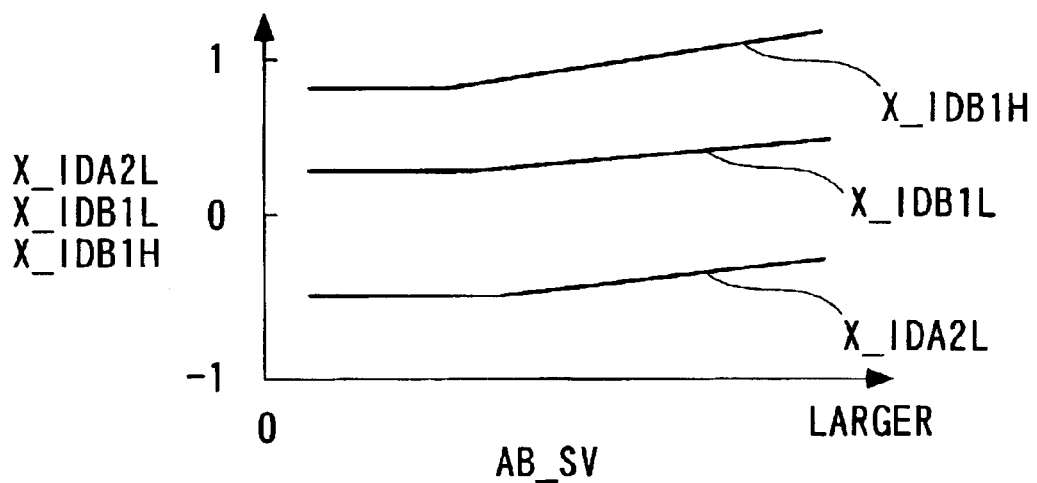
FIG. 34 shows an exemplary table for use in calculating limit values X_IDA2L, X_IDB1L, X_IDB1H for limiting ranges of model parameters a1, a2, b1.

Next, the routine proceeds to step 183, where the ECU 2 calculates a lower limit value X_IDA2L for limiting allowable ranges of the model parameters a1, a2, and a lower limit value X_IDB1L and an upper limit value X_IDB1H for limiting an allowable range of the model parameter b1 by searching a table shown in FIG. 34 in accordance with the exhaust gas volume AB_SV.

In the table shown in FIG. 34, the lower limit value X_IDA2L is set to a larger value as the exhaust gas volume AB_SV is larger. This is because an increase and/or a decrease in the dead times resulting from a change in the exhaust gas volume AB_SV causes a change in a combination of the model parameters a1, a2 which provide a stable state in the control system. Likewise, the lower limit value X_IDB1L and upper limit value X_IDB1H are set to larger values as the exhaust gas volume AB_SV is larger. This is because a pre-catalyst air/fuel ratio (air/fuel ratio of exhaust gases upstream of the first catalyzer 8*a*) affects more the output Vout of the O2 sensor 15, i.e., the gain of the controlled object becomes larger as the exhaust gas volume AB_SV is larger.

Next, the routine proceeds to step 184, where the ECU 2 calculates the filter order n of the moving average filtering processing, followed by termination of the processing. Specifically, the ECU 2 calculates the filter order n by searching a table shown in FIG. 35 in accordance with the exhaust gas volume AB_SV.

Figure 35:
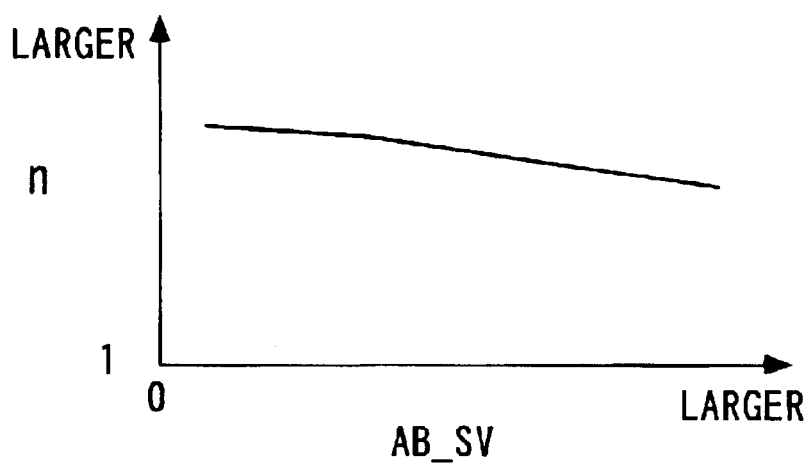
FIG. 35 shows an exemplary table for use in calculating a filter order n.

In the table shown in FIG. 35, the filter order n is set to a smaller value as the exhaust gas volume AB_SV is larger. This setting is made for the reason set forth below. As described above, a change in the exhaust gas volume AB_SV causes fluctuations in the frequency characteristic, in particular, the gain characteristic of the controlled object, so that the weighted least square algorithm must be appropriately corrected for the frequency weighting characteristic in accordance with the exhaust gas volume AB_SV for fitting the gain characteristic of the controlled object model to the actual gain characteristic of the controlled object. Therefore, by setting the filter order n of the moving average filtering processing in accordance with the exhaust gas volume AB_SV as in the table shown in FIG. 35, constant identification weighting can be ensured in the identification algorithm irrespective of a change in the exhaust gas volume AB_SV, and the controlled object model can be matched with the controlled object in the gain characteristic, thereby making it possible to improve the identification accuracy.

Figure 36:
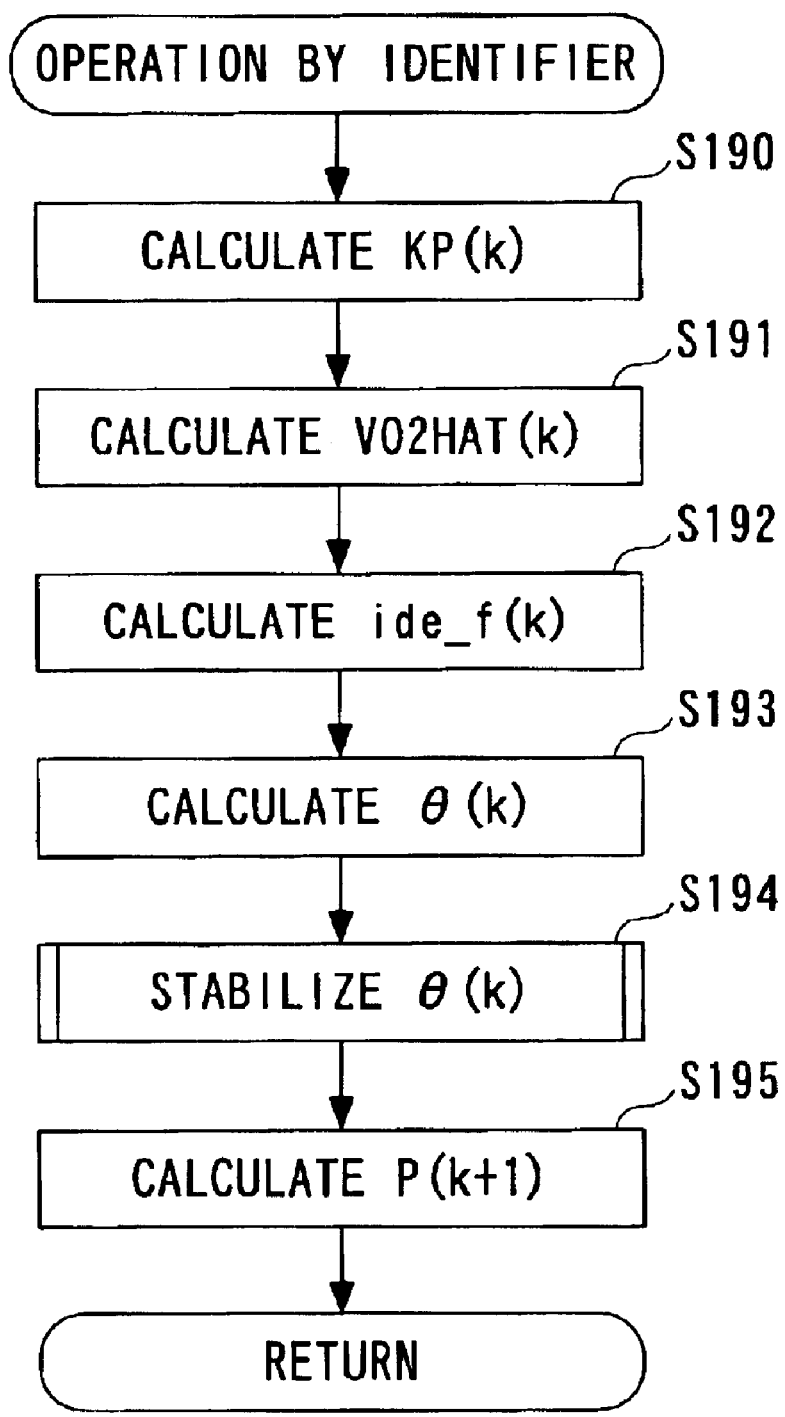
FIG. 36 is a flow chart illustrating a routine for executing the operation of the identifier at step 131 in FIG. 26.

Next, the operation performed by the on-board identifier 23 at step 131 will be described with reference to FIG. 36 which illustrates a routine for executing the processing. As illustrated in FIG. 36, in this operation, the on-board identifier 23 first calculates the gain coefficient KP(k) in accordance with the aforementioned equation (39) at step 190. Next, the routine proceeds to step 191, where the on-board identifier 23 calculates the identified value VO2HAT(k) for the output deviation VO2 in accordance with the aforementioned equation (37).

Next, the routine proceeds to step 192, where the on-board identifier 23 calculates the identification error filter value ide_f(k) in accordance with the aforementioned equations (35), (36). Next, the routine proceeds to step 193, where the on-board identifier 23 calculates the vector θ(k) for model parameters in accordance with the aforementioned equation (33), followed by the routine proceeding to step 194, where the on-board identifier 23 executes processing for stabilizing the vector θ(k) for the model parameters. The stabilization processing will be described later.

Next, the routine proceeds to step 195, where the on-board identifier 23 calculates the next value P(k+1) for the square matrix P(k) in accordance with the aforementioned equation (40). This next value P(k+1) is used as the value for the square matrix P(k) in the calculation in the next loop.

Figure 37:
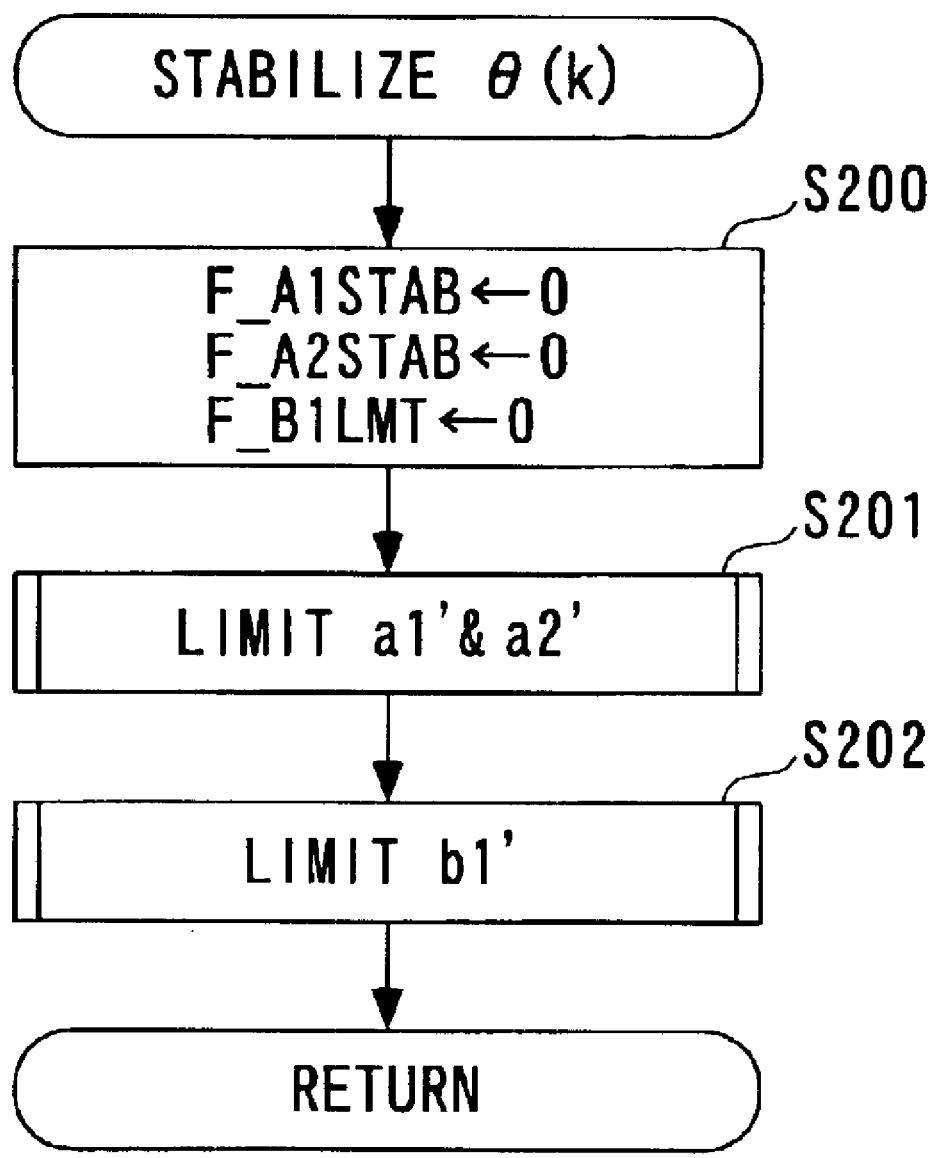
FIG. 37 is a flow chart illustrating a routine for executing θ(k) stabilization processing at step 194 in FIG. 36.

In the following, the processing for stabilizing the vector θ(k) for the model parameters at step 194 will be described with reference to FIG. 37. As illustrated in FIG. 37, the ECU 2 first sets three flags F_A1STAB, F_A2STAB, F_B1STAB to "0" at step 200.

Next, the routine proceeds to step 201, where the ECU 2 limits the identified values a1', a2', as described later. Next, at step 202, the ECU 2 limits the identified value b1', as later described, followed by termination of the processing for stabilizing the vector θ(k) for the model parameters.

In the following, the processing involved in limiting the identified values a1', a2' at step 201 will be described with reference to FIG. 38 which illustrates a routine for executing the processing. As illustrated, it is first determined at step 210 whether or not the identified value a2' for the model parameter calculated at step 193 is equal to or larger than the lower limit value X_IDA2L calculated at step 183 in FIG. 31. If the result of determination at step 210 is NO, the routine proceeds to step 211, where the ECU 2 sets the model parameter a2 to the lower limit value X_IDA2L for stabilizing the control system, and simultaneously sets the flag F_A2STAB to "1" for indicating that the stabilization has been executed for the model parameter a2. On the other hand, if the result of determination at step 210 is YES, indicating that a2'≧X_IDA2L, the routine proceeds to step 212, where the ECU 2 sets the model parameter a2 to the identified value a2'.

At step 213 subsequent to the foregoing step 211 or 212, it is determined whether or not the identified value a1' for the model parameter calculated at step 193 is equal to or larger than a predetermined lower limit value X_IDA1L (for example, a constant value equal to or larger than −2 and smaller than 0). If the result of determination at step 213 is NO, the routine proceeds to step 214, where the ECU 2 sets the model parameter a1 to the lower limit value X_IDA1L for stabilizing the control system, and simultaneously sets the flag F_A1STAB to "1" for indicating that the stabilization has been executed for the model parameter a1.

On the other hand, if the result of determination at step 213 is YES, the routine proceeds to step 215, where it is determined whether or not the identified value a1' is equal to or lower than a predetermined upper limit value X_IDA1H (for example, 2). If the result of determination at step 215 is YES, indicating that X_IDA1L≦a1'≦X_IDA1H, the routine proceeds to step 216, where the ECU 2 sets the model parameter a1 to the identified value a1'. On the other hand, if the result of determination at step 215 is NO, indicating that X_IDA1H<a1', the routine proceeds to step 217, where the ECU 2 sets the model parameter a1 to the upper limit value X_IDA1H, and simultaneously sets the flag F_A1STAB to "1" for indicating that the stabilization has been executed for the model parameter a1.

At step 218 subsequent to the foregoing steps 214, 216 or 217, it is determined whether or not the sum of the absolute value of the model parameter a1 calculated in the manner described above and the model parameter a2 (|a1|+a2) is equal to or smaller than a predetermined determination value X_A2STAB (for example, 0.9). If the result of determination at step 218 is YES, the processing for limiting the identified values a1', a2' is terminated without further processing, on the assumption that a combination of the model parameters a1, a2 is within a range (a restriction range indicated by hatchings in FIG. 39) in which the stability can be ensured for the control system.

On the other hand, if the result of determination at step 218 is NO, the routine proceeds to step 219, where it is determined whether or not the model parameter a1 is equal to or smaller than a value calculated by subtracting the lower limit value X_IDA2L from the determination value X_A2STAB (X_A2STAB-X_IDA2L). If the result of determination at step 219 is YES, the routine proceeds to step 220, where the ECU 2 sets the model parameter a2 to a value calculated by subtracting the absolute value of the model parameter a1 from the determination value X_A2STAB (X_A2STAB-|a1|), and simultaneously sets the flag F_A2STAB to "1" for indicating that the stabilization has been executed for the model parameter a2, followed by termination of the processing for limiting the identified values a1', a2'.

On the other hand, if the result of determination at step 219 is NO, indicating that a1>(X_A2STAB-X_IDA2L), the routine proceeds to step 221, where the ECU 2 sets the model parameter a1 to the value calculated by subtracting the lower limit value X_IDA2L from the determination value X_A2STAB (X_A2STAB-X_IDA2L) for stabilizing the control system, and sets the model parameter a2 to the lower limit value X_IDA2L. Simultaneously with these settings, the ECU 2 sets both flags F_A1STAB, F_A2STAB to "1" for indicating that the stabilization has been executed for the model parameters a1, a2, followed by termination of the processing for limiting the identified values a1', a2'.

As described above, in the sequential identification algorithm, when the input and output of a controlled object enter a steady state, a control system may become instable or oscillatory because a so-called drift phenomenon is more likely to occur, in which absolute values of identified model parameters increase due to a shortage of self excitation condition. Also, its stability limit varies depending on the operating condition of the engine 3. For example, during a low load operating condition, the exhaust gas volume AB_SV becomes smaller to cause an increase in a response delay, a dead time and the like of exhaust gases with respect to a supplied air/fuel mixture, resulting in a high susceptibility to an oscillatory output Vout of the O2 sensor 15.

Figure 39:
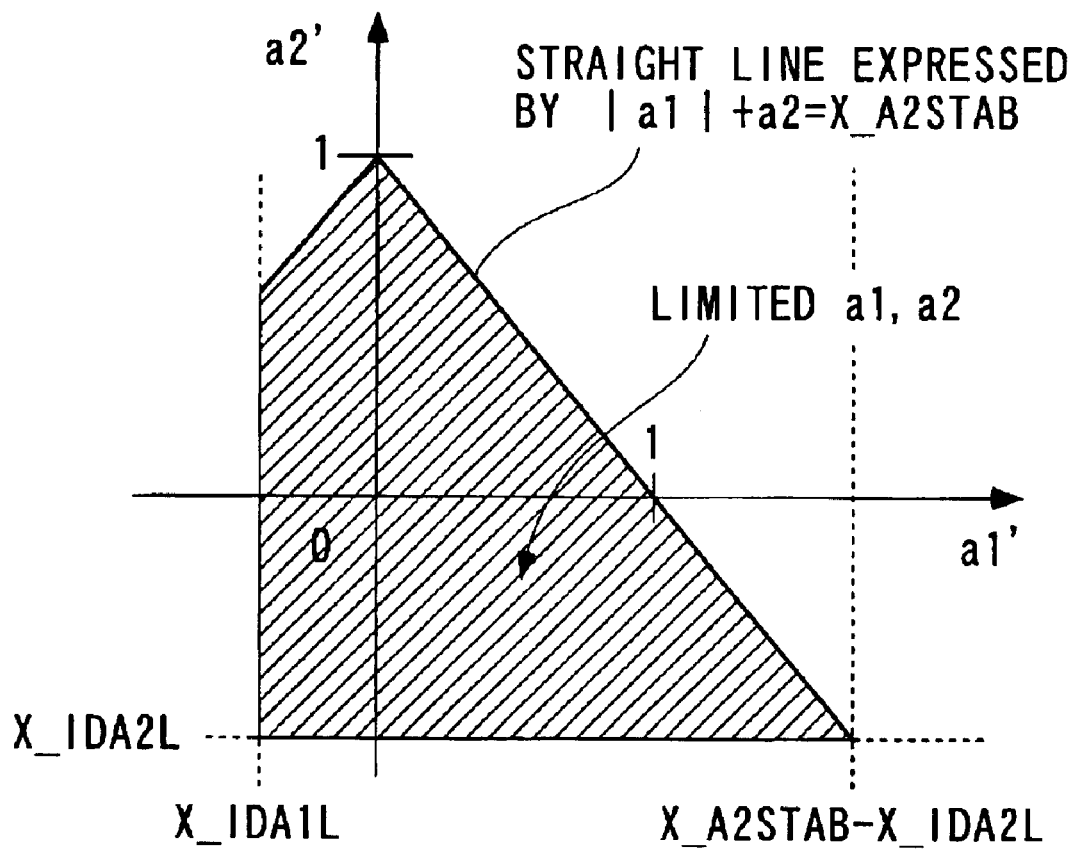
FIG. 39 is a diagram showing a restriction range in which a combination of the identified values a1' and a2' is restricted by the processing of FIG. 38.

In contrast, the foregoing a1' and a2' limit processing sets a combination of model parameters a1, a2 within the restriction range indicated by hatchings in FIG. 39, and sets the lower limit value X_IDA2L for determining this restriction range in accordance with the exhaust gas volume AB_SV, so that this restriction range can be set as an appropriate stability limit range which reflects a change in the stability limit associated with a change in the operating condition of the engine 3, i.e., a change in the dynamic characteristic of the controlled object. With the use of the model parameters a1, a2 which are restricted to fall within such a restriction range, it is possible to avoid the occurrence of the drift phenomenon to ensure the stability of the control system. In addition, by setting the combination of model parameters a1, a2 as values within the restriction range in which the stability can be ensured for the control system, it is possible to avoid an instable state of the control system which would otherwise be seen when the model parameters a1, a2 are restricted independently of each other. With the foregoing strategy, it is possible to improve the stability of the control system and the post-catalyst exhaust gas characteristic.

Next, the b1' limit processing at step 202 will be described with reference to FIG. 40 which illustrates a routine for executing this processing. As illustrated, it is determined at step 230 whether or not the identified value b1' for the model parameter calculated at step 193 is equal to or larger than the lower limit value X_IDB1L calculated at step 183 in FIG. 31.

Figure 31:
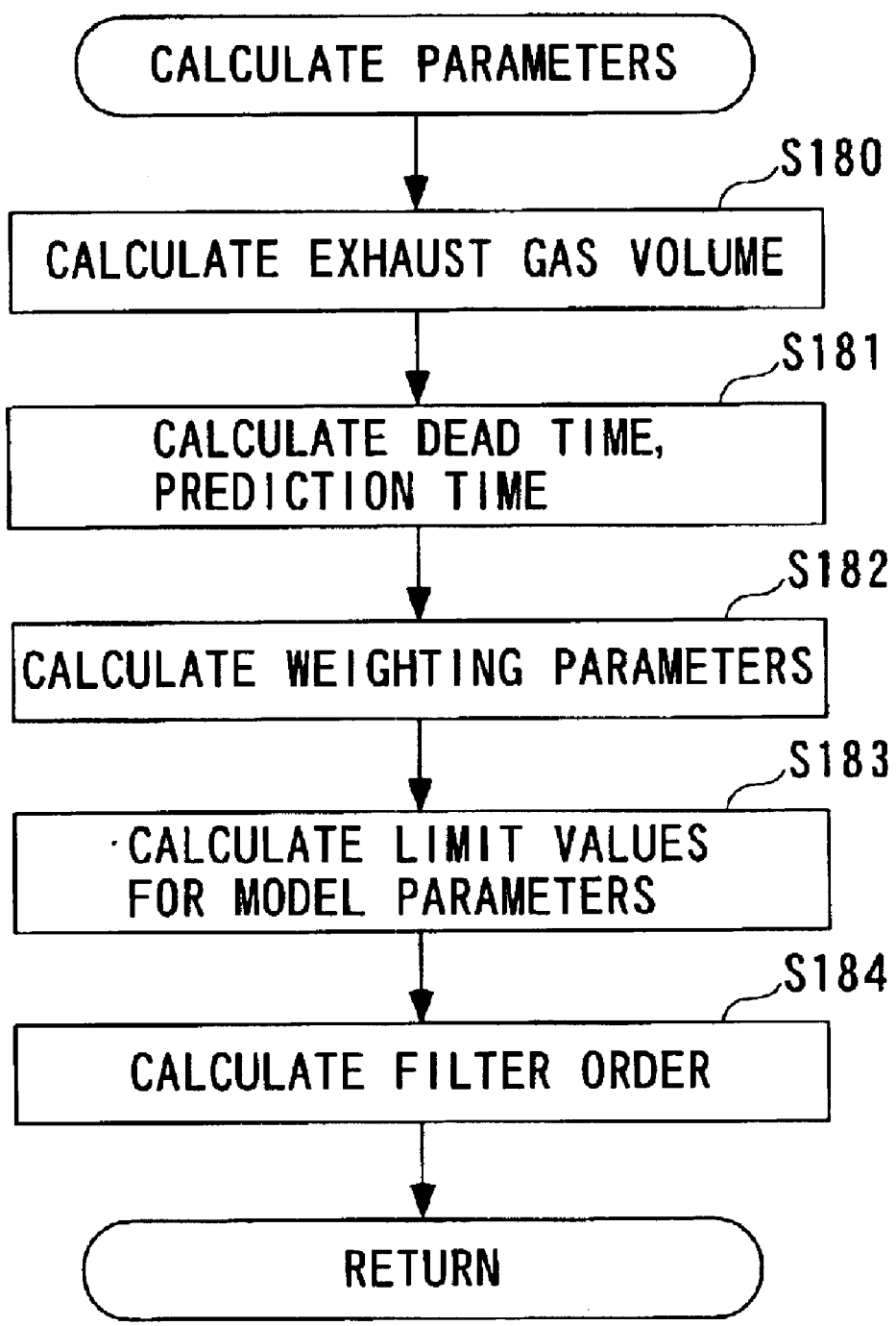
FIG. 31 is a flow chart illustrating a routine for executing the processing for calculating a variety of parameters at step 125 in FIG. 26.

If the result of determination at step 230 is YES, indicating that b1'≧X_IDB1L, the routine proceeds to step 231, where it is determined whether or not the identified value b1' for the model parameter is equal to or smaller than the upper limit value X_IDB1H calculated at step 183 in FIG. 31. If the result of determination at step 231 is YES, indicating that X_IDB1L b1' X_IDB1H, the routine proceeds to step 232, where the ECU 2 sets the model parameter b1 to the identified value b1', followed by termination of the b1' limit processing.

On the other hand, if the result of determination at step 231 is NO, indicating that b1'>X_IDB1H, the routine proceeds to step 233, where the ECU 2 sets the model parameter b1 to the upper limit value X_IDB1H, and simultaneously sets a flag F_B1LMT to "1" for indicating this setting, followed by termination of the b1' limiting processing.

On the other hand, if the result of determination at step 230 is NO, indicating that b1'<X_IDB1L, the routine proceeds to step 234, where the ECU 2 sets the model parameter b1 to the lower limit value X_IDB1L, and simultaneously sets the F_B1LMT to "1" for indicating this setting, followed by termination of the b1' limit processing.

By executing the foregoing b1' limit processing, the model parameter b1 can be restricted within the restriction range from X_IDB1L to X_IDB1H, thereby avoiding the drift phenomenon caused by the sequential identification algorithm. Further, as described above, these upper and lower limit values X_IDB1H, X_IDB1L are set in accordance with the exhaust gas volume AB_SV, so that the restriction range can be set as an appropriate stability limit range which reflects a change in the stability limit associated with a change in the operating condition of the engine 3, i.e., a change in the dynamic characteristic of the controlled object. With the use of the model parameter b1 restricted in such a restriction range, the stability can be ensured for the control system. The foregoing strategy can provide an improvement in the stability of the control system and a resulting improvement in the post-catalyst exhaust gas characteristic.

Figure 41:
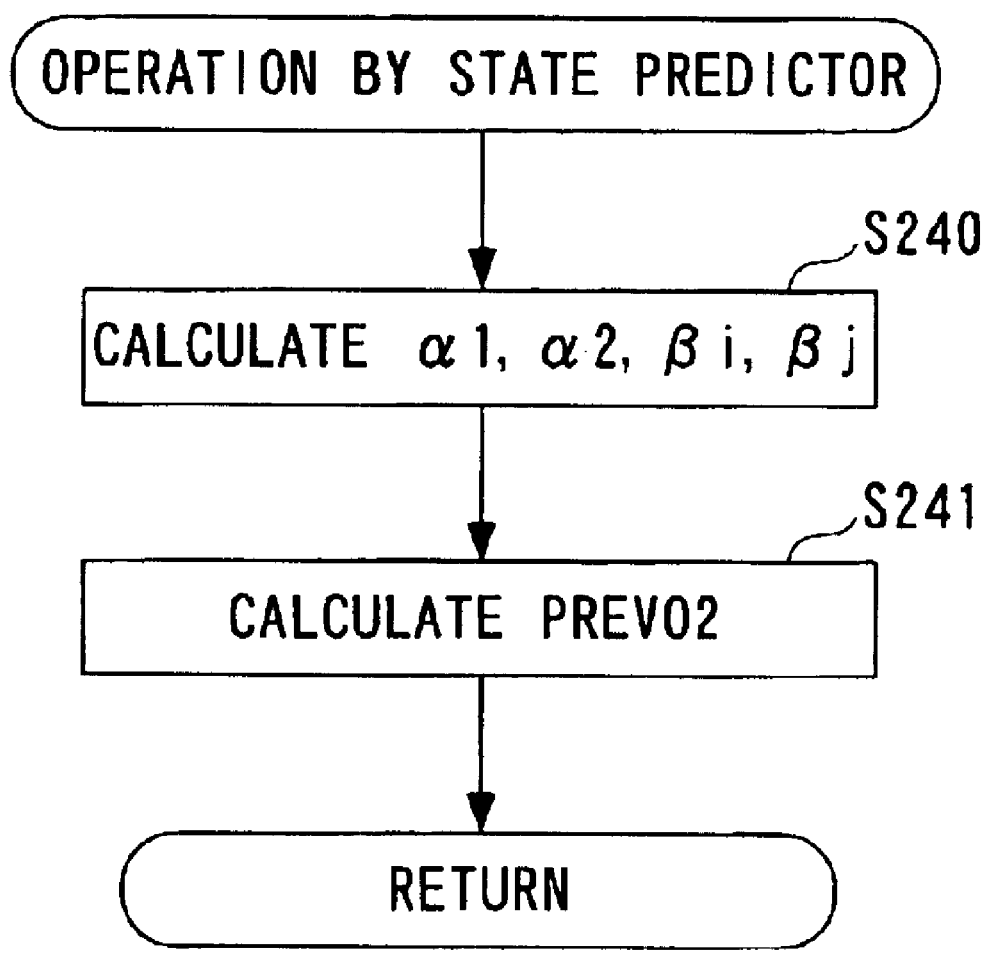
FIG. 41 is a flow chart illustrating the operation performed by the state predictor at step 133 in FIG. 27.

Next, the aforementioned operation performed by the state predictor 22 at step 133 will be described with reference to FIG. 41 which illustrates a routine for executing this processing. First, the state predictor 22 calculates matrix elements α1, α2, βi, βj in the aforementioned equation (24) at step 240. Then, the routine proceeds to step 241, where the state predictor 22 applies the matrix elements α1, α2, βi, βj calculated at step 240 to the equation (24) to calculate the predicted value PREVO 2 of the output deviation VO2, followed by termination of the processing.

Next, the aforementioned processing for calculating the control amount Usl at step 134 in FIG. 27 will be described with reference to FIG. 42 which illustrates a routine for executing this processing. First, at step 150, the ECU 2 calculates the prediction switching function σPRE in accordance with the aforementioned equation (52) in FIG. 24.

Figure 43:
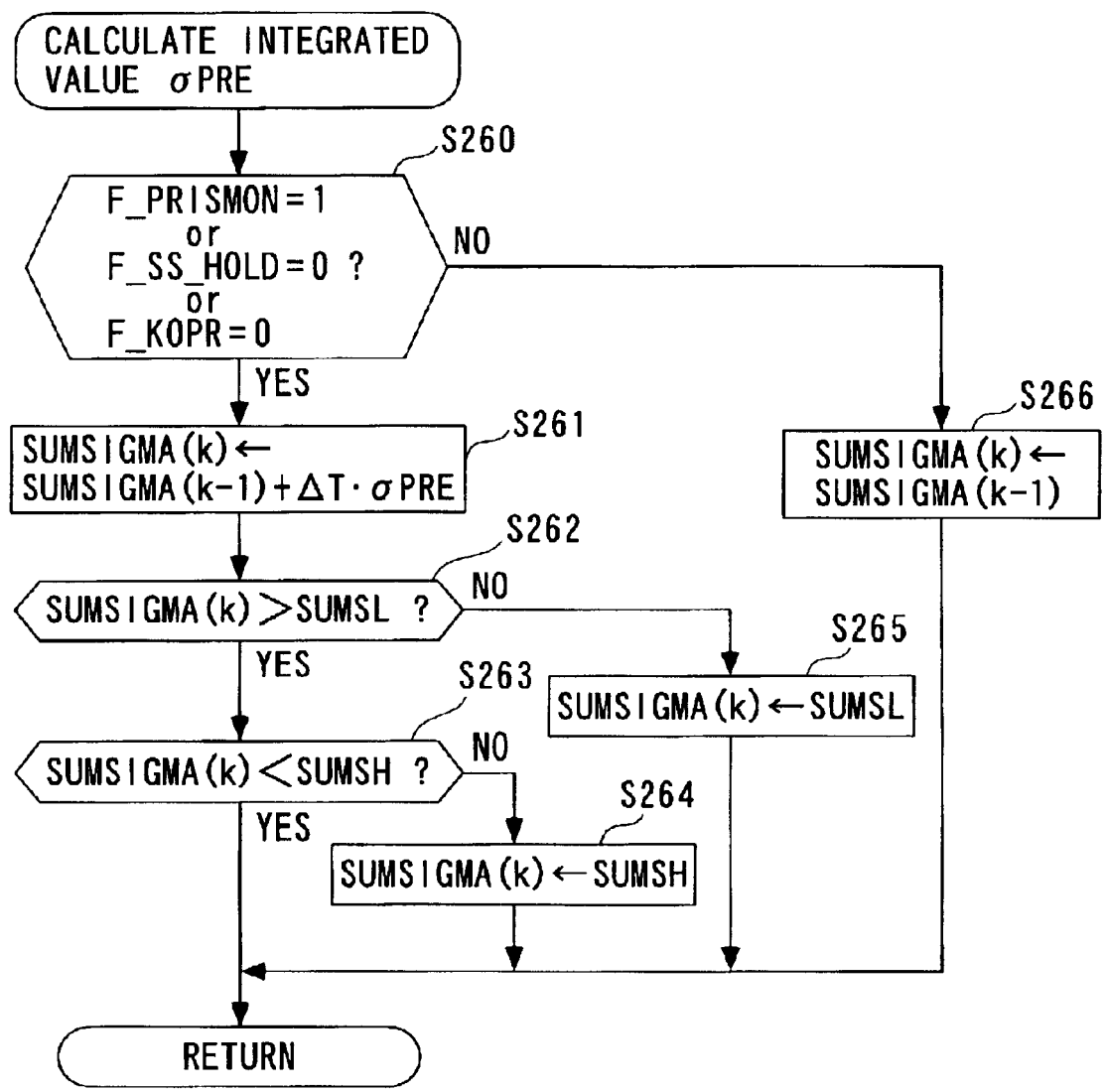
FIG. 43 is a flow chart illustrating a routine for executing the processing for calculating an integrated value of a prediction switching function σPRE at step 251 in FIG. 42.

Then, the routine proceeds to step 251, where the ECU 2 calculates an integrated value SUMSIGMA of the prediction switching function σPRE. As illustrated in FIG. 43, in the calculation of the integrated value SUMSIGMA, it is first determined at step 260 whether or not at least one of the following three conditions (f24)–(f26) is satisfied:

(f24) the adaptive control flag F_PRISMON is "1";
(f25) an integrated value holding flag F_SS_HOLD, later described, is "0"; and
(f26) an ADSM execution flag F_KOPR, later described, is "0."

If the result of determination at step 260 is YES, i.e., when the condition is satisfied for calculating the integrated value SUMSIGMA, the routine proceeds to step 261, where the ECU 2 sets a current value SUMSIGMA(k) of the integrated value SUMSIGMA to a value which is calculated by adding the product of a control period ΔT and the prediction switching function σPRE to the preceding value SUMSIGMA(k−1) [SUMSIGMA(k−1)+ΔT·σPRE].

Next, the routine proceeds to step 262, where it is determined whether or not the current value SUMSIGMA(k) calculated at step 261 is larger than a predetermined lower limit value SUMSL. If the result of determination at step 262 is YES, the routine proceeds to step 263, where it is determined whether or not the current value SUMSIGMA(k) is smaller than a predetermined upper limit value SUMSH. If the result of determination at step 263 is YES, indicating that SUMSL<SUMSIGMA(k)<SUMSH, the processing for calculating the prediction switching function σPRE is terminated without further processing.

On the other hand, if the result of determination at step 263 is NO, indicating that SUMSIGMA(k)≧SUMSH, the routine proceeds to step 264, where the ECU 2 sets the current value SUMSIGMA(k) to the upper limit value SUMSH, followed by termination of the processing for calculating the prediction switching function UPRE. On the other hand, if the result of determination at step 262 is NO, indicating SUMSIGMA(k)≦SUMSL, the routine proceeds to step 265, where the ECU 2 sets the current value SUMSIGMA(k) to the lower limit value SUMSL, followed by termination of the processing for calculating the prediction switching function σPRE.

On the other hand, if the result of determination at step 260 is NO, i.e., when none of the three conditions (f24)–(f26) is satisfied to result in a failure in satisfying the condition for calculating the integrated value SUMSIGMA, the routine proceeds to step 266, where the ECU 2 sets the current value SUMSIGMA(k) to the preceding value SUMSIGMA(k−1). In other words, the integrated value SUMSIGMA is held unchanged. Subsequently, the processing for calculating the prediction switching function APRE is terminated.

Turning back to FIG. 42, at steps 252–254 subsequent to step 251, the ECU 2 calculates the equivalent control input Ueq, reaching law input Urch, and adaptive law input Uadp in accordance with the aforementioned equations (54)–(56), respectively, in FIG. 24.

Next, the routine proceeds to step 255, where the ECU 2 sets the sum of these equivalent control input Ueq, reaching law input Urch, and adaptive law input Uadp as the control amount Usl, followed by termination of processing for calculating the control amount Usl.

Figure 44:
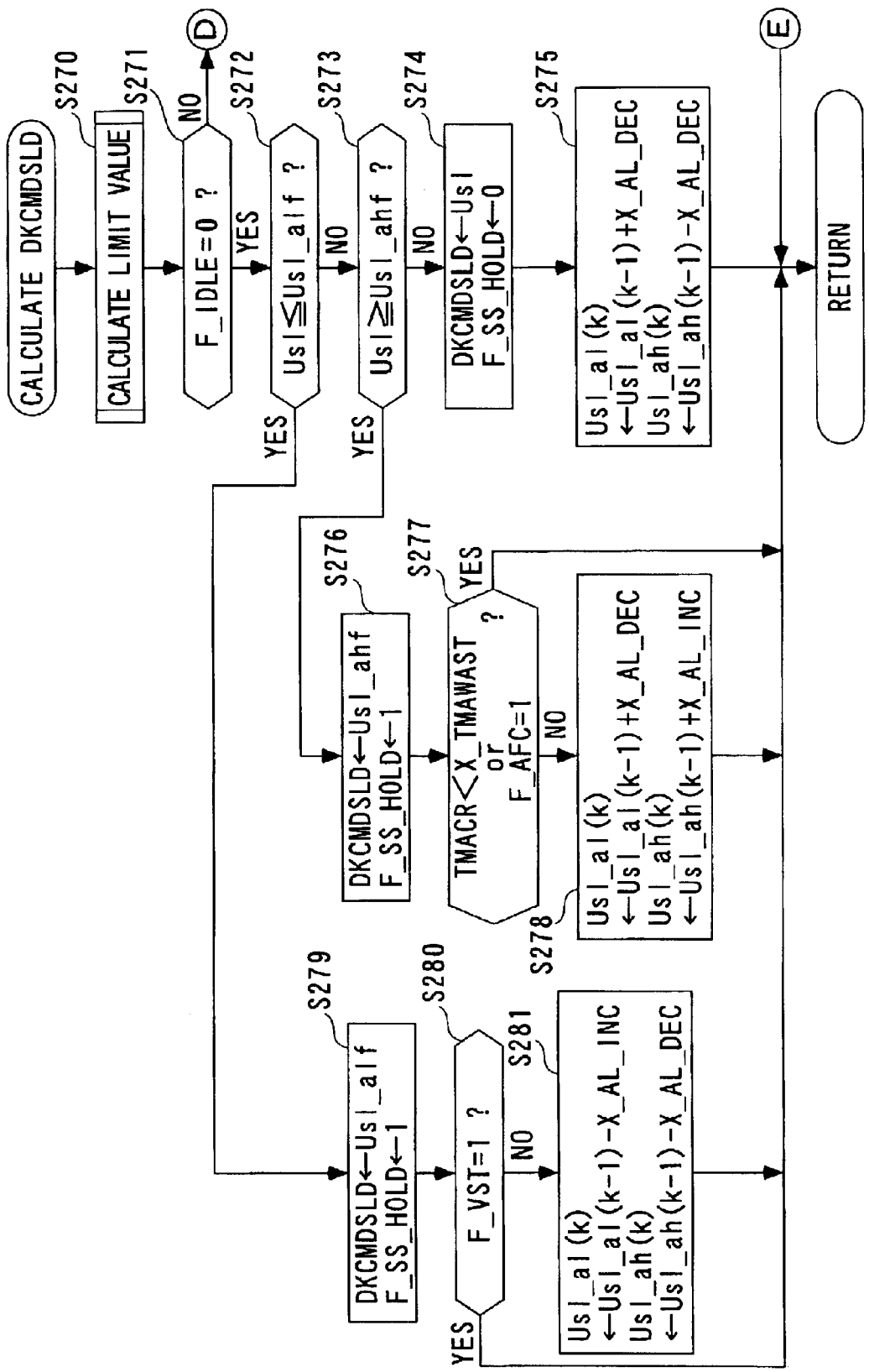
FIGS. 44 and 45 are flow charts illustrating in combination a routine for executing the processing for calculating a sliding mode control amount DKCMDSLD at step 136 in FIG. 27.

Next, the aforementioned processing for calculating the sliding mode control amount DKCMDSLD at step 136 in FIG. 27 will be described in detail with reference to FIGS. 44 and 45 which illustrate in combination a routine for executing this processing. First, at step 270, the ECU 2 executes processing for calculating a limit value for the control amount Usl. In this processing, though detailed description is omitted, the ECU 2 calculates upper and lower limit values Usl_ahf, Usl_alf for non-idle operation, as well as upper and lower limit values Usl_ahfi, Usl_alfi for idle operation, respectively, based on the result of determination for determining the stability of the controller at step 135, and adaptive upper and lower limit values Usl_ah, Usl_al, later described, for the control amount Usl.

Figure 42:
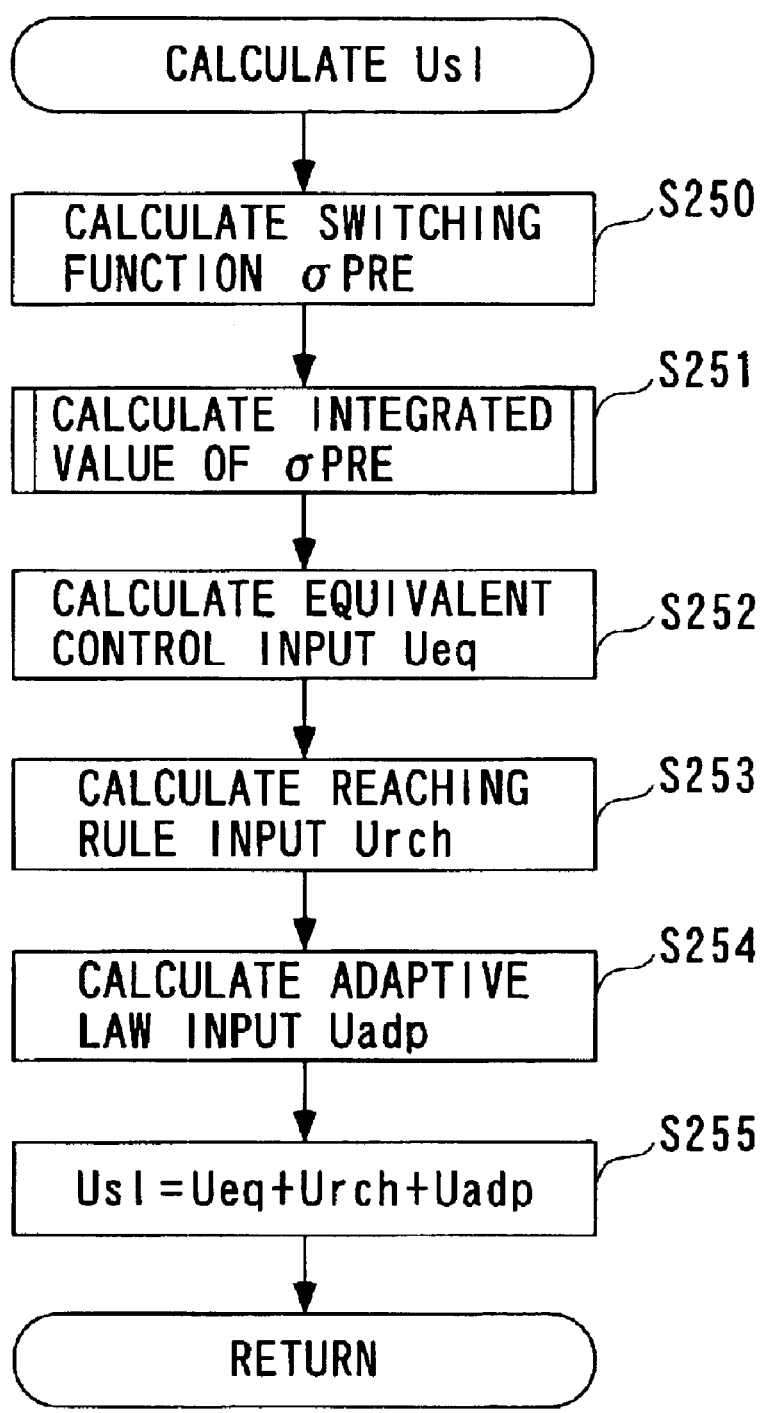
FIG. 42 is a flow chart illustrating a routine for executing the processing for calculating a control amount Us1 at step 134 in FIG. 27.

Next, the routine proceeds to step 271, where it is determined whether or not an idle operation flag F_IDLE is "0." If the result of determination at step 271 is YES, indicating that the engine 3 is not in an idle operation, the routine proceeds to step 272, where it is determined whether or not the control amount Usl calculated in the aforementioned processing of FIG. 42 is equal to or smaller than the lower limit value Usl_alf for non-idle operation.

If the result of determination at step 272 is NO, indicating that Usl>Usl_alf, the routine proceeds to step 273, where it is determined whether or not the control amount Usl is equal to or larger than the upper limit value Usl_ahf for non-idle operation. If the result of determination at step 273 is NO, indicating that Usl_alf<Usl<Usl_ahf, the routine proceeds to step 274, where the ECU 2 sets the sliding mode control amount DKCMDSLD to the control amount Usl, and simultaneously sets the integrated value holding flag F_SS_HOLD to "0."

Next, the routine proceeds to step 275, where the ECU 2 sets the current value Usl_al(k) of the adaptive lower limit value to a value [Usl_al(k−1)+X_AL_DEC] which is calculated by adding a predetermined decrement value X_AL_DEC to the preceding value Usl_al(k−1), and simultaneously sets the current value Usl_ah(k) of the adaptive upper limit value to a value which is calculated by subtracting the predetermined decrement value X_AL_DEC from the preceding value Usl_ah(k−1) [Usl_al(k−1)−X_AL_DEC], followed by termination of the processing for calculating the sliding mode control amount DKCMDSLD.

On the other hand, if the result of determination at step 273 is YES, indicating that Usl≧Usl_ahf, the routine proceeds to step 276, where the ECU 2 sets the sliding mode control amount DKCMDSLD to the adaptive upper limit value Usl_ahf for non-idle operation, and simultaneously sets the integrated value holding flag F_SS_HOLD to "1."

Next, the routine proceeds to step 277, where it is determined whether or not a post-start timer presents a timer value TMACR smaller than a predetermined time X_TMAWAST, or whether or not an post-F/C determination flag F_AFC is "1." This post-start timer is an up-count type timer for measuring a time elapsed after the start of the engine 3.

If the result of determination at step 277 is YES, i.e., when a predetermined time X_TMAWAST has not elapsed after the start of the engine 3, or when a predetermined time X_TM_AFC has not elapsed after a fuel cut operation is terminated, the processing for calculating the sliding mode control amount DKCMDSLD is terminated without further processing.

On the other hand, if the result of determination at step 277 is NO, i.e., when the predetermined time X_TMAWAST has elapsed after the start of the engine 3, and when the predetermined time X_TM_AFC has elapsed after a fuel cut operation, the routine proceeds to step 278, where the ECU 2 sets the current value Usl_al(k) of the adaptive lower limit value to a value which is calculated by adding the decrement value X_AL_DEC to the preceding value Usl_al(k−1) [Usl_al(k−1)+X_AL_DEC], and simultaneously sets the current value Usl_ah(k) of the adaptive upper limit value to a value which is calculated by adding a predetermined increment value X_AL_INC to the preceding value Usl_ah(k−1) [Usl_ah(k−1)+X_AL_INC], followed by termination of the processing for calculating the sliding mode control amount DKCMDSLD.

On the other hand, if the result of determination at step 272 is YES, indicating that Usl≦Usl_alf, the routine proceeds to step 279, where the ECU 2 sets the sliding mode control amount DKCMDSLD to the adaptive lower limit value Usl_alf for non-idle operation, and simultaneously sets the integrated value holding flag F_SS_HOLD to "1."

Next, the routine proceeds to step 280, where it is determined whether or not a second launch flag F_VST is "1." If the result of determination at step 280 is YES, i.e., when a second predetermined time TVST has not elapsed after the launch of the vehicle so that the vehicle is still in a second launch mode, the processing for calculating the sliding mode control amount DKCMDSLD is terminated without further processing.

On the other hand, if the result of determination at step 280 is NO, i.e., when the second predetermined time TVST has elapsed after the launch of the vehicle so that the second launch mode has been terminated, the routine proceeds to step 281, where the ECU 2 sets the current value Usl_al(k) of the adaptive lower limit value to a value which is calculated by subtracting the increment value X_AL_INC from the preceding value Usl_al(k−1) [Usl_al(k−1)−X_AL_INC], and simultaneously sets the current value Usl_ah(k) of the adaptive upper limit value to a value which is calculated by subtracting the decrement value X_AL_DEC from the preceding value Usl_ah(k−1) [Usl_ah(k−1)−X_AL_DEC], followed by termination of the processing for calculating the sliding mode control amount DKCMDSLD.

Figure 45:
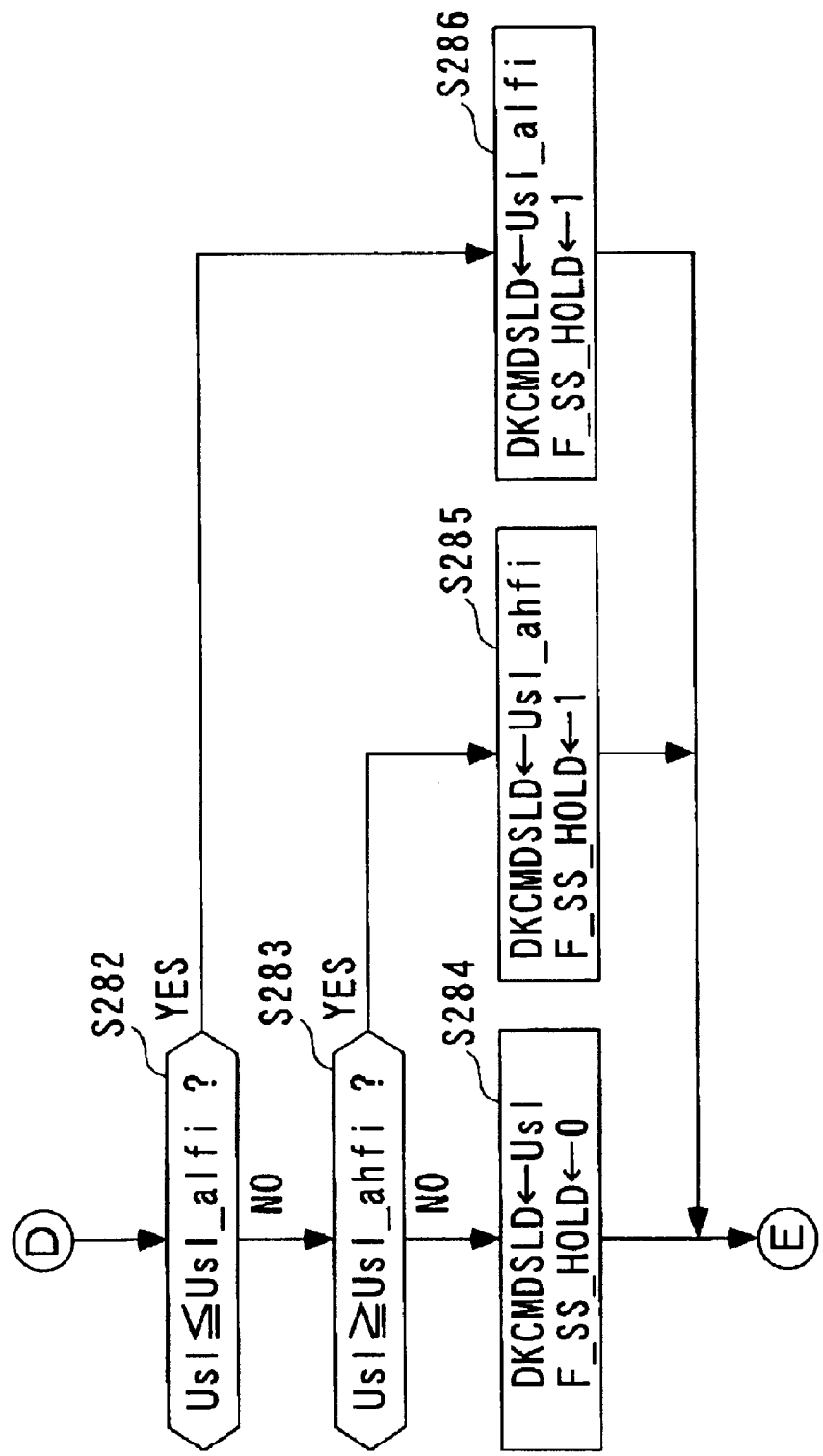

On the other hand, if the result of determination at step 271 is NO, indicating that the engine 3 is in an idle operation, the routine proceeds to step 282 in FIG. 45, where it is determined whether or not the control amount Usl is equal to or smaller than the lower limit value Usl_alfi for idle operation. If the result of determination at step 282 is NO, indicating that Usl>Usl_alfi, the routine proceeds to step 283, where it is determined whether or not the control amount Usl is equal to or larger than the upper limit value Usl_ahfi for idle operation.

If the result of determination at step 283 is NO, indicating that Usl_alfi<Usl<Usl_ahfi, the routine proceeds to step 284, where the ECU 2 sets the sliding mode control amount DKCMDSLD to the control amount Usl, and simultaneously sets the integrated value holding flag F_SS_HOLD to "0," followed by termination of the processing for calculating the sliding mode control amount DKCMDSLD.

On the other hand, if the result of determination at step 283 is YES, indicating that Usl≧Usl_ahfi, the routine proceeds to step 285, where the ECU 2 sets the sliding mode control amount DKCMDSLD to the upper limit value Usl_ahfi for idle operation, and simultaneously sets the integrated value holding flag F_SS_HOLD to "1," followed by termination of the processing for calculating the sliding mode control amount DKCMDSLD.

On the other hand, if the result of determination at step 282 is YES, indicating that Usl≦Usl_alfi, the routine proceeds to step 286, where the ECU 2 sets the sliding mode control amount DKSMDSLD to the lower limit value Usl_alfi for idle operation, and simultaneously sets the integrated value holding flag F_SS_HOLD to "1," followed by termination of the processing for calculating the sliding mode control amount DKCMDSLD.

Figure 46:
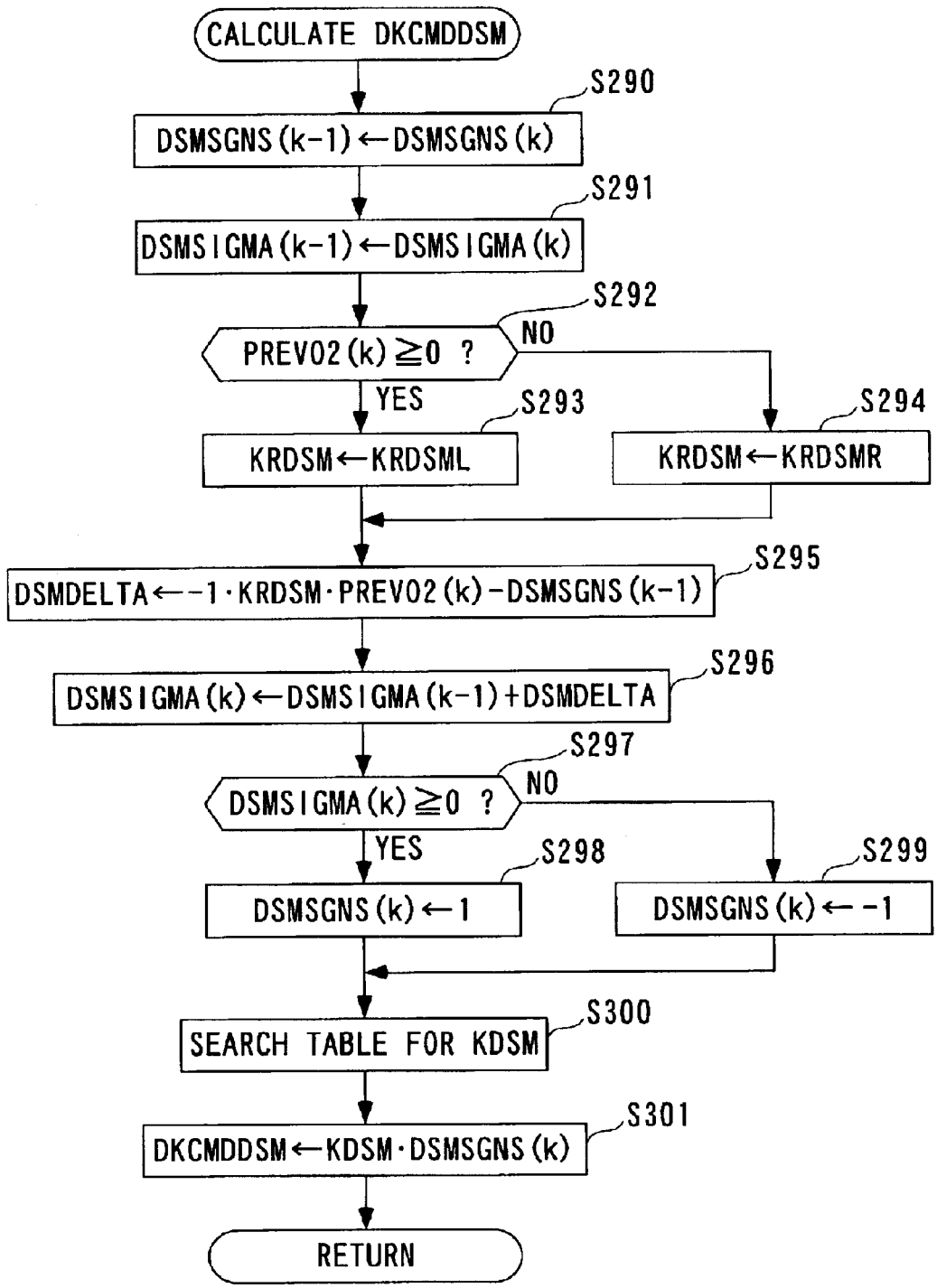
FIG. 46 is a flow chart illustrating a routine for executing the processing for calculating a ΔΣ modulation control amount DKCMDDSM at step 137 in FIG. 27.

Next, the processing for calculating the $\Delta\Sigma$ modulation control amount DKCMDDSM at step 137 in FIG. 27 will be described with reference to FIG. 46 which illustrates a routine for executing this processing. As illustrated, at step 290, the ECU 2 first sets a current value DSMSGNS(k) [=u″(k)] of a DSM signal value calculated in the preceding loop, which is stored in the RAM, as the preceding value DSMSGNS(k−1) [=u″(k−1)].

Next, the routine proceeds to step 291, where the ECU 2 sets a current value DSMSIGMA(k) [=$\sigma_d$(k)] of a deviation integrated value calculated in the preceding loop and stored in the RAM as the preceding value DSMSIGMA(k−1) [=$\sigma_d$(k−1)].

Next, the routine proceeds to step 292, where it is determined whether or not the predicted value PREVO2(k) of the output deviation is equal to or larger than zero. If the result of determination at step 292 is YES, the routine proceeds to step 293, where a gain KRDSM (=$G_d$) for reference signal value is set to a leaning coefficient KRDSML, on the assumption that the engine 3 is in an operating condition in which the air/fuel ratio of the air-fuel mixture should be changed to be leaner. Then, the routine proceeds to step 295, later described.

On the other hand, if the result of determination at step 292 is NO, the routine proceeds to step 294, where the gain KRDSM for reference signal value is set to an enriching coefficient KRDSMR, larger than the leaning coefficient KRDSML, on the assumption that the engine 3 is in an operating condition in which the air/fuel ratio of the air-fuel mixture should be changed to be richer. Then, the routine proceeds to step 295.

The leaning coefficient KRDSML and the enriching coefficient KRDSMR are set to values different from each other, as described above, for the reason set forth below. For changing the air/fuel ratio of the air/fuel mixture to be leaner, the leaning coefficient KRDSML is set to a value smaller than the enriching coefficient KRDSMR for effectively suppressing the amount of exhausted NOx by lean biasing to ensure an NOx purification percentage of the first catalyzer 8a. Thus, the air/fuel ratio is controlled such that the output Vout of the O2 sensor 15 converges to the target value Vop slower than when the air/fuel ratio is changed to be richer. On the other hand, for changing the air/fuel ratio of the air/fuel mixture to be richer, the enriching coefficient KRDSMR is set to a value larger than the leaning coefficient KRDSML for sufficiently recovering the NOx purification percentage of the first and second catalyzers 8a, 8b. Thus, the air/fuel ratio is controlled such that the output Vout of the O2 sensor 15 converges to the target value Vop faster than when the air/fuel ratio is changed to be leaner. In the foregoing manner, a satisfactory post-catalyst exhaust gas characteristic can be ensured whenever the air/fuel ratio of the air/fuel mixture is changed to be either leaner or richer.

At step 295 subsequent to step 293 or 294, the ECU 2 sets a value calculated by subtracting the preceding value DSMSGNS(k−1) of the DSM signal value calculated at the aforementioned step 290 from the product of a value of −1, the gain KRDSM for reference signal value, and the current value PREVO2(k) of the predicted value [−1·KRDSM·PREVO2(k)−DSMSGNS(k−1)] as a deviation signal value DSMDELTA [=δ(k)]. This setting corresponds to the aforementioned equations (41), (42).

Next, the routine proceeds to step 296, where the ECU 2 sets the current value DSMSIGMA(k) of the deviation integrated value to the sum of the preceding value DSMSIGMA(k−1) calculated at step 291 and the deviation signal value DSMDELTA calculated at step 295 [DSMSIGMA(k−1)+DSMDELTA]. This setting corresponds to the aforementioned equation (43).

Next, in a sequence of steps 297–299, the ECU 2 sets the current value DSMSGNS(k) of the DSM signal value to 1 when the current value DSMSIGMA(k) of the deviation integrated value calculated at step 296 is equal to or larger than 0, and sets the current value DSMSGNS(k) of the DSM signal value to −1 when the current value DSMSIGMA(k) of the deviation integrated value is smaller than 0. The setting in this sequence of steps 297–299 corresponds to the aforementioned equation (44).

Figure 47:
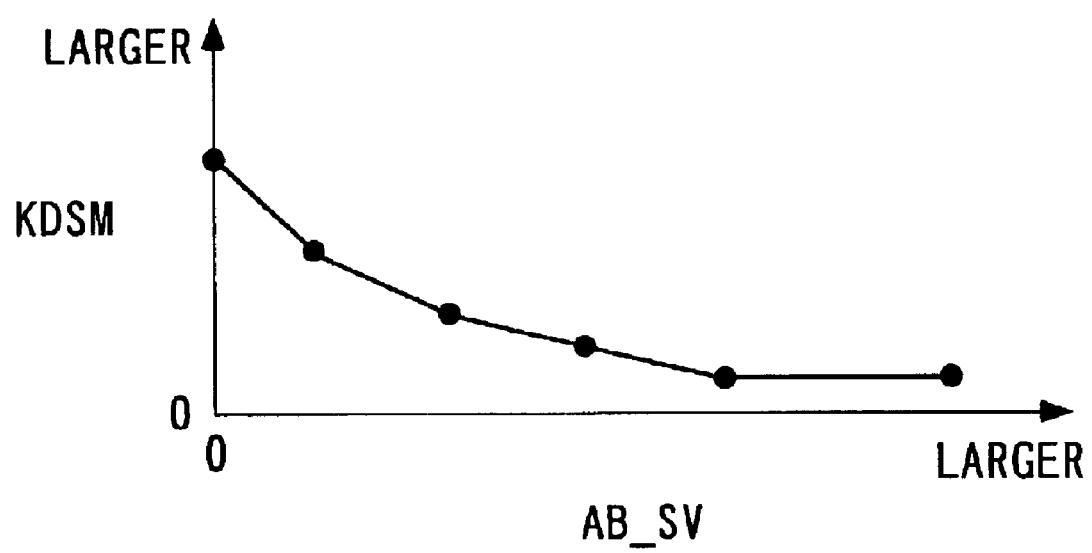
FIG. 47 shows an exemplary table for use in calculating a gain KDSM.

Next, the ECU 2 calculates a gain KDSM (=$F_d$) for the DSM signal value at step 300 by searching a table shown in FIG. 47 in accordance with the exhaust gas volume AB_SV. As shown in FIG. 47, the gain KDSM is set to a larger value as the exhaust gas volume AB_SV is smaller. This is because the responsibility of the output Vout of the O2 sensor 15 is degraded as the exhaust gas volume AB_SV is smaller, i.e., as the engine 3 is operating with a smaller load, so that the gain KDSM is set larger to compensate for the degraded responsibility of the output Vout. By thus setting the gain KSDM, the ΔΣ modulation control amount DKCMDDSM can be appropriately calculated in accordance with an operating condition of the engine 3, while avoiding, for example, an over-gain state, thereby making it possible to improve the post-catalyst exhaust gas characteristic.
0303–0315

The table for use in the calculation of the gain KDSM is not limited to the table of FIG. 47 which sets the gain KDSM in accordance with the exhaust gas volume AB_SV, but any table may be used instead as long as it previously sets the gain KDSM in accordance with a parameter indicative of an operating load of the engine 3 (for example, a basic fuel injection time Tim). Also, when a deterioration determining unit is provided for the catalyzers 8a, 8b, the gain DSM may be corrected to a smaller value as the catalyzers 8a, 8b are deteriorated to a higher degree, as determined by the deterioration determining unit. Further, the gain KDSM may be determined in accordance with the model parameters identified by the on-board identifier 23. For example, the gain KDSM may be set to a larger value as the inverse of the model parameter b1 (1/b1) is larger, in other words, as the model parameter b1 is smaller.

Next, the routine proceeds to step 301, where the ECU 2 sets the ΔΣ modulation control amount DKCMDDSM to the product of the gain KDSM for DSM signal value and the current value DSMSGNS(k) of the DSM signal value [KDSM·DSMSGNS(k)], followed by termination of the processing for calculating the sliding mode control amount DKCMDSLD. The setting at step 301 corresponds to the aforementioned equation (45).

Next, the aforementioned processing for calculating the adaptive target air/fuel ratio KCMDSLD at step 138 in FIG. 27 will be described with reference to FIG. 48 which illustrates a routine for executing this processing. As illustrated, it is first determined at step 310 whether or not the idle operation flag F_IDLE is "1" and whether or not an idle time ADSM execution flag F_SWOPRI is "1." The idle time ADSM execution flag F_SWOPRI is set to "1" when the engine 3 is idling in an operating condition in which the ADSM processing should be executed, and otherwise to "0."

If the result of determination at step 310 is YES, i.e., when the engine 3 is idling in an operating condition in which the adaptive target air/fuel ratio KCMDSLD should be calculated by the ADSM processing, the routine proceeds to step 311, where the ECU 2 sets the adaptive target air/fuel ratio KCMDSLD to the sum of the reference value FLAFBASE and the ΔΣ modulation control amount DKCMDDSM [FLAFBASE+DKCMDDSM]. This setting corresponds to the aforementioned equation (46).

Next, the routine proceeds to step 312, where the ECU 2 sets an ADSM execution end flag F_KOPR to "1" for indicating that the ADSM processing has been executed, followed by termination of the processing for calculating the adaptive target air/fuel ratio KCMDSLD.
0308

On the other hand, if the result of determination at step 310 is NO, the routine proceeds to step 313, where it is determined whether or not a catalyst/O2 sensor flag F_FCATDSM is "1." This catalyst/O2 sensor flag F_FCATDSM is set to "1" when at least one of the four following conditions (f27)–(f30) is satisfied, and otherwise to "0":

(f27) the first catalyzer 8a has a carrier, the length of which is equal to or larger than a predetermined value L1 in a direction in which the exhaust pipe 7 extends;

(f28) the first catalyzer 8a has a total amount of non-metal catalyst and metal catalyst loaded therein equal to or larger than a predetermined load amount M1;

(f29) the LAF sensor 14 is not provided in the exhaust pipe 7 of the engine 3; and (f30) the O2 sensor 15 is provided downstream of the most downstream catalyzer (the second catalyzer 8b in the second embodiment).

If the result of determination at step 313 is YES, the routine proceeds to step 314, where it is determined whether or not a first launch flag F_VOTVST and a launch ADSM execution flag F_SWOPRVST are both "1." The launch ADSM execution flag F_SWOPRVST is set to "1" when the engine 3 is in the first launch mode in which the engine 3 is in an operation mode in which the engine 3 should execute the ADSM processing, and otherwise to "0."

If the result of the determination at step 314 is YES, i.e., when the engine 3 is in the first launch mode in which the engine 3 is in an operation mode in which the engine 3 should execute the ADSM processing, the ECU 2 executes steps 311, 312, in the manner described above, followed by termination of the processing for calculating the adaptive target air/fuel ratio KCMDSLD.

On the other hand, if the result of determination at step 314 is NO, the routine proceeds to step 315, where it is determined whether or not the following conditions are both satisfied: the exhaust gas volume AB_SV is equal to or smaller than a predetermined value OPRSVH, and a small-exhaust-period ADSM execution flag F_SWOPRSV is "1." The small-exhaust-period ADSM execution flag F_SWOPRSV is set to "1" when the engine 3 has a small exhaust gas volume AB_SV (a small load) and when the engine 3 is in an operating condition in which the ADSM processing should be executed, and otherwise to "0."

If the result of determination at step 315 is YES, i.e., when the exhaust gas volume AB_SV is small and when the engine 3 is in an operating condition in which the ADSM processing should be executed, the ECU 2 executes steps 311, 312 in the manner described above, followed by termination of the processing for calculating the adaptive target air/fuel ratio KCMDSLD.

0313

On the other hand, if the result of determination at step 315 is NO, the routine proceeds to step 316, where it is determined whether or not a difference ΔAB_SV between the current value and previous value of the exhaust gas volume AB_SV is equal to or larger than a predetermined value ΔAB_SVREF. If the result of determination at step 315 is YES, i.e., when the engine 3 is in a transient operation mode in which the load is largely fluctuating, the ECU 2 executes steps 311, 312 in the manner described above, determining that the ADSM processing should be executed, followed by termination of the processing for calculating the adaptive target air/fuel ratio KCMDSLD.

On the other hand, if the result of determination at step 316 is NO, i.e., when the engine 3 is not lightly loaded in an operation mode including a steady-state operation mode in which fluctuations in load are relatively small, the routine proceeds to step 317, determining that the PRISM processing should be executed, where the ECU 2 sets the adaptive target air/fuel ratio KCMDSLD to the sum of the reference value FLAFBASE, the adaptive correction term FLAFADP, and the sliding mode control amount DKCMDSLD [FLAFBASE+FLAFADP+DKCMDSLD]. Next, the routine proceeds to step 318, where the ECU 2 sets the ADSM execution end flag F_KOPR to "0" for indicating that the PRISM processing has been executed, followed by termination of the processing for calculating the adaptive target air/fuel ratio KCMDSLD.

On the other hand, if the result of determination at step 313 is NO, i.e., when any of the aforementioned four conditions (f27)–(f30) is not satisfied, the ECU 2 skips steps 314–316, and executes the aforementioned steps 317, 318, followed by termination of the processing for calculating the adaptive target air/fuel ratio KCMDSLD. In this event, the result of determination at step 313 is NO when the catalyst of the first catalyzer 8a has a carrier, the length of which is less than the predetermine length L1, or when the total amount of non-metal catalyst and metal catalyst loaded in the first catalyzer 8a is less than the predetermined load amount M1, when the catalyzers 8a, 8b, LAF sensor 14 and O2 sensor 15 are all disposed as in the second embodiment.

In the foregoing manner, in the processing for calculating the adaptive target air/fuel ratio KCMDSLD, the ECU 2 calculates the adaptive target air/fuel ratio KCMDSLD for the ADSM processing or PRISM processing, switched in accordance with an operation mode of the engine 3. More specifically, the adaptive target air/fuel ratio KCMDSLD, i.e., the target air/fuel ratio KCMD is calculated in accordance with the ADSM processing irrespective of the arrangement of the catalyzers 8a, 8b, LAF sensor 14, and O2 sensor 15, the length of the carrier of the first catalyzer 8a, and the total amount of loaded catalysts. This is attributed to the following reason. When the target air/fuel ratio KCMD is calculated in accordance with the PRISM processing in an extremely low load operation mode such as an idle operation mode in which the exhaust gas volume AB_SV is reduced to increase an operation delay and a dead time of the O2 sensor 15 and to narrow down the range of air/fuel ratio in which a stable combustion state can be ensured for the engine, the output Vout of the O2 sensor 15 slowly converges to the target value Vop. On the other hand, the target air/fuel ratio KCMD, when calculated in accordance with the ADSM processing, is derived such that the output Vout of the O2 sensor 15 is generated to provide an output deviation having the opposite phase waveform to the output deviation VO2 so as to cancel the same. Thus, the ADSM processing is free from the problem which would be experienced by the PRISM processing, thereby making it possible to ensure more satisfactory convergence of the output Vout of the O2 sensor 15 to the target value Vop than the PRISM processing. As such, in the second embodiment, the target air/fuel ratio KCDM is calculated in accordance with the ADSM processing in the idle operation mode, whereby the output Vout of the O2 sensor 15 can be rapidly converged to the target value Vop to ensure a satisfactory post-catalyst exhaust gas characteristic.

Also, with devices such as the catalyzers 8a, 8b, LAF sensor 14, O2 sensor 15, and the like disposed as in the second embodiment, the target air/fuel ratio KCMD is calculated in accordance with the PRISM processing when the carrier of the first catalyzer 8a has the length smaller than the predetermined length L1, or when the total amount of non-metal catalyst and metal catalyst loaded in the first catalyzer 8a is smaller than the predetermined load amount M1. This is because the output Vout of the O2 sensor presents a smaller response delay, dead time, and the like with respect to exhaust gases supplied to the first catalyzer 8a as the first catalyzer 8a disposed upstream of the O2 sensor 15 has a less total amount of catalysts loaded therein or has a less length of the carrier for carrying the catalysts. Therefore, the output Vout of the O2 sensor 15 can be more rapidly converged to the target value Vop when the target air/fuel ratio KCMD is calculated in accordance with the PRISM processing than when it is calculated in accordance with the ADSM processing. As such, when the carrier of the first catalyst 8a has the length less than the predetermined length L1, or when the total amount of non-metal catalyst and metal catalyst loaded in the first catalyzer 8a is less than the predetermined load amount M1, i.e., in an arrangement different from that in the second embodiment, the target air/fuel ratio KCMD is calculated in accordance with the PRISM processing, thereby making it possible to more rapidly converge the output Vout of the O2 sensor 15 to the target value Vop.

Further, with the respective devices arranged as in the second embodiment, with the carrier of the first catalyst 8a having the length equal to or larger than the predetermined length L1, or with the total amount of non-metal catalyst and metal catalyst loaded in the first catalyzer 8a equal to or larger than the predetermined load amount M1, the target air/fuel ratio KCMD is calculated in accordance with the ADSM processing when the engine 3 is in the first launch mode, in a low load operation mode in which the exhaust gas volume AB_SV is smaller than a predetermined value, or in a transient operation mode in which the load largely fluctuates. The employment of the ADSM processing in this event is justified as follows. Under the aforementioned condition, the responsibility of the target air/fuel ratio KCMD to the air/fuel ratio of exhaust gases supplied to the first catalyzer 8a is degraded by disturbance (for example, a fluctuating load, switching of the valve timing, ON/OFF operation of the EGR valve, and the like) in the launch mode, low load operation mode, and transient operation mode, so that the output Vout of the O2 sensor 15 can be more rapidly converged to the target value Vop when the target air/fuel ratio KCMD is calculated in accordance with the ADSM processing than when it is calculated in accordance with the PRISM processing. In the second embodiment, therefore, since the first catalyzer 8a has the carrier, the length of which is equal to or larger than the predetermined length L1, with the total amount of non-metal catalyst and metal catalyst loaded in the first catalyzer 8a equal to or larger than the predetermined load amount M1, the target air/fuel ratio KCMD is calculated in accordance with the ADSM processing, thereby making it possible to more rapidly converge the output Vout of the O2 sensor 15 to the target value Vop.

Figure 49:
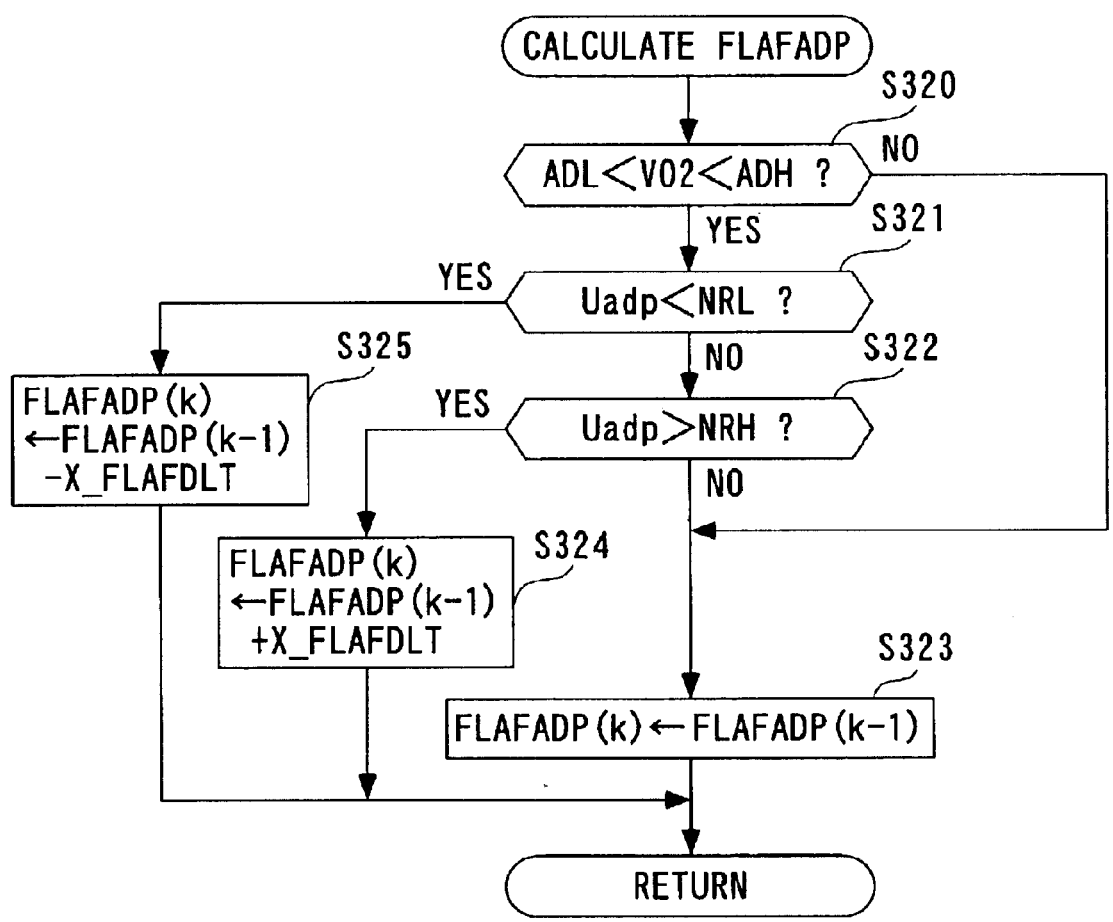
FIG. 49 is a flow chart illustrating a routine for executing the processing for calculating an adaptive correction term FLAFADP at step 139 in FIG. 27.

Next, the processing for calculating the adaptive correction term FLAFADP at step 139 in FIG. 27 will be described with reference to FIG. 49 which illustrates a routine for executing this processing. As illustrated in FIG. 49, it is first determined at step 320 whether or not the output deviation VO2 is within a predetermined range (ADL<VO2<ADH). If the result of determination at step 320 is YES, i.e., when the output deviation VO2 is small so that the output Vout of the O2 sensor 15 is near the target value Vop, the routine proceeds to step 321, where it is determined whether or not the adaptive law input Uadp is smaller than a predetermined lower limit value NRL.

If the result of determination at step 321 is NO, indicating that Uadp≧NRL, the routine proceeds to step 322, where it is determined whether or not the adaptive law input Uadp is larger than a predetermined upper limit value NRH. If the result of determination at step 322 is NO, indicating that NRL≦≦Uadp≦NRH, the routine proceeds to step 323, where the ECU 2 sets the current value FLAFADP(k) of the adaptive correction term to the preceding value FLAFADP(k−1). In other words, the current value of the adaptive correction term FLAFADP is held. Then, the processing for calculating the adaptive correction term FLAFADP is terminated.

On the other hand, if the result of determination at step 322 is YES, indicating that Uadp>NRH, the routine proceeds to step 324, where the ECU 2 sets the current value FLAFADP(k) of the adaptive correction term to the sum of the preceding value FLAFADP(k−1) and a predetermined update value X_FLAFDLT [FLAFADP(k−1)+X_FLAFDLT], followed by termination of the processing for calculating the adaptive correction term FLAFADP.

On the other hand, if the result of determination at step 321 is YES, indicating that Uadp<NRL, the routine proceeds to step 325, where the ECU 2 sets the current value FLAFADP(k) of the adaptive correction term to a value calculated by subtracting the predetermined update value X_FLAFDLT from the preceding value FLAFADP(k−1) [FLAFADP(k−1)−X_FLAFDLT], followed by termination of the processing for calculating the adaptive correction term FLAFADP.

As described above, the control apparatus 201 according to the second embodiment can appropriately eliminate a slippage in control timing between the input and output of a controlled object which has the target air/fuel ratio KCMD as a control input and the output Vout of the O2 sensor 15 as the output, and exhibits the dynamic characteristic with relatively large phase delay, dead time and the like, thereby making it possible to improve the stability and controllability of the control and accordingly improve the post-catalyst exhaust gas characteristic.

In the following, control apparatuses according to a third through a ninth embodiment of the present invention will be described with reference to FIGS. 50–58. In the following description on the respective embodiments, components identical or equivalent to those in the second embodiment are designated the same reference numerals, and description thereon will be omitted as appropriate.

Figure 50:
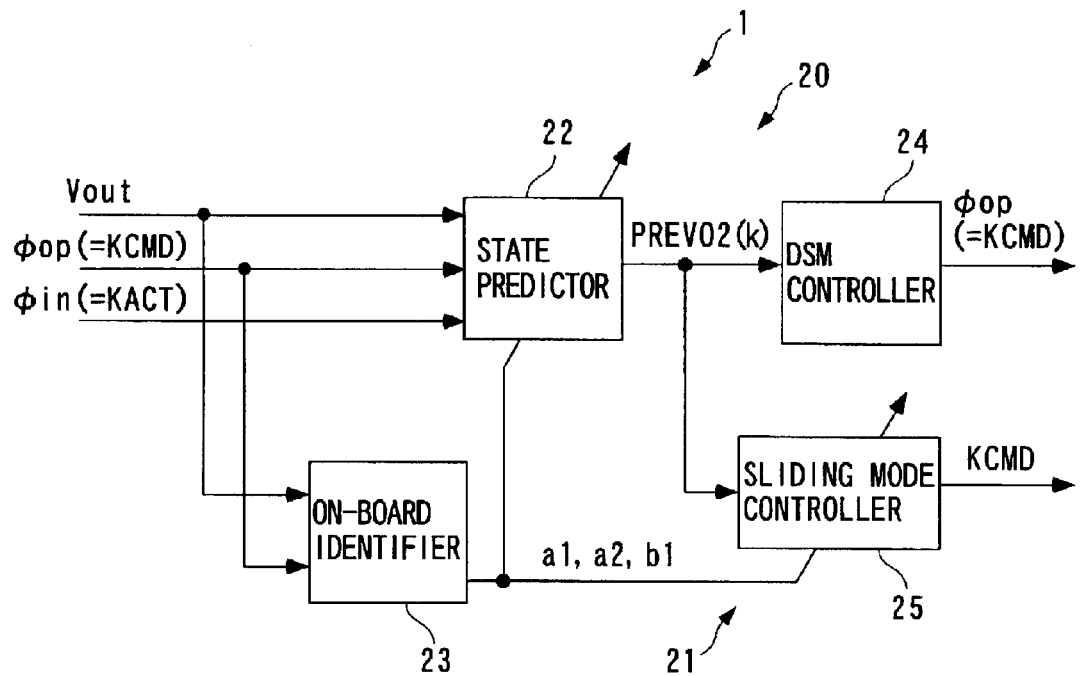
FIG. 50 is a block diagram generally illustrating the configuration of a control apparatus according to a third embodiment.

First, a control apparatus according to a third embodiment will be described with reference to FIG. 50. As illustrated in FIG. 50, the control apparatus 301 in the third embodiment differs from the control apparatus 201 in the second embodiment only in the on-board identifier 23. Specifically, the on-board identifier 23 in the second embodiment calculates the model parameters a1, a2, b1 based on KACT, Vout, and φop(KCMD), whereas the on-board identifier 23 in the third embodiment calculates the model parameters a1, a2, b1 based on Vout and φop.

Figure 38:
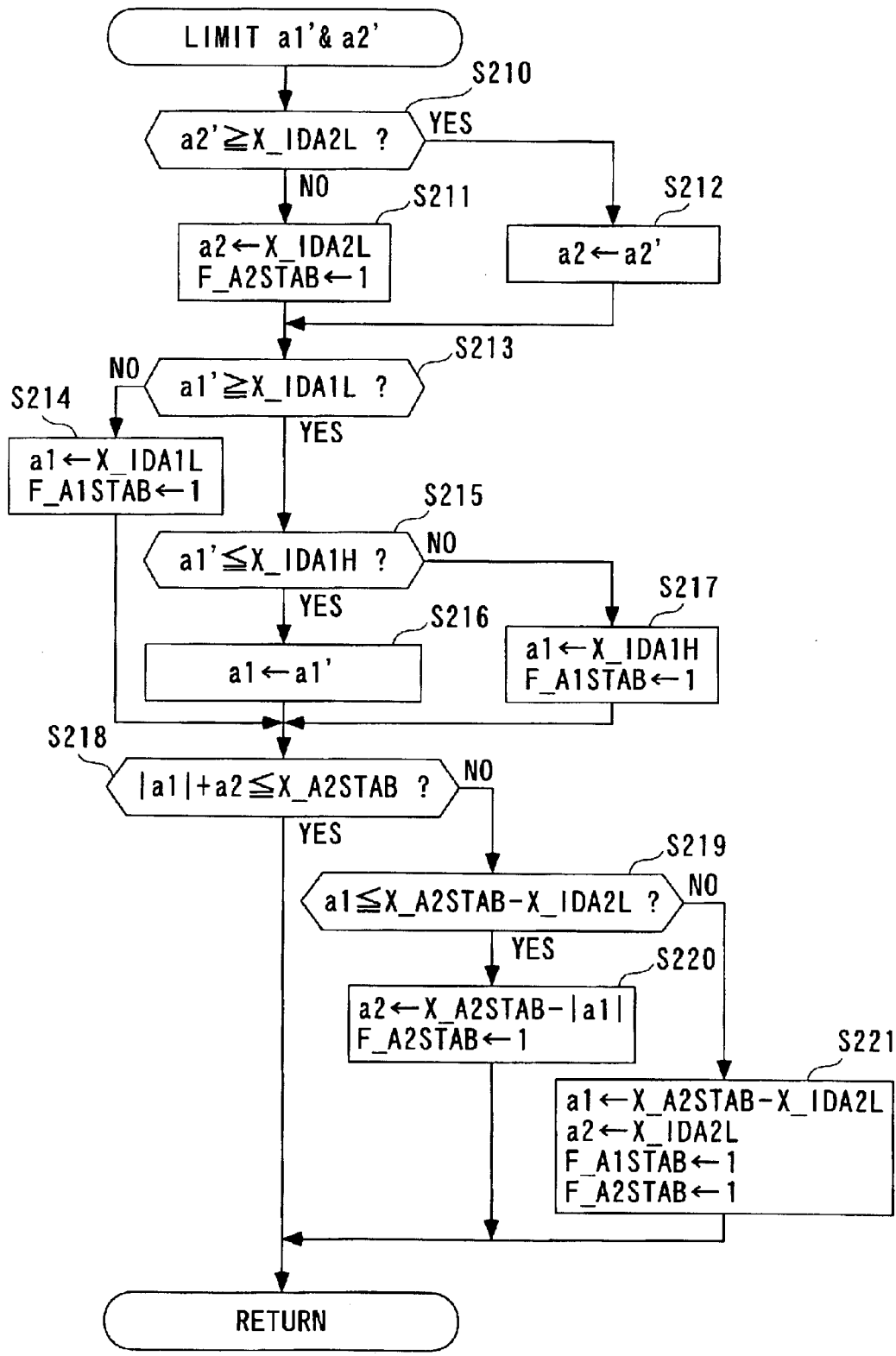
FIG. 38 is a flow chart illustrating a routine for executing the processing for limiting identified values a1' and a2' at step 201 in FIG. 37.
Figure 40:
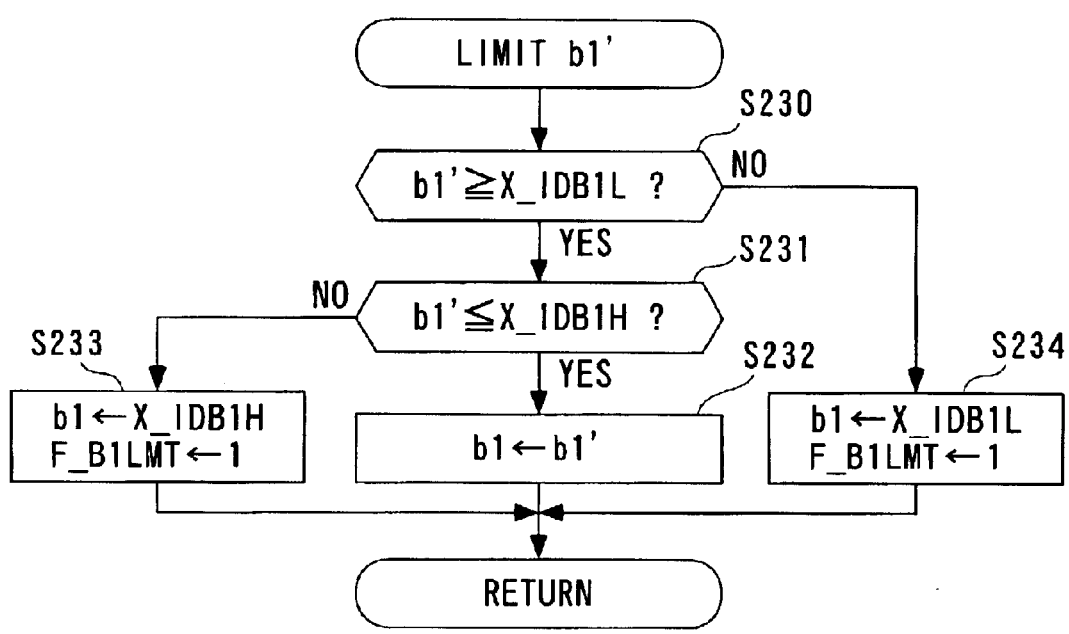
FIG. 40 is a flow chart illustrating a routine for executing the processing for limiting an identified value b1' at step 202 in FIG. 37.

More specifically, the on-board identifier 23 calculates identified values a1', a2', b1' for the model parameters in accordance with the identification algorithm expressed by the equations (25)–(32) in FIG. 19 in place of the identification algorithm expressed by the equations (33)–(40) in FIG. 20 used in the second embodiment, and limits the identified values a1', a2', b1', as illustrated in FIGS. 38, 40, to calculate the model parameters a1, a2, b1. Though no specific program is shown for the processing performed by the on-board identifier 23, such a program may be organized substantially similar to that used in the second embodiment. The control apparatus 301 according to the third embodiment can provide similar advantages to the control apparatus 201 according to the second embodiment.

Figure 51:
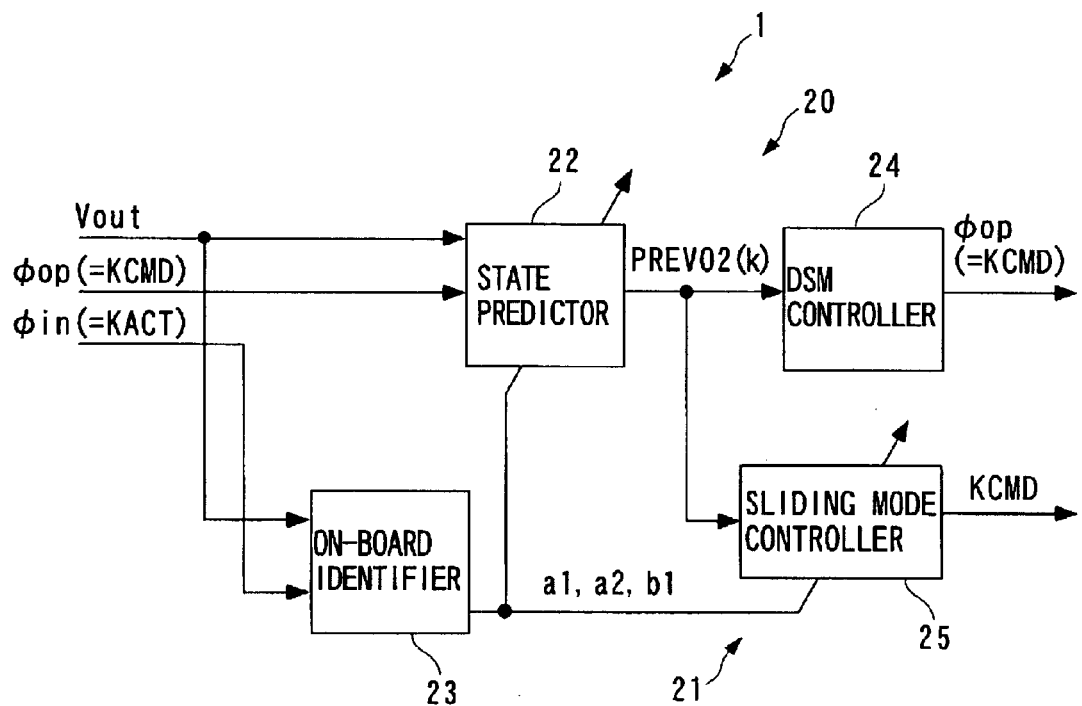
FIG. 51 is a block diagram generally illustrating the configuration of a control apparatus according to a fourth embodiment.

Next, a control apparatus according to a fourth embodiment will be described with reference to FIG. 51. As illustrated in FIG. 51, the control apparatus 401 in the fourth embodiment differs from the control apparatus 201 in the second embodiment only in the state predictor 22. Specifically, the state predictor 22 in the second embodiment calculates the predicted value PREVO2 based on a1, a2, b1, KACT, Vout, and φop (KCMD), whereas the state predictor 22 in the fourth embodiment calculates the predicted value PREVO2 based on a1, a2, b1, Vout, and φop.

More specifically, the state predictor 22 in the fourth embodiment calculates the predicted value PREVO2 of the output deviation VO2 in accordance with the prediction algorithm expressed by the equation (23) in FIG. 18, in place of the prediction algorithm expressed by the equation (24) in FIG. 18 used in the second embodiment. Though no specific program is shown for the processing performed by the state predictor 22, such a program may be organized substantially similar to that used in the second embodiment. The control apparatus 401 according to the fourth embodiment can provide similar advantages to the control apparatus 201 according to the second embodiment.

Next, a control apparatus according to a fifth embodiment will be described with reference to FIG. 52. As illustrated in FIG. 52, the control apparatus 501 according to the fifth embodiment differs from the control apparatus 201 according to the second embodiment only in that a schedule type DSM controller 20A, a schedule type state prediction sliding mode controller 21A, and a parameter scheduler 28 (model parameter setting means) are used to calculate the model parameters a1, a2, b1 in place of the ADSM controller 20, PRISM controller 21, and on-board identifier 23.

The parameter scheduler 28 first calculates the exhaust gas volume AB_SV in accordance with the aforementioned equation (58) based on the engine rotational speed NE and intake pipe inner absolute pressure PBA. Next, the parameter scheduler 28 calculates the model parameters a1, a2, b1 in accordance with the exhaust gas volume AB_SV using a table shown in FIG. 53.

Figure 53:
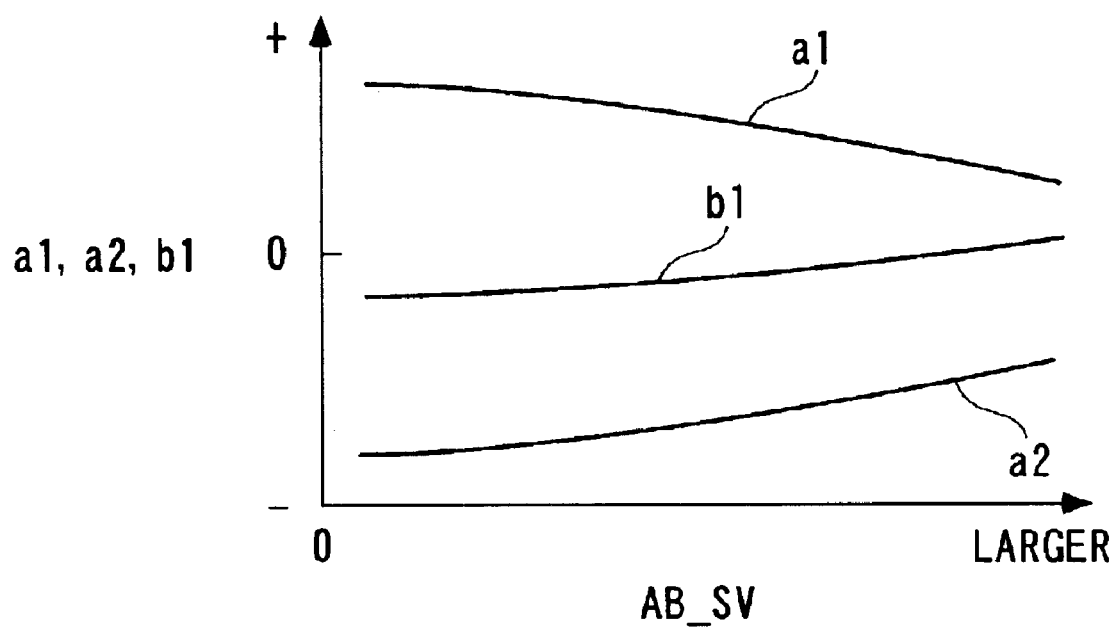
FIG. 53 shows an exemplary table for use in calculating model parameters in a parameter scheduler in the control apparatus according to the fifth embodiment.

In the table sown in FIG. 53, the model parameter a1 is set to a smaller value as the exhaust gas volume AB_SV is larger. Contrary to the model parameter a1, the model parameters a2, b1 are set to larger values as the exhaust gas volume AB_SV is larger. This is because the output of the controlled object, i.e., the output Vout of the O2 sensor 15 becomes more stable as the exhaust gas volume AB_SV is increased, whereas the output Vout of the O2 sensor becomes oscillatory as the exhaust gas volume AB_SV is decreased.

The schedule type DSM controller 20A calculates the target air/fuel ratio KCMD in a DSM controller 24 similar to that in the second embodiment, using the model parameters a1, a2, b1 calculated as described above. Likewise, the schedule type state prediction sliding mode controller 21A calculates the target air/fuel ratio KCMD in an SLD controller 25 similar to that in the second embodiment, using the model parameters a1, a2, b1 calculated as described above.

The control apparatus 501 according to the fifth embodiment can provide similar advantages to the control apparatus 201 according to the second embodiment. In addition, the model parameters a1, a2, b1 can be more rapidly calculated using the parameter scheduler 28 than using the on-board identifier 23. It is therefore possible to improve the responsibility of the control and more rapidly ensure a favorable post-catalyst exhaust gas characteristic.

Next, a control apparatus according to a sixth embodiment will be described with reference to FIG. 54. The control apparatus 601 according to the sixth embodiment differs from the control apparatus 201 according to the second embodiment only in that an SDM controller 29 is used in place of the DSM controller 24 of the control apparatus 201 in the second embodiment. The SDM controller 29 calculates the control input $\phi op(k)$ in accordance with a control algorithm which applies the $\Sigma\Delta$ modulation algorithm (see equations (11)–(14) based on the predicted value PREVO2(k). In the sixth embodiment, the SDM controller 29 implements control input calculating means, first control input calculating means, air/fuel ratio calculating means, and first air/fuel ratio calculating means.

Figure 54:
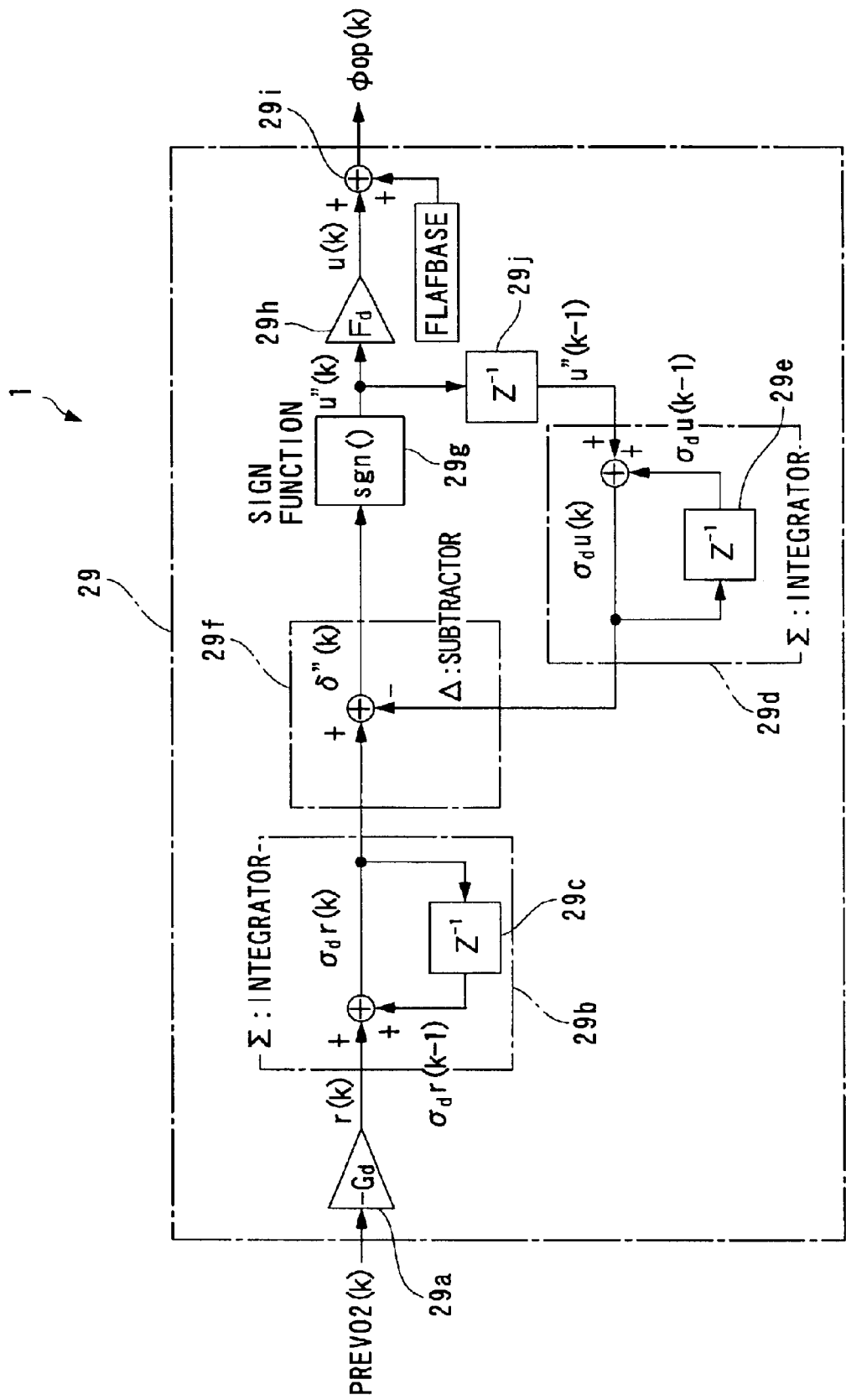
FIG. 54 is a block diagram generally illustrating the configuration of an SDM controller in a control apparatus according to a sixth embodiment.

In the SDM controller 29 illustrated in FIG. 54, an inverting amplifier 29a generates a reference signal r(k) as the product of the value of −1, gain $G_d$ for reference signal, and predicted value PREVO2(k). Next, an integrator 29b generates a reference signal integrated value $\sigma_d r(k)$ as the sum of a reference signal integrated value $\sigma_d r(k-1)$ delayed by a delay element 29c and the reference signal r(k). On the other hand, an integrator 29d generates an SDM signal integrated value $\sigma_d u(k)$ as the sum of an SDM signal integrated value $\sigma_d u(k-1)$ delayed by a delay element 2e, and an SDM signal u"(k−1) delayed by a delay element 2j. Then, a subtractor 29f generates a deviation signal $\delta"(k)$ of the SDM signal integrated value $\sigma_d u(k)$ from the reference signal integrated value $\sigma_d r(k)$.

Next, a quantizer 29g (sign function) generates an SDM signal u"(k) as the sign of the deviation signal $\delta"(k)$. Then, an amplifier 29h generates an amplified SDM signal u(k) by amplifying the SDM signal u"(k) by a predetermined gain $F_d$. Then, an adder 29i generates the control input $\phi op(k)$ as the sum of the amplified SDM signal u(k) and a predetermined reference value FLAFBASE.

The foregoing control algorithm of the SDM controller 29 is expressed by the following equations (59)–(65):

$$r(k)=-1\cdot Gd\cdot PREVO2(k) \tag{59}$$

$$\sigma_d r(k)=\sigma_d r(k-1)+r(k) \tag{60}$$

$$\sigma_d u(k)=\sigma_d u(k-1)+u"(k-1) \tag{61}$$

$$\delta"(k)=\sigma_d r(k)-\sigma_d u(k) \tag{62}$$

$$u"(k)=sgn(\delta"(k)) \tag{63}$$

$$u(k)=F_d\cdot u"(k) \tag{64}$$

$$\phi op(k)=FLAFBASE+u(k) \tag{65}$$

where $G_d$ and $F_d$ represent gains. The sign function sgn ($\delta"(k)$) takes the value of 1 (sgn($\delta"(k)$)=1) when $\delta"(k)\geq=0$, and −1 (sgn($\delta"(k)$)=−1) when $\delta"(k)<0$ (alternatively, sgn ($\delta"(k)$) may be set to 0 (sgn ($\delta"(k)$)=0) when $\delta"(k)$=0.

The $\Sigma\Delta$ modulation algorithm in the control algorithm of the SDM controller 29 is characterized in that the SDM signal u(k) can be generated (calculated) such that the reference signal r(k) is reproduced at the output of the controlled object when the SDM signal u(k) is inputted to the control object, as is the case with the aforementioned $\Delta\Sigma$ modulation algorithm. In other words, the SDM controller 29 has the characteristic of generating the control input $\phi op(k)$ similar to the aforementioned DSM controller 24. Therefore, the control apparatus 601 according to the sixth embodiment, which utilizes the SDM controller 29, can provide similar advantages to the control apparatus 201 according to the second embodiment. Though no specific program is shown for the SDM controller 29, such a program may be organized substantially similar to the DSM controller 24.

Next, a control apparatus according to a seventh embodiment will be described with reference to FIG. 55. The control apparatus 701 according to the seventh embodiment differs from the control apparatus 201 according to the second embodiment only in that a DM controller 30 is used in place of the DSM controller 24. The DM controller 30 calculates the control input $\phi op(k)$ in accordance with the control algorithm (see equations (15)–(17)) which applies a $\Delta$ modulation algorithm based on the predicted value PREVO2(k). In the seventh embodiment, the DM controller 30 implements control input calculating means, first control input calculating means, air/fuel ratio calculating means, and first air/fuel ratio calculating means.

Figure 55:
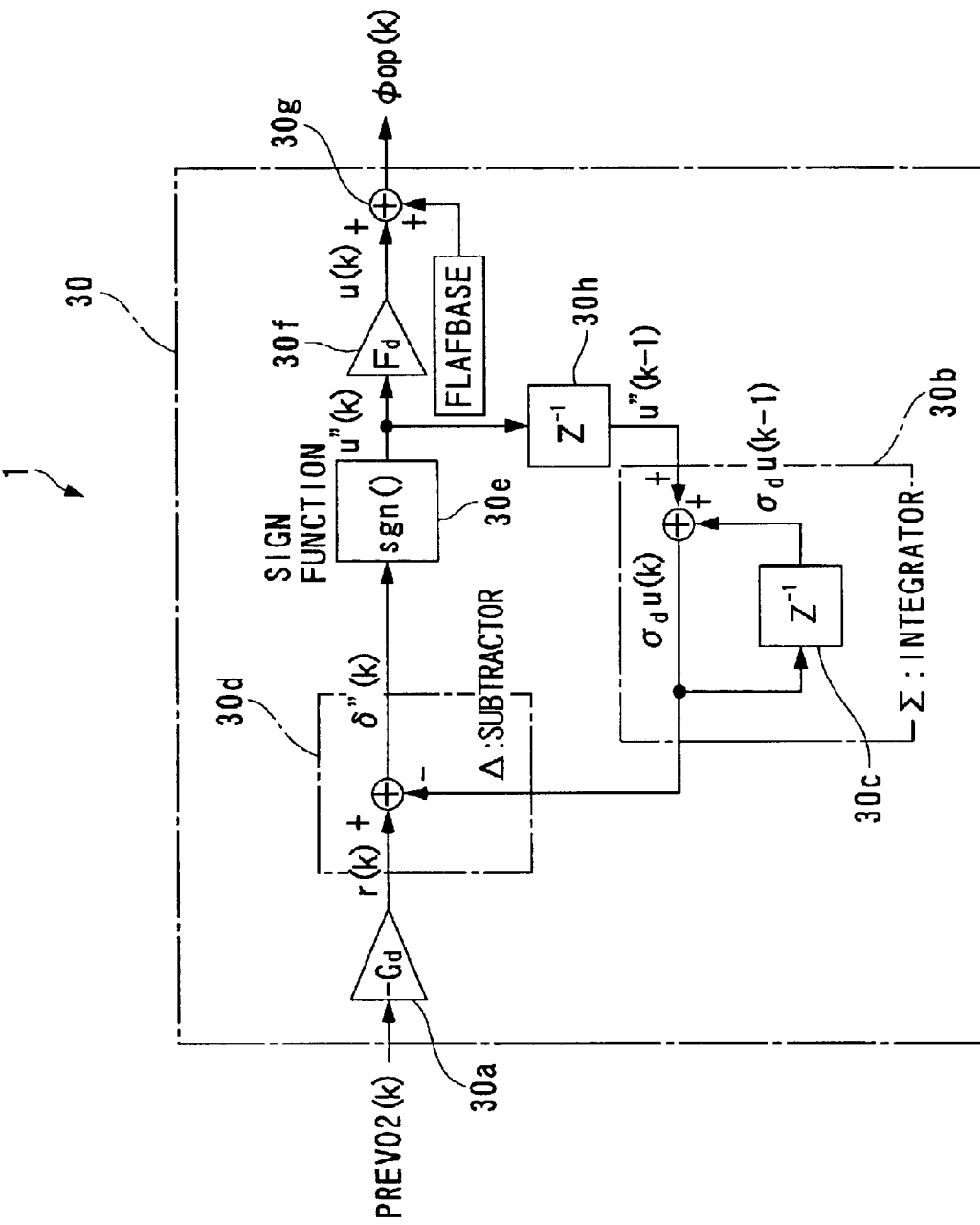
FIG. 55 is a block diagram generally illustrating the configuration of an DM controller in a control apparatus according to a seventh embodiment.

Specifically, as illustrated in FIG. 55, in the DM controller 30, an inverting amplifier 30a generates the reference signal r(k) as the product of the value of −1, gain Gd for reference signal, and predicted value PREVO2(k). An integrator 30b generates a DM signal integrated value $\delta_d u(k)$ as the sum of a DM signal integrated value $\delta_d u(k-1)$ delayed by a delay element 30 and a DM signal u"(k−1) delayed by a delay element 30h. Then, a subtractor 30d generates a deviation signal $\delta"(k)$ of the DM signal integrated value $\delta_d u(k)$ from the reference signal r(k).

Next, a quantizer 30e (sign function) generates a DM signal u"(k) as a sign of the deviation signal $\delta"(k)$. Then, an amplifier 30f generates an amplified DM signal u(k) by amplifying the DM signal u"(k) by a predetermined gain $F_d$. Next, an adder 30g generates the control input $\phi op(k)$ as the sum of the amplified DM signal u(k) and the predetermined reference value FLAFBASE.

The foregoing control algorithm of the DM controller 30 is expressed by the following equations (66)–(71):

$$r(k)=-1\cdot G_d\cdot PREVO2(k) \tag{66}$$

$$\sigma_d u(k)=\sigma_d u(k-1)+u"(k-1) \tag{67}$$

$$\delta"(k)=r(k)-\sigma_d u(k) \tag{68}$$

$$u"(k)=sgn(\delta"(k)) \tag{69}$$

$$u(k)=F_d\cdot u"(k) \tag{70}$$

$$\phi op(k)=FLAFBASE+u(k) \tag{71}$$

where $G_d$ and $F_d$ represents gains. The sign function sgn($\delta''$(k)) takes the value of 1 (sgn($\delta''$(k))=1) when $\delta''$(k)≧0, and −1 (sgn($\delta''$(k))=−1) when $\delta''$(k)<0 (alternatively, sgn($\delta''$(k)) may be set to 0 (sgn($\delta''$(k))=0) when $\delta''$(k)=0.

The control algorithm of the DM controller 30, i.e., the Δ modulation algorithm is characterized in that the DM signal u(k) can be generated (calculated) such that the reference signal r(k) is reproduced at the output of the controlled object when the DM signal u(k) is inputted to the controlled object, as is the case with the aforementioned ΔΣ modulation algorithm and ΣΔ modulation algorithm. In other words, the DM controller 30 has the characteristic of generating the control input φop(k) similar to the aforementioned DSM controller 24 and SDM controller 29. Therefore, the control apparatus 701 according to the seventh embodiment, which utilizes the DM controller 30, can provide similar advantages to the control apparatus 201 according to the second embodiment. Though no specific program is shown for the DM controller 30, such a program may be organized substantially similar to the DSM controller 24.

Figure 56:
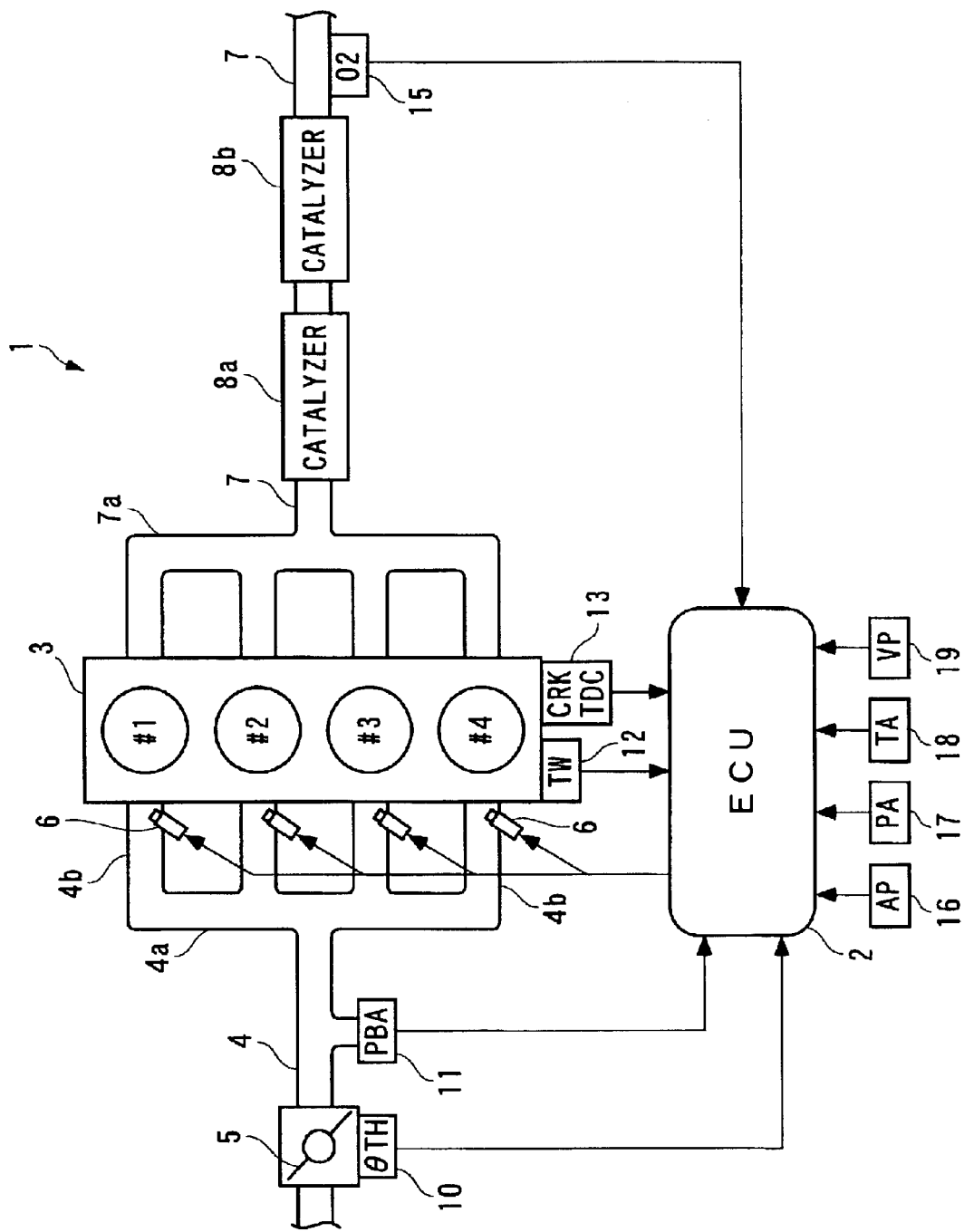
FIG. 56 is a block diagram generally illustrating a control apparatus according to an eighth embodiment, and an internal combustion engine which applies the control apparatus.

Next, a control apparatus according to an eighth embodiment will be described with reference to FIGS. 56 and 57. As illustrated in FIG. 56, the control apparatus 801 according to the eighth embodiment differs from the control apparatus 201 according to the second embodiment only in that the engine 3 is not provided with the LAF sensor 14, and the O2 sensor 15 is disposed downstream of the second catalyzer 8*b*.

Figure 57:
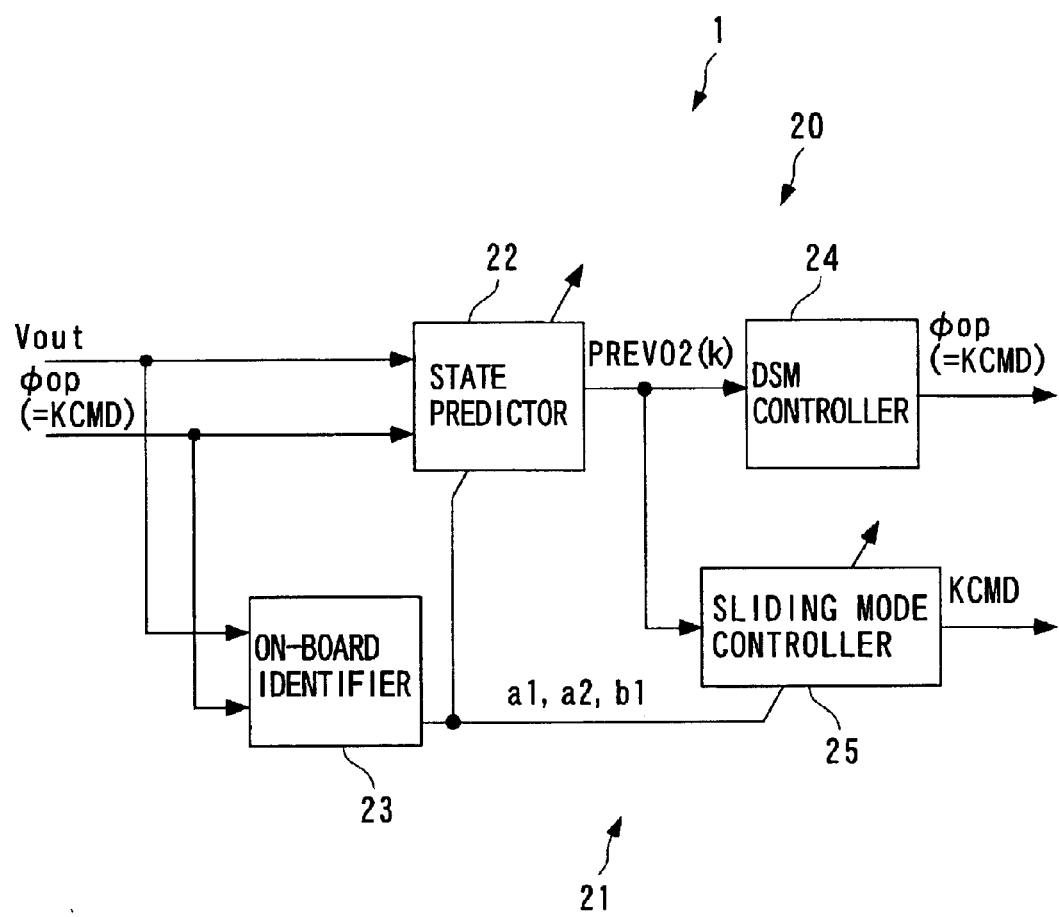
FIG. 57 is a block diagram generally illustrating the configuration of a control apparatus according to the eighth embodiment.

Since the LAF sensor 14 is not provided, the control apparatus 801 relies on the on-board identifier 23 to calculate the model parameters a1, a2, b1 based on the output Vout of the O2 sensor 15, and the control input φop(k) (target air/fuel ratio KCMD), as illustrated in FIG. 57. In other words, the on-board identifier 23 calculates the identified values a1', a2', b1' for the model parameters in accordance with the identification algorithm expressed by the equation (25)–(32) in FIG. 19, and limits these identified values in the manner described above to calculate the model parameters a1, a2, b1.

Further, the state predictor 22 calculates the predicted value PREVO2 of the output deviation VO2 based the model parameters a1, a2, b1, output Vout of the O2 sensor 15, and control input fop. In other words, the state predictor 22 calculates the predicted value PREVO2 of the output deviation VO2 in accordance with the prediction algorithm expressed by the equation (23) in FIG. 18. Though no specific programs are shown for the processing performed by the state predictor 22 and on-board identifier 23, such programs may be organized substantially similar to those in the second embodiment. Other programs may also be organized in a similar manner to those in the second embodiment.

Figure 48:
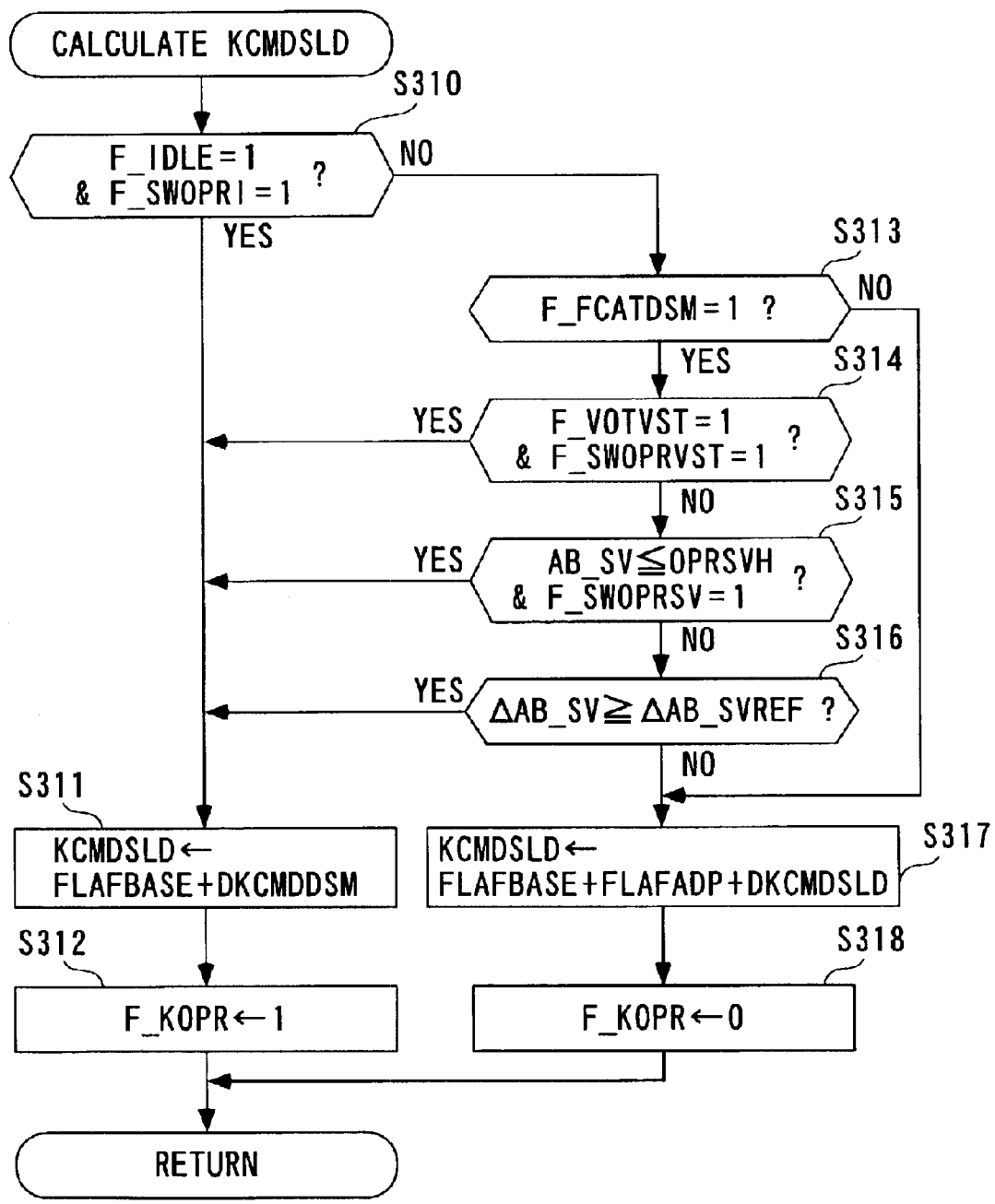
FIG. 48 is a flow chart illustrating a routine for executing the processing for calculating an adaptive target air/fuel ratio KCMDSLD at step 138 in FIG. 27.

In the control apparatus 801, since the engine 3 is not provided with the LAF sensor 14 and is provided with the O2 sensor 15 at a location downstream of the second catalyzer 8*b*, the result of determination is YES at step 313 in FIG. 48. Thus, as described above, the target air/fuel ratio KCMD is calculated in accordance with the ADSM processing when the engine 3 is in the first launch mode, in a low load operation mode in which the exhaust gas volume AB_SV is smaller than a predetermined value, and in a transient operation mode. This is justified as follows. With the O2 sensor 15 and catalyzers 8*a*, 8*b* disposed as in the eighth embodiment, in other words, with a plurality of catalyzers disposed upstream of the O2 sensor 15, the output Vout of the O2 sensor 15 presents larger response delay, dead time, and the like with respect to exhaust gases supplied to the first catalyzer 8*a* in the operation modes mentioned above, so that the output Vout of the O2 sensor 15 can be more rapidly converged to the target value Vop to reduce a range of fluctuations in exhaust gases flowing into the first catalyzer 8*a* and consequently maintain satisfactorily purified exhaust gases by the catalyzers 8*a*, 8*b*, particularly, the first catalyzer 8*a* disposed on the upstream side, when the target air/fuel ratio KCMD is calculated in accordance with the ADSM processing than when it is calculated in accordance with the PRISM processing. Though experiment data is not shown herein, it has been confirmed through experiments that in the air/fuel ratio control conducted by the control apparatus 801 of the eighth embodiment, the amount of NOx in exhaust gases can be reduced by several percent, for example, in a transient operation mode when the target air/fuel ratio KCMD is calculated in accordance with the ADSM processing, as compared with the calculation in accordance with the PRISM processing.

The control apparatus 801 according to the eighth embodiment as described above can provide similar advantages to the control apparatus 201 according to the second embodiment. Particularly, when the air/fuel ratio is controlled only by the O2 sensor 15, the control apparatus 801 can provide a satisfactory post-catalyst exhaust gas characteristic without fail for changing the air/fuel ratio of the air/fuel mixture to be richer and leaner by setting the gain KRDSM for reference signal value to different values at steps 292–294 in FIG. 46 for controlling exhaust gases to be leaner and richer to converge the target air/fuel ratio KCMD to the target value Vop at different rates. In addition, since the suitable post-catalyst exhaust gas characteristic can be ensured without using the LAF sensor 14, the manufacturing cost can be saved correspondingly.

Figure 58:
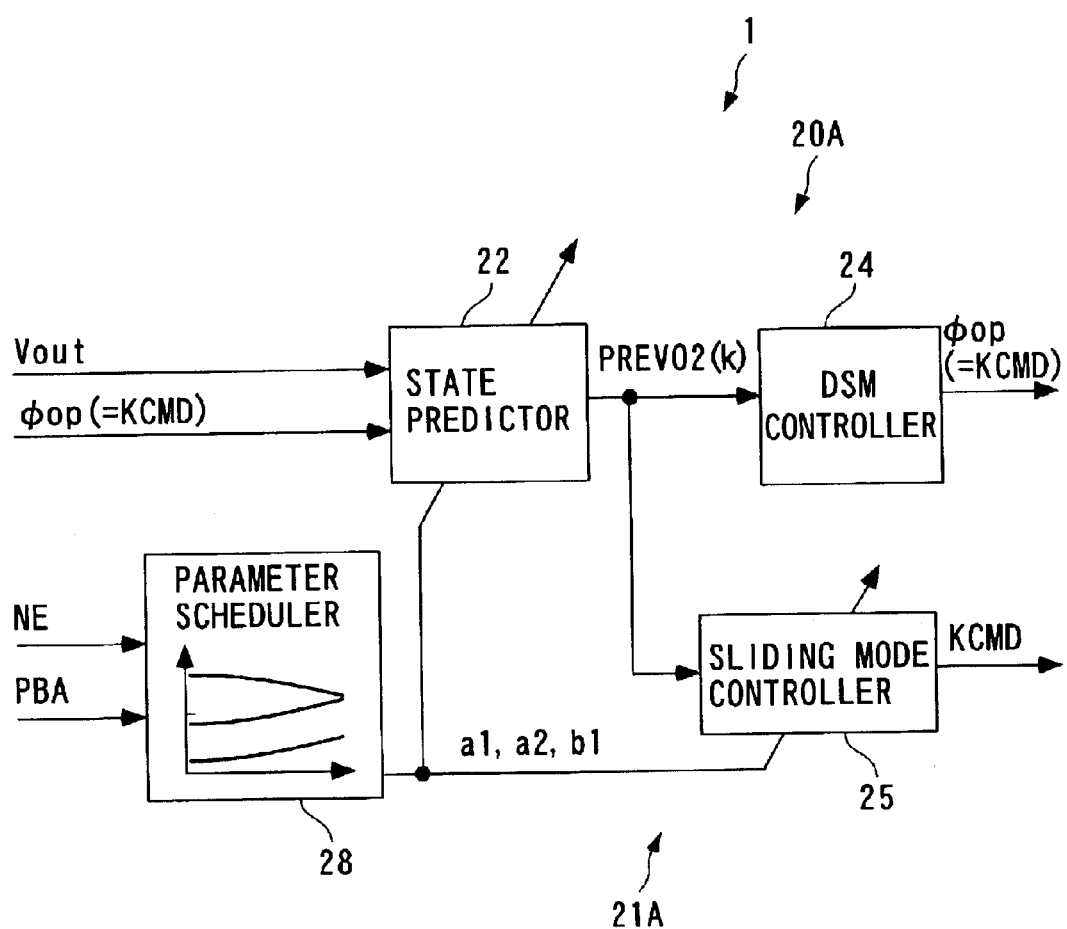
FIG. 58 is a block diagram generally illustrating the configuration of a control apparatus according to a ninth embodiment.

Next, a control apparatus according to a ninth embodiment will be described with reference to FIG. 58. As illustrated, the control apparatus 901 according to the ninth embodiment differs from the control apparatus 801 according to the eighth embodiment in that the ADSM controller 20, PRISM controller 21, and on-board identifier 23 in the eighth embodiment are replaced with the schedule type DSM controller 20A, schedule type state prediction sliding mode controller 21A, and parameter scheduler 28 in the fifth embodiment. These controllers 20A, 21A and parameter scheduler 28 are configured in a manner similar to those in the fifth embodiment. The control apparatus 901 according to the ninth embodiment can provide similar advantages to the control apparatus 801 according to the eighth embodiment. In addition, the model parameters a1, a2, b1 can be calculated faster when the parameter scheduler 28 is used than when the on-board identifier 23 is used. This can improve the responsibility of the control and more rapidly ensure a satisfactory post-catalyst exhaust gas characteristic.

The foregoing second to ninth embodiments have illustrated exemplary configurations of the control apparatus according to the present invention for controlling the air/fuel ratio of the internal combustion engine 3. It should be understood, however, that the present invention is not limited to the foregoing embodiments, but can be widely applied to control apparatuses for controlling other arbitrary controlled objects. In addition, the ADSM controller 20 and PRISM controller 21 may be implemented in hardware in place of the programs as illustrated in the embodiments.

Also, while the foregoing first to ninth embodiments have illustrated exemplary control apparatuses which employ the sliding mode control as the response specifying control, the response specifying control is not limited to the sliding mode control, but any approach may be employed as long as it can specify a converging behavior for the output deviation VO2. For example, the response specifying control may be implemented by a back stepping control which can specify the converging behavior for the output deviation VO2 by adjusting design parameters, in which case the aforementioned advantages can be provided as well by employing a method of setting the switching function σ similar to the embodiments.

Further, while the foregoing second to ninth embodiments employ a discrete time system model as a controlled object model, the controlled object model is not limited to this one, but a continuous time system model may be used instead.

As described above, the control apparatus according to the present invention can control the output of a controlled object which is limited in an available range for a control input, a controlled object which has a relatively large response delay and/or dead time, and the like to rapidly and accurately converge to a target value. Particularly, when the output of the controlled object is chosen to be that of an air/fuel ratio sensor in an internal combustion engine, the present invention can control the output of the air/fuel ratio sensor to rapidly and accurately converge to a target value even when the engine is in an extremely low load operation mode, thereby providing a satisfactory post-catalyst exhaust gas characteristic.

What is claimed is:

1. A control apparatus comprising:

deviation calculating means for calculating a deviation of an output of a controlled object from a predetermined target value; and control input calculating means for calculating a control input to said controlled object based on one modulation algorithm selected from a $\Delta$ modulation algorithm, a $\Delta\Sigma$ modulation algorithm, and a $\Sigma\Delta$ modulation algorithm for converging the output of said controlled object to said target value in accordance with the calculated deviation;

wherein said control input calculating means calculates a first intermediate value in accordance with said deviation based on said one modulation algorithm, and calculates said control input based on a product of said calculated first intermediate value and a predetermined gain.

2. A control apparatus according to claim 1, further comprising:

gain parameter detecting means for detecting a gain parameter indicative of a gain characteristic of said controlled object; and gain setting means for setting said gain in accordance with the detected gain parameter.

3. A control apparatus according to claim 1, wherein said control input calculating means calculates a second intermediate value in accordance with said deviation based on said one modulation algorithm, and calculates said control input by adding a predetermined value to said calculated second intermediate value.

4. A control apparatus according to claim 1, wherein:

said deviation calculating means includes predicted value calculating means for calculating a predicted value of said deviation in accordance with said deviation based on a prediction algorithm, wherein said control input calculating means calculates said control input in accordance with the calculated predicted value of said deviation based on said one modulation algorithm.

5. A control apparatus according to claim 1, wherein:

said control input calculating means calculates said control input in accordance with said deviation based further on a controlled object model which models said controlled object.

6. A control apparatus according to claim 5, further comprising identifying means for identifying a model parameter for said controlled object model in accordance with one of said calculated control input and a value reflecting the control input inputted to said controlled object, and an output of said controlled object.

7. A control apparatus according to claim 6, wherein:

said controlled object model comprises a discrete time system model, wherein said identifying means identifies a model parameter for said discrete time system model in accordance with one of discrete data of said control input and discrete data of the value reflecting the control input inputted to said controlled object, and discrete data of the output of said controlled object.

8. A control apparatus according to claim 5, further comprising:

dynamic characteristic parameter detecting means for detecting a dynamic characteristic parameter indicative of a change in a dynamic characteristic of said controlled object; and model parameter setting means for setting a model parameter for said controlled object model in accordance with the detected dynamic characteristic parameter.

9. A control apparatus comprising:

deviation calculating means for calculating a deviation of an output of a controlled object from a predetermined target value;

first control input calculating means for calculating a control input to said controlled object based on one modulation algorithm selected from a $\Delta$ modulation algorithm, a $\Delta\Sigma$ modulation algorithm, and a $\Sigma\Delta$ modulation algorithm for converging the output of said controlled object to said target value in accordance with the calculated deviation;

second control input calculating means for calculating a control input to said controlled object in accordance with the calculated deviation based on a response specifying control algorithm for converging the output of said controlled object to said target value;

controlled object state detecting means for detecting a state of said controlled object; and control input selecting means for selecting one of the control input calculated by said first control input calculating means and he control input calculated by said second control input calculating means in accordance with the detected state of said controlled object as a control input which should be inputted to said controlled object.

10. A control apparatus according to claim 9, wherein said first control input calculating means calculates a first intermediate value in accordance with said deviation based on said one modulation algorithm, and calculates said control input based on a product of said calculated first intermediate value and a predetermined gain.

11. A control apparatus according to claim 10, wherein:

said controlled object state detecting means includes gain parameter detecting means for detecting a gain parameter indicative of a gain characteristic of said controlled object, and said control apparatus further comprises gain setting means for setting said gain in accordance with the detected gain parameter.

12. A control apparatus according to claim 9, wherein said first control input calculating means calculates a second intermediate value in accordance with said deviation based on said one modulation algorithm, and calculates said control input by adding a predetermined value to said calculated second intermediate value.

13. A control apparatus according to claim 9, wherein said deviation calculating means includes predicted value calculating means for calculating a predicted value of said deviation in accordance with said deviation based on a prediction algorithm,
  wherein said first control input calculating mans calculates said control input in accordance with the calculated predicted value of said deviation based on said one modulation algorithm; and
  said second control input calculating means calculates said control input in accordance with the calculated predicted value of said deviation based on said response specifying control algorithm.

14. A control apparatus according to claim 9, wherein said first control input calculating means and said second control input calculating means calculate said control input in accordance with said deviation based further on a controlled object model which models said controlled object.

15. A control apparatus according to claim 14, further comprising identifying means for identifying a model parameter for said controlled object model in accordance with one of said calculated control input and a value reflecting the control input inputted to said controlled object, and an output of said controlled object.

16. A control apparatus according to claim 15, wherein:
  said controlled object model comprises a discrete time system model,
  wherein said identifying means identifies a model parameter for said discrete time system model in accordance with one of discrete data of said control input and discrete data of the value reflecting the control input inputted to said controlled object, and discrete data of the output of said controlled object.

17. A control apparatus according to claim 14, further comprising:
  dynamic characteristic parameter detecting mans for detecting a dynamic characteristic parameter indicative of a change in a dynamic characteristic of said controlled object; and
  model parameter setting means for setting a model parameter for said controlled object model in accordance with the detected dynamic characteristic parameter.

18. A control apparatus according to claim 9, wherein said response specifying control algorithm is a sliding mode control algorithm.

19. A control apparatus comprising:
  a downstream air/fuel ratio sensor for outputting a detection signal indicative of an air/fuel ratio of exhaust gases at a location downstream of a catalyzer in an exhaust pipe of an internal combustion engine;
  output deviation calculating means for calculating an output deviation of an output of said downstream air/fuel ratio sensor from a predetermined target value; and
  air/fuel ratio control means for controlling an air/fuel ratio of an air/fuel mixture supplied to said internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of said downstream air/fuel ratio sensor converges to said target value.

20. A control apparatus according to claim 19, wherein said air/fuel ratio control means includes:
  air/fuel ratio calculating means for calculating a first intermediate value in accordance with said output deviation based on said one modulation algorithm, and calculating a target air/fuel ratio of the air/fuel mixture for converging the output of said downstream air/fuel ratio sensor to said target value based on a product of said calculated first intermediate value and a predetermined gain,
  wherein said air/fuel ratio control means controls the air/fuel ratio of the air/fuel mixture in accordance with the calculated target air/fuel ratio.

21. A control apparatus according to claim 20, further comprising:
  operating condition parameter detecting means for detecting an operating condition parameter indicative of an operating condition of said internal combustion engine; and
  gain setting means for setting said gain in accordance with the detected operating condition parameter.

22. A control apparatus according to claim 19, wherein:
  said air/fuel ratio control means includes air/fuel ratio calculating means for calculating a second intermediate value in accordance with said output deviation based on said one modulation algorithm, and calculating a target air/fuel ratio of the air/fuel mixture for converging the output of said downstream air/fuel ratio sensor to said target value by adding a predetermined value to the calculated second intermediate value,
  wherein said air/fuel ratio control means controls the air/fuel ratio of the air/fuel mixture in accordance with the calculated target air/fuel ratio.

23. A control apparatus according to claim 19, wherein:
  said output deviation calculating means includes predicted value calculating means for calculating a predicted value of said output deviation in accordance with said output deviation based on a prediction algorithm,
  wherein said air/fuel ratio control means controls the air/fuel ratio of the air/fuel mixture in accordance with the calculated predicted value of said output deviation based on said one modulation algorithm such that the output of said downstream air/fuel ratio sensor converges to said target value.

24. A control apparatus according to claim 19, wherein:
  said air/fuel ratio control means includes air/fuel ratio calculating means for calculating said target air/fuel ratio in accordance with said output deviation based on an algorithm which applies a controlled object model and said one modulation algorithm, said controlled object model having a variable associated with a value indicative of said target air/fuel ratio of the air/fuel mixture for converging the output of said downstream air/fuel ratio sensor to said target value, and a variable associated with a value indicative of the output of said downstream air/fuel ratio sensor,
  wherein said air/fuel ratio control means controls the air/fuel ratio of the air/fuel mixture in accordance with the calculated target air/fuel ratio.

25. A control apparatus according to claim 24, further comprising identifying means for identifying a model parameter for said controlled object model in accordance with said target air/fuel ratio and the output of said downstream air/fuel ratio sensor.

26. A control apparatus according to claim 25, wherein:
said controlled object model comprises a discrete time system model,
wherein said identifying means identifies a model parameter for said discrete time system model in accordance with discrete data of said target air/fuel ratio, and discrete data of the output of said downstream air/fuel ratio sensor.

27. A control apparatus according to claim 24, further comprising:
operating condition parameter detecting means for detecting an operating condition parameter indicative of an operating condition of said internal combustion engine; and
model parameter setting means for setting a model parameter for said controlled object model in accordance with the detected operating condition parameter.

28. A control apparatus according to claim 19, further comprising:
an upstream air/fuel ratio sensor for outputting a detection signal indicative of an air/fuel ratio of exhaust gases at a location downstream of said catalyzer in said exhaust pipe of said internal combustion engine,
wherein said air/fuel ratio control means includes air/fuel ratio calculating means for calculating said target air/fuel ratio in accordance with said output deviation based on an algorithm which applies a controlled object model and said one modulation algorithm, said controlled object model having a variable associated with a value indicative of one of said target air/fuel ratio of the air/fuel mixture for converging the output of said downstream air/fuel ratio sensor to said target value and a value indicative of an output of said upstream air/fuel ratio sensor, and a variable associated with a value indicative of the output of said downstream air/fuel ratio sensor, and
said air/fuel ratio control means controls the air/fuel ratio of the air/fuel mixture supplied to said internal combustion engine in accordance with the calculated target air/fuel ratio.

29. A control apparatus according to claim 28, further comprising identifying means for identifying a model parameter for said controlled object model in accordance with one of said target air/fuel ratio and the output of said upstream air/fuel ratio sensor, and the output of said downstream air/fuel ratio sensor.

30. A control apparatus according to claim 29, wherein:
said controlled object model comprises a discrete time system model,
wherein said identifying means identifies the model parameter for said discrete time system model in accordance with one of discrete data of said target air/fuel ratio and discrete data of the output of said upstream air/fuel ratio sensor, and discrete data of the output of said downstream air/fuel ratio sensor.

31. A control apparatus according to claim 28, further comprising:
operating condition parameter detecting means for detecting an operating condition parameter indicative of an operating condition of said internal combustion engine; and
model parameter setting means for setting a model parameter for said controlled object model in accordance with the detected operating condition parameter.

32. A control apparatus comprising:
a downstream air/fuel ratio sensor for outputting a detection signal indicative of an air/fuel ratio of exhaust gases at a location downstream of a catalyzer in an exhaust pipe of an internal combustion engine;
output deviation calculating means for calculating an output deviation of an output of said downstream air/fuel ratio sensor from a predetermined target value;
first air/fuel ratio control means for controlling an air/fuel ratio of an air/fuel mixture supplied to said internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of said downstream air/fuel ratio sensor converges to said target value;
second air/fuel ratio control means for controlling the air/fuel ratio of the air/fuel mixture supplied to said internal combustion engine in accordance with the calculated output deviation based on a response specifying control algorithm such that the output of said downstream air/fuel ratio sensor converges to said target value;
operating condition parameter detecting means for detecting an operating condition parameter indicative of an operating condition of said internal combustion engine; and
selecting means for selecting one of said first air/fuel ratio control means and said second air/fuel ratio control means in accordance with the detected operating condition parameter to control the air/fuel ratio of the air/fuel mixture.

33. A control apparatus according to claim 32, wherein said selecting means selects one of said first air/fuel ratio control means and said second air/fuel ratio control means in accordance with at least one of whether or not said catalyzer has a total amount of catalyst loaded therein equal to or larger than a predetermined load amount, and whether or not a carrier for carrying said catalyst in said catalyzer has a length in a direction in which said exhaust pipe extends equal to or longer than a predetermined length.

34. A control apparatus according to claim 32, wherein:
said selecting means includes operation mode discriminating means for discriminating an operation mode of said internal combustion engine in accordance with said operating condition parameter, and
said selecting means selects said first air/fuel ratio control means when the discriminated operation mode is a predetermined first operation mode, and selects said second air/fuel ratio control means when the discriminated operation mode is a predetermined second operation mode.

35. A control apparatus according to claim 32, wherein:
said catalyzer comprises a plurality of catalyzers disposed along said exhaust pipe of said internal combustion engine and spaced apart from each other, and
said selecting means includes operation mode discriminating means for discriminating an operation mode of said internal combustion engine in accordance with said operating condition parameter,
wherein said selecting means selects said first air/fuel ratio control means when the discriminated operation mode is a predetermined first operation mode, and selects said second air/fuel ratio control means when the discriminated operation mode is a predetermined second operation mode.

36. A control apparatus according to claim 32, wherein:

said internal combustion engine comprises a downstream catalyzer in said exhaust pipe at a location downstream of said downstream air/fuel ratio sensor, and said selecting means includes operation mode discriminating means for discriminating an operation mode of said internal combustion engine in accordance with said operating condition parameter, wherein said selecting means selects said first air/fuel ratio control means when the discriminated operation mode is a predetermined first operation mode, and selects said second air/fuel ratio control means when the discriminated operation mode is a predetermined second operation mode.

37. A control apparatus according to claim 36, wherein:

the total amount of catalyst loaded in said downstream catalyzer is set smaller than the total amount of catalyst loaded in said catalyzer, and said target value is set to provide the highest purification percentage for said catalyzer.

38. A control apparatus according to claim 34, wherein said first operation mode includes a transient operation mode of said internal combustion engine.

39. A control apparatus according to claim 34, wherein said first operation mode includes an idle operation mode.

40. A control apparatus according to claim 34, wherein said second operation mode includes a steady-state operation mode in which said internal combustion engine is loaded substantially in a steady-state.

41. A control apparatus according to claim 32, wherein:

said first air/fuel ratio control means includes first air/fuel ratio calculating means for calculating a first intermediate value in accordance with said output deviation based on said one modulation algorithm, and calculating a target air/fuel ratio of the air/fuel mixture for converging the output of said downstream air/fuel ratio sensor to said target value based on a product of said calculated first intermediate value and a predetermined gain, wherein said first air/fuel ratio control means controls the air/fuel ratio of the air/fuel mixture in accordance with the calculated target air/fuel ratio.

42. A control apparatus according to claim 41, further comprising gain setting means for setting said gain in accordance with said operating condition parameter.

43. A control apparatus according to claim 32, wherein:

said first air/fuel ratio control means include first air/fuel ratio calculating means for calculating a second intermediate value in accordance with said output deviation based on said one modulation algorithm, and calculating a target air/fuel ratio of the air/fuel mixture for converging the output of said downstream air/fuel ratio sensor to said target value by adding a predetermined value to the calculated second intermediate value, and said first air/fuel ratio control means controls the air/fuel ratio of the air/fuel mixture in accordance with the calculated target air/fuel ratio.

44. A control apparatus according to claim 32, wherein:

said output deviation calculating means includes predicted value calculating means for calculating a predicted value of said output deviation in accordance with said output deviation based on a prediction algorithm, wherein said first air/fuel ratio control means controls the air/fuel ratio of the air/fuel mixture in accordance with the calculated predicted value of said output deviation based on said one modulation algorithm such that the output of said downstream air/fuel ratio sensor converges to said target value, and said second air/fuel ratio control means controls the air/fuel ratio of the air/fuel mixture in accordance with the calculated predicted value of said output deviation based on said response specifying control algorithm such that the output of said downstream air/fuel ratio sensor converges to said target value.

45. A control apparatus according to claim 32, wherein:

said first air/fuel ratio control means includes first air/fuel ratio calculating means for calculating said target air/fuel ratio in accordance with said output deviation based on an algorithm which applies a controlled object model and said one modulation algorithm, said controlled object model having a variable associated with a value indicative of said target air/fuel ratio of the air/fuel mixture for converging the output of said downstream air/fuel ratio sensor to said target value, ad a variable associated with a value indicative of the output of said downstream air/fuel ratio sensor, wherein said first air/fuel ratio control means controls the air/fuel ratio of the air/fuel mixture in accordance with the calculated target air/fuel ratio, and said second air/fuel ratio control means includes second air/fuel ratio calculating means for calculating said target air/fuel ratio in accordance with said output deviation based on an algorithm which applies a controlled object model and said response specifying control algorithm, said controlled object model having a variable associated with a value indicative of said target air/fuel ratio of the air/fuel mixture for converging the output of said downstream air/fuel ratio sensor to said target value, and a variable associated with a value indicative of the output of said downstream air/fuel ratio sensor, wherein said second air/fuel ratio control means controls the air/fuel ratio of the air/fuel mixture in accordance with the calculated target air/fuel ratio.

46. A control apparatus according to claim 45, further comprising identifying means for identifying a model parameter for said controlled object model in accordance with said target air/fuel ratio and the output of said downstream air/fuel ratio sensor.

47. A control apparatus according to claim 46, wherein:

said controlled object model comprises a discrete time system model, wherein said identifying means identifies the model parameter for said discrete time system model in accordance with discrete data of said target air/fuel ratio and discrete data of the output of said downstream air/fuel ratio sensor.

48. A control apparatus according to claim 45, further comprising model parameter setting means for setting the model parameter for said controlled object model in accordance with said operating condition parameter.

49. A control apparatus according to claim 32, further comprising:

an upstream air/fuel ratio sensor for outputting a detection signal indicative of an air/fuel ratio of exhaust gases at a location upstream of said catalyzer in said exhaust pipe of said internal combustion engine, said first air/fuel ratio control means includes first air/fuel ratio calculating means for calculating said target air/fuel ratio in accordance with said output deviation based on an algorithm which applies a controlled object model and said one modulation algorithm, said controlled object model having a variable associated with a value indicative of one of said target air/fuel ratio of the air/fuel mixture for converging the output of said downstream air/fuel ratio sensor to said target value and a value indicative of an output of said upstream air/fuel ratio sensor, and a variable associated with a value indicative of the output of said downstream air/fuel ratio sensor, wherein said first air/fuel ratio control means controls he air/fuel ratio of the air/fuel mixture in accordance with the calculated target air/fuel ratio, and said second air/fuel ratio control means includes second air/fuel ratio calculating means for calculating said target air/fuel ratio in accordance with said output deviation based on an algorithm which applies a controlled object model and said response specifying control algorithm, said controlled object model having a variable associated with a value indicative of one of said target air/fuel ratio of the air/fuel mixture for converging the output of said downstream air/fuel ratio sensor to said target value and a value indicative of an output of said upstream air/fuel ratio sensor, and a variable associated with a value indicative of the output of said downstream air/fuel ratio sensor, wherein said second air/fuel ratio control means controls the air/fuel ratio of the air/fuel mixture in accordance with the calculated target air/fuel ratio.

50. A control apparatus according to claim 49, further comprising identifying means for identifying the model parameter for said controlled object model in accordance with one of said target air/fuel ratio and the output of said upstream air/fuel ratio sensor, and the output of said downstream air/fuel ratio sensor.

51. A control apparatus according to claim 50, wherein:
said controlled object model comprises a discrete time system model,
wherein said identifying means identifies the model parameter for said discrete time system model in accordance with one of discrete data of said target air/fuel ratio and discrete data of the output of said upstream air/fuel ratio sensor, and discrete data of the output of said downstream air/fuel ratio sensor.

52. A control apparatus according to claim 49, further comprising a model parameter setting means for setting a model parameter for said controlled object model in accordance with said operating condition parameter.

53. A control apparatus according to claim 32, wherein said response specifying control algorithm is a sliding mode control algorithm.

54. A control method comprising the steps of:
calculating a deviation of an output of a controlled object from a predetermined target value; and
calculating a control input to said controlled object based on one modulation algorithm selected from a Δ modulation algorithm, a ΔΣ modulation algorithm, and a ΣΔ modulation algorithm for converging the output of said controlled object to said target value in accordance with the calculated deviation;
wherein said step of calculating a control input includes calculating a first intermediate value in accordance with said deviation based on said one modulation algorithm, and calculating said control input based on a product of said calculated first intermediate value and a predetermined gain.

55. A control method according to claim 54, further comprising the step of:
detecting a gain parameter indicative of a gain characteristic of said controlled object; and
setting said gain in accordance with the detected gain parameter.

56. A control method according to claim 54, wherein said step of calculating a control input includes calculating a second intermediate value in accordance with said deviation based on said one modulation algorithm, and calculating said control input by adding a predetermined value to said calculated second intermediate value.

57. A control method according to claim 54, wherein:
said step of calculating a deviation includes calculating a predicted value of said deviation in accordance with said deviation based on a prediction algorithm, and
said step of calculating a control input includes calculating said control input in accordance with the calculated predicted value of said deviation based on said one modulation algorithm.

58. A control method according to claim 54, wherein:
said step of calculating a control input includes calculating said control input in accordance with said deviation based further on a controlled object model which models said controlled object.

59. A control method according to claim 58, further comprising the step of identifying a model parameter for said controlled object model in accordance with one of said calculated control input and a value reflecting the control input inputted to said controlled object, and an output of said controlled object.

60. A control method according to claim 59, wherein:
said controlled object model comprises a discrete time system model,
wherein said step of identifying includes identifying a model parameter for said discrete time system model in accordance with one of discrete data of said control input and discrete data of the value reflecting the control input inputted to said controlled object, and discrete data of the output of said controlled object.

61. A control method according to claim 58, further comprising the steps of:
detecting a dynamic characteristic parameter indicative of a change in a dynamic characteristic of said controlled object; and
setting a model parameter for said controlled object model in accordance with the detected dynamic characteristic parameter.

62. A control method comprising the steps of:
calculating a deviation of an output of a controlled object from a predetermined target value;
calculating a control input to said controlled object based on one modulation algorithm selected from a Δ modulation algorithm, a ΔΣ modulation algorithm, and a ΣΔ modulation algorithm for converging the output of said controlled object to said target value in accordance with the calculated deviation;
calculating a control input to said controlled object in accordance with the calculated deviation based on a response specifying control algorithm for converging the output of said controlled object to said target value;
detecting a state of said controlled object; and
selecting one of the control input calculated based on the one modulation algorithm and the control input calculated based on the response specifying control algorithm in accordance with the detected state of said controlled object as a control input which should be inputted to said controlled object.

63. A control method according to claim 62, wherein said step of calculating a control input to said controlled object based on one modulation algorithm includes calculating a first intermediate value in accordance with said deviation based on said one modulation algorithm, and calculating said control input based on a product of said calculated first intermediate value and a predetermined gain.

64. A control method according to claim 63, wherein:
said step of detecting a controlled object state includes detecting a gain parameter indicative of a gain characteristic of said controlled object, and
said control method further comprises the step of setting said gain in accordance with the detected gain parameter.

65. A control method according to claim 62, wherein said step of calculating a control input to said controlled object based on one modulation algorithm includes calculating a second intermediate value in accordance with said deviation based on said one modulation algorithm, and calculating said control input by adding a predetermined value to said calculated second intermediate value.

66. A control method according to claim 62, wherein said step of calculating a deviation includes calculating a predicted value of said deviation in accordance with said deviation based on a prediction algorithm,
wherein said step of calculating a control input to said controlled object based on one modulation algorithm includes calculating said control input in accordance with the calculated predicted value of said deviation based on said one modulation algorithm; and
said step of calculating a control input to said controlled object based on a response specifying control algorithm includes calculating said control input in accordance with the calculated predicted value of said deviation based on said response specifying control algorithm.

67. A control method according to claim 62, wherein:
said step of calculating a control input to said controlled object based on one modulation algorithm includes calculating said control input in accordance with said deviation based further on a controlled object model which models said controlled object; and
said step of calculating a control input to said controlled object based on a response specifying control algorithm includes calculating said control input in accordance with said deviation based further on a controlled object model which models said controlled object.

68. A control method according to claim 67, further comprising the step of identifying a model parameter for said controlled object model in accordance with one of said calculated control input and a value reflecting the control input inputted to said controlled object, and an output of said controlled object.

69. A control method according to claim 68, wherein:
said controlled object model comprises a discrete time system model,
wherein said step of identifying includes identifying a model parameter for said discrete time system model in accordance with one of discrete data of said control input and discrete data of the value reflecting the control input inputted to said controlled object, and discrete data of the output of said controlled object.

70. A control method according to claim 67, further comprising the steps of:
detecting a dynamic characteristic parameter indicative of a change in a dynamic characteristic of said controlled object; and
setting a model parameter for said controlled object model in accordance with the detected dynamic characteristic parameter.

71. A control method according to claim 62, wherein said response specifying control algorithm is a sliding mode control algorithm.

72. A control method comprising the steps of:
outputting a detection signal indicative of an air/fuel ratio of exhaust gases at a location downstream of a catalyzer in an exhaust pipe of an internal combustion engine;
calculating an output deviation of an output of said downstream air/fuel ratio sensor from a predetermined target value; and
controlling an air/fuel ratio of an air/fuel mixture supplied to said internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of said downstream air/fuel ratio sensor converges to said target value.

73. A control method according to claim 72, wherein said step of controlling an air/fuel ratio includes:
calculating a first intermediate value in accordance with said output deviation based on said one modulation algorithm;
calculating a target air/fuel ratio of the air/fuel mixture for converging the output of said downstream air/fuel ratio sensor to said target value based on a product of said calculated first intermediate value and a predetermined gain; and
controlling the air/fuel ratio of the air/fuel mixture in accordance with the calculated target air/fuel ratio.

74. A control method according to claim 73, further comprising the steps of:
detecting an operating condition parameter indicative of an operating condition of said internal combustion engine; and
setting said gain in accordance with the detected operating condition parameter.

75. A control method according to claim 72, wherein said step of controlling an air/fuel ratio includes:
calculating a second intermediate value in accordance with said output deviation based on said one modulation algorithm;
calculating a target air/fuel ratio of the air/fuel mixture for converging the output of said downstream air/fuel ratio sensor to said target value by adding a predetermined value to the calculated second intermediate value; and
controlling the air/fuel ratio of the air/fuel mixture in accordance with the calculated target air/fuel ratio.

76. A control method according to claim 72, wherein:
said step of calculating an output deviation includes calculating a predicted value of said output deviation in accordance with said output deviation based on a prediction algorithm, and
said step of controlling an air/fuel ratio includes controlling the air/fuel ratio of the air/fuel mixture in accordance with the calculated predicted value of said output deviation based on said one modulation algorithm such that the output of said downstream air/fuel ratio sensor converges to said target value.

77. A control method according to claim 72, wherein:
said step of controlling an air/fuel ratio includes calculating said target air/fuel ratio in accordance with said output deviation based on an algorithm which applies a controlled object model and said one modulation algorithm, said controlled object model having a variable associated with a value indicative of said target air/fuel ratio of the air/fuel mixture for converging the output of said downstream air/fuel ratio sensor to said target value, and a variable associated with a value indicative of the output of said downstream air/fuel ratio sensor; and controlling the air/fuel ratio of the air/fuel mixture in accordance with the calculated target air/fuel ratio.

78. A control method according to claim 77, further comprising the step of identifying a model parameter for said controlled object model in accordance with said target air/fuel ratio and the output of said downstream air/fuel ratio sensor.

79. A control method according to claim 78, wherein:

said controlled object model comprises a discrete time system model, wherein said step of identifying includes identifying a model parameter for said discrete time system model in accordance with discrete data of said target air/fuel ratio, and discrete data of the output of said downstream air/fuel ratio sensor.

80. A control method according to claim 77, further comprising the steps of:

detecting an operating condition parameter indicative of an operating condition of said internal combustion engine; and setting a model parameter for said controlled object model in accordance with the detected operating condition parameter.

81. A control method according to claim 72, further comprising the step of:

outputting a detection signal indicative of an air/fuel ratio of exhaust gases at a location downstream of said catalyzer in said exhaust pipe of said internal combustion engine, wherein said step of controlling an air/fuel ratio includes:

calculating said target air/fuel ratio in accordance with said output deviation based on an algorithm which applies a controlled object model and said one modulation algorithm, said controlled object model having a variable associated with a value indicative of one of said target air/fuel ratio of the air/fuel mixture for converging the output of said downstream air/fuel ratio sensor to said target value and a value indicative of an output of said upstream air/fuel ratio sensor, and a variable associated with a value indicative of the output of said downstream air/fuel ratio sensor; and controlling the air/fuel ratio of the air/fuel mixture supplied to said internal combustion engine in accordance with the calculated target air/fuel ratio.

82. A control method according to claim 81, further comprising the step of identifying a model parameter for said controlled object model in accordance with one of said target air/fuel ratio and the output of said upstream air/fuel ratio sensor, and the output of said downstream air/fuel ratio sensor.

83. A control method according to claim 82, wherein:

said controlled object model comprises a discrete time system model, wherein said step of identifying includes identifying the model parameter for said discrete time system model in accordance with one of discrete data of said target air/fuel ratio and discrete data of the output of said upstream air/fuel ratio sensor, and discrete data of the output of said downstream air/fuel ratio sensor.

84. A control method according to claim 81, further comprising the steps of:

detecting an operating condition parameter indicative of an operating condition of said internal combustion engine; and setting a model parameter for said controlled object model in accordance with the detected operating condition parameter.

85. A control method comprising the steps of:

outputting a detection signal indicative of an air/fuel ratio of exhaust gases at a location downstream of a catalyzer in an exhaust pipe of an internal combustion engine;

calculating an output deviation of an output of said downstream air/fuel ratio sensor from a predetermined target value;

controlling an air/fuel ratio of an air/fuel mixture supplied to said internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of said downstream air/fuel ratio sensor converges to said target value;

controlling the air/fuel ratio of the air/fuel mixture supplied to said internal combustion engine in accordance with the calculated output deviation based on a response specifying control algorithm such that the output of said downstream air/fuel ratio sensor converges to said target value;

detecting an operating condition parameter indicative of an operating condition of said internal combustion engine; and selecting one of the air/fuel ratio controlled based on the one modulation algorithm and the air/fuel ratio controlled based on the response specifying control algorithm in accordance with the detected operating condition parameter to control the air/fuel ratio of the air/fuel mixture.

86. A control method according to claim 85, wherein said step of selecting includes selecting one of the air/fuel ratio controlled based on the one modulation algorithm and the air/fuel ratio controlled based on the response specifying control algorithm in accordance with at least one of whether or not said catalyzer has a total amount of catalyst loaded therein equal to or larger than a predetermined load amount, and whether or not a carrier for carrying said catalyst in said catalyzer has a length in a direction in which said exhaust pipe extends equal to or longer than a predetermined length.

87. A control method according to claim 85, wherein said step of selecting includes:

discriminating an operation mode of said internal combustion engine in accordance with said operating condition parameter; and selecting the air/fuel ratio controlled based on the one modulation algorithm when the discriminated operation mode is a predetermined first operation mode, and selecting the air/fuel ratio controlled based on the response specifying control algorithm when the discriminated operation mode is a predetermined second operation mode.

88. A control method according to claim 85, wherein:

said catalyzer comprises a plurality of catalyzers disposed along said exhaust pipe of said internal combustion engine and spaced apart from each other, and said step of selecting includes discriminating an operation mode of said internal combustion engine in accordance with said operating condition parameter; and selecting the air/fuel ratio controlled based on the one modulation algorithm when the discriminated operation mode is a predetermined first operation mode, and selecting the air/fuel ratio controlled based on the response specifying control algorithm when the discriminated operation mode is a predetermined second operation mode.

89. A control method according to claim 85, wherein:

said internal combustion engine comprises a downstream catalyzer in said exhaust pipe at a location downstream of said downstream air/fuel ratio sensor, and said step of selecting includes:

discriminating an operation mode of said internal combustion engine in accordance with said operating condition parameter; and selecting the air/fuel ratio controlled based or the one modulation algorithm when the discriminated operation mode is a predetermined first operation mode, and selecting the air/fuel ratio controlled based on the response specifying control algorithm when the discriminated operation mode is a predetermined second operation mode.

90. A control method according to claim 89, wherein:

the total amount of catalyst loaded in said downstream catalyzer is set smaller than the total amount of catalyst loaded in said catalyzer, and said target value is set to provide the highest purification percentage for said catalyzer.

91. A control method according to claim 87, wherein said first operation mode includes a transient operation mode of said internal combustion engine.

92. A control method according to claim 87, wherein said first operation mode includes an idle operation mode.

93. A control method according to claim 87, wherein said second operation mode includes a steady-state operation mode in which said internal combustion engine is loaded substantially in a steady-state.

94. A control method according to claim 85, wherein said step of controlling an air/fuel ratio based on one modulation algorithm includes:

calculating a first intermediate value in accordance with said output deviation based on said one modulation algorithm;

calculating a target air/fuel ratio of the air/fuel mixture for converging the output of said downstream air/fuel ratio sensor to said target value based on a product of said calculated first intermediate value and a predetermined gain; and controlling the air/fuel ratio of the air/fuel mixture in accordance with the calculated target air/fuel ratio.

95. A control method according to claim 94, further comprising the step of setting said gain in accordance with said operating condition parameter.

96. A control method according to claim 85, wherein said step of controlling an air/fuel ratio control based on one modulation algorithm includes:

calculating a second intermediate value in accordance with said output deviation based on said one modulation algorithm;

calculating a target air/fuel ratio of the air/fuel mixture for converging the output of said downstream air/fuel ratio sensor to said target value by adding a predetermined value to the calculated second intermediate value; and controlling the air/fuel ratio of the air/fuel mixture in accordance with the calculated target air/fuel ratio.

97. A control method according to claim 85, wherein:

said step of calculating an output deviation includes calculating a predicted value of said output deviation in accordance with said output deviation based on a prediction algorithm;

said step of controlling an air/fuel ratio based on one modulation algorithm includes controlling the air/fuel ratio of the air/fuel mixture in accordance with the calculated predicted value of said output deviation based on said one modulation algorithm such that the output of said downstream air/fuel ratio sensor converges to said target value; and said step of controlling the air/fuel ratio based on a response specifying control algorithm includes controlling the air/fuel ratio of the air/fuel mixture in accordance with the calculated predicted value of said output deviation based on said response specifying control algorithm such that the output of said downstream air/fuel ratio sensor converges to said target value.

98. A control method according to claim 85, wherein:

said step of controlling an air/fuel ratio based pn one modulation algorithm includes:

calculating said target air/fuel ratio in accordance with said output deviation based on an algorithm which applies a controlled object model and said one modulation algorithm, said controlled object model having a variable associated with a value indicative of said target air/fuel ratio of the air/fuel mixture for converging the output of said downstream air/fuel ratio sensor to said target value, aid a variable associated with a value indicative of the output of said downstream air/fuel ratio sensor; and controlling the air/fuel ratio of the air/fuel mixture in accordance with the calculated target air/fuel ratio, and said step of controlling the air/fuel ratio control based on a response specifying control algorithm includes:

calculating said target air/fuel ratio in accordance with said output deviation based on an algorithm which applies a controlled object model and said response specifying control algorithm, said controlled object model having a variable associated with a value indicative of said target air/fuel ratio of the air/fuel mixture for converging the output of said downstream air/fuel ratio sensor to said target value, and a variable associated with a value indicative of the output of said downstream air/fuel ratio sensor; and controlling the air/fuel ratio of the air/fuel mixture in accordance with the calculated target air/fuel ratio.

99. A control method according to claim 98, further comprising the step of identifying a model parameter for said controlled object model in accordance with said target air/fuel ratio and the output of said downstream air/fuel ratio sensor.

100. A control method according to claim 99, wherein:

said controlled object model comprises a discrete time system model, wherein said step of identifying includes identifying the model parameter for said discrete time system model in accordance with discrete data of said target air/fuel ratio and discrete data of the output of said downstream air/fuel ratio sensor.

101. A control method according to claim 98, further comprising the step of setting the model parameter for said controlled object model in accordance with said operating condition parameter.

102. A control method according to claim 85, further comprising the step of outputting a detection signal indicative of an air/fuel ratio of exhaust gases at a location upstream of said catalyzer in said exhaust pipe of said internal combustion engine,
wherein said step of controlling an air/fuel ratio based on one modulation algorithm includes:
calculating said target air/fuel ratio in accordance with said output deviation based on an algorithm which applies a controlled object model and said one modulation algorithm, said controlled object model having a variable associated with a value indicative of one of said target air/fuel ratio of the air/fuel mixture for converging the output of said downstream air/fuel ratio sensor to said target value and a value indicative of an output of said upstream air/fuel ratio sensor, and a variable associated with a value indicative of the output of said downstream air/fuel ratio sensor; and
controlling the air/fuel ratio of the air/fuel mixture in accordance with the calculated target air/fuel ratio, and
said step of controlling the air/fuel ratio based on a response specifying control algorithm includes:
calculating said target air/fuel ratio in accordance with said output deviation based on an algorithm which applies a controlled object model and said response specifying control algorithm, said controlled object model having a variable associated with a value indicative of one of said target air/fuel ratio of the air/fuel mixture for converging the output of said downstream air/fuel ratio sensor to said target value and a value indicative of an output of said upstream air/fuel ratio sensor, and a variable associated with a value indicative of the output of said downstream air/fuel ratio sensor; and
controlling the air/fuel ratio of the air/fuel mixture in accordance with the calculated target air/fuel ratio.

103. A control method according to claim 102, further comprising the step of identifying the model parameter for said controlled object model in accordance with one of said target air/fuel ratio and the output of said upstream air/fuel ratio sensor, and the output of said downstream air/fuel ratio sensor.

104. A control method according to claim 103, wherein:
said controlled object model comprises a discrete time system model,
wherein said step of identifying includes identifying the model parameter for said discrete time system model in accordance with one of discrete data of said target air/fuel ratio and discrete data of the output of said upstream air/fuel ratio sensor, and discrete data of the output of said downstream air/fuel ratio sensor.

105. A control method according to claim 102, further comprising the step of setting a model parameter for said controlled object model in accordance with said operating condition parameter.

106. A control method according to claim 85, wherein said response specifying control algorithm is a sliding mode control algorithm.

107. An engine control unit including
a control program for causing a computer to calculate a deviation of an output of a controlled object from a predetermined target value; and
calculate a control input to said controlled object based on one modulation algorithm selected from a $\Delta$ modulation algorithm, a $\Delta\Sigma$ modulation algorithm, and a $\Sigma\Delta$ modulation algorithm for converging the output of said controlled object to said target value in accordance with the calculated deviation
wherein said control program further causes the computer to calculate a first intermediate value in accordance with said deviation based on said one modulation algorithm, and calculate said control input based on a product of said calculated first intermediate value and a predetermined gain.

108. An engine control unit according to claim 107, wherein said control program further causes the computer to detect a gain parameter indicative of a gain characteristic of said controlled object; and set said gain in accordance with the detected gain parameter.

109. An engine control unit according to claim 107, wherein said control program causes the computer to calculate a second intermediate value in accordance with said deviation based on said one modulation algorithm, and calculating said control input by adding a predetermined value to said calculated second intermediate value.

110. An engine control unit according to claim 107, wherein said control program causes the computer to calculate a predicted value of said deviation in accordance with said deviation based on a prediction algorithm; and calculate said control input in accordance with the calculated predicted value of said deviation based on said one modulation algorithm.

111. An engine control unit according to claim 107, wherein said control program causes the computer to calculate said control input in accordance with said deviation based further on a controlled object model which models said controlled object.

112. An engine control unit according to claim 111, wherein said control program further causes the computer to identify a model parameter for said controlled object model in accordance with one of said calculated control input and a value reflecting the control input inputted to said controlled object, and an output of said controlled object.

113. An engine control unit according to claim 112, wherein:
said controlled object model comprises a discrete time system model,
wherein said control program causes the computer to identify a model parameter for said discrete time system model in accordance with one of discrete data of said control input and discrete data of the value reflecting the control input inputted to said controlled object, and discrete data of the output of said controlled object.

114. An engine control unit according to claim 111, wherein said control program further causes the computer to detect a dynamic characteristic parameter indicative of a change in a dynamic characteristic of said controlled object; and set a model parameter for said controlled object model in accordance with the detected dynamic characteristic parameter.

115. An engine control unit including a control program for causing a computer to calculate a deviation of an output of a controlled object from a predetermined target value; calculate a control input to said controlled object based on one modulation algorithm selected from a $\Delta$ modulation algorithm, a $\Delta\Sigma$ modulation algorithm, and a $\Sigma\Delta$ modulation algorithm for converging the output of said controlled object to said target value in accordance with the calculated deviation; calculate a control input to said controlled object in accordance with the calculated deviation based on a response specifying control algorithm for converging the output of said controlled object to said target value; detect a state of said controlled object; and select one of the control input calculated based on the one modulation algorithm and the control input calculated based on the response specifying control algorithm in accordance with the detected state of said controlled object as a control input which should be inputted to said controlled object.

116. An engine control unit according to claim 115, wherein said control program causes the computer to calculate a first intermediate value in accordance with said deviation based on said one modulation algorithm, and calculate said control input based on a product of said calculated first intermediate value and a predetermined gain.

117. An engine control unit according to claim 116, wherein said control program causes the computer to detect a controlled object state includes detecting a gain parameter indicative of a gain characteristic of said controlled object, and set said gain in accordance with the detected gain parameter.

118. An engine control unit according to claim 115, wherein said control program causes the computer to calculate a second intermediate value in accordance with said deviation based on said one modulation algorithm, and calculate said control input by adding a predetermined value to said calculated second intermediate value.

119. An engine control unit according to claim 115, wherein said control program causes the computer to calculate a predicted value of said deviation in accordance with said deviation based on a prediction algorithm; calculate said control input in accordance with the calculated predicted value of said deviation based on said one modulation algorithm; and calculate a control input to said controlled object based on a response specifying control algorithm includes calculating said control input in accordance with the calculated predicted value of said deviation based on said response specifying control algorithm.

120. An engine control unit according to claim 115, wherein said control program causes the computer to calculate said control input in accordance with said deviation based on said one modulation algorithm, and a controlled object model which models said controlled object; and calculate said control input in accordance with said deviation based on said response specifying control algorithm, and a controlled object model which models said controlled object.

121. An engine control unit according claim 120, wherein said control program further causes the computer to identify a model parameter for said controlled object model in accordance with one of said calculated control input and a value reflecting the control input inputted to said controlled object, and an output of said controlled object.

122. An engine control unit according to claim 121, wherein:
said controlled object model comprises a discrete time system model,
wherein said control program causes the computer to identify a model parameter for said discrete time system model in accordance with one of discrete data of said control input and discrete data of the value reflecting the control input inputted to said controlled object, and discrete data of the output of said controlled object.

123. An engine control unit according to claim 120, wherein said control program further causes the computer to detect a dynamic characteristic parameter indicative of a change in a dynamic characteristic of said controlled object; and set a model parameter for said controlled object model in accordance with the detected dynamic characteristic parameter.

124. An engine control unit according to claim 115, wherein said response specifying control algorithm is a sliding mode control algorithm.

125. An engine control unit including a control program for causing a computer to output a detection signal indicative of an air/fuel ratio of exhaust gases at a location downstream of a catalyzer in an exhaust pipe of an internal combustion engine; calculate an output deviation of an output of said downstream air/fuel ratio sensor from a predetermined target value; and control an air/fuel ratio of an air/fuel mixture supplied to said internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of said downstream air/fuel ratio sensor converges to said target value.

126. An engine control unit according to claim 125, wherein said control program causes the computer to calculate a first intermediate value in accordance with said output deviation based on said one modulation algorithm, and calculate a target air/fuel ratio of the air/fuel mixture for converging the output of said downstream air/fuel ratio sensor to said target value based on a product of said calculated first intermediate value and a predetermined gain; and control the air/fuel ratio of the air/fuel mixture in accordance with the calculated target air/fuel ratio.

127. An engine control unit according to claim 126, wherein said control program further causes the computer to detect an operating condition parameter indicative of an operating condition of said internal combustion engine; and set said gain in accordance with the detected operating condition parameter.

128. An engine control unit according to claim 125, wherein said control program causes the computer to calculate a second intermediate value in accordance with said output deviation based on said one modulation algorithm; calculate a target air/fuel ratio of the air/fuel mixture for converging the output of said downstream air/fuel ratio sensor to said target value by adding a predetermined value to the calculated second intermediate value; and control the air/fuel ratio of the air/fuel mixture in accordance with the calculated target air/fuel ratio.

129. An engine control unit according to claim 125, wherein said control program causes the computer to calculate a predicted value of said output deviation in accordance with said output deviation based on a prediction algorithm; and control the air/fuel ratio of the air/fuel mixture in accordance with the calculated predicted value of said output deviation based on said one modulation algorithm such that the output of said downstream air/fuel ratio sensor converges to said target value.

130. An engine control unit according to claim 125, wherein said control program causes the computer to calculate said target air/fuel ratio in accordance with said output deviation based on an algorithm which applies a controlled object model and said one modulation algorithm, said controlled object model having a variable associated with a value indicative of said target air/fuel ratio of the air/fuel mixture for converging the output of said downstream air/fuel ratio sensor to said target value, and a variable associated with a value indicative of the output of said downstream air/fuel ratio sensor; and control the air/fuel ratio of the air/fuel mixture in accordance with the calculated target air/fuel ratio.

131. An engine control unit according to claim 130, wherein said control program further causes the computer to identify a model parameter for said controlled object model in accordance with said target air/fuel ratio and the output of said downstream air/fuel ratio sensor.

132. An engine control unit according to claim 131, wherein:
said controlled object model comprises a discrete time system model,
wherein said control program causes the computer to identify a model parameter for said discrete time system model in accordance with discrete data of said target air/fuel ratio, and discrete data of the output of said downstream air/fuel ratio sensor.

133. An engine control unit according to claim 130, wherein said control program further causes the computer to detect an operating condition parameter indicative of an operating condition of said internal combustion engine; and set a model parameter for said controlled object model in accordance with the detected operating condition parameter.

134. An engine control unit according to claim 125, wherein said control program further causes the computer to output a detection signal indicative of an air/fuel ratio of exhaust gases at a location downstream of said catalyzer in said exhaust pipe of said internal combustion engine; calculate said target air/fuel ratio in accordance with said output deviation based on an algorithm which applies a controlled object model and said one modulation algorithm, said controlled object model having a variable associated with a value indicative of one of said target air/fuel ratio of the air/fuel mixture for converging the output of said downstream air/fuel ratio sensor to said target value and a value indicative of an output of said upstream air/fuel ratio sensor, and a variable associated with a value indicative of the output of said downstream air/fuel ratio sensor; and control the air/fuel ratio of the air/fuel mixture supplied to said internal combustion engine in accordance with the calculated target air/fuel ratio.

135. An engine control unit according to claim 134, wherein said control program further causes the computer to identify a model parameter for said controlled object model in accordance with one of said target air/fuel ratio and the output of said upstream air/fuel ratio sensor, and the output of said downstream air/fuel ratio sensor.

136. An engine control unit according to claim 135, wherein:
said controlled object model comprises a discrete time system model,
wherein said control program causes the computer to identify the model parameter for said discrete time system model in accordance with one of discrete data of said target air/fuel ratio and discrete data of the output of said upstream air/fuel ratio sensor, and discrete data of the output of said downstream air/fuel ratio sensor.

137. An engine control unit according to claim 134, wherein said control program further causes the computer to detect an operating condition parameter indicative of an operating condition of said internal combustion engine; and set a model parameter for said controlled object model in accordance with the detected operating condition parameter.

138. An engine control unit including a control program for causing a computer to output a detection signal indicative of an air/fuel ratio of exhaust gases at a location downstream of a catalyzer in an exhaust pipe of an internal combustion engine; calculate an output deviation of an output of said downstream air/fuel ratio sensor from a predetermined target value; control an air/fuel ratio of an air/fuel mixture supplied to said internal combustion engine in accordance with the calculated output deviation based on one modulation algorithm selected from a $\Delta$ modulation algorithm, a $\Delta\Sigma$ modulation algorithm, and a $\Sigma\Delta$ modulation algorithm such that the output of said downstream air/fuel ratio sensor converges to said target value; control the air/fuel ratio of the air/fuel mixture supplied to said internal combustion engine in accordance with the calculated output deviation based on a response specifying control algorithm such that the output of said downstream air/fuel ratio sensor converges to said target value; detect an operating condition parameter indicative of an operating condition of said internal combustion engine; and select one of the air/fuel ratio controlled based on the one modulation algorithm and the air/fuel ratio controlled based on the response specifying control algorithm in accordance with the detected operating condition parameter to control the air/fuel ratio of the air/fuel mixture.

139. An engine control unit according to claim 138, wherein said control program causes the computer to select one of the air/fuel ratio controlled based on the one modulation algorithm and the air/fuel ratio controlled based on the response specifying control algorithm in accordance with at least one of whether or not said catalyzer has a total amount of catalyst loaded therein equal to or larger than a predetermined load amount, and whether or not a carrier for carrying said catalyst in said catalyzer has a length in a direction in which said exhaust pipe extends equal to or longer than a predetermined length.

140. An engine control unit according to claim 138, wherein said control program causes the computer to discriminate an operation mode of said internal combustion engine in accordance with said operating condition parameter; select the air/fuel ratio controlled based on the one modulation algorithm when the discriminated operation mode is a predetermined first operation mode; and select the air/fuel ratio controlled based on the response specifying control algorithm when the discriminated operation mode is a predetermined second operation mode.

141. An engine control unit according to claim 138, wherein said catalyzer comprises a plurality of catalyzers disposed along said exhaust pipe of said internal combustion engine and spaced apart from each other,
wherein said control program causes the computer to discriminate an operation mode of said internal combustion engine in accordance with said operating condition parameter; select the air/fuel ratio controlled based on the one modulation algorithm when the discriminated operation mode is a predetermined first operation mode; and select the air/fuel ratio controlled based on the response specifying control algorithm when the discriminated operation mode is a predetermined second operation mode.

142. An engine control unit according to claim 138, wherein said internal combustion engine comprises a downstream catalyzer in said exhaust pipe at a location downstream of said downstream air/fuel ratio sensor,
wherein said control program causes the computer to discriminate an operation mode of said internal combustion engine in accordance with said operating condition parameter; select the air/fuel ratio controlled based on the one modulation algorithm when the discriminated operation mode is a predetermined first operation mode; and select the air/fuel ratio controlled based on the response specifying control algorithm when the discriminated operation mode is a predetermined second operation mode.

143. An engine control unit according to claim 142, wherein:

the total amount of catalyst loaded in said downstream catalyzer is set smaller than the total amount of catalyst loaded in said catalyzer, and said target value is set to provide the highest purification percentage for said catalyzer.

144. An engine control unit according to claim 140, wherein said first operation mode includes a transient operation mode of said internal combustion engine.

145. An engine control unit according to claim 140, wherein said first operation mode includes an idle operation mode.

146. An engine control unit according to claim 140, wherein said second operation mode includes a steady-state operation mode in which said internal combustion engine is loaded substantially in a steady-state.

147. An engine control unit according to claim 138, wherein said control program causes the computer to calculate a first intermediate value in accordance with said output deviation based on said one modulation algorithm; calculate a target air/fuel ratio of the air/fuel mixture for converging the output of said downstream air/fuel ratio sensor to said target value based on a product of said calculated first intermediate value and a predetermined gain; and control the air/fuel ratio of the air/fuel mixture in accordance with the calculated target air/fuel ratio.

148. An engine control unit according to claim 147, wherein said control program further causes the computer to set said gain in accordance with said operating condition parameter.

149. An engine control unit according to claim 138, wherein said control program causes the computer to calculate a second intermediate value in accordance with said output deviation based on said one modulation algorithm; calculate a target air/fuel ratio of the air/fuel mixture for converging the output of said downstream air/fuel ratio sensor to said target value by adding a predetermined value to the calculated second intermediate value; and control the air/fuel ratio of the air/fuel mixture in accordance with the calculated target air/fuel ratio.

150. An engine control unit according to claim 138, wherein said control program causes the computer to calculate a predicted value of said output deviation in accordance with said output deviation based on a prediction algorithm; control the air/fuel ratio of the air/fuel mixture in accordance with the calculated predicted value of said output deviation based on said one modulation algorithm such that the output of said downstream air/fuel ratio sensor converges to said target value; and control the air/fuel ratio of the air/fuel mixture in accordance with the calculated predicted value of said output deviation based on said response specifying control algorithm such that the output of said downstream air/fuel ratio sensor converges to said target value.

151. An engine control unit according to claim 138, wherein said control program causes the computer to calculate said target air/fuel ratio in accordance with said output deviation based on an algorithm which applies a controlled object model and said one modulation algorithm, said controlled object model having a variable associated with a value indicative of said target air/fuel ratio of the air/fuel mixture for converging the output of said downstream air/fuel ratio sensor to said target value, and a variable associated with a value indicative of the output of said downstream air/fuel ratio sensor; and control the air/fuel ratio of the air/fuel mixture in accordance with the calculated target air/fuel ratio; calculate said target air/fuel ratio in accordance with said output deviation based on an algorithm which applies a controlled object model and said response specifying control algorithm, said controlled object model having a variable associated with a value indicative of said target air/fuel ratio of the air/fuel mixture for converging the output of said downstream air/fuel ratio sensor to said target value, and a variable associated with a value indicative of the output of said downstream air/fuel ratio sensor; and control the air/fuel ratio of the air/fuel mixture in accordance with the calculated target air/fuel ratio.

152. An engine control unit according to claim 151, wherein said control program further causes the computer to identify a model parameter for said controlled object model in accordance with said target air/fuel ratio and the output of said downstream air/fuel ratio sensor.

153. An engine control unit according to claim 152, wherein:

said controlled object model comprises a discrete time system model, wherein said control program causes the computer to identify the model parameter for said discrete time system model in accordance with discrete data of said target air/fuel ratio and discrete data of the output of said downstream air/fuel ratio sensor.

154. An engine control unit according to claim 151, wherein said control program further causes the computer to set the model parameter for said controlled object model in accordance with said operating condition parameter.

155. An engine control unit according to claim 138, wherein said control program further causes the computer to output a detection signal indicative of an air/fuel ratio of exhaust gases at a location upstream of said catalyzer in said exhaust pipe of said internal combustion engine; calculate said target air/fuel ratio in accordance with said output deviation based on an algorithm which applies a controlled object model and said one modulation algorithm, said controlled object model having a variable associated with a value indicative of one of said target air/fuel ratio of the air/fuel mixture for converging the output of said downstream air/fuel ratio sensor to said target value and a value indicative of an output of said upstream air/fuel ratio sensor, and a variable associated with a value indicative of the output of said downstream air/fuel ratio sensor; and control the air/fuel ratio of the air/fuel mixture in accordance with the calculated target air/fuel ratio; and calculate said target air/fuel ratio in accordance with said output deviation based on an algorithm which applies a controlled object model and said response specifying control algorithm, said controlled object model having a variable associated with a value indicative of one of said target air/fuel ratio of the air/fuel mixture for converging the output of said downstream air/fuel ratio sensor to said target value and a value indicative of an output of said upstream air/fuel ratio sensor, and a variable associated with a value indicative of the output of said downstream air/fuel ratio sensor; and control the air/fuel ratio of the air/fuel mixture in accordance with the calculated target air/fuel ratio.

156. An engine control unit according to claim 155, wherein said control program further causes the computer to identify the model parameter for said controlled object model in accordance with one of said target air/fuel ratio and the output of said upstream air/fuel ratio sensor, and the output of said downstream air/fuel ratio sensor.

157. An engine control unit according to claim 156, wherein:

said controlled object model comprises a discrete time system model, wherein said control program causes the computer to identify the model parameter for said discrete time system model in accordance with one of discrete data of said target air/fuel ratio and discrete data of the output of said upstream air/fuel ratio sensor, and discrete data of the output of said downstream air/fuel ratio sensor.

158. An engine control unit according to claim 155, wherein said control program further causes the computer to set a model parameter for said controlled object model in accordance with said operating condition parameter.

159. An engine control unit according to claim 138, wherein said response specifying control algorithm is a sliding mode control algorithm.

* * * * *